United States Patent
Aruga et al.

(10) Patent No.: US 8,790,458 B2
(45) Date of Patent: Jul. 29, 2014

(54) INK SET AND DROPLET EJECTION APPARATUS USING THE INK SET

(75) Inventors: Tomohiro Aruga, Matsumoto (JP); Daisuke Ishihara, Matsumoto (JP)

(73) Assignee: Seiko Epson Corporation (JP)

( * ) Notice: Subject to any disclaimer, the term of this patent is extended or adjusted under 35 U.S.C. 154(b) by 202 days.

(21) Appl. No.: 13/534,391

(22) Filed: Jun. 27, 2012

(65) Prior Publication Data

US 2013/0002757 A1 Jan. 3, 2013

(30) Foreign Application Priority Data

| Jun. 28, 2011 | (JP) | 2011-142927 |
| Jun. 28, 2011 | (JP) | 2011-142973 |
| Jun. 28, 2011 | (JP) | 2011-142974 |
| Jun. 28, 2011 | (JP) | 2011-143003 |

(51) Int. Cl.
*C09D 11/02* (2014.01)

(52) U.S. Cl.
USPC ............ 106/31.28; 106/31.47; 106/31.48; 106/31.5

(58) Field of Classification Search
USPC ........... 106/31.28, 31.47, 31.48, 31.5; 347/33
See application file for complete search history.

(56) References Cited

U.S. PATENT DOCUMENTS

| 6,153,001 | A | 11/2000 | Suzuki et al. | |
| 7,771,525 | B2 * | 8/2010 | Morita et al. | 106/31.48 |
| 8,496,746 | B2 * | 7/2013 | Teramoto et al. | 106/31.48 |
| 8,506,697 | B2 * | 8/2013 | Morita et al. | 106/31.48 |
| 8,512,462 | B2 * | 8/2013 | Matsui et al. | 106/31.48 |
| 8,657,433 | B2 * | 2/2014 | Ooshima et al. | 347/100 |
| 2005/0279246 | A1 | 12/2005 | Ohira et al. | |
| 2009/0130399 | A1 * | 5/2009 | Takahashi et al. | 106/31.48 |
| 2010/0056704 | A1 | 3/2010 | Iwamura et al. | |
| 2011/0234695 | A1 * | 9/2011 | Yamazaki et al. | 347/33 |
| 2012/0147084 | A1 * | 6/2012 | Ikeda et al. | 347/20 |
| 2012/0148807 | A1 * | 6/2012 | Ikeda et al. | 428/195.1 |
| 2012/0301685 | A1 * | 11/2012 | Iseki et al. | 106/31.48 |
| 2013/0002754 | A1 * | 1/2013 | Aruga et al. | 106/31.28 |
| 2013/0101811 | A1 * | 4/2013 | Kawaguchi et al. | 428/195.1 |

FOREIGN PATENT DOCUMENTS

| JP | 11-181340 | 7/1999 |
| JP | 2004-075719 | 3/2004 |
| JP | 2006-002094 | 1/2006 |
| JP | 2010-084136 | 4/2010 |

* cited by examiner

*Primary Examiner* — Helene Klemanski
(74) *Attorney, Agent, or Firm* — Harness, Dickey & Pierce, P.L.C.

(57) ABSTRACT

The ink set according to the invention includes a first ink containing water, pigments, and first metal ions as counter-ions of the pigments; and a second ink containing water, specific dyes, and second metal ions as counter-ions of the dyes, in which the maximum equivalent conductivity [$S \cdot cm^2$/eq] of the first metal ions is greater than the maximum equivalent conductivity [$S \cdot cm^2$/eq] of the second metal ions.

20 Claims, 3 Drawing Sheets

INK SET AND DROPLET EJECTION APPARATUS USING THE INK SET

The entire disclosure of Japanese Application Nos. 2011-142927 filed on Jun. 28, 2011; 2011-142973 filed on Jun. 28, 2011; 2011-142974 filed on Jun. 28, 2011; and 2011-143003 filed on Jun. 28, 2011 are expressly incorporated by reference herein.

BACKGROUND

1. Technical Field

The present invention relates to an ink set and a droplet ejection apparatus using the ink set.

2. Related Art

Hitherto, inks containing pigments or dyes as coloring materials have been known. Pigment inks containing pigments as coloring materials are particularly preferably used for recording letters and the like due to the fact they have little bleeding and favorable water resistance and light resistance. Further, dye inks containing dyes as coloring materials are particularly preferably used for recording images and the like due to the fact they have favorable glossiness and color development, as well as vivid colors.

When the pigment ink and the dye ink provided with the above-described characteristics are used together, the recording quality of both the letters and images recorded on a recording medium becomes excellent. For this reason, in recent years, ink sets provided with both pigment ink and dye ink have been widely used.

Here, when an ink set provided with the pigment ink and the dye ink is applied to an ink jet recording apparatus, there are times when the pigment ink and the dye ink are mixed together at a nozzle surface provided with nozzle holes for ejecting ink. In such a case, there are times when the dispersion of the pigments in the pigment ink is disrupted by the dye ink and the pigments become aggregated. In particular, when the nozzle surface is cleaned by a wiping member provided for cleaning the nozzle surface, there have been times when the nozzle holes are blocked by the aggregations of pigment and the ejection stability of the ink is deteriorated. Further, defects have been generated in which the aggregations of pigments attached to the nozzle surface fall onto the recording medium.

In order to reduce this kind of pigment aggregation, JP-A-2010-84136 discloses adding a polymer having a lactam structure to the dye ink. Further, JP-A-2006-2094 discloses regulating the amount of counter-ions included in the pigment ink and dye ink.

However, in the above-described techniques of the related art, when the pigment ink and the dye ink were mixed together, it was not possible to sufficiently suppress the disruption of the pigment dispersion and there were times when aggregation of the pigments occurred. In particular, when using dye ink containing specific dyes refined in order to improve characteristics such as weather resistance (for example, light resistance and gas resistance), if the dye ink and pigment ink were mixed together, there were times when the dispersion of the pigments was remarkably deteriorated.

SUMMARY

An advantage of some aspects of the invention is that there is provided an ink set for which the dispersion of pigments included in pigment ink is favorable even in a case where pigment ink and dye ink are mixed together.

The invention can be realized in the following forms or application examples.

Application Example 1

According to Application Example 1, there is provided an ink set including: a first ink containing water, pigments, and first metal ions as counter-ions of the pigments; and a second ink containing water, dyes represented by at least one type selected from the group consisting of the following general formula (1A), the following general formula (1B), the following general formula (1C) and the following general formula (1D), and second metal ions as counter-ions of the dyes, in which the maximum equivalent conductivity [$S \cdot cm^2/eq$] of the first metal ions disclosed in the following (condition 1) or (condition 2) is greater than the maximum equivalent conductivity [$S \cdot cm^2/eq$] of the second metal ions disclosed in the following (condition 3) or (condition 4).

(condition 1) when the first metal ions are formed of one type of metal ions, the maximum equivalent conductivity of the first metal ions is set to the maximum equivalent conductivity of the one type of metal ions (condition 2) when the first metal ions are formed of two or more types of metal ions, the maximum equivalent conductivity of the first metal ions is the average of the limits of the equivalent conductivity of the two or more types of metal ions (condition 3) when the second metal ions are formed of one type of metal ions, the maximum equivalent conductivity of the second metal ions is set to the maximum equivalent conductivity of the one type of metal ions (condition 4) when the second metal ions are formed of two or more types of metal ions, the maximum equivalent conductivity of the second metal ions is the average of the limits of the equivalent conductivity of the two or more types of metal ions

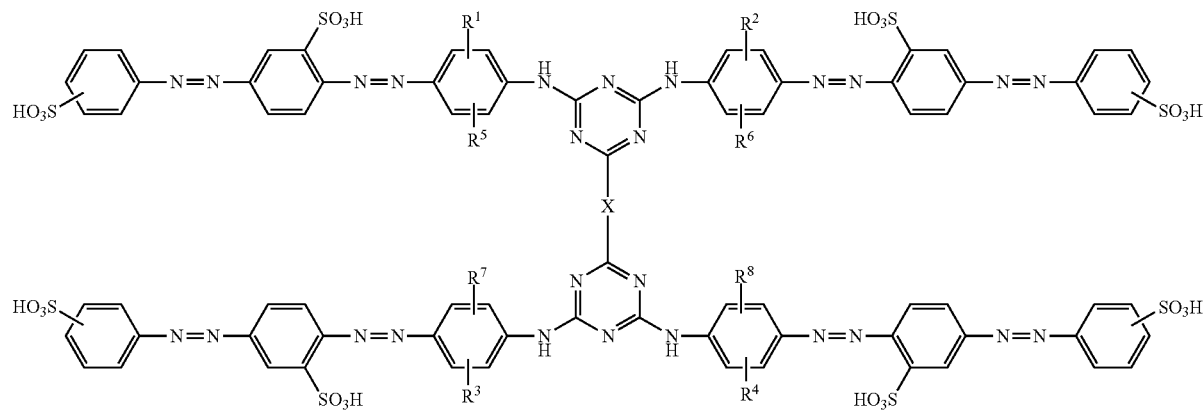

(1A)

(In the formula (1A), $R^1$, $R^2$, $R^3$, $R^4$, $R^5$, $R^6$, $R^7$, and $R^8$ each independently represents a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one kind of group selected from a group of a hydroxy group, a C1-C4 alkoxy group, a hydroxy C1-C4 alkoxy group, a sulfo group, and a carboxy group as a substituent; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one kind of group selected from a group of a hydroxy group, a sulfo group, and a carboxy group as a substituent; a di-C1-C4 alkylureido group substituted with at least one kind of group selected from a group of a hydroxy group, a sulfo group, and a carboxy group as a substituent; a benzoylamino group; a benzoylamino group in which a benzene ring is substituted with at least one kind of group selected from a group of a halogen atom, a C1-C4 alkyl group, a nitro group, a sulfo group, and a carboxy group; a benzenesulfonylamino group; or a phenylsulfonylamino group in which a benzene ring is substituted with at least one kind of group selected from a group of a halogen atom, a C1-C4 alkyl group, a nitro group, a sulfo group, and a carboxy group; and X represents a divalent crosslinked group.)

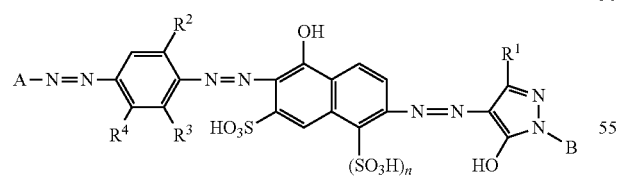

(1B)

(In formula (1B), n is 0 or 1, $R^1$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group; $R^2$, $R^3$, and $R^4$ each independently represents a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy C1-C4 alkoxy group, a sulfo group or a carboxy group; a mono or di-C1-C4 alkylamino group which may be substituted with a hydroxy group, a sulfo group or a carboxy group; a C1-C4 alkylcarbonylamino group which may be substituted with a hydroxy group or a carboxy group; an N'—C1-C4 alkylureido group which may be substituted with a hydroxy group, a sulfo group or a carboxy group; a phenylamino group in which a benzene ring may be substituted with a chlorine atom, a C1-C4 alkyl group, a nitro group, a sulfo group or a carboxy group; a benzoylamino group in which a benzene ring may be substituted with a chlorine atom, a C1-C4 alkyl group, a nitro group, a sulfo group or a carboxy group; or a phenylsulfonylamino group in which a benzene ring may be substituted with a chlorine atom, a C1-C4 alkyl group, a nitro group, a sulfo group or a carboxy group; and group A is a substituted heterocyclic group represented by the following general formula (2B) or the following general formula (3B)

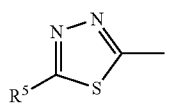

(2B)

(In the formula (2B), $R^5$ represents a mercapto group; or a C1-C4 alkylthio group which may be substituted with a hydroxy group, a C1-C4 alkoxy group, a hydroxy C1-C4 alkoxy group, a sulfo group or a carboxy group.)

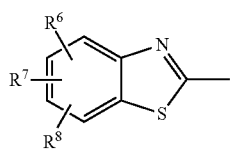

(3B)

(In the formula (3B), $R^6$, $R^7$, and $R^8$ each independently represents a hydrogen atom; a chlorine atom; a carboxy group; a sulfo group; nitro group; a hydroxy group; a carbamoyl group; a sulfamoyl group; a C1-C4 alkyl group; a C1-C4 alkoxy group which may be substituted with a hydroxy group, a C1-C4 alkoxy group, a sulfo group or a carboxy group; a C1-C4 alkylsulfonyl group which may be substituted with a hydroxy group, a sulfo group or a carboxy group; or a phenylsulfonyl group in which a benzene ring may be substituted with a chlorine atom, a C1-C4 alkyl group, a nitro group, a sulfo group, or a carboxy group.)

Group B is a phenyl group or a naphthyl group which may be substituted, and, when group B is a substituted phenyl group, it has a substituent selected from a group of a hydroxy group; a sulfo group; a carboxy group; a C1-C4 alkyl group; a C1-C4 alkoxy group; an amino group; a mono or di-C1-C4 alkylamino group; an acetylamino group; and a benzoylamino group in which a benzene ring may be substituted with a chlorine atom, a C1-C4 alkyl group, a nitro group, a sulfo group, or a carboxy group, and, when group B is a substituted naphthyl group, it has a substituent selected from a group of a hydroxy group; a sulfo group; a C1-C4 alkoxy group; and a phenylsulfonyloxy group in which a benzene ring may be substituted with a methyl group, a nitro group, or a chlorine atom.)

arylamino group, a C1-C3 alkylcarbonylamino group, a ureido group, a C1-C6 alkyl group, a nitro group, a cyano group, a halogen atom, a C1-C6 alkylsulfonyl group, and a C1-C6 alkylthio group, R represents a hydrogen atom; a sulfo group; a carboxy group; a phosphoric acid group; a sulfamoyl group; a carbamoyl group; a hydroxy group; a C1-C6 alkoxy group; an amino group; a mono-C1-C6 alkylamino group; a di-C1-C6 alkylamino group; a monoarylamino group; a diarylamino group; a C1-C3 alkylcarbonylamino group; a ureido group; a C1-C6 alkyl group; a nitro group; a cyano group; a halogen atom; a C1-C6 alkylsulfonyl group; or an alkylthio group, Group F represents a phenyl group; or a 6-membered nitrogen-containing heterocyclic aromatic ring,

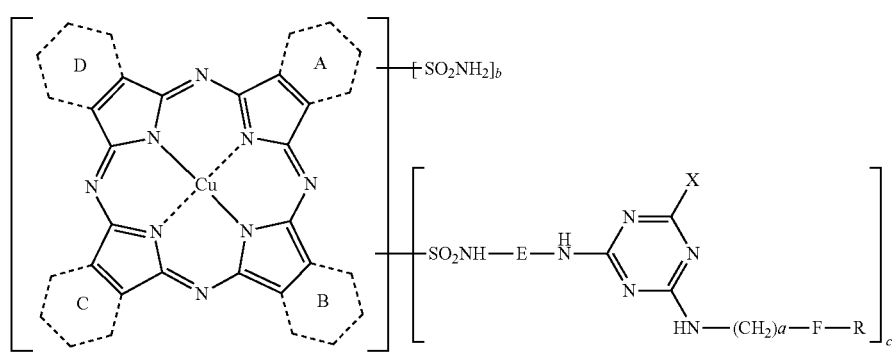

(1C)

(In the formula (1C),
rings A to D represented by a dashed line each independently represents a benzene ring or a 6-membered nitrogen-containing heterocyclic aromatic ring condensed to a porphyrazine ring, the number of nitrogen-containing heterocyclic aromatic rings is greater than 0.00 to 3.00 or less as an average value, and the remainder are benzene rings, E represents a C2-C12 alkylene, X is a sulfoanilino group, a carboxyanilino group, a phosphonoanilino group, a sulfonaphthylamino group, a carboxynaphthylamino group or a phosphononaphthylamino group which may have, as a substituent, one kind or two kinds or more selected from a group of a sulfo group, a carboxy group, a phosphoric acid group, a sulfamoyl group, a carbamoyl group, a hydroxy group, a C1-C6 alkoxy group, an amino group, a mono-C1-C4 alkylamino group, a di-C1-C4 alkylamino group, a mono-C6-C10 arylamino group, di-C6-C10 a represents an integer of 1 or more to 6 or less, b represents 0.00 or more to less than 3.90 as an average value, c represents 0.10 or more to less than 4.00 as an average value, and the sum of b and c is 1.00 or more to less than 4.00 as an average value.)

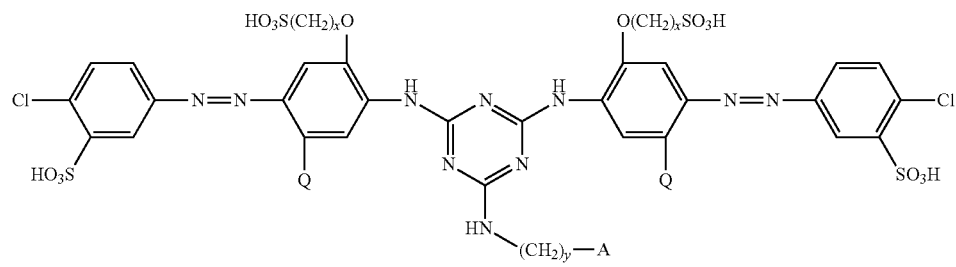

(1D)

(In formula (1D), Q represents a halogen atom, A represents a sulfo group, a carboxy group or a hydroxy group, x represents an integer of 2 or more to 4 or less, and y represents an integer of 1 or more to 3 or less.)

According to the ink set of Application Example 1, the dispersion of the pigments included in the first ink is favorable even when the first ink and the second ink are mixed together.

Application Example 2

In the ink set according to Application Example 1, the second metal ions may be at least one of sodium ions and lithium ions.

Application Example 3

In the ink set according to Application Example 1 or Application Example 2, the first metal ions may be at least one of potassium ions and sodium ions.

Application Example 4

In the ink set according to any one of Application Example 1 to Application Example 3, the divalent crosslinked group represented by the X in the general formula (1A) may be a group selected from a group of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group in which the alkyl member is substituted with a hydroxy group or a carboxy group; an amino C1-C6 alkoxy C1-C6 alkylamino group; an amino C1-C4 alkoxy C1-C4 alkoxy C1-C4 alkylamino group; a xylylenediamino group; a piperazine-1,4-diyl group; a piperazine-1,4-diyl group substituted with a C1-C4 alkyl group or a C1-C4 alkoxy group; or a phenylenediamino group.

Application Example 5

In the ink set according to any one of Application Example 1 to Application Example 4, $R^1$, $R^2$, $R^3$, $R^4$, $R^5$, $R^6$, $R^7$, and $R^8$ in the general formula (1A) may each independently be a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group.

Application Example 6

In the ink set according to any one of Application Example 1 to Application Example 5, the dyes may be a compound represented by the following formula (2A) or a salt thereof.

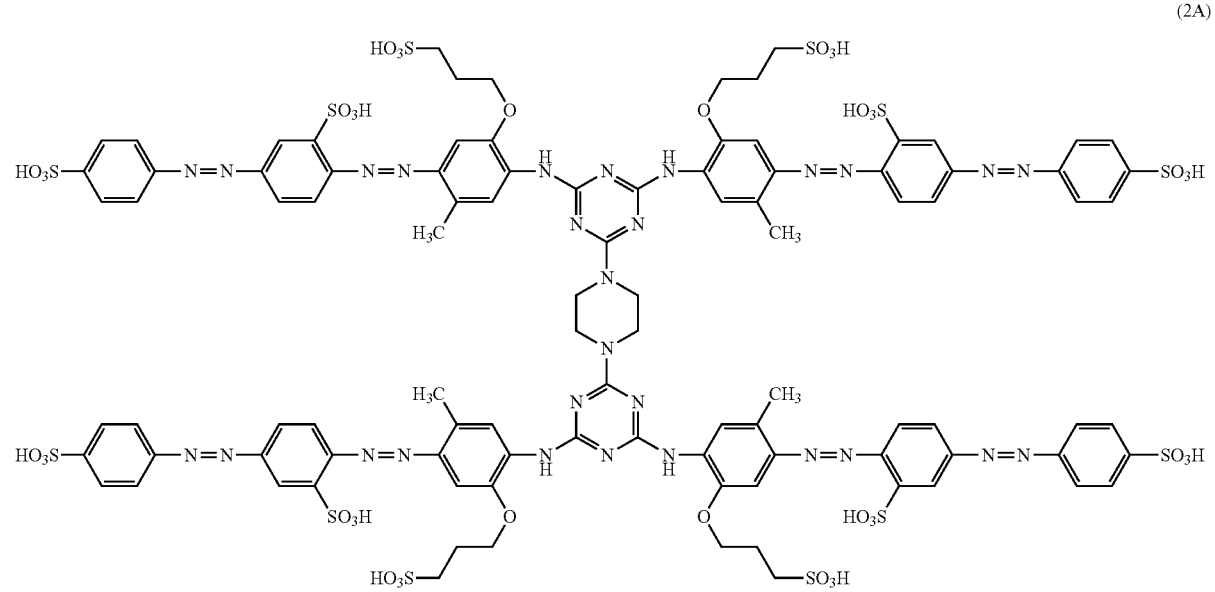 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O]

(2A)

Application Example 7

In the ink set according to any one of Application Example 1 to Application Example 3, in the general formula (1B), $R^1$ may be a carboxy group or an unsubstituted C1-C4 alkyl group, $R^2$ may be a sulfo C1-C4 alkoxy group, and $R^3$ may be a hydrogen atom, a methyl group, or an ethyl group.

Application Example 8

In the ink set according to any one of Application Example 1 to Application Example 3 or Application Example 7, the group A is a substituted heterocyclic group represented by the general formula (3B), and, in the general formula (3B), $R^6$, $R^7$, and $R^8$ may each independently be a hydrogen atom, a chlorine atom, a carboxy group, a sulfo group, a nitro group, a C1-C4 alkyl group, a C1-C4 alkoxy group, and a C1-C4 alkylsulfonyl group.

Application Example 9

In the ink set according to any one of Application Example 1 to Application Example 3 or Application Example 7 or Application Example 8, the dyes may be a compound represented by the following formula (4B) or a salt thereof.

R may be a hydrogen atom; a sulfo group; a carboxy group; a C1-C6 alkoxy group; a C1-C6 alkyl group; or a halogen atom, group F may be a phenyl group; or a pyridyl group in which R is a hydrogen atom, and a may be an integer of 1 or 2.

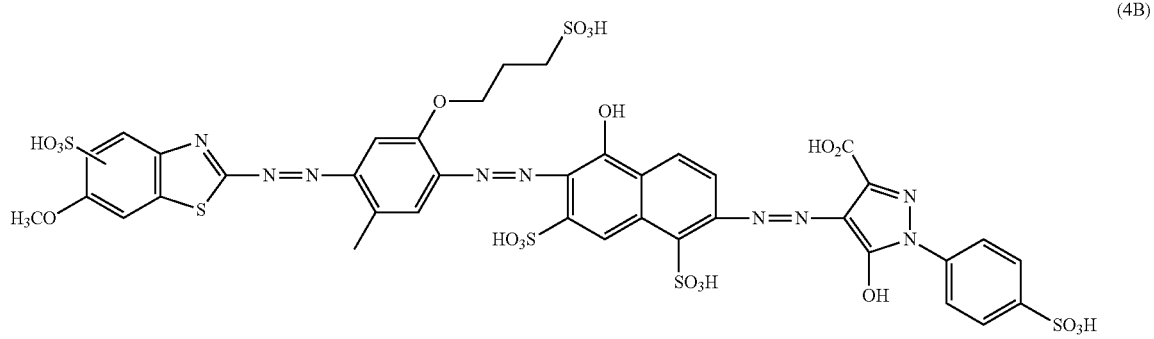

(4B)

Application Example 10

In the ink set according to any one of Application Example 1 to Application Example 3, in the general formula (1C), the nitrogen-containing heterocyclic aromatic rings of rings A to D may each independently be pyridine rings condensed at the 2-position and the 3-position or the 3-position and the 4-position; or pyrazine rings condensed at the 2-position and the 3-position, E may be a linear C2-C4 alkylene, X may be a sulfoanilino group which may have zero to two substituents of one kind or two kinds of substituent selected from a group of a sulfo group, a carboxy group, a hydroxy group, a C1-C6 alkoxy group, an amino group, a mono-C1-C4 alkylamino group, a di-C1-C4 alkylamino group, a C1-C3 alkylcarbonylamino group, a nitro group, a halogen atom, a C1-C6 alkylsulfonyl group, and a C1-C6 alkylthio group as a substituent; a carboxyanilino group which may have zero to two substituents of one kind or two kinds of substituent selected from a group of a sulfo group, a carboxy group, a hydroxy group, and a sulfamoyl group as a substituent; a phosphonoanilino group; or a sulfonaphthylamino group which may have zero to two substituents of one kind or two kinds of substituent selected from a sulfo group and a hydroxy group as a substituent,

Application Example 11

In the ink set according to any one of Application Example 1 to Application Example 3 and Application Example 10, in the general formula (1C), the nitrogen-containing heterocyclic aromatic rings of rings A to D may each independently be pyridine rings condensed at the 2-position and the 3-position, E may be ethylene, X may be a sulfoanilino group which may have zero or one sulfo group as a substituent; or a sulfonaphthylamino group having two sulfo groups as substituents, R is a hydrogen atom, a sulfo group, or a carboxy group, group F may be a phenyl group, or a pyridyl group in which R is a hydrogen atom, a may be an integer of 1, b may be 0.00 or more to less than 3.90 as an average value, c may be 0.10 or more to less than 4.00 as an average value, and the sum of b and c may be 1.00 or more to less than 4.00 as an average value.

Application Example 12

In the ink set according to any one of Application Example 1 to Application Example 3, the dyes may be a compound represented by the following formula (2D) or a salt thereof.

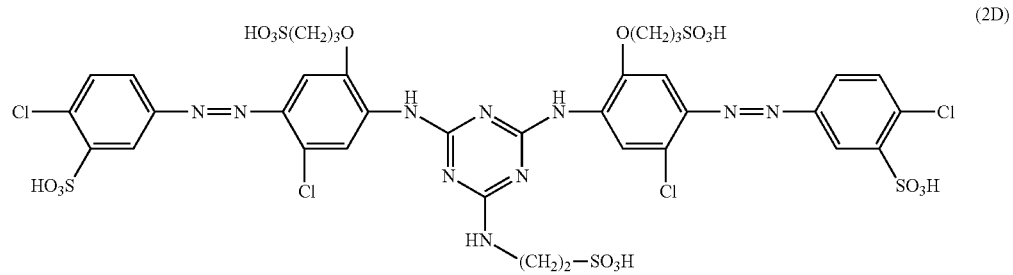

(2D)

Application Example 13

According to another aspect of the invention, there is provided a droplet ejection apparatus including:

the ink set provided with the first ink and the second ink according to any one of Application Example 1 to Application Example 12, a nozzle surface provided with nozzle holes for ejecting the first ink and the second ink, and a wiping member for wiping the nozzle surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
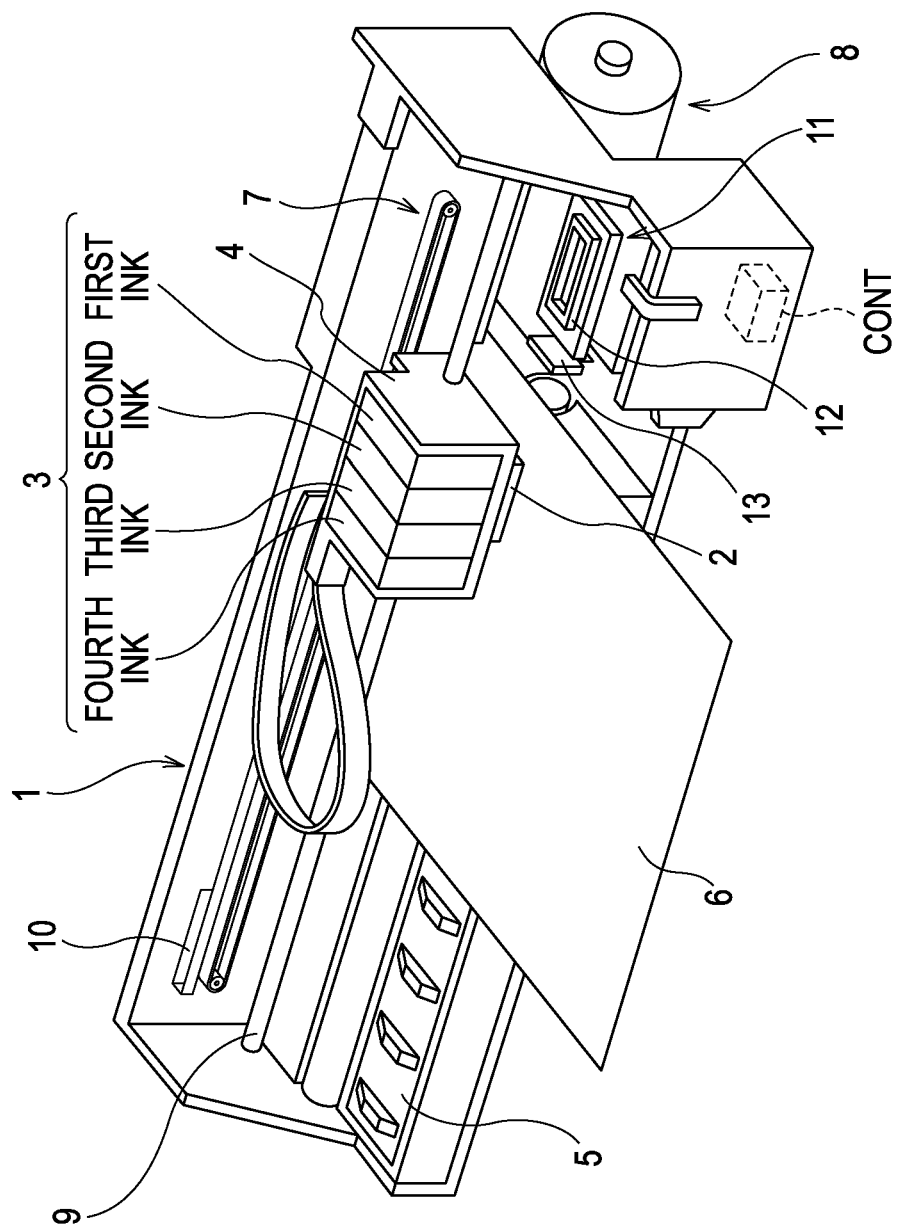
FIG. 1 is a perspective view showing a configuration of a printer according to an embodiment of the invention.

Below, description will be given of favorable embodiments of the invention. The embodiments described below are for describing examples of the invention. Further, the invention is not limited by the following embodiments and includes various types of modifications carried out in a range not departing from the gist of the invention.

Here, in the invention, the acid functionality of the sulfo group, the carboxy group, or the like is represented in the form of a free acid unless otherwise noted.

In the invention, the [Cv-Cw alkyl (group)] (v and w are integers, respectively) signifies an alkyl group including v to w carbon atoms. For example, a C1-C4 alkyl is an alkyl group including 1 to 4 carbon atoms. The alkyl group may have either of a linear or a branched structure, unless otherwise noted.

Further, the [Cv-Cw alkoxy (group)] (v and w are integers, respectively) signifies an alkoxy group including v to w carbon atoms. For example, a C1-C4 alkoxy is an alkoxy group including 1 to 4 carbon atoms. The alkoxy group may have either of a linear or a branched structure, unless otherwise noted.

Further, the [Cv-Cw alkylene (group)] (v and w are integers, respectively) signifies an alkylene group including v to w carbon atoms. For example, a C1-C4 alkylene is an alkylene group including 1 to 4 carbon atoms. The alkylene group may have either of a linear or a branched structure, unless otherwise noted.

Further, the [Cv-Cw alkylamino (group)], the [Cv-Cw arylamino (group)], the [Cv-Cw alkylcarbonylamino (group)], the [Cv-Cw alkylsulfonyl (group)], and the [Cv-Cw alkylthio (group)] indicate groups including v to w carbon atoms, in the same manner as the [Cv-Cw alkyl (group)], and may have either of a linear or a branched structure, unless otherwise noted.

1.1 First Ink

The ink set according to the embodiment includes a first ink. Below, detailed description will be given of the components included in the first ink.

1.1.1. Pigments

The first ink contains pigments. It is possible to use well-known pigments as the pigments; however, it is preferable that the pigments be a self-dispersing type. The self-dispersing type pigments are pigments capable of dispersing in an aqueous medium without a dispersing agent. Here, "dispersing in an aqueous medium without a dispersing agent" means a state of stably existing in the aqueous medium due to a hydrophilic group of the pigment surface even without using a dispersing agent for dispersing the pigments. When the self-dispersing type pigments are used, since it is possible to reduce the amount of dispersing agent used for dispersing the pigments, it is possible to reduce the bubbles of the ink caused by the dispersing agent and it is easy to prepare an ink with favorable ejection stability.

The self-dispersing type pigments may include a hydrophilic group on the pigment surface. The hydrophilic group of the pigment surface is preferably one or more hydrophilic groups selected from a group of $-OM$, $-COOM$, $-CO-$, $-SO_3M$, $-SO_2M$, $-SO_2NH_2$, $-RSO_2M$, $-PO_3HM$, $-PO_3M_2$, $-SO_2NHCOR$, $-NH_3$, and $-NR_3$ (M in the formula represents a hydrogen atom, an alkali metal, (for example, lithium, sodium, and potassium), ammonium, a phenol group which may have a substituent, or organic ammonium, R represents an alkyl group having 1 to 12 carbon atoms, or a naphthyl group which may have a substituent).

The first ink according to the embodiment includes pigments and metal salt of first metal ions and the pigments included in the first ink are preferably substantially formed of metal salts of the first metal ions. In the above manner, when the pigments included in the first ink have a metal salt structure, the dispersion of the pigments is improved and pigment aggregation is not easily generated.

As the first metal ions included in the first ink as the counter-ions of the pigments, at least one of potassium ions and sodium ions is preferable. In this manner, it is possible to improve the dispersion of the pigments in the first ink.

By performing a physical process or a chemical process, for example, the pigments are produced by bonding (grafting) the hydrophilic group to the surface of the pigments. As the physical process, for example, vacuum plasma processing and the like may be exemplified. Further, as the chemical process, for example, a wet oxidation process of oxidizing using an oxidizing agent in water, a method of bonding a carboxyl group through a phenyl group by bonding p-aminobenzoic acid to the pigment surface, or the like may be exemplified.

When black ink (below referred to as "pigment black ink") is used as the first ink, it is preferable from the viewpoint of high color development that the pigments undergo surface processing according to an oxidation process using a hypohalous acid and/or a hypohalous acid salt, an oxidation process using ozone, or an oxidation process using persulfuric acid and/or a persulfuric acid salt.

When ink of a color other than black (below referred to as "pigment color ink") is used as the first ink, it is preferable from the viewpoint of high color development that the pigments include the above-described hydrophilic group at the surface thereof through a phenyl group. As surface processing means that bonds the hydrophilic group to the pigment surface through the phenyl group, various well-known surface processing means may be applied and a method of bonding the hydrophilic group through the phenyl group by bonding sulfanilic acid, p-aminobenzoic acid, 4-aminosalicylic acid and the like to the pigment surface and the like may be exemplified.

The pigments used in the pigment black ink may use carbon black produced by a well-known method such as a contact method, a furnace method, or a thermal method, for example. Preferable specific examples of the carbon black include No. 2300, 900, MCF88, No. 20B, No. 33, No. 40, No. 45, No. 52, MA7, MA8, MA100, No. 2200B (the above manufactured by Mitsubishi Chemical Corporation.), Color Black FW1, FW2, FW2V, FW18, FW200, 5150, 5160, 5170, Printex 30, U, V, 140U, Special Black 6, 5, 4A, 4, 250 (the above manufactured by Evonik Degussa, Ltd.), Conductex SC, Loewen 1255, 5750, 5250, 5000, 3500, 1255, 700 (the above manufactured by Columbia Carbon, Ltd.), Regal 400R, 330R, 660R, Mogul L, Monarch 700, 800, 880, 900, 1000, 1100, 1300, 1400, Elf Tex 12 (manufactured by Cabot, Corporation.), or the like. These carbon blacks may be used as a single type or a mixture of two or more types.

Further, as the pigments used in the pigment color ink, other than pigments such as Pigment Red, Pigment Violet, and Pigment Blue described in a color index, pigments based on phthalocyanine, azo, anthraquinone, azomethine, condensed rings and the like may be exemplified. Further, organic pigments such as orange No. 228, No. 405, blue No. 1, and No. 404, and inorganic pigments such as titanium oxide, zinc oxide, zirconium oxide, iron oxide, ultramarine blue, prussian blue, and chrome oxide may be exemplified, specifically, for example, C. I. Pigment Red 1, 3, 5, 8, 9, 16, 17, 19, 22, 38, 57:1, 90, 112, 122, 123, 127, 146, 184, C. I. Pigment Violet 1, 3, 5:1, 16, 19, 23, 38, C. I. Pigment Blue 1, 2, 15, 15:1, 15:2, 15:3, 15:4, and 16 may be exemplified.

Further, it is also possible to use commercial products as the pigments, for example, Microjet CW1 (manufactured by Orient Chemical Industries Co., Ltd.), CAB-O-JET 250C, CAB-O-JET 260M (the above manufactured by Cabot, Corporation.), or the like may be exemplified.

The content of the pigments is preferably from 1% by mass or more to 20% by mass or less with respect to the total mass of the first ink composition, and more preferably 1% by mass or more to 10% by mass or less.

Further, the average particle diameter of the pigments is preferably in the range of 50 to 250 nm from the viewpoint of ink stability when stored, prevention of nozzle clogging, and the like.

1.1.2. Water

The ink composition according to the embodiment contains water. The water functions as the main solvent dispersing or dissolving the above-described pigments.

The water is preferably one for which ionic impurities have been removed as much as possible such as pure water or ultrapure water, such as ion-exchanged water, ultrafiltration water, reverse osmosis water, and distilled water. Further, the use of water sterilized by ultraviolet irradiation, the addition of hydrogen peroxide, or the like, is preferable since it is possible to prevent the generation of mold and bacteria in the case of long-term storage of the pigment dispersion and the ink using the same.

The water contained in first ink according to the embodiment is preferably 50% by mass or more with respect to the total mass of the first ink.

1.1.3. Other Components

The first ink according to the embodiment may contain a surfactant. As the surfactant, nonionic surfactants, cationic surfactants, anionic surfactants, amphoteric surfactants, and the like may be exemplified. One surfactant may be used alone or a mixture of two or more may be used.

Among the above, the use of the nonionic surfactants is preferable since, in addition to being able to improve the permeability and fixability with respect to the recording medium of the ink, they enable the shape of the droplets of the ink attached onto the recording medium by the ink jet recording method to be close to a perfect circle.

In addition, even among the nonionic surfactants, the use of an acetylene glycol-based surfactant is more preferable from the viewpoint of having an excellent ability to appropriately maintain the surface tension and interfacial tension and a characteristic of almost no foaming. As the acetylene glycol-based surfactant, 2,4,7,9-tetramethyl-5-decyne-4,7-diol, 3,6-dimethyl-4-octyne-3,6-diol, or 3,5-dimethyl-1-hexyne-3-ol, 2,4-dimethyl-5-hexyne-3-ol, or the like may be exemplified. In addition, the acetylene glycol-based surfactant can also be a commercial product, for example, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA (the above are all trade names manufactured by Air Products and Chemicals. Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (the above are all trade names manufactured by Nissin Chemical Industry Co., Ltd.), Acetylenol E00, E00P, E40, E100 (the above are all trade names manufactured by Kawaken Fine Chemicals Co., Ltd.), and the like may be exemplified.

In a case where a surfactant is contained, the content is preferably 0.1% by mass or more to 5% by mass or less with respect to the total mass of the first ink.

The first ink according to the embodiment may contain a permeability enhancing agent. The permeability enhancing agent provides a uniform spreading action by further improving the wettability of the ink with respect to the recording medium. In this manner, it is possible to further reduce light and shade unevenness or bleeding of the ink of the formed image and to further improve the color development density of the image. One permeability enhancing agent may be used alone or a mixture of two or more may be used.

As the permeability enhancing agents, for example, glycol ethers may be exemplified. The glycol ethers have a particularly excellent effect as a permeability enhancing agent. As glycol ethers, for example, ethylene glycol monobutyl ether, diethylene glycol monobutyl ether, triethylene glycol monoethyl ether, triethylene glycol monobutyl ether, propylene glycol monomethyl ether, dipropylene glycol monoethyl ether, propylene glycol monobutyl ether, dipropylene glycol monobutyl ether, and the like may be exemplified. Among these, from the viewpoint of having excellent compatibility with the component included in the first ink according to the embodiment, triethylene glycol monobutyl ether may be preferably used.

In a case where a permeability enhancing agent is contained, the content is preferably 1% by mass or more to 15% by mass or less with respect to the total mass of the first ink.

The first ink according to the embodiment may contain a moisturizing agent. As the moisturizing agent, for example, 1,2-alkanediols, polyvalent alcohols, pyrrolidone derivatives, ureas, and the like may be exemplified. One moisturizing agent may be used alone or a mixture of two or more may be used.

Since the 1,2-alkanediols improve the wettability of the ink with respect to the recording medium and have an excellent uniform wetting action, it is possible to form an excellent image on the recording medium. As the 1,2-alkanediols, for example, 1,2-propanediol, 1,2-butanediol, 1,2-pentanediol, 1,2-hexanediol, 1,2-octanediol and the like, may be exemplified. In a case where 1,2-alkanediols are contained, the content is preferably 1% by mass or more to 20% by mass or less with respect to the total mass of the first ink.

When the first ink is used in the ink jet recording apparatus, the polyvalent alcohols may be preferably used from the viewpoint of being able to suppress drying and hardening of the ink at the nozzle surface of the head and reduce nozzle clogging, ejection defects, or the like. As the polyvalent alcohols, for example, ethylene glycol, diethylene glycol, triethylene glycol, propylene glycol, dipropylene glycol, 1,3-propanediol, 1,4-butanediol, 1,6-hexanediol, trimethylolpropane, glycerine, and the like may be exemplified. In a case where polyvalent alcohols are contained, the content is preferably 1% by mass or more to 30% by mass or less with respect to the total mass of the first ink.

Pyrrolidone derivatives may be preferably used from the viewpoint of being able to suppress drying and hardening of the ink at the nozzle surface of the head and reduce nozzle clogging, ejection defects, or the like. As the pyrrolidone derivatives, for example, N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like may be exemplified. In a case where a pyrrolidone derivative is contained, the content is preferably 1% by mass or more to 10% by mass or less with respect to the total mass of the first ink.

When the first ink is used in the ink jet recording apparatus, the ureas may be preferably used from the viewpoint of being able to suppress drying and hardening of the ink at the nozzle surface of the head and reduce nozzle clogging, ejection defects, or the like. As the ureas, for example, urea, thiourea, ethyleneurea, 1,3-dimethylimidazolidinone, or the like may be exemplified. In a case where a urea is contained, the content is preferably 1% by mass or more to 20% by mass or less with respect to the total mass of the first ink.

The first ink according to the embodiment may contain a pH adjusting agent. The pH adjusting agent can easily adjust the pH value of the first ink. One pH adjusting agent may be used alone or a mixture of two or more may be used.

As the pH adjusting agent, inorganic acids (for example, sulfuric acid, hydrochloric acid, nitric acid, or the like), inorganic bases (for example, lithium hydroxide, sodium hydroxide, potassium hydroxide, ammonia, and the like), organic bases (triethanolamine, diethanolamine, monoethanolamine, tri-iso-propanolamine), organic acids (for example, adipic acid, citric acid, succinic acid, or the like), and the like may be exemplified.

As the pH adjusting agent, even in the above, the use of at least one of an organic acid and an organic base is preferable. In particular, when an organic acid and an organic base are used in combination, the pH buffering capacity is higher than the combinations of an inorganic acid and an inorganic base, an inorganic acid and an organic base, and an organic acid and an inorganic base. Therefore, when the organic acid and organic base are used in combination, the effect of suppressing the fluctuation of the pH value is further improved and there is an effect whereby it is easy to set the desired pH.

The first ink according to the embodiment may further contain a preservative, a fungicide, a corrosion inhibitor, a chelating agents, and the like. When the first ink according to the embodiment contains these compounds, the characteristics thereof may be further improved.

As preservatives and fungicides, for example, sodium benzoate, pentachlorophenol sodium, sodium 2-pyridinethiol-1-oxide, sodium sorbate, sodium dehydroacetic acid, 1,2-dibenzisothiazolin-3-one, and the like may be exemplified. In commercially available products, Proxel XL2, Proxel GXL (the above are trade names manufactured by Avecia Corporation.), Denicide CSA, NS-500W (the above are trade names manufactured by Nagase ChemteX Corporation.), and the like may be exemplified.

As the corrosion inhibitor, for example, benzotriazole and the like may be exemplified.

As the chelating agent, for example, ethylenediaminetetraacetic acid and salts thereof (such as ethylenediaminetetraacetic acid disodium dihydrogen salt) and the like may be exemplified.

1.2. Second Ink

The ink set according to the embodiment includes a second ink. In the second ink, since the components other than the pigments in the components included in the above-described first ink may be used in the same manner, description of components used in the same manner will be omitted.

1.2.1. Dyes

1.2.1.1. Dye 1A a. Dyes

The second ink according to the embodiment contains dyes represented by the following general formula (1A) (below, referred to as "Dye 1A") and second metal ions as counterions of the dyes.

The dye 1A has a property of being not easily decomposed even when light is irradiated thereto, or when exposed to gas (in particular, ozone) in the atmosphere. Therefore, an image formed using the second ink has excellent light resistance and gas resistance (in particular, ozone resistance), and color changes or fading due to the influence of light and the atmosphere are not easily caused. Further, the dye 1A has a property of being not easily decomposed in ink. Therefore, the second ink has excellent stability when stored.

The content of the dye 1A is preferably from 1% by mass or more to 15% by mass or less with respect to the total mass of the second ink, and more preferably 1% by mass or more to 10% by mass or less. When the content of the dye 1A is within the above-described range, it is possible to improve the color development density of the recorded image, and to improve the light resistance and the gas resistance.

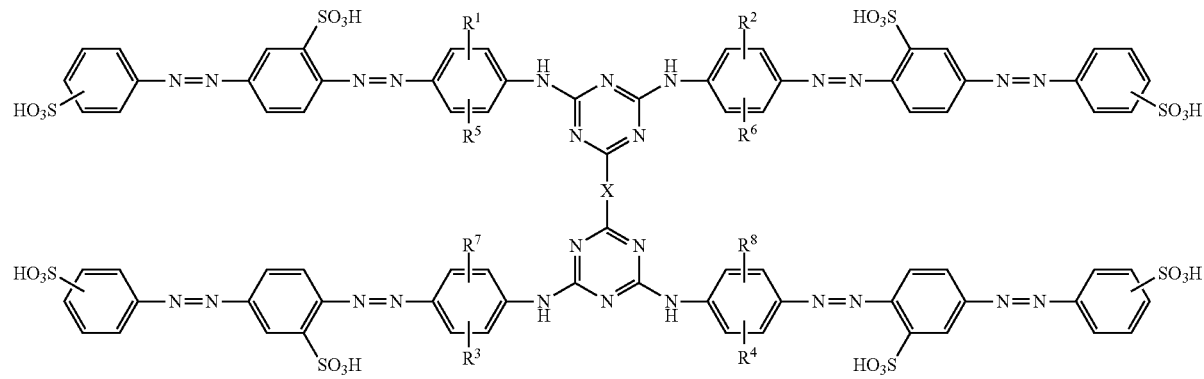

(1A)

In the above-described general formula (1A), $R^1$, $R^2$, $R^3$, $R^4$, $R^5$, $R^6$, $R^7$ and $R^8$ each independently represents a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with a group of at least one kind selected from the group consisting of a hydroxy group, a C1-C4 alkoxy group, a hydroxy C1-C4 alkoxy group, a sulfo group, and a carboxy group as a substituent; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with a group of at least one kind selected from the group consisting of a hydroxy group, a sulfo group, and a carboxy group as a substituent; a di-C1-C4 alkylureido group substituted with a group of at least one kind selected from the group consisting of a hydroxy group, a sulfo group, and a carboxy group as a substituent; a benzoylamino group; a benzoylamino group in which a benzene ring is substituted with a group of at least one kind selected from the group consisting of a halogen atom, a C1-C4 alkyl group, a nitro group, a sulfo group, and a carboxy group; a benzenesulfonylamino group; or a phenylsulfonylamino group in which a benzene ring is substituted with a group of at least one kind selected from the group consisting of a halogen atom, a C1-C4 alkyl group, a nitro group, a sulfo group, and a carboxy group.

Further, X represents a divalent crosslinked group.

In the above-described general formula (1A), as the halogen atom in $R^1$ to $R^8$, a fluorine atom, a chlorine atom, a bromine atom and an iodine atom may be exemplified. Among these, the fluorine atom, the chlorine atom, and the bromine atom are preferable and the chlorine atom is particularly preferable.

As the C1-C4 alkyl group in $R^1$ to $R^8$, a linear or branched group may be exemplified, and a linear group is preferable. As the C1-C4 alkyl group, for example, linear groups such as methyl, ethyl, n-propyl, and n-butyl; and branched groups such as isopropyl, isobutyl, sec-butyl, and t-butyl, may be exemplified. Preferable specific examples include methyl and ethyl and methyl is particularly preferable.

As the C1-C4 alkoxy group in $R^1$ to $R^8$, a linear or branched group may be exemplified. Specific examples include linear groups such as methoxy, ethoxy, n-propoxy, and n-butoxy; and branched groups such as isopropoxy, isobutoxy, sec-butoxy, and t-butoxy; and the like. Preferable specific examples include methoxy and ethoxy and methoxy is particularly preferable.

In the above $R^1$ to $R^8$, as the C1-C4 alkoxy group, which is substituted with a group of at least one kind selected from the group consisting of a hydroxy group, a C1-C4 alkoxy group, a hydroxy C1-C4 alkoxy group, a sulfo group, and a carboxy group as a substituent, one having these substituents for an arbitrary carbon atom in the C1-C4 alkoxy group may be exemplified. The number of the substituents is normally one or two and preferably one. The position of the substituents is not particularly limited; however, one in which two or more oxygen atoms are not substituted for the same carbon atom is preferable. Specific examples include a hydroxy C1-C4 alkoxy group such as 2-hydroxyethoxy, 2-hydroxypropoxy, and 3-hydroxypropoxy; a C1-C4 alkoxy C1-C4 alkoxy group such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, and n-propoxybutoxy; a hydroxy C1-C4 alkoxy C1-C4 alkoxy group such as 2-hydroxyethoxyethoxy; a carboxy C1-C4 alkoxy group such as carboxymethoxy, 2-carboxyethoxy, and 3-carboxypropoxy; a sulfo C1-C4 alkoxy group such as 2-sulfoethoxy, 3-sulfopropoxy, and 4-sulfobutoxy; and the like.

As the C1-C4 alkylcarbonylamino group in $R^1$ to $R^8$, a linear or branched group may be exemplified, and a linear group is preferable. Specific examples include linear ones such as acetylamino (methylcarbonylamino), ethylcarbonylamino, propylcarbonylamino, and butylcarbonylamino; and branched ones such as isopropylcarbonylamino, and t-butylcarbonylamino; and the like.

In $R^1$ to $R^8$, specific examples of the C1-C4 alkylcarbonylamino group, which is substituted with a carboxy group include, for example, a carboxy C1-C4 alkylcarbonylamino group such as 2-carboxyethylcarbonylamino, 3-carboxypropylcarbonylamino, or the like. The number of the substituents of the carboxy group is normally one or two and preferably one.

As the mono-C1-C4 alkylureido group in $R^1$ to $R^8$, one in which the alkyl member is linear or branched may be exemplified. The substitution position of the C1-C4 alkyl is not particularly limited; however, substituting at "N'" is preferable. In the specification, the term "mono-C1-C4 alkylureido group" signifies a "C1-C4 alkyl NH—CO—NH-" group or an "H$_2$N—CO—N(C1-C4 alkyl)-" group, and, in the benzene ring in which $R^1$ to $R^8$ are bonded, a nitrogen atom directly bonded to the benzene ring is written as "N", and the nitrogen atom bonded through this nitrogen atom and a carbonyl (CO) group is written as "N'". Therefore, as the substitution position of the C1-C4 alkyl, "N'" is the former, and "N" is the latter. Specific examples thereof include linear N'-ethyl ureido, N'-propyl ureido, N'-butyl ureido, and the like; branched N'-isopropyl ureido, N'-isobutyl ureido, N'-t-butyl ureido, and the like; and the like.

As the di-C1-C4 alkylureido group in $R^1$ to $R^8$, a linear or branched group may be exemplified. The substitution position of the C1-C4 alkyl is not particularly limited and it may be substituted at one each of "N" and "N'" or twice at "N'" based on the substitution position in the "mono-C1-C4 alkylureido group"; however, the latter is preferable. Further, two of the above C1-C4 alkyls may be the same or different; however, it is preferable that they be the same. Specific examples thereof include linear N',N'-dimethyl-ureido, N',N'-diethyl ureido, N',N'-di-propylureido, N',N'-dibutylureido and the like; branched N',N'-diisopropylureido, N',N'-diisobutylureido, and the like; and the like.

In $R^1$ to $R^8$, as the mono-C1-C4 alkylureido group, which is substituted with a group of at least one kind selected from the group consisting of a hydroxy group, a sulfo group, and a carboxy group as a substituent, one having these substituents for an arbitrary carbon atom in the mono-C1-C4 alkylureido group may be exemplified. The number of the substituents is normally one or two and preferably one. The position of the substituents is not particularly limited; however, one in which a nitrogen atom and a hydroxy group are not substituted for the same carbon atom is preferable. Specific examples include N'-mono(hydroxy C1-C4 alkyl) ureido groups such as N'-2-hydroxyethylureido, and N'-3-hydroxypropylureido; N'-mono(sulfo C1-C4 alkyl) ureido groups such as N'-2-sulfoethylureido, and N'-3-sulfopropylureido; N'-mono(carboxy C1-C4 alkyl) ureido groups such as N'-carboxymethylureido, N'-2-carboxyethylureido, N'-3-carboxypropylureido, N'-4-carboxybutylureido; and the like.

In $R^1$ to $R^8$, as the di-C1-C4 alkylureido group, which is substituted with a group of at least one kind selected from the group consisting of a hydroxy group, a sulfo group, and a carboxy group as a substituent, one having these substituents for an arbitrary carbon atom in the di-C1-C4 alkylureido group may be exemplified. The number of the substituents is normally one or two and preferably two. The position of the substituents is not particularly limited; however, one in which a nitrogen atom and a hydroxy group are not substituted for the same carbon atom is preferable. Further, when there are a plurality of substituents, the types thereof may be the same or different; however, it is preferable that they be the same. Specific examples include N',N'-di(hydroxy C1-C4 alkyl) ureido groups such as N',N-di(2-hydroxyethyl) ureido, N',N-di(2-hydroxypropyl)ureido, and N',N'-di(3-hydroxypropyl) ureido; N',N'-di(sulfo C1-C4 alkyl)ureido groups such as N'N'-di(3-sulfopropyl)ureido; N'N'-di(carboxy C1-C4 alkyl) ureido groups such as N'N'-di(carboxymethyl)ureido; and the like.

In $R^1$ to $R^8$, as the benzoylamino group, in which a benzene ring is substituted with a group of at least one kind selected from the group consisting of a halogen atom (a fluorine atom, a chlorine atom, a bromine atom and an iodine atom may be exemplified, and the chlorine atom is particularly preferable), a C1-C4 alkyl group, a nitro group, a sulfo group, and a carboxy group as a substituent, one having one to three of these substituents and preferably one or two may be exemplified. When there are a plurality of substituents, the types thereof may be the same or different; however, it is preferable that they be the same. Specific examples include halogen atom substituted benzoylamino groups such as 2-chloro-benzoylamino, 4-chloro-benzoylamino, and 2,4-dichloro-benzoylamino; C1-C4 alkyl-substituted benzoylamino groups such as 2-methyl-benzoylamino, 3-methyl-benzoylamino, and 4-methyl-benzoylamino; nitro-substituted benzoylamino groups such as 2-nitro-benzoylamino, 4-nitro-benzoylamino, and 3,5-di-nitro-benzoylamino; sulfo-substituted benzoylamino groups such as 2-sulfo-benzoylamino, and 4-sulfo-benzoylamino; carboxy-substituted benzoylamino groups such as 2-carboxy-benzoylamino, 4-carboxy-benzoylamino, and 3,5-di-carboxy-benzoylamino; and the like.

In $R^1$ to $R^8$, as the phenylsulfonylamino group in which a benzene ring is substituted with a group of at least one kind selected from the group consisting of a halogen atom, a C1-C4 alkyl group, a nitro group, a sulfo group, and a carboxy group, one having one to three of these substituents, preferably one or two, and more preferably one may be exemplified. When there are a plurality of substituents, the types thereof may be the same or different. Specific examples include halogen atom substituted phenylsulfonylamino groups such as 2-chlorophenylsulfonylamino, and 4-chlorophenylsulfonylamino; C1-C4 alkyl-substituted phenylsulfonylamino groups such as 2-methyl-phenylsulfonylamino, 4-methylphenylsulfonylamino, and 4-t-butylphenylsulfonylamino; nitro-substituted phenylsulfonylamino groups such as 2-nitrophenylsulfonylamino, 3-nitrophenylsulfonylamino, and 4-nitrophenylsulfonylamino; sulfo-substituted phenylsulfonylamino groups such as 3-sulfophenylsulfonylamino, and 4-sulfophenylsulfonylamino; carboxy-substituted phenylsulfonylamino groups such as 3-carboxyphenylsulfonylamino, and 4-carboxyphenylsulfonylamino; and the like.

In the above, as $R^1$ to $R^8$, a hydrogen atom; a halogen atom; a C1-C4 alkyl group; a C1-C4 alkoxy group; a C1-C4 alkoxy group substituted with a sulfo group or a carboxy group; and a C1-C4 alkylcarbonylamino group are preferable. Among these, a hydrogen atom, methyl, ethyl, t-butyl, 2-carboxyethoxy, 3-carboxypropoxy, 2-sulfoethoxy, 3-sulfopropoxy, and 4-sulfobutoxy are more preferable. Further, even among these, a hydrogen atom, methyl, and 3-sulfopropoxy are particularly preferable.

In general formula (1A), as $R^1$ to $R^8$, it is preferable that at least one be a C1-C4 alkoxy group substituted with a sulfo group. Further, it is more preferable that $R^1$ to $R^4$ be each independently a C1-C4 alkoxy group substituted with a hydrogen atom, a C1-C4 alkyl group, or a sulfo group, and at least one of $R^1$ to $R^4$ be a C1-C4 alkoxy group substituted with a sulfo group, and that $R^5$ to $R^8$ be each independently a hydrogen atom or a C1-C4 alkyl group. Further, it is even more preferable that at least one of $R^1$ and $R^2$ be a sulfopropoxy group, at least one of $R^3$ and $R^4$ be a sulfopropoxy group, and that $R^5$ to $R^8$ be a C1-C4 alkyl group.

The substitution position of $R^1$ to $R^8$ is not particularly limited; however, in the respective benzene rings which are substituted therein, it is preferable that the substitution position of the nitrogen atom bonded to the triazine ring be the 1-position, the substitution position of the azo group be the 4-position, and that $R^1$ to $R^4$ be substituted at the 2-position and $R^5$ to $R^8$ be substituted at the 5-position.

In the general formula (1A), the crosslinked group represented by X is not particularly limited as long as it is a divalent group within a range in which the dyes represented by the general formula (1A) exhibit solubility with respect to water. Here, as the solubility of the dyes represented by the general formula (1A) with respect to water, normally, 5 g or more of the dyes represented by the general formula (1A) dissolve with respect to one liter of water, preferably 10 g or more, more preferably 25 g or more, even more preferably 50 g or more, and particularly preferably 100 g or more, respectively. Specific examples thereof include divalent atoms such as nitrogen atoms, oxygen atoms, and sulfur atoms, (preferably divalent hetero atoms); an alkylenediamino group, an alkylenedioxy group, or an alkylenedithio group, of C1-C8, respectively; an N,N'-hydrazine-diyl group; an aminoalkoxyalkylamino group in which two alkylamino groups are substituted for an oxygen atom; one in which one each of an amino group and an alkylamino group are substituted at the ends of an alkylene oxide chain including one or more ether bonds of the aminoalkoxyalkylamino group or the like; and the like. The divalent crosslinked groups representing X may each have a group selected from the group consisting of a hydroxy group, a carboxy group and an alkoxy group as carbon atom substituents; or, an alkyl group in which the alkyl member may be substituted with a hydroxy group or a carboxy group as nitrogen atom substituents.

The divalent crosslinked group represented by the X is preferably any one selected from the group consisting of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group in which the alkyl member is substituted with a hydroxy group or a carboxy group; an amino C1-C6 alkoxy C1-C6 alkylamino group; an amino C1-C4 alkoxy C1-C4 alkoxy C1-C4 alkylamino group; a xylylenediamino group; a piperazine-1,4-diyl group; a piperazine-1,4-diyl group substituted with a C1-C4 alkyl group or a C1-C4 alkoxy group; or a phenylenediamino group. Further, these divalent crosslinked groups are "diamino" groups having two of any amino groups. Accordingly, the "diamino" includes both of a case where a group of a part of piperazine-1,4 diyl or the like is removed, and crosslinking is performed with any one nitrogen atom (that is, becoming N,N-diyl) and a case where crosslinking is performed with two different nitrogen atoms (that is, becoming N,N'-diyl). Of these, the latter case of becoming "N,N'-diyl" is particularly preferable.

In X, as the C1-C8 alkylenediamino group, a linear or branched group may be exemplified, and a linear group is preferable. The range of the number of carbon atoms may be exemplified as normally C1-C8, preferably C2-C8, more preferably C2-C6, and even more preferably C2-C4. Specific examples thereof include for example, linear ethylenediamino, 1,3-propylenediamino, 1,4-butylenediamino, 1,5-pentylenediamino, 1,6-hexylenediamino, 1,7-heptylenediamino, and 1,8-octylenediamino; branched 2-methyl-1,3-propylenediamino, 3-methyl-1,4-butylenediamino, 4-methyl-1,6-hexylenediamino, and the like; and the like.

In X, as the C1-C8 alkylenediamino group substituted with a hydroxy group or a carboxy group, ones having these substituents at an arbitrary carbon atom in the C1-C8 alkylenediamino group may be exemplified. The number of the substituents is not particularly limited; however, it is preferably one or two. Further, when there are a plurality of substituents, the types thereof may be the same or different; however, it is preferable that they be the same. Specific examples thereof include for example, hydroxy substituted C1-C8 alkylenediamino groups such as 2-hydroxy-1,3-propylenediamino, 2-hydroxy-1,4-butylenediamino, and 3-hydroxy-1,6-hexylenediamino; carboxy-substituted C1-C8 alkylenediamino groups such as 1-carboxy-ethylenediamino, 1-carboxy-1,3-propylenediamino, 1-carboxy-1,4-butylenediamino, 1-carboxy-1,5-pentylenediamino, and 1,5-dicarboxy-1,5-pentylenediamino; and the like.

In X, as the N—C1-C4 alkyl-C1-C6 alkylenediamino group, one nitrogen atom of the C1-C6 alkylenediamino group signifies one substituted with a C1-C4 alkyl group. In the present specification, the nitrogen atom substituted with the C1-C4 alkyl group among the diamino groups is represented as "N", and other nitrogen atoms are represented as "N'" according to necessity. The range of the number of carbon atoms of the alkylene member is normally C1-C6, preferably C2-C4, and particularly preferably C2 or C3. As the C1-C4 alkyl group, a linear or branched group may be exemplified, and a linear group is preferable. Specific examples thereof include N-linear C1-C4 alkyl-C1-C6 alkylenediamino groups such as an N-methylethylenediamino group, an N-ethylethylenediamino group, an N-propylethylenediamino group, and an N-butylethylenediamino group; N-branched C1-C4 alkyl-C1-C6 alkylenediamino groups such as an N-isopropylethylenediamino group, an N-isobutylethylenediamino group, an N-sec-butyl ethylenediamino group, and an N-tert-butyl ethylenediamino group; and the like.

In X, as the N—C1-C4 alkyl-C1-C6 alkylenediamino group in which the alkyl member is substituted with a hydroxy group or a carboxy group, ones having these substituents for an arbitrary carbon atom of the alkyl member of the N—C1-C4 alkyl group in the N—C1-C4 alkyl-C1-C6 alkylenediamino group may be exemplified. The position of the substituents is not particularly limited; however, one in which a nitrogen atom and a hydroxy group are not substituted for the same carbon atom is preferable. As the range of the number of carbon atoms of the alkylene member, the same range as that in the N—C1-C4 alkyl-C1-C6 alkylenediamino group may be exemplified, including the same preferences. Further, the range of the number of carbon atoms of the alkylene member is normally C1-C4, preferably C2-C4, and more preferably C2-C3. The number of the substituents is normally one or two and preferably one. Further, when there are a plurality of substituents, the types thereof may be the same or different; however, it is preferable that they be the same. Specific examples thereof include N-hydroxy substituted C1-C4 alkyl-C1-C6 alkylenediamino groups such as an N-(2-hydroxyethyl)ethylenediamino group, an N-(3-hydroxypropyl)ethylenediamino group, an N-(2-hydroxypropyl)ethylenediamino group, and an N-(4-hydroxybutyl)ethylenediamino group; N-carboxy-substituted C1-C4 alkyl-C1-C6 alkylenediamino groups such as an N-(carboxymethyl)ethylenediamino group, an N-(2-carboxyethyl)ethylenediamino group, an N-(3-carboxypropyl)ethylenediamino group, and an N-(4-carboxybutyl)ethylenediamino group; and the like.

In X, as the amino C1-C6 alkoxy C1-C6 alkylamino group, a linear or branched group may be exemplified, and a linear group is preferable. Here, in the amino C1-C6 alkoxy C1-C6 alkylamino group, as one having a preferable range of the number of carbon atoms, an amino C2-C4 alkoxy C2-C4 alkylamino group may be exemplified and, as one having a particularly preferable range of the number of carbon atoms, an amino C2-C3 alkoxy C2-C3 alkylamino group may be exemplified. Specific examples thereof include aminoethoxyethylamino, aminoethoxypropylamino, aminopropoxypropylamino, aminoethoxypentylamino, and the like.

In X, as the amino C1-C4 alkoxy C1-C4 alkoxy C1-C4 alkylamino group, a linear or branched group may be exemplified, and a linear group is preferable. Here, in the amino C1-C4 alkoxy C1-C4 alkoxy C1-C4 alkylamino group, as one having a preferable range of the number of carbon atoms, an amino C2-C4 alkoxy C2-C4 alkoxy C2-C4 alkylamino group may be exemplified and, as one having a particularly preferable range of the number of carbon atoms, an amino C2-C3 alkoxy C2-C3 alkoxy C2-C3 alkylamino group may be exemplified. Specific examples thereof include linear aminoethoxyethoxyethylamino, aminoethoxypropoxyethylamino, aminoethoxybutoxyethylamino, or the like; branched aminoethoxy(2-methylethoxy)ethylamino, aminoethoxy(2-methylpropoxy)ethylamino, or the like; and the like.

As the xylylenediamino group in X, for example, an o-xylylenediamino group, an m-xylylenediamino group, and a p-xylylenediamino group may be exemplified, and the m-xylylenediamino group, or the p-xylylenediamino group is preferable.

In X, as the piperazine-1,4-diyl group substituted with a C1-C4 alkyl group or a C1-C4 alkoxy group, ones having these substituents for an arbitrary carbon atom of the annular atoms of the piperazine ring may be exemplified. The number of the substituents is normally one or two and preferably one. Further, when there are a plurality of substituents, the types thereof may be the same or different; however, it is preferable that they be the same. Specific examples thereof include a 2-methyl piperazine-1,4-diyl group, a 2-ethyl piperazine-1,4-diyl group, a 2,5-dimethyl piperazine-1,4-diyl group, a 2,6-dimethyl piperazine-1,4-diyl group, a 2,5-diethyl piperazine-1,4-diyl group, and a 2-methyl-5-ethyl piperazine-1,4-diyl group; and the like.

As the phenylenediamino group in X, o-, m-, and p-phenylenediamino groups may be exemplified, and the m-, and p-phenylenediamino groups are preferable.

In the above, the X is preferably a C1-C8 alkylenediamino group; a C1-C8 alkylenediamino group substituted with a carboxy group; an N—C1-C4 alkyl-C1-C6 alkylenediamino group in which the alkyl member is substituted with hydroxy; an amino C1-C4 alkoxy C1-C4 alkoxy C1-C4 alkylamino group; a xylylenediamino group; or a piperazine-1,4-diyl group. Among these, X is more preferably a C1-C8 alkylenediamino group; a xylylenediamino group; or a piperazine-1,4-diyl group. Among these, as preferable specific examples, 1,2-ethylenediamino; 1,3-propylenediamino; 1,4-butylenediamino; 1-carboxypentylene-1,5-diamino; N-2-hydroxyethyl-ethylenediamino; aminoethoxyethoxyethylamino; m-xylylenediamino; or piperazine-1,4-diyl; may be exemplified.

In the above-described general formula (1A), the substitution position of the four sulfo groups for which the substitution position is not specified is not particularly limited. With the substitution position of the azo bond set as the 1-position, a sulfo group, in which a benzene ring having one azo bond is substituted, may be substituted at the 2-, 3-, or 4-position and is preferably substituted at the 4-position.

The dye 1A represented by the general formula (1A) is preferably a compound represented by the following general formula (3A), and more preferably a compound represented by the following general formula (4A).

(3A)

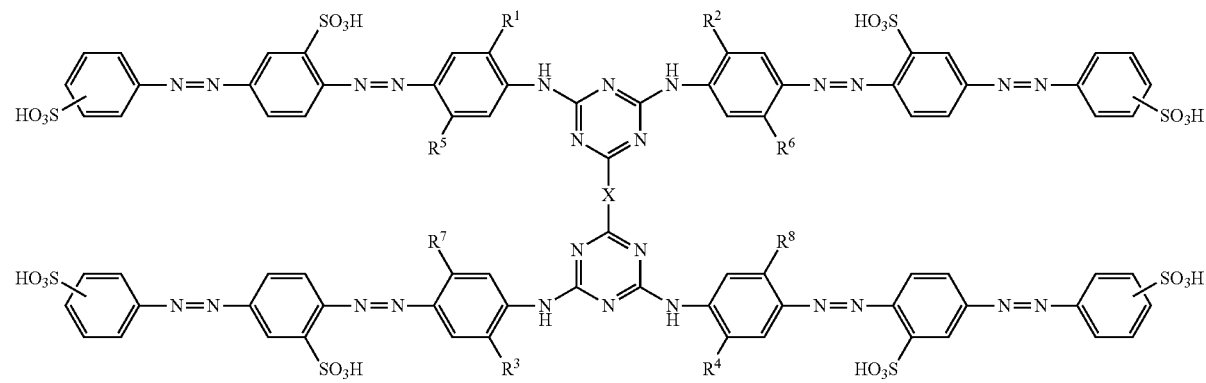

In the above-described general formula (3A), $R^1$ to $R^8$ and X represent the same meanings as those in formula (1A).

(4A)

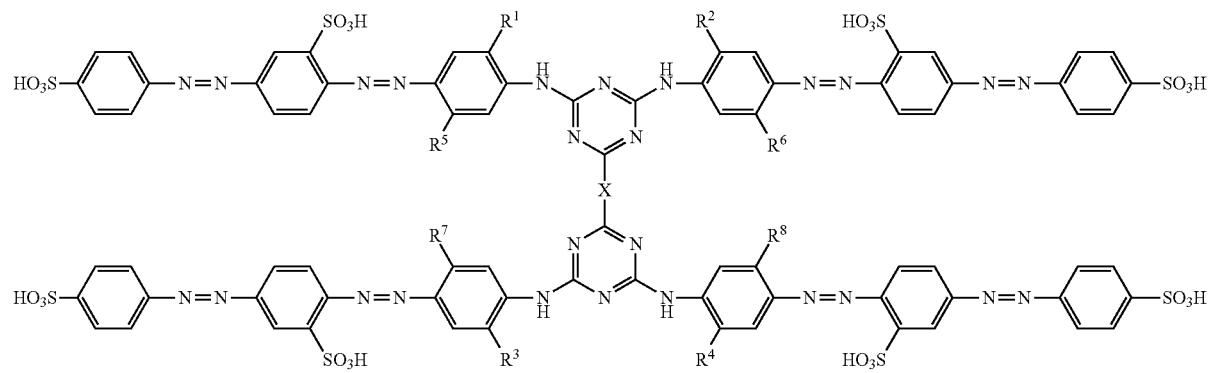

In the above-described general formula (4A), $R^1$ to $R^8$ and X represent the same meanings as those in formula (1A).

Regarding $R^1$ to $R^8$ in general formula (1A), general formula (3A), and general formula (4A); the substitution position of $R^1$ to $R^8$ in general formula (1A); and the sulfo-substitution position and the like for which the substitution position in general formula (1A) and general formula (3A) are not specified, a compound in which preferable ones are combined is more preferable, and one in which more preferable ones are combined is even more preferable. Further, the same applies to preferable ones, combinations of preferable ones and more preferable ones, and the like.

The dyes represented by the general formula (1A) may use a sulfo group or the like in a molecule and form a salt. When forming a salt, the sulfo group or the like in a molecule preferably forms a salt with each of a metal cation, ammonia, an organic base, or the like.

As the metal, an alkali metal or an alkaline earth metal may be exemplified. Examples of the alkali metal include lithium, sodium, potassium and the like. As the alkaline earth metal, for example, calcium, magnesium, and the like may be exemplified.

As the organic base, the quaternary ammonium ions shown in the following general formula (5A) may be exemplified; however, the organic base is not limited thereto.

The second ink according to the embodiment includes dyes represented by general formula (1A) and metal salts of second metal ions and the dyes included in the second ink are preferably substantially formed of metal salts of the second metal ions. In this manner, the solubility of the dyes is improved.

As the second metal ions included in the second ink as the counter-ions of the dye 1A, at least one of sodium ions and lithium ions is preferable. In this manner, it is possible to improve the solubility of the dye 1A in the second ink.

Further, the free acid of the dye 1A according to the embodiment and the various types of salts thereof may be a mixture. For example, a combination of any of a mixture of sodium salt of the dye 1A and ammonium salt of the dye 1A; a mixture of free acid of the dye 1A and sodium salt of the dye 1A; a mixture of lithium salt of the dye 1A, sodium salt of the dye 1A, and ammonium salt of the dye 1A; or the like, may be used. There are cases where the physical properties such as solubility differ according to the type of salt, and, by selecting an appropriate type of salt as necessary and changing the ratio thereof in cases where a plurality of salts and the like are included, it is possible to obtain a mixture having suitable physical properties.

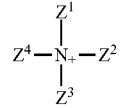

(5A)

$Z^1$, $Z^2$, $Z^3$, and $Z^4$ in the above-described general formula (5A) each independently represents a group selected from the group consisting of a hydrogen atom, an alkyl group, a hydroxyalkyl group, and a hydroxyalkoxyalkyl group.

Specific examples of the alkyl groups of $Z^1$, $Z^2$, $Z^3$, and $Z^4$ in the general formula (5A) include methyl, ethyl, n-propyl, isopropyl, n-butyl, isobutyl, sec-butyl, tert-butyl and the like. Further, specific examples of the hydroxyalkyl groups include hydroxy C1-C4 alkyl groups such as hydroxymethyl, hydroxyethyl, 3-hydroxypropyl, 2-hydroxypropyl, 4-hydroxybutyl, 3-hydroxybutyl, and 2-hydroxybutyl. Further, examples of the hydroxyalkoxyalkyl groups include hydroxy C1-C4 alkoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl. Among these, it is possible to preferably use a hydrogen atom, methyl, hydroxymethyl, hydroxyethyl, 3-hydroxypropyl, 2-hydroxypropyl, 4-hydroxybutyl, 3-hydroxybutyl, 2-hydroxybutyl, hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, 2-hydroxyethoxybutyl, and the like.

Regarding the quaternary ammonium ions represented in formula (5A), specific examples of preferable combinations of $Z^1$, $Z^2$, $Z^3$, and $Z^4$ are shown in Table 1.

TABLE 1

| Compound No. | $Z^1$ | $Z^2$ | $Z^3$ | $Z^4$ |
|---|---|---|---|---|
| 1-1 | H | $CH_3$ | $CH_3$ | $CH_3$ |
| 1-2 | $CH_3$ | $CH_3$ | $CH_3$ | $CH_3$ |
| 1-3 | H | —$C_2H_4OH$ | —$C_2H_4OH$ | —$C_2H_4OH$ |
| 1-4 | $CH_3$ | —$C_2H_4OH$ | —$C_2H_4OH$ | —$C_2H_4OH$ |
| 1-5 | H | —$CH_2CH(OH)CH_3$ | —$CH_2CH(OH)CH_3$ | —$CH_2CH(OH)CH_3$ |
| 1-6 | $CH_3$ | —$CH_2CH(OH)CH_3$ | —$CH_2CH(OH)CH_3$ | —$CH_2CH(OH)CH_3$ |
| 1-7 | H | —$C_2H_4OH$ | H | —$C_2H_4OH$ |
| 1-8 | $CH_3$ | —$C_2H_4OH$ | H | —$C_2H_4OH$ |
| 1-9 | H | —$CH_2CH(OH)CH_3$ | H | —$CH_2CH(OH)CH_3$ |
| 1-10 | $CH_3$ | —$CH_2CH(OH)CH_3$ | H | —$CH_2CH(OH)CH_3$ |
| 1-11 | $CH_3$ | —$C_2H_4OH$ | $CH_3$ | —$C_2H_4OH$ |
| 1-12 | $CH_3$ | —$CH_2CH(OH)CH_3$ | $CH_3$ | —$CH_2CH(OH)CH_3$ |

Preferable specific examples of the dye 1A are not particularly limited; however, compounds or the like represented by the structural formulas shown in Table 2 to Table 23 may be exemplified. The functional groups of the sulfo group, the carboxy group, and the like in each Table are disclosed in the form of free acids for convenience.

TABLE 2

| Compound No. | Structural Formula |
|---|---|
| 1 | (structure) |
| 2 | (structure) |

TABLE 2-continued
| Compound No. | Structural Formula |
|---|---|
| 3 | 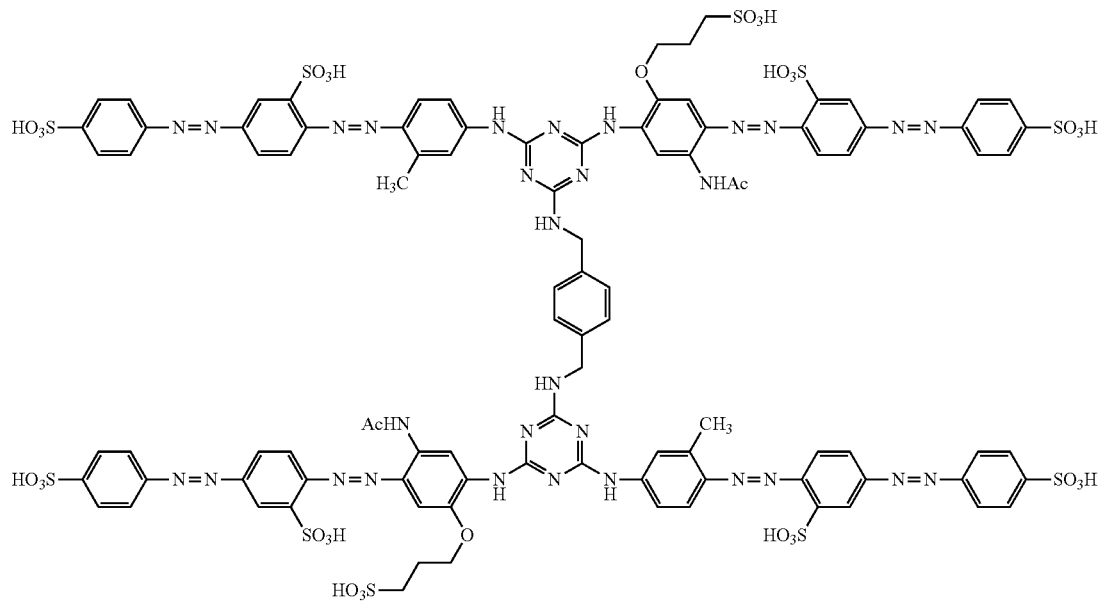 [SMILES: CC(=O)Nc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(NC(C)=O)c(N=Nc6ccc(N=Nc7ccc(S(=O)(=O)O)cc7)cc6S(=O)(=O)O)cc5OCCCS(=O)(=O)O)n4)cc3)nc(Nc3ccc(N=Nc4ccc(N=Nc5ccc(S(=O)(=O)O)cc5)cc4S(=O)(=O)O)c(C)c3)n2)c(OCCCS(=O)(=O)O)cc1N=Nc1ccc(N=Nc2ccc(S(=O)(=O)O)cc2)cc1S(=O)(=O)O] |
TABLE 3
| Compound No. | Structural Formula |
|---|---|
| 4 | 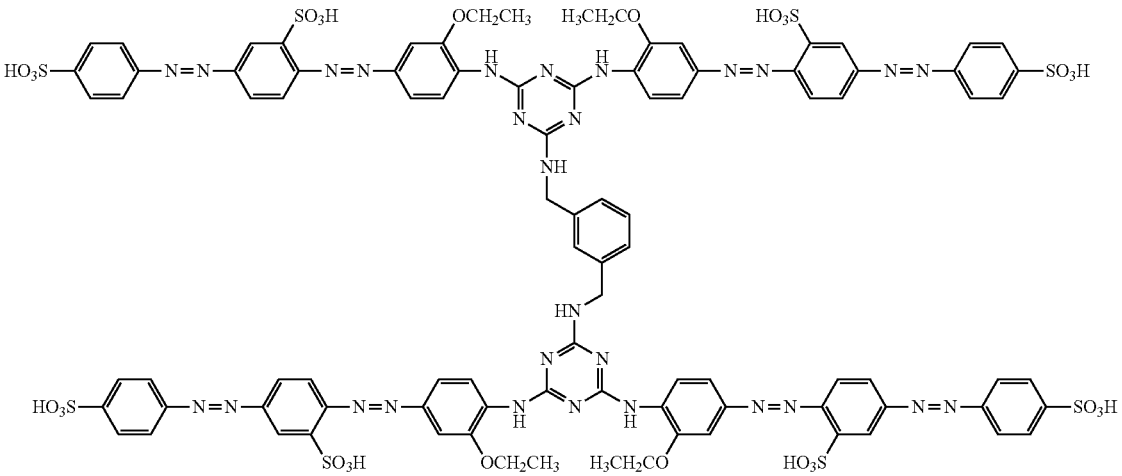 |

TABLE 3-continued
| Compound No. | Structural Formula |
|---|---|
| 5 | 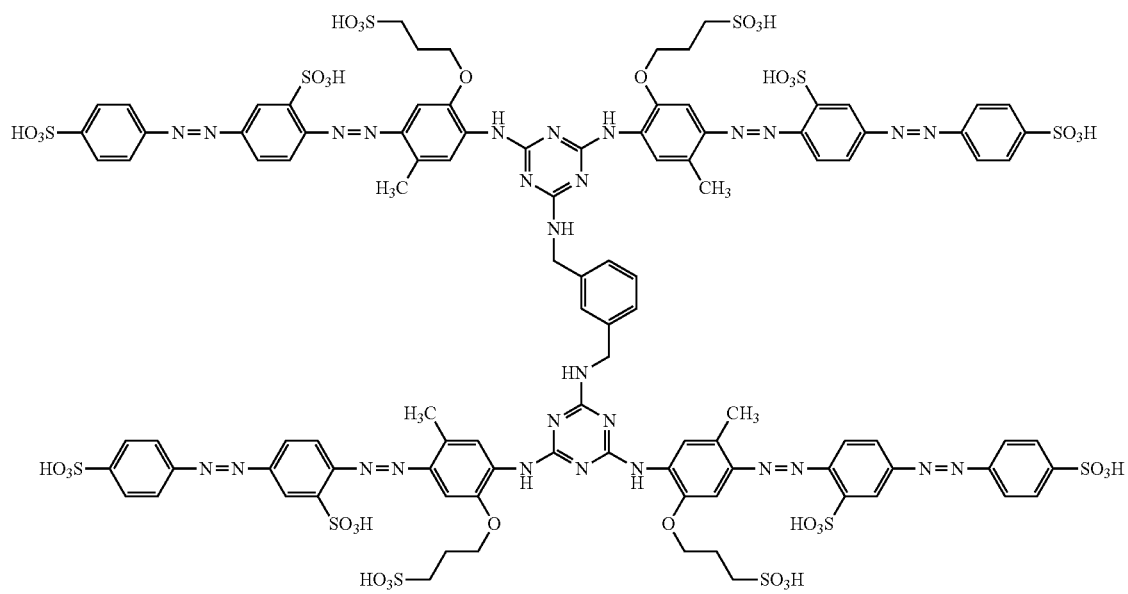 [SMILES: Cc1cc(Nc2nc(NCc3cccc(CNc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 6 | 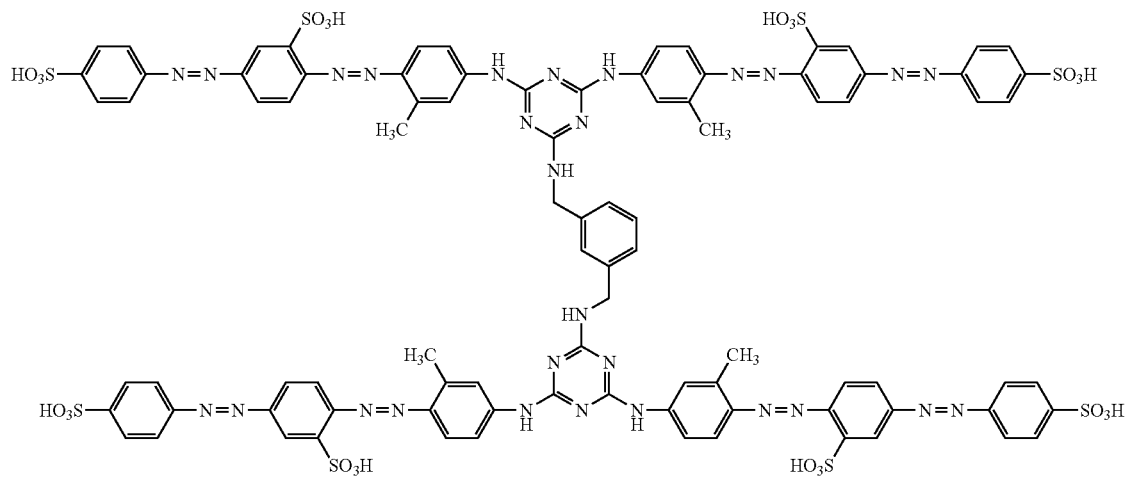 [SMILES: Cc1cc(Nc2nc(NCc3cccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)c3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 4

| Compound No | Structural Formula |
|---|---|
| 7 | (structural formula) |
| 8 | (structural formula) |

TABLE 4-continued
| Compound No | Structural Formula |
|---|---|
| 9 | 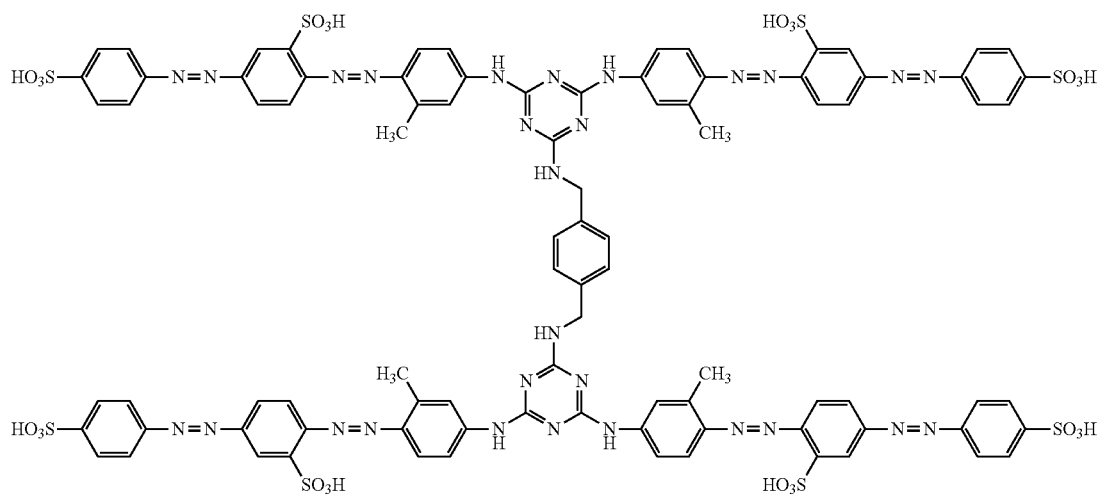 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 5
| Compound No. | Structural Formula |
|---|---|
| 10 | 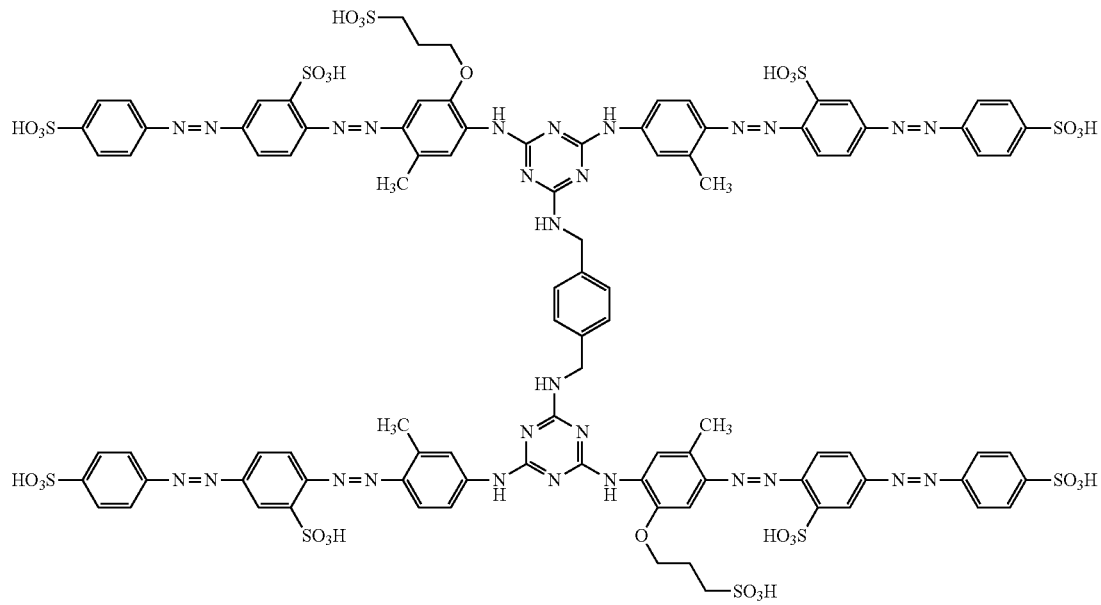 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 5-continued
| Compound No. | Structural Formula |
|---|---|
| 11 | 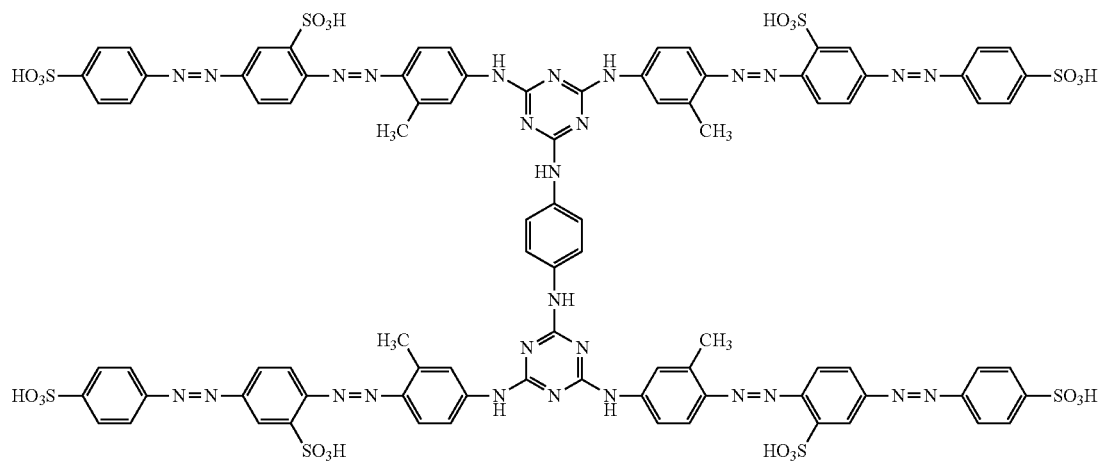 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 12 | 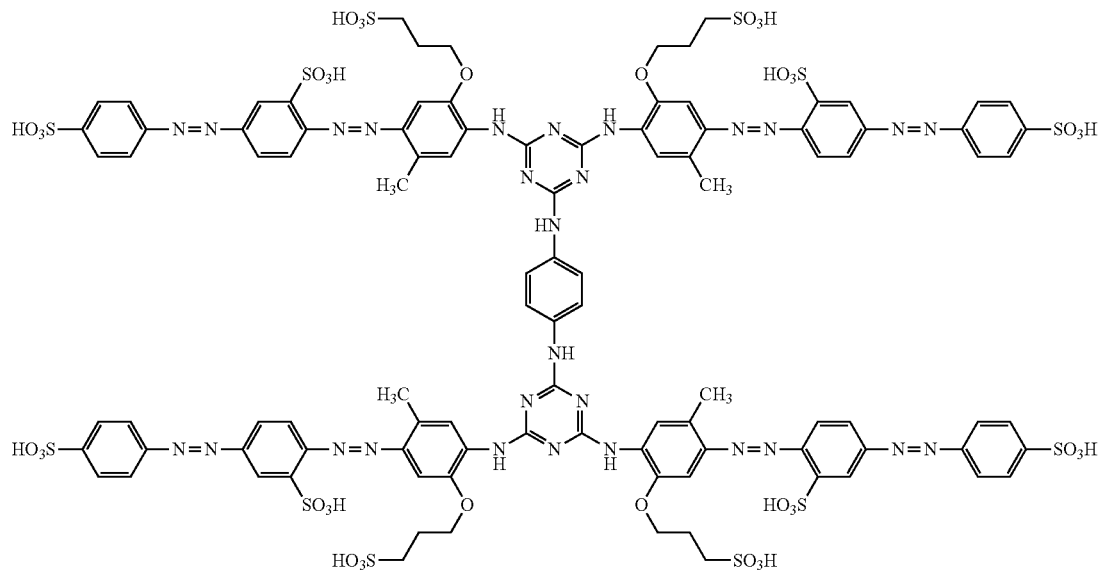 [SMILES: Cc1cc(Nc2nc(Nc3ccc(Nc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 6

| Compound No. | Structural Formula |
|---|---|
| 13 | |
| 14 | |
| 15 | |

TABLE 6-continued
| Compound No. | Structural Formula |
|---|---|
| 16 | 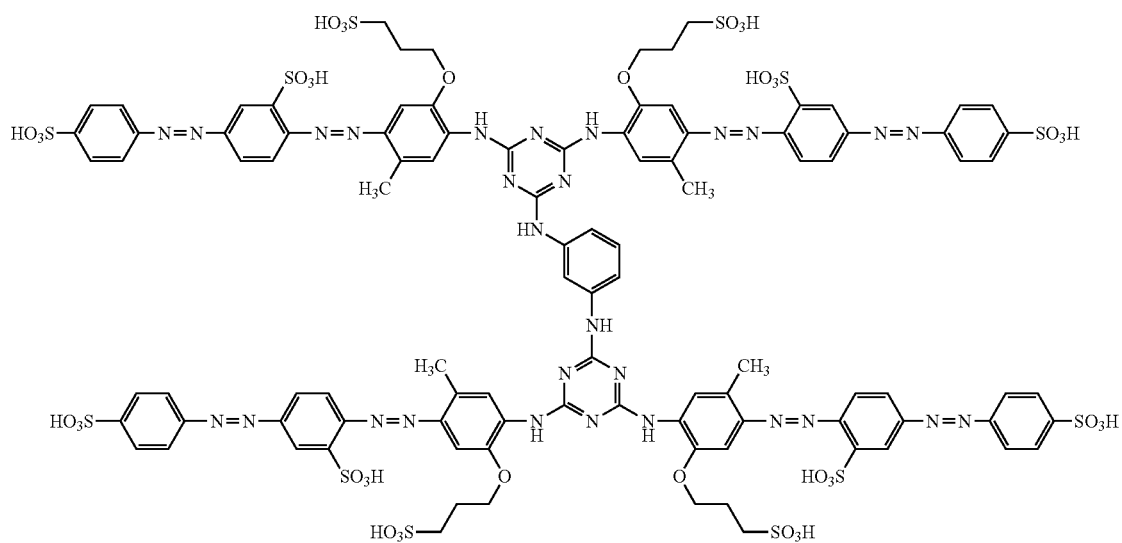 [SMILES: Cc1cc(Nc2nc(Nc3cccc(Nc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
TABLE 7
| Compound No | Structural Formula |
|---|---|
| 17 | 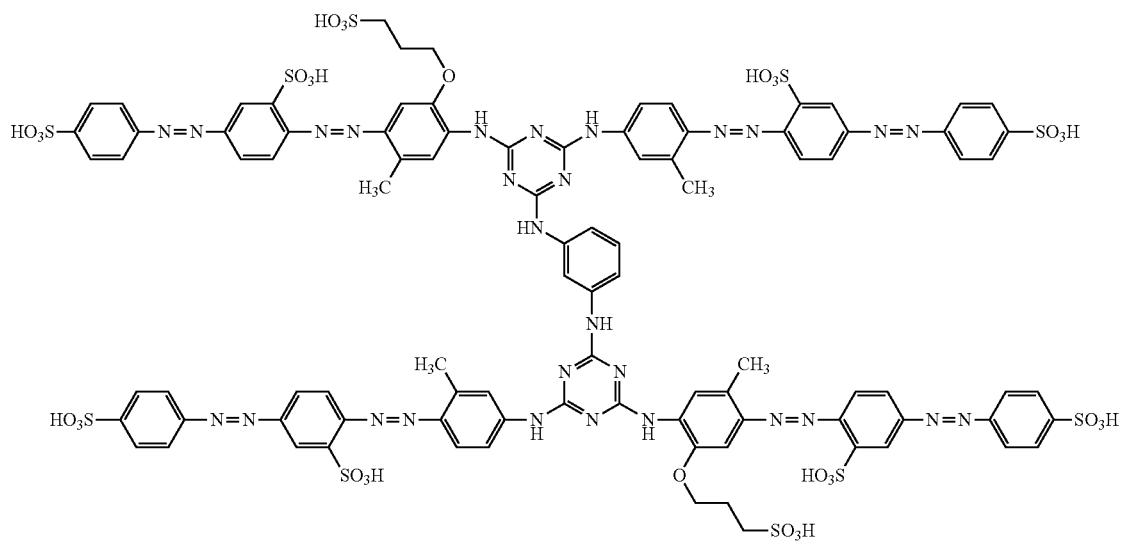 [SMILES: Cc1cc(Nc2nc(Nc3cccc(Nc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 7-continued

| Compound No | Structural Formula |
|---|---|
| 18 | |
| 19 | |
| 20 | |

TABLE 8
| Compound No | Structural Formula |
|---|---|
| 21 | 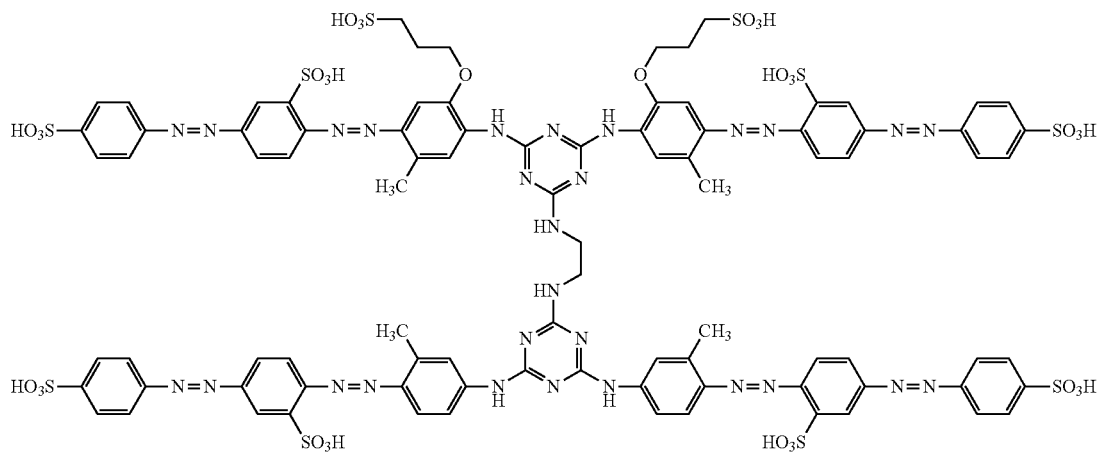 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 22 | 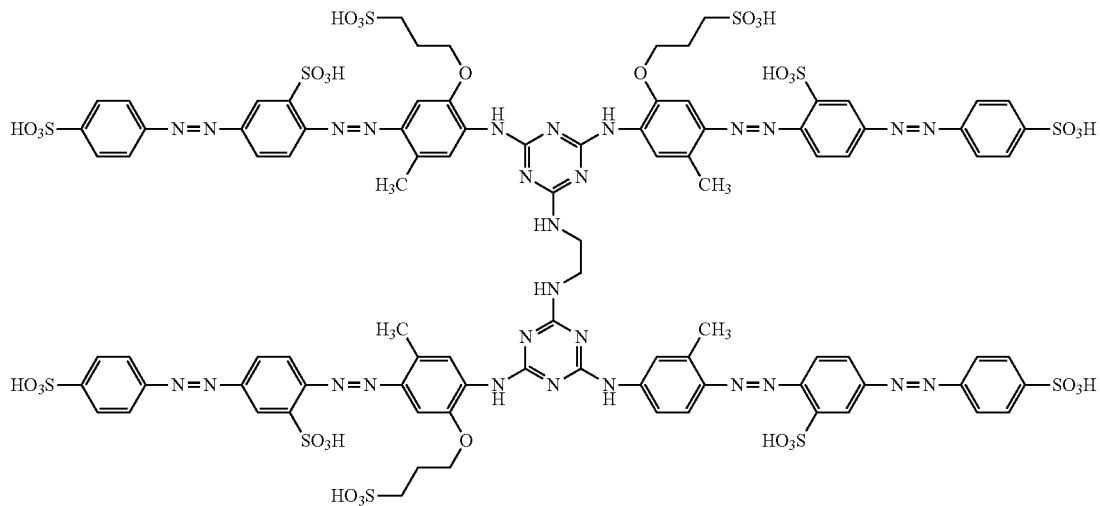 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 23 | 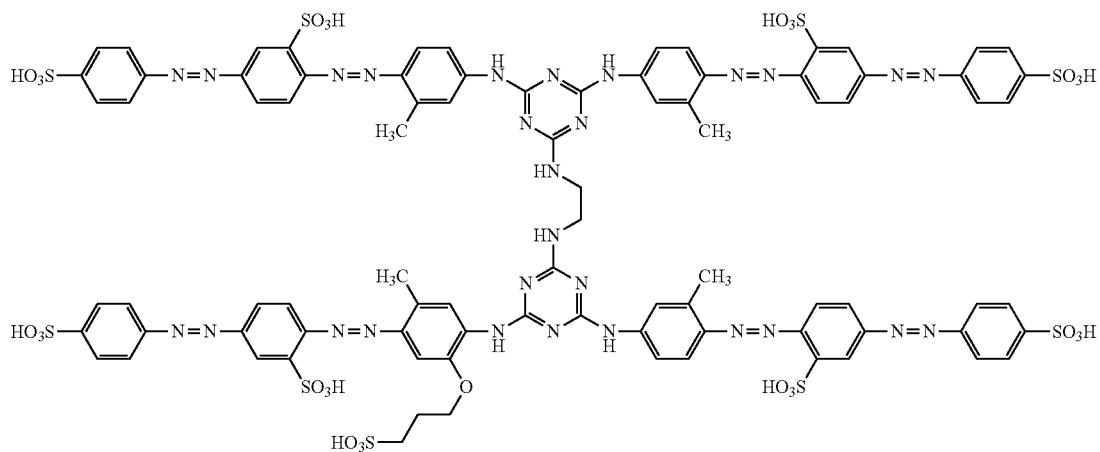 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 8-continued
| Compound No | Structural Formula |
|---|---|
| 24 | 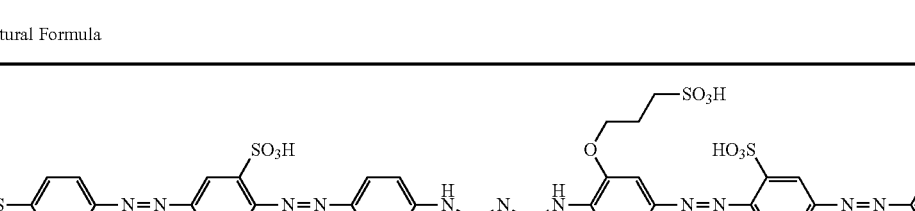 |
TABLE 9
| Compound No. | Structural Formula |
|---|---|
| 25 | |

TABLE 9-continued
| Compound No. | Structural Formula |
| --- | --- |
| 26 | 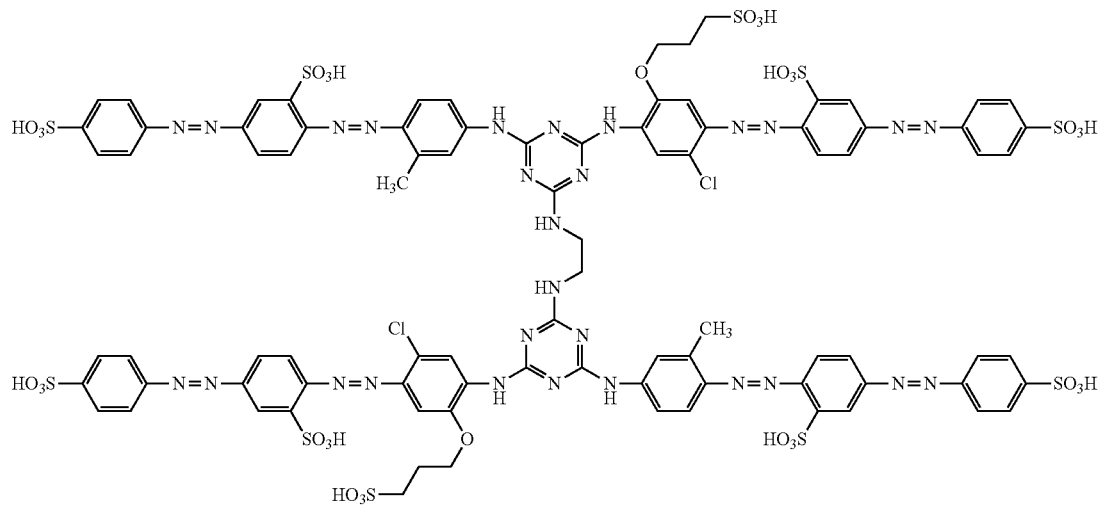 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(Cl)c(N=Nc5ccc(N=Nc6ccc(S(=O)(=O)O)cc6)cc5S(=O)(=O)O)cc4OCCCS(=O)(=O)O)n3)nc(Nc3cc(Cl)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 27 | 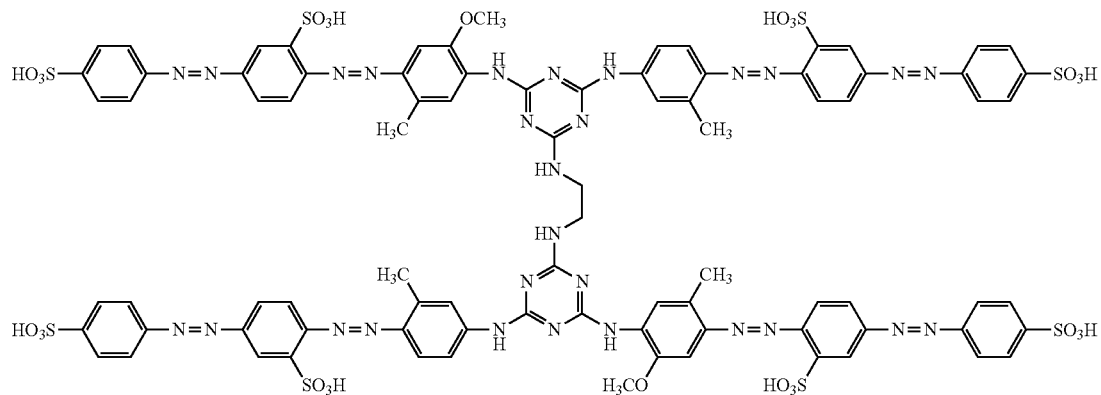 [SMILES: COc1cc(N=Nc2ccc(N=Nc3ccc(S(=O)(=O)O)cc3)cc2S(=O)(=O)O)c(C)cc1Nc1nc(NCCNc2nc(Nc3ccc(N=Nc4ccc(N=Nc5ccc(S(=O)(=O)O)cc5)cc4S(=O)(=O)O)c(C)c3)nc(Nc3cc(C)c(N=Nc4ccc(N=Nc5ccc(S(=O)(=O)O)cc5)cc4S(=O)(=O)O)cc3OC)n2)nc(Nc2ccc(N=Nc3ccc(N=Nc4ccc(S(=O)(=O)O)cc4)cc3S(=O)(=O)O)c(C)c2)n1] |
| 28 | 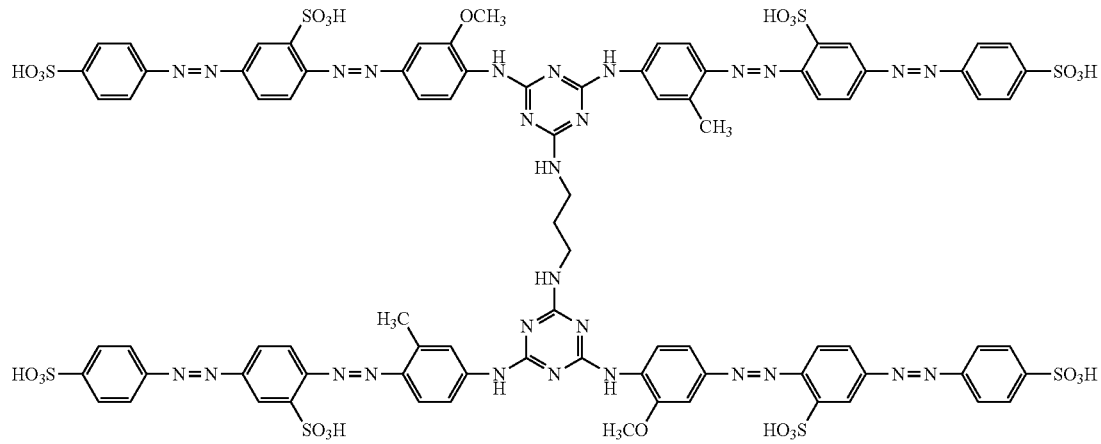 [SMILES: COc1cc(N=Nc2ccc(N=Nc3ccc(S(=O)(=O)O)cc3)cc2S(=O)(=O)O)ccc1Nc1nc(NCCCNc2nc(Nc3ccc(N=Nc4ccc(N=Nc5ccc(S(=O)(=O)O)cc5)cc4S(=O)(=O)O)c(C)c3)nc(Nc3ccc(N=Nc4ccc(N=Nc5ccc(S(=O)(=O)O)cc5)cc4S(=O)(=O)O)cc3OC)n2)nc(Nc2ccc(N=Nc3ccc(N=Nc4ccc(S(=O)(=O)O)cc4)cc3S(=O)(=O)O)c(C)c2)n1] |

TABLE 10
| Compound No. | Structural Formula |
|---|---|
| 29 | 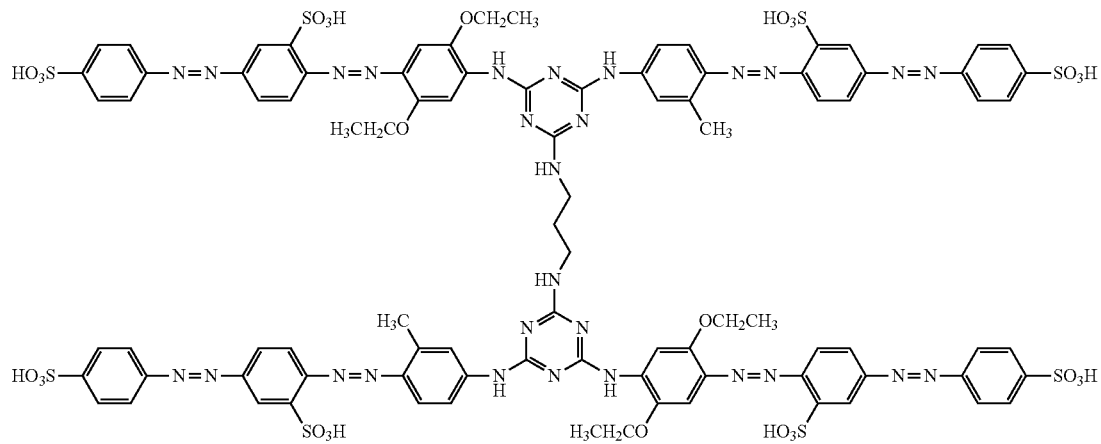 |
| 30 | 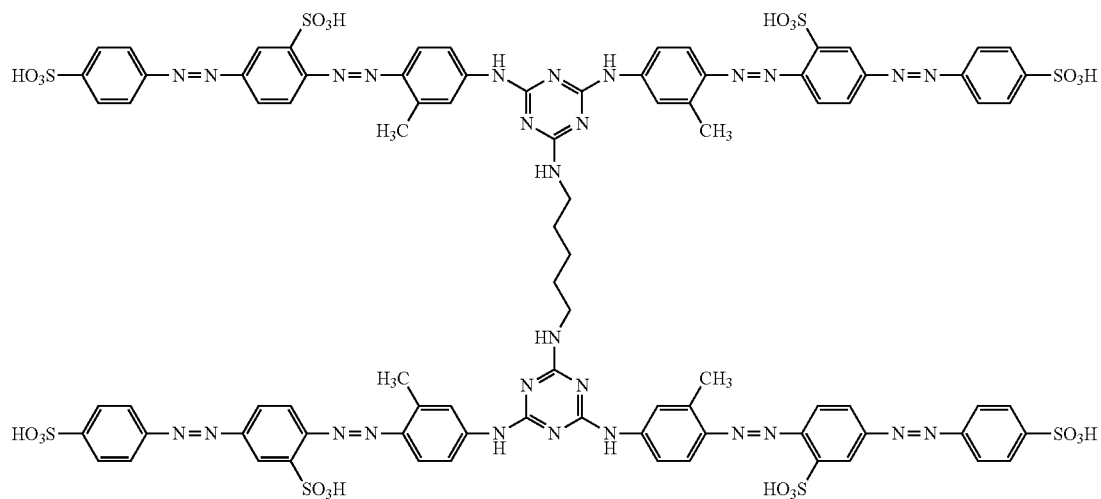 [SMILES: Cc1cc(Nc2nc(NCCCCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 31 | 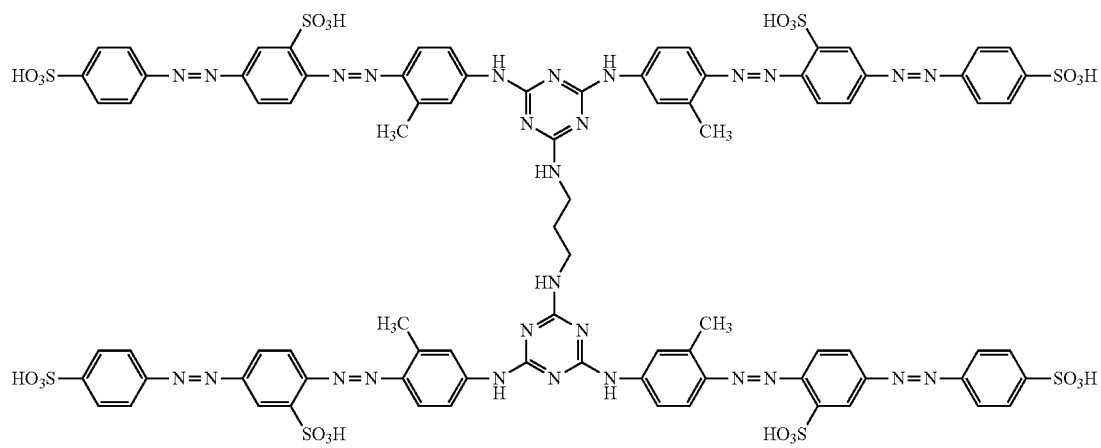 [SMILES: Cc1cc(Nc2nc(NCCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 10-continued
| Compound No. | Structural Formula |
|---|---|
| 32 | 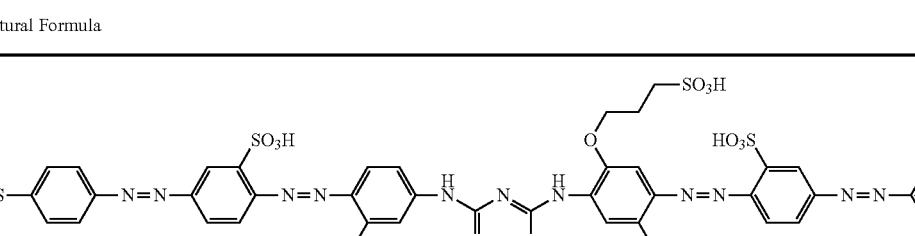 |
TABLE 11
| Compound No. | Structural Formula |
|---|---|
| 33 | |

TABLE 11-continued
| Compound No. | Structural Formula |
|---|---|
| 34 | 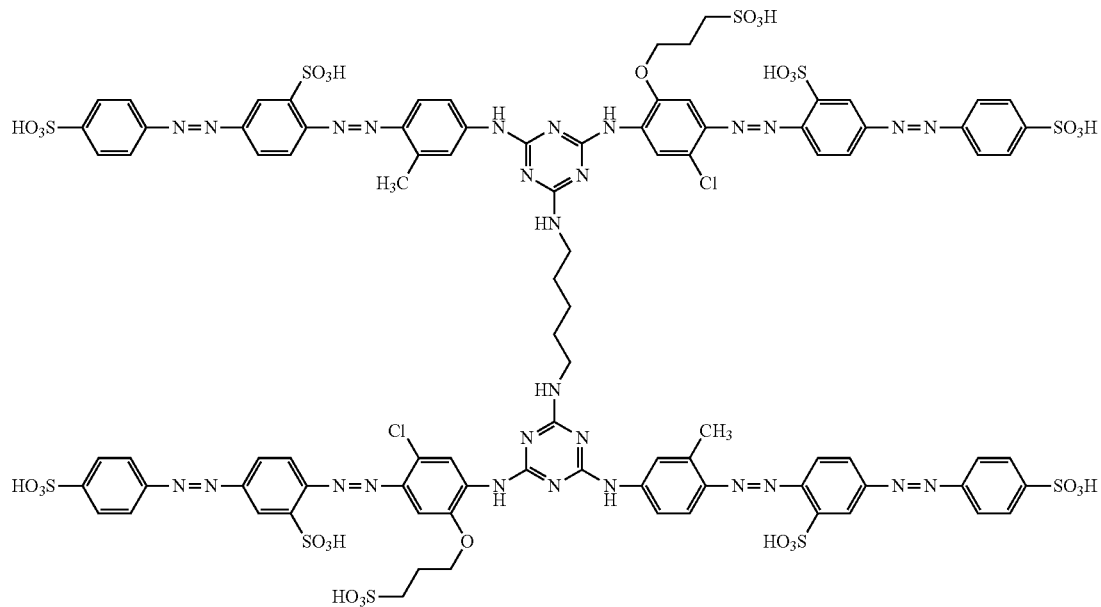 [SMILES: Cc1cc(Nc2nc(NCCCCCNc3nc(Nc4ccc(N=Nc5ccc(N=Nc6ccc(S(=O)(=O)O)cc6)cc5S(=O)(=O)O)c(C)c4)nc(Nc4cc(Cl)c(N=Nc5ccc(N=Nc6ccc(S(=O)(=O)O)cc6)cc5S(=O)(=O)O)cc4OCCCS(=O)(=O)O)n3)nc(Nc3cc(Cl)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 35 | 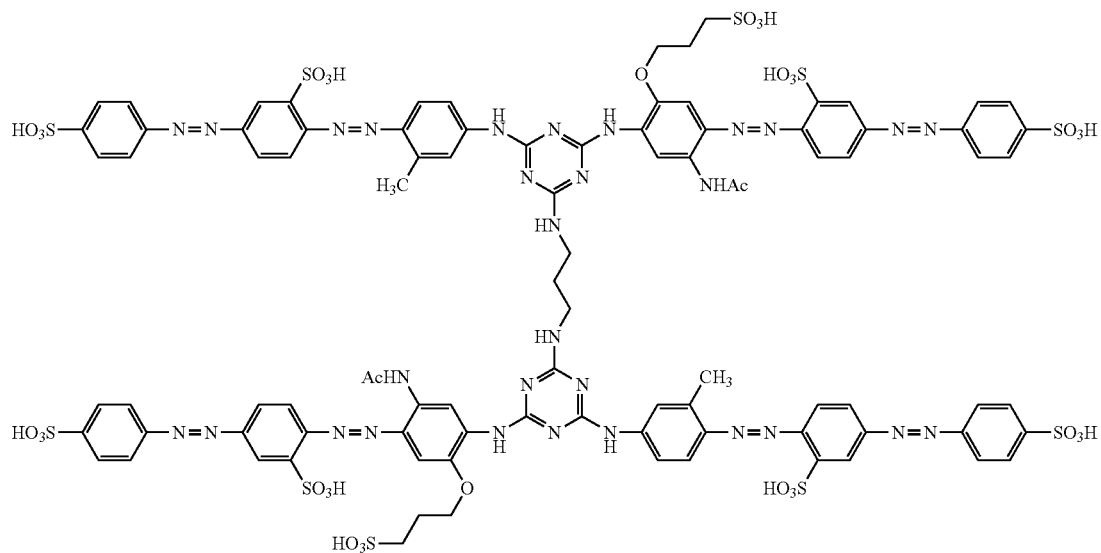 [SMILES: CC(=O)Nc1cc(Nc2nc(NCCCNc3nc(Nc4ccc(N=Nc5ccc(N=Nc6ccc(S(=O)(=O)O)cc6)cc5S(=O)(=O)O)c(C)c4)nc(Nc4cc(NC(C)=O)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)c(OCCCS(=O)(=O)O)cc1N=Nc1ccc(N=Nc2ccc(S(=O)(=O)O)cc2)cc1S(=O)(=O)O] |

TABLE 12
| Compound No. | Structural Formula |
| --- | --- |
| 36 | 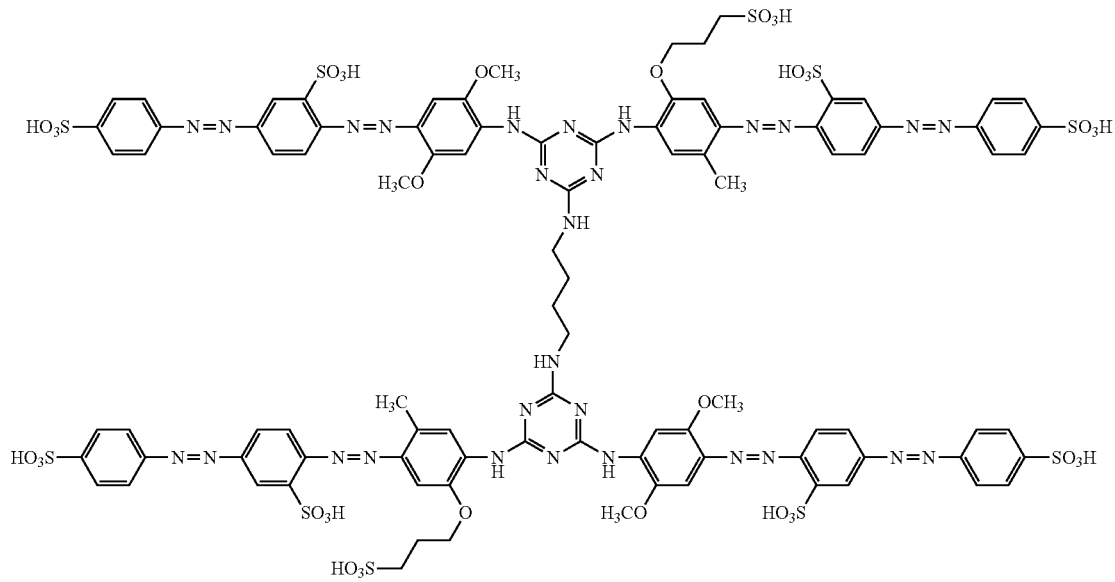 [SMILES: COc1cc(Nc2nc(NCCCCNc3nc(Nc4cc(OC)c(N=Nc5ccc(N=Nc6ccc(S(=O)(=O)O)cc6)cc5S(=O)(=O)O)cc4OC)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OC)cc1N=Nc1ccc(N=Nc2ccc(S(=O)(=O)O)cc2)cc1S(=O)(=O)O] |
| 37 | 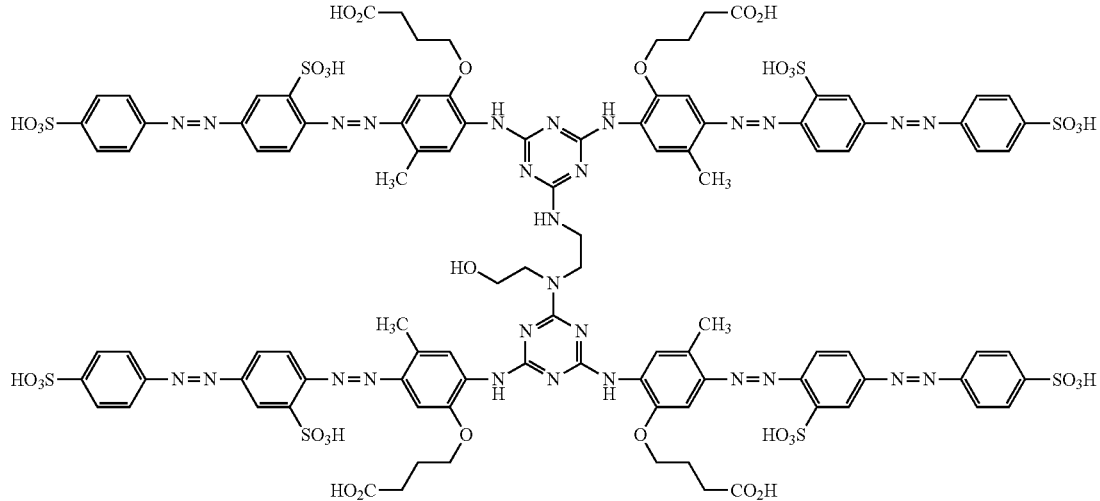 |

TABLE 12-continued
| Compound No. | Structural Formula |
|---|---|
| 38 | 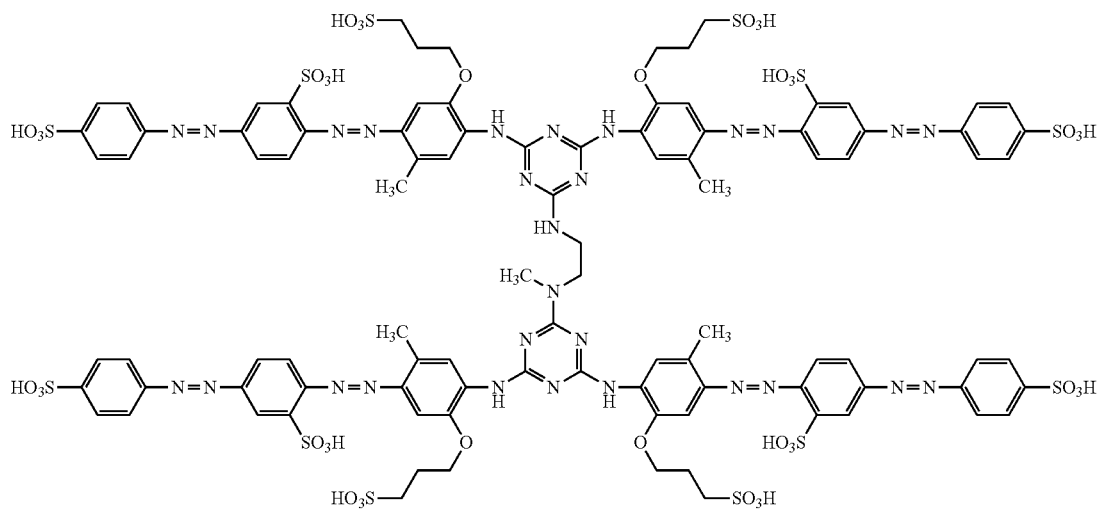 [SMILES: Cc1cc(Nc2nc(NCCN(C)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
TABLE 13
| Compound No. | Structural Formula |
|---|---|
| 39 | 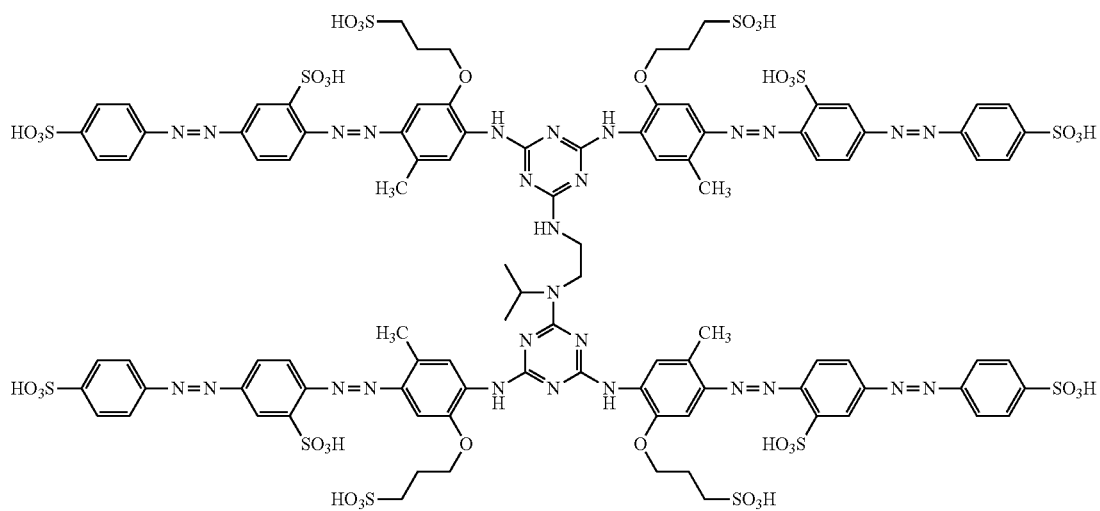 |

TABLE 13-continued
| Compound No. | Structural Formula |
|---|---|
| 40 | 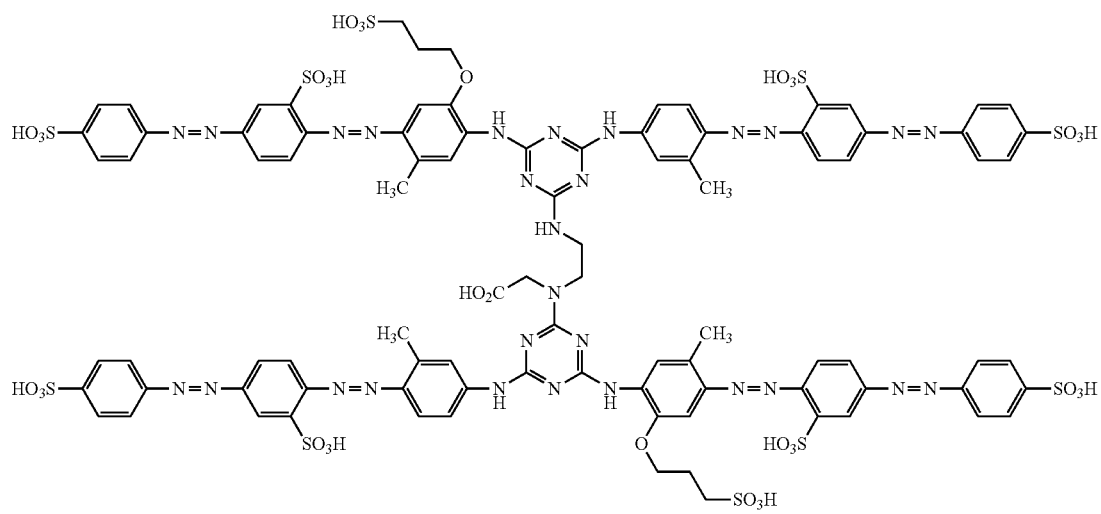 [SMILES: Cc1cc(Nc2nc(NCCN(CC(=O)O)c3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 41 | 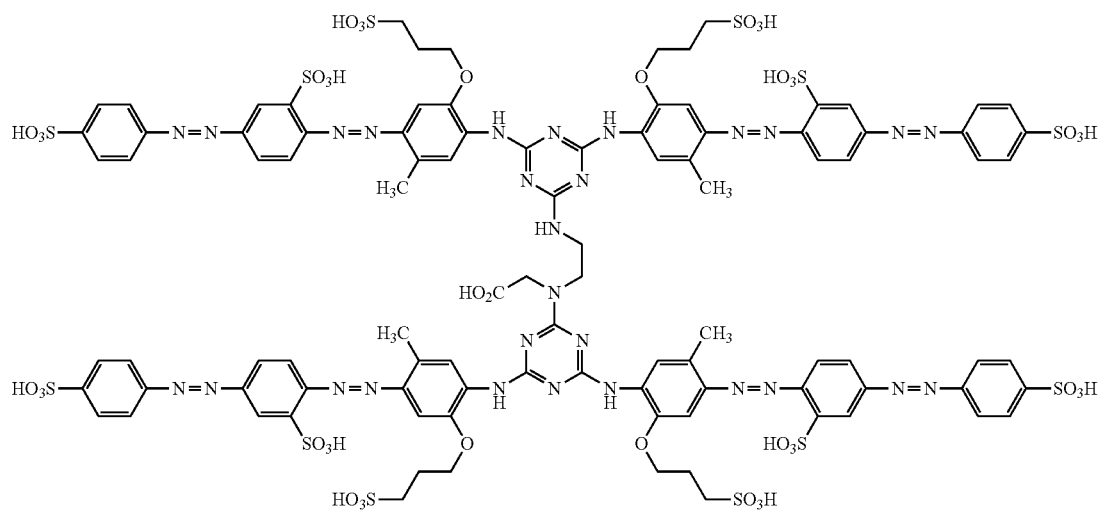 [SMILES: Cc1cc(Nc2nc(NCCN(CC(=O)O)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 14

| Compound No. | Structural Formula |
|---|---|
| 42 | (structure) |
| 43 | (structure) |
| 44 | (structure) |

TABLE 14-continued
| Compound No. | Structural Formula |
|---|---|
| 45 | 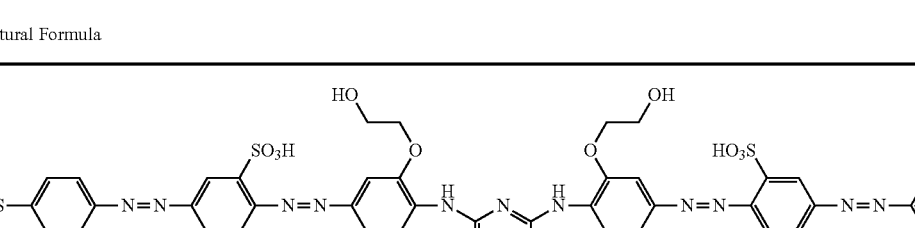 |
TABLE 15
| Compound No | Structural Formula |
|---|---|
| 46 | |

TABLE 15-continued
| Compound No | Structural Formula |
|---|---|
| 47 | 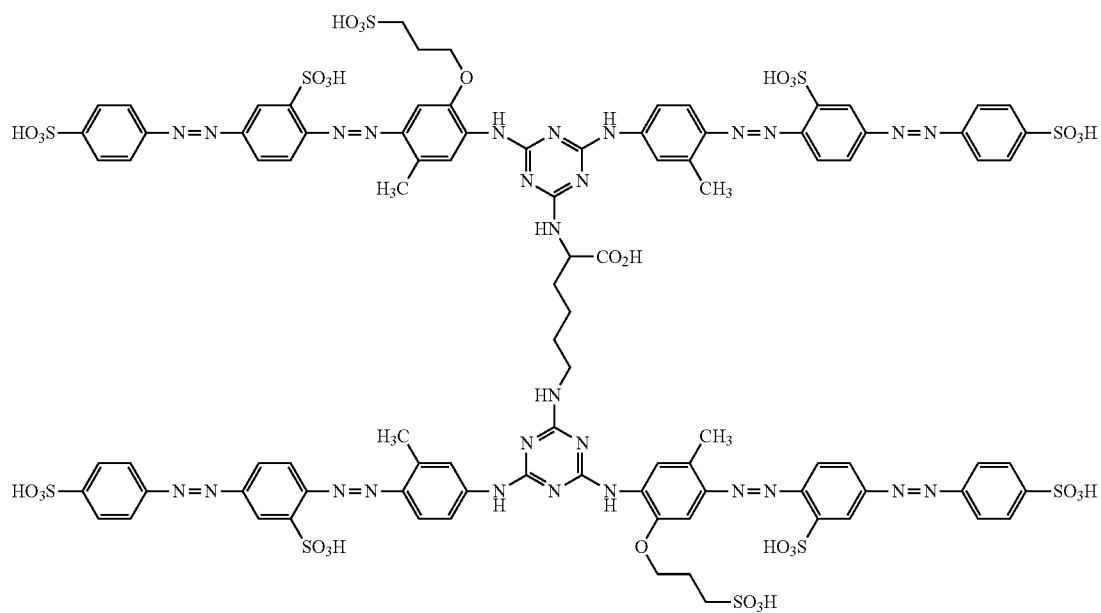 [SMILES: Cc1cc(Nc2nc(NCCCCC(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)C(=O)O)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 48 | 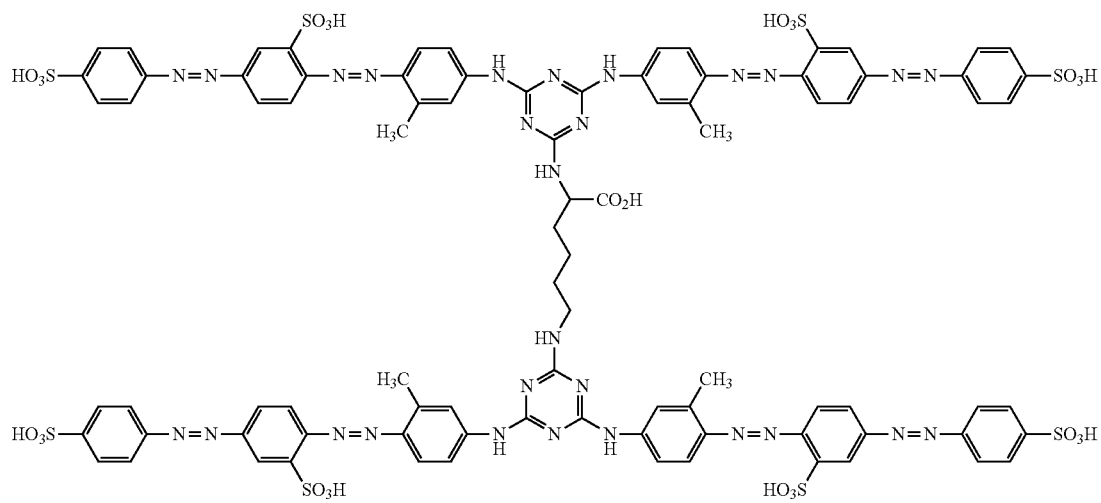 [SMILES: Cc1cc(Nc2nc(NCCCCC(Nc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)C(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 16

| Compound No | Structural Formula |
|---|---|
| 49 | |
| 50 | |

TABLE 16-continued
| Compound No | Structural Formula |
|---|---|
| 51 | 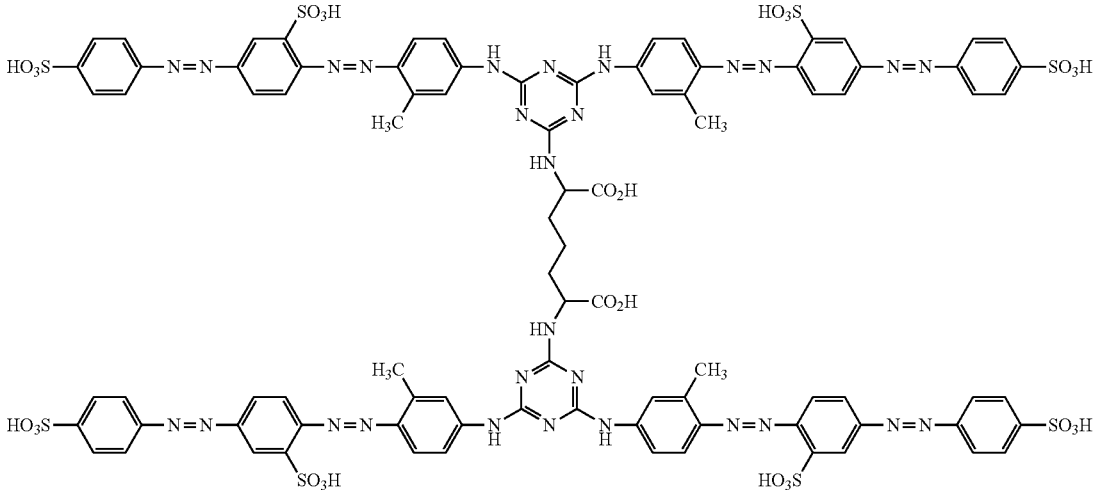 [SMILES: Cc1cc(Nc2nc(Nc3ccc(N=Nc4ccc(N=Nc5ccc(S(=O)(=O)O)cc5)cc4S(=O)(=O)O)c(C)c3)nc(NC(CCCC(Nc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)C(=O)O)C(=O)O)n2)ccc1N=Nc1ccc(N=Nc2ccc(S(=O)(=O)O)cc2)cc1S(=O)(=O)O] |
TABLE 17
| Compound No. | Structural Formula |
|---|---|
| 52 | 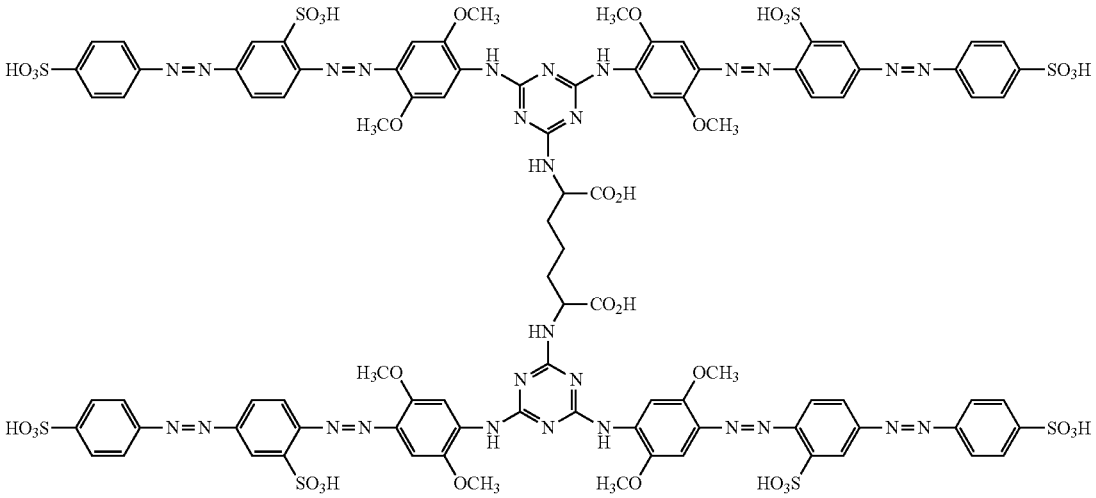 [SMILES: COc1cc(Nc2nc(Nc3cc(OC)c(N=Nc4ccc(N=Nc5ccc(S(=O)(=O)O)cc5)cc4S(=O)(=O)O)cc3OC)nc(NC(CCCC(Nc3nc(Nc4cc(OC)c(N=Nc5ccc(N=Nc6ccc(S(=O)(=O)O)cc6)cc5S(=O)(=O)O)cc4OC)nc(Nc4cc(OC)c(N=Nc5ccc(N=Nc6ccc(S(=O)(=O)O)cc6)cc5S(=O)(=O)O)cc4OC)n3)C(=O)O)C(=O)O)n2)c(OC)cc1N=Nc1ccc(N=Nc2ccc(S(=O)(=O)O)cc2)cc1S(=O)(=O)O] |

TABLE 17-continued
| Compound No. | Structural Formula |
|---|---|
| 53 | 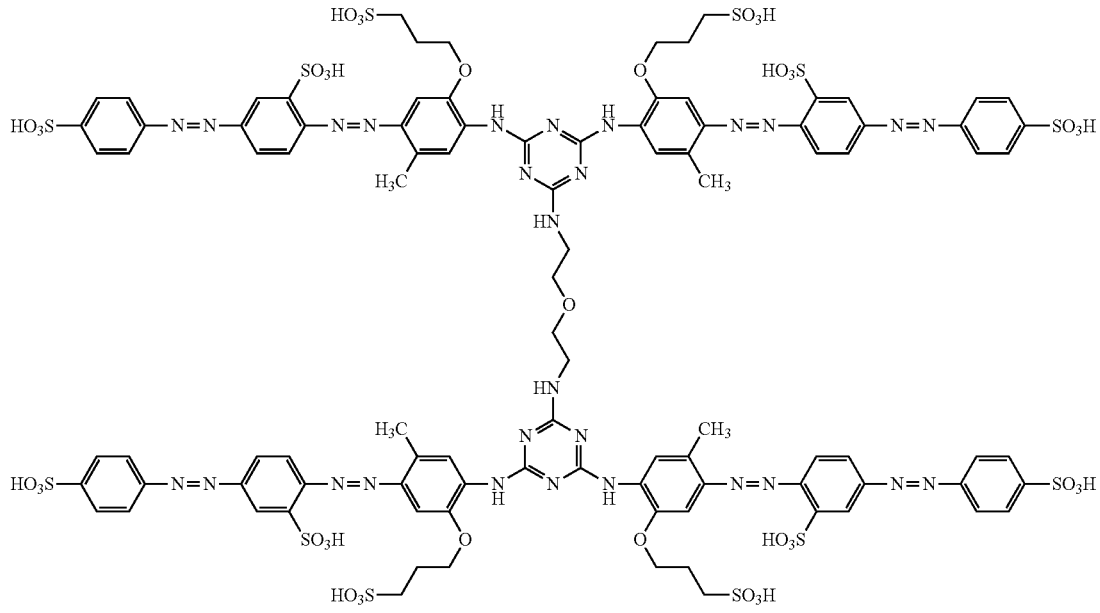 [SMILES: Cc1cc(Nc2nc(NCCOCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 54 | 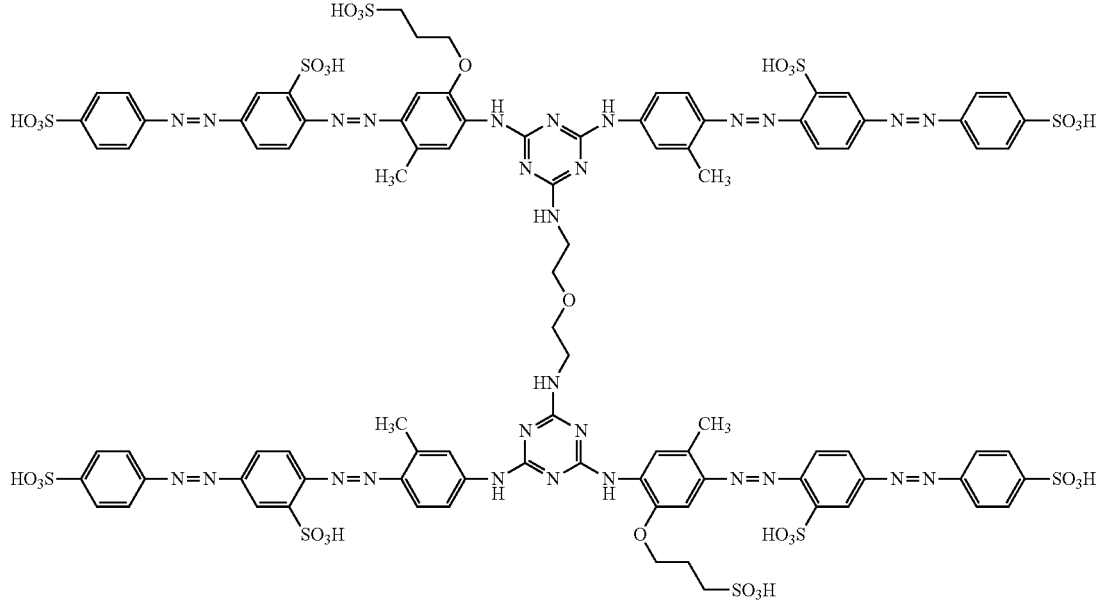 [SMILES: Cc1cc(Nc2nc(NCCOCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 18
| Compound No. | Structural Formula |
|---|---|
| 55 | 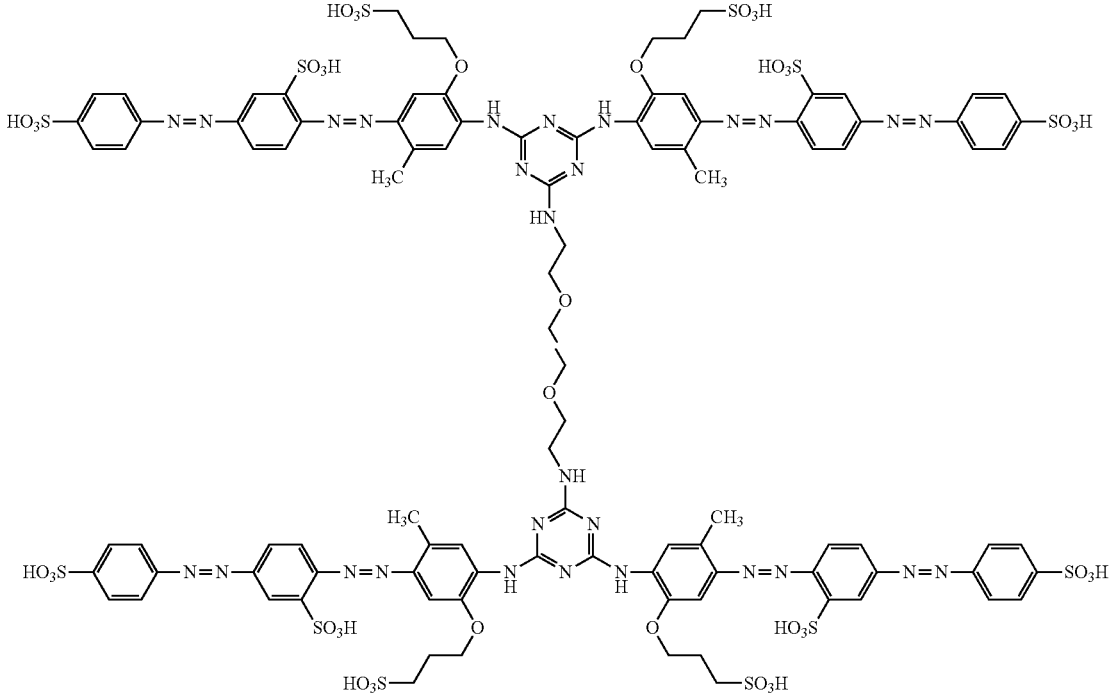 [SMILES: Cc1cc(Nc2nc(NCCOCCOCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 56 | 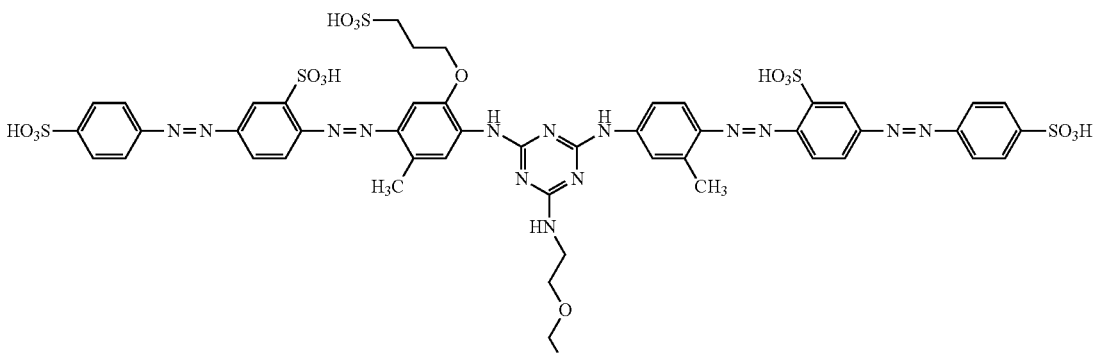 |

TABLE 18-continued
| Compound No. | Structural Formula |
|---|---|
| 57 | 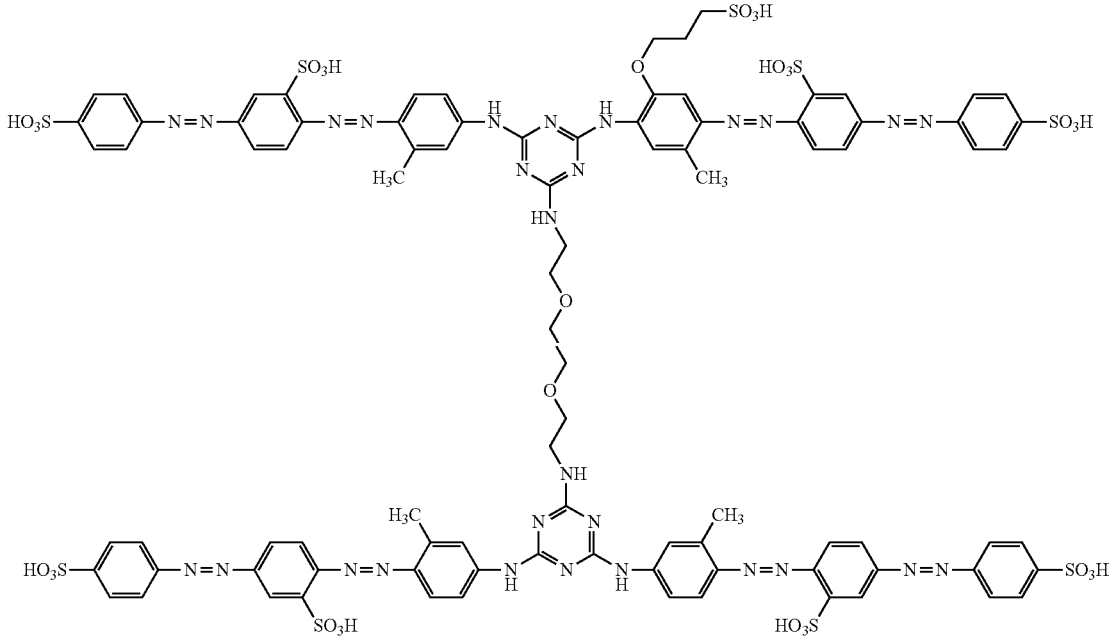 [SMILES: Cc1cc(Nc2nc(NCCOCCOCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 19
| Compound No. | Structural Formula |
|---|---|
| 58 | 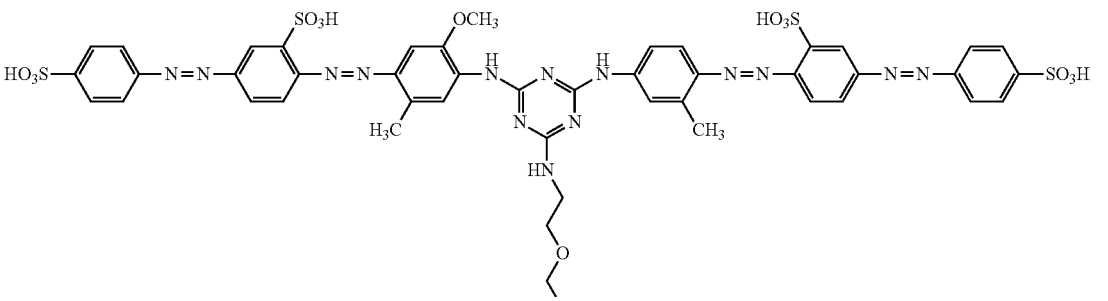 |

TABLE 19-continued

| Compound No. | Structural Formula |
|---|---|
| 59 | |
| 60 | |
| 61 | |

TABLE 20
| Compound No. | Structural Formula |
|---|---|
| 62 | 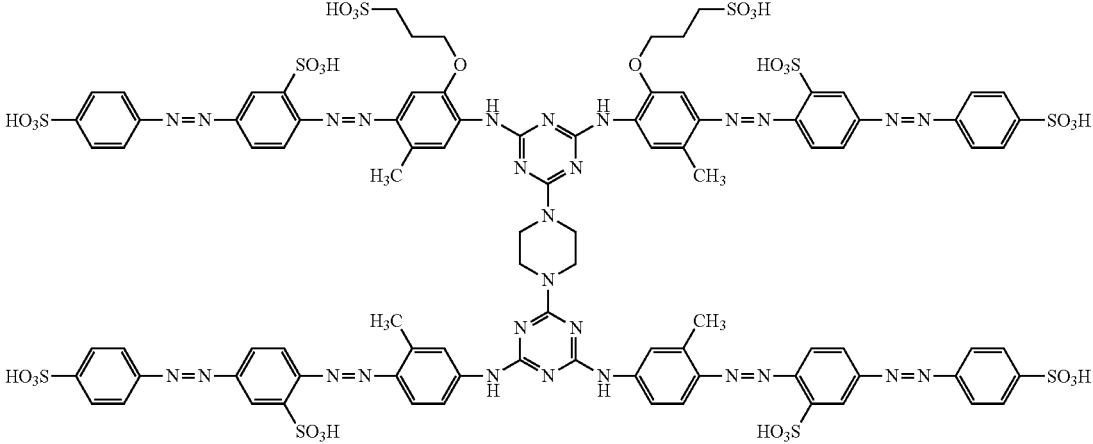 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
| 63 | 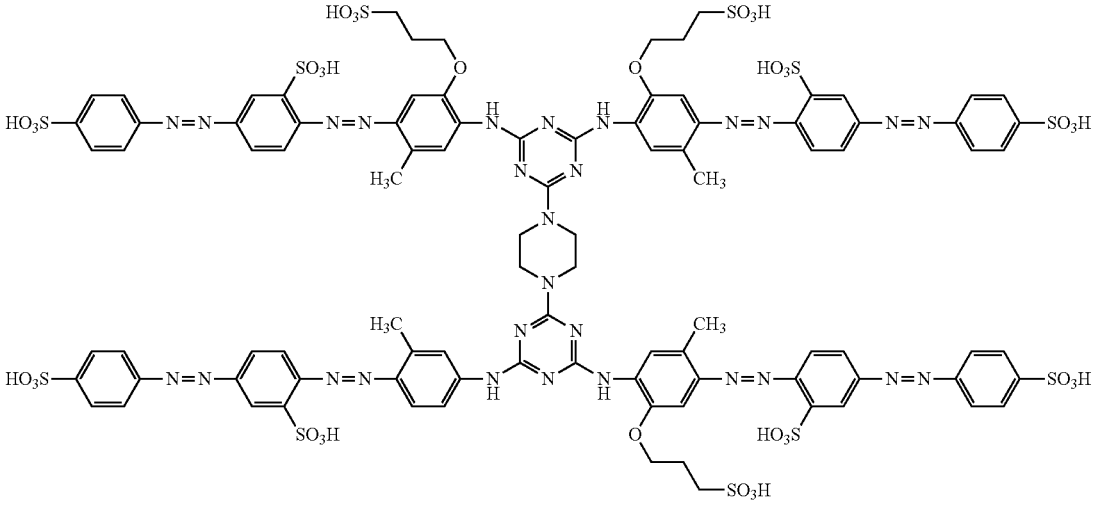 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
| 64 | 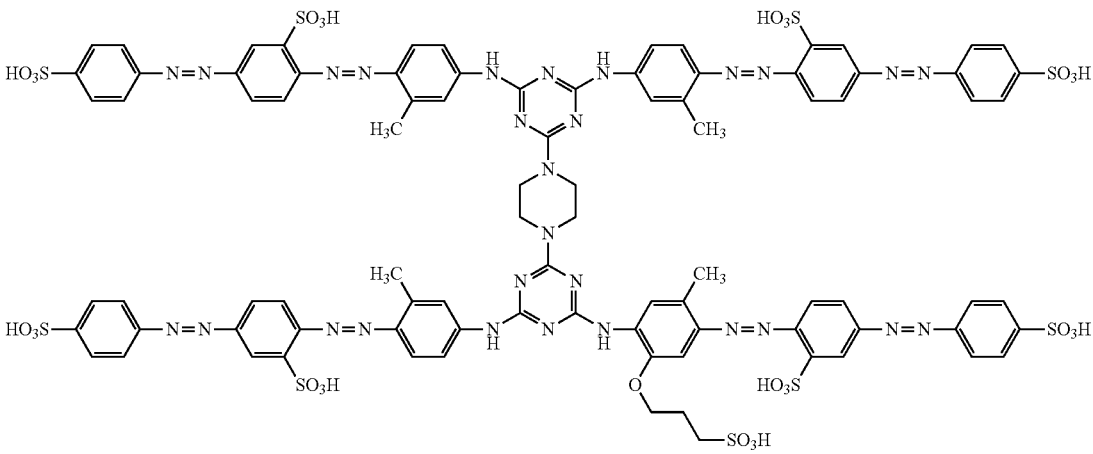 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |

TABLE 20-continued
| Compound No. | Structural Formula |
|---|---|
| 65 | 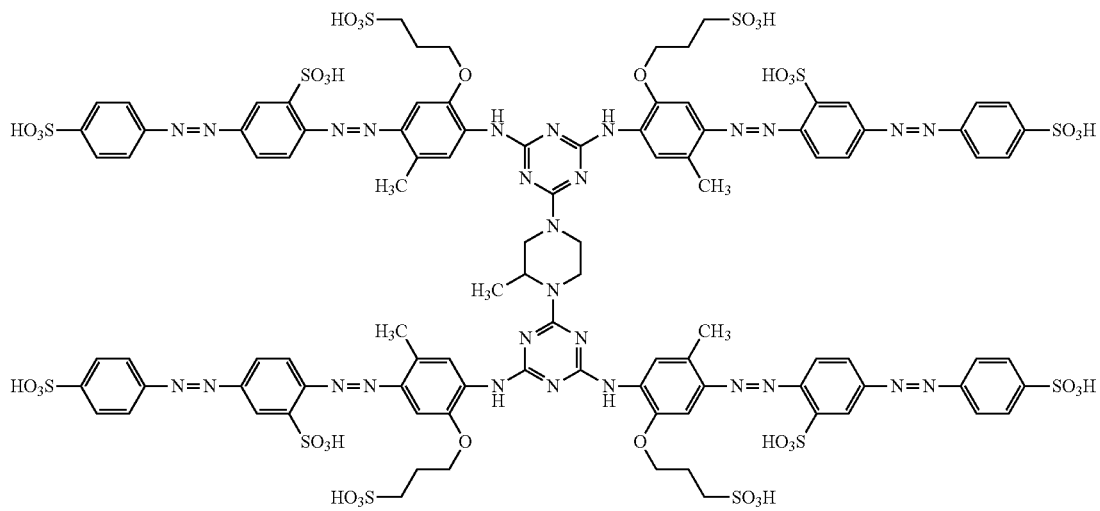 |
TABLE 21
| Compound No. | Structural Formula |
|---|---|
| 66 | 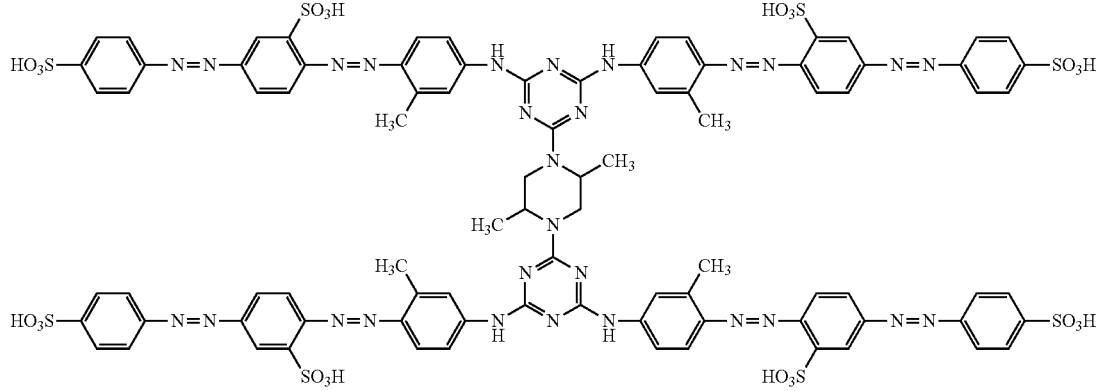 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CC(C)N(c4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)CC3C)n2)ccc1N=Nc1ccc(N=Nc2ccc(S(=O)(=O)O)cc2)cc1S(=O)(=O)O] |

TABLE 21-continued
| Compound No. | Structural Formula |
|---|---|
| 67 | 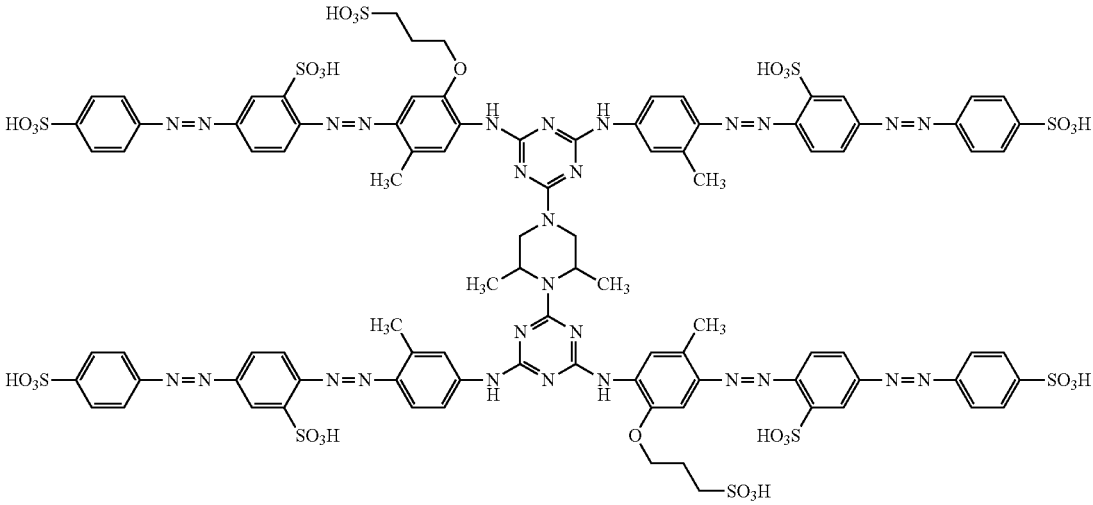 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)C(C)C3)n2)ccc1N=Nc1ccc(N=Nc2ccc(S(=O)(=O)O)cc2)cc1S(=O)(=O)O] |
| 68 | 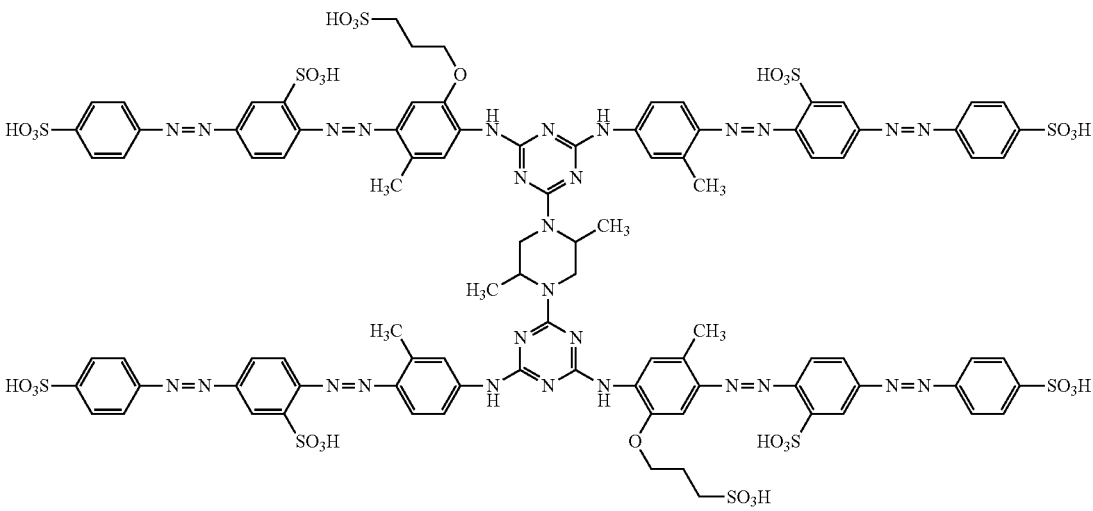 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3C)n2)ccc1N=Nc1ccc(N=Nc2ccc(S(=O)(=O)O)cc2)cc1S(=O)(=O)O] |
| 69 | 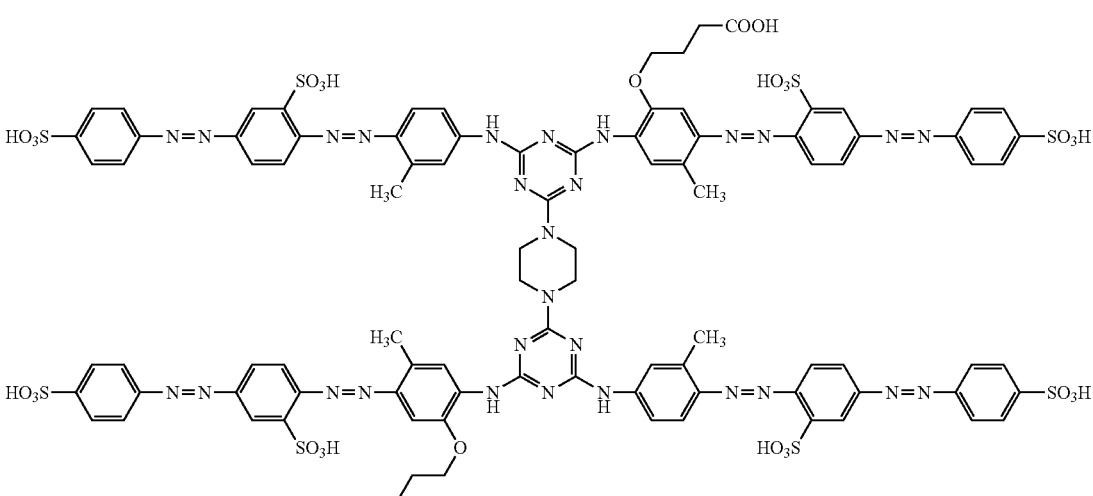 |

TABLE 22
| Compound No. | Structural Formula |
|---|---|
| 70 | 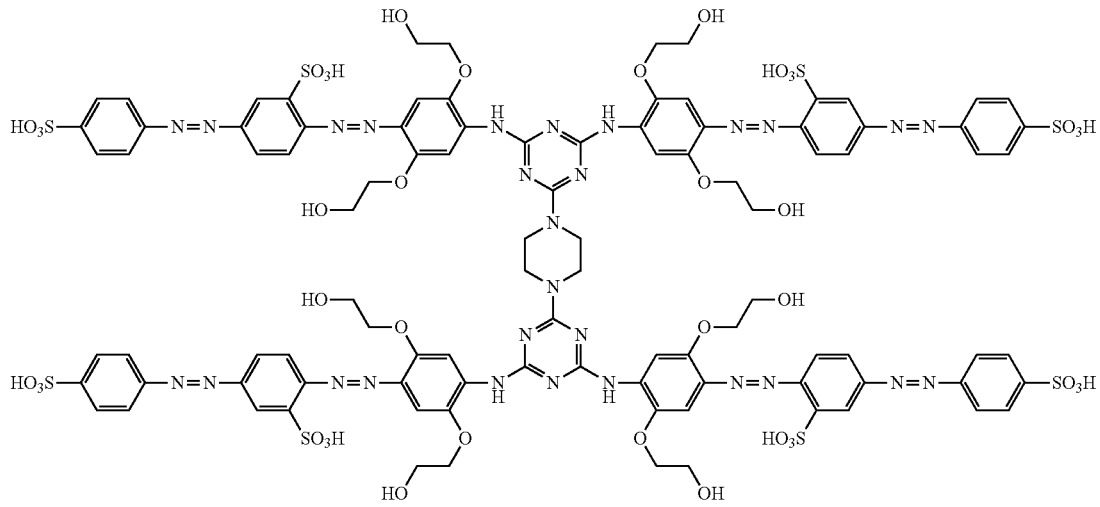 [SMILES: O=S(=O)(O)c1ccc(N=Nc2ccc(N=Nc3cc(OCCO)c(Nc4nc(Nc5cc(OCCO)c(N=Nc6ccc(N=Nc7ccc(S(=O)(=O)O)cc7)cc6S(=O)(=O)O)cc5OCCO)nc(N5CCN(c6nc(Nc7cc(OCCO)c(N=Nc8ccc(N=Nc9ccc(S(=O)(=O)O)cc9)cc8S(=O)(=O)O)cc7OCCO)nc(Nc7cc(OCCO)c(N=Nc8ccc(N=Nc9ccc(S(=O)(=O)O)cc9)cc8S(=O)(=O)O)cc7OCCO)n6)CC5)n4)cc3OCCO)c(S(=O)(=O)O)c2)cc1] |
| 71 | 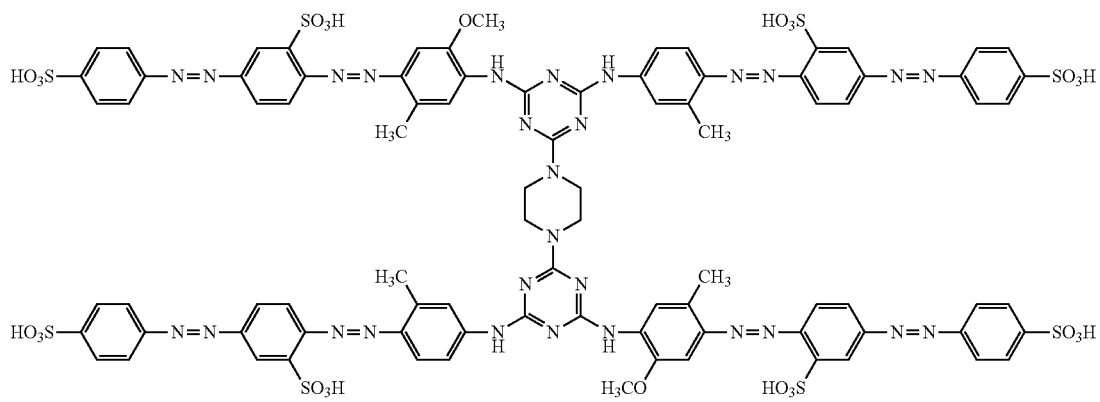 [SMILES: COc1cc(N=Nc2ccc(N=Nc3ccc(S(=O)(=O)O)cc3)cc2S(=O)(=O)O)c(C)cc1Nc1nc(Nc2ccc(N=Nc3ccc(N=Nc4ccc(S(=O)(=O)O)cc4)cc3S(=O)(=O)O)c(C)c2)nc(N2CCN(c3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OC)n3)CC2)n1] |
| 72 | 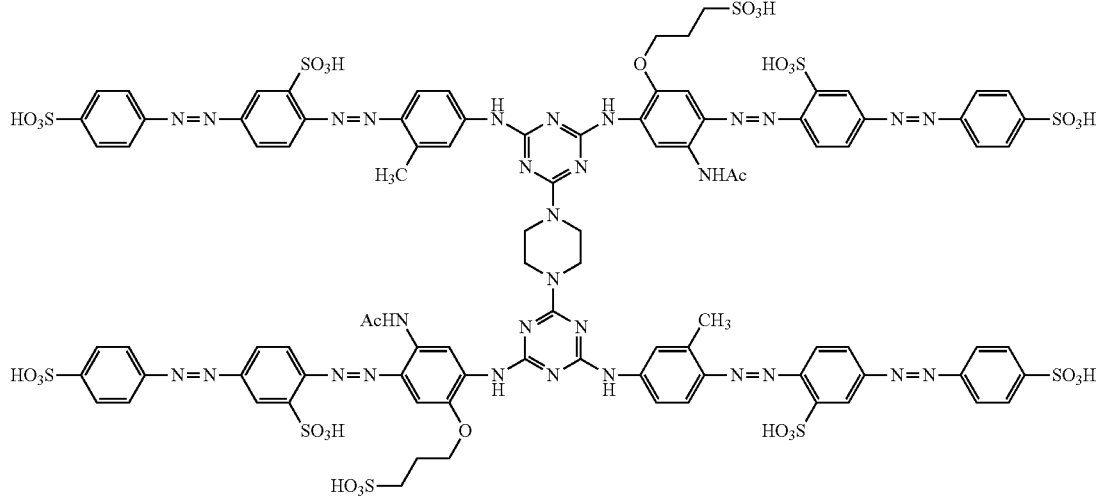 [SMILES: CC(=O)Nc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5cc(NC(C)=O)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] |

TABLE 22-continued
| Compound No. | Structural Formula |
|---|---|
| 73 | 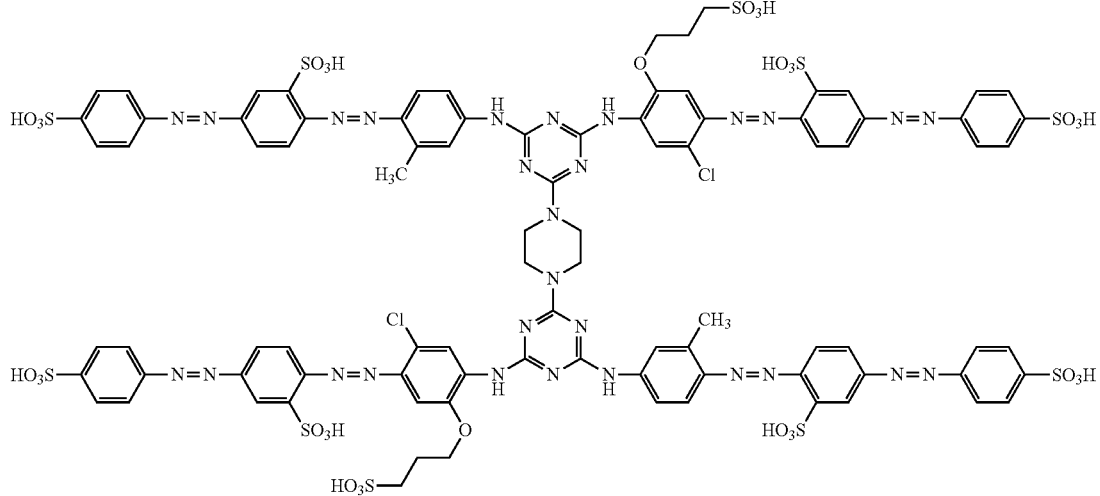 [SMILES: Cc1cc(Nc2nc(Nc3cc(Cl)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(Cl)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
TABLE 23
| Compound No. | Structural Formula |
|---|---|
| 74 | 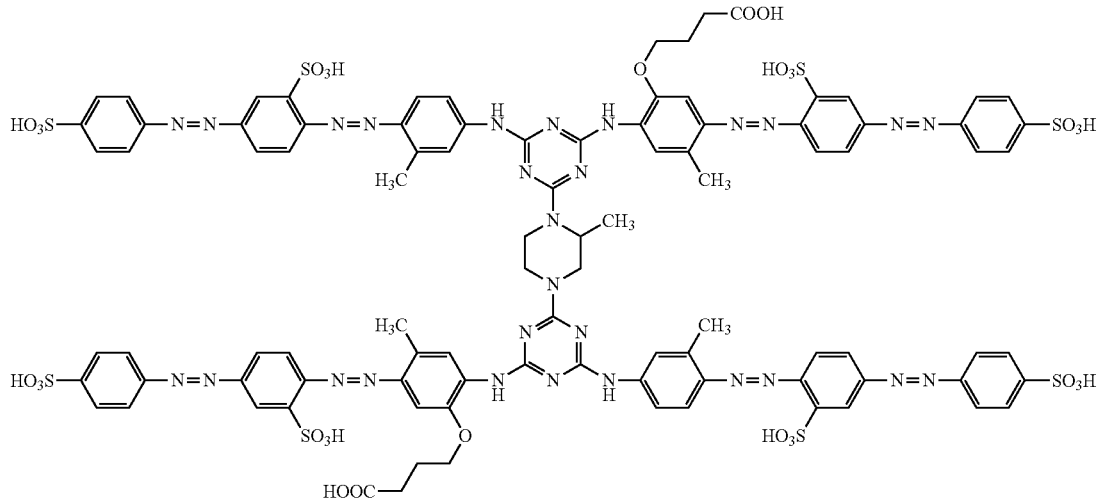 |

TABLE 23-continued
| Compound No. | Structural Formula |
|---|---|
| 75 | 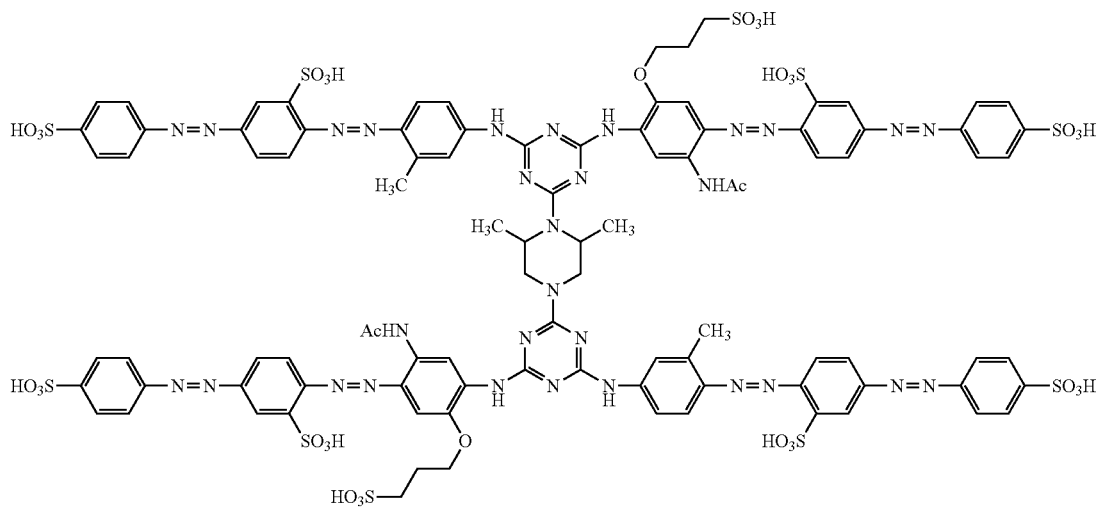 [SMILES: CC(=O)Nc1cc(Nc2nc(Nc3ccc(N=Nc4ccc(N=Nc5ccc(S(=O)(=O)O)cc5)cc4S(=O)(=O)O)c(C)c3)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(NC(C)=O)c(N=Nc6ccc(N=Nc7ccc(S(=O)(=O)O)cc7)cc6S(=O)(=O)O)cc5OCCCS(=O)(=O)O)n4)C(C)C3)n2)c(OCCCS(=O)(=O)O)cc1N=Nc1ccc(N=Nc2ccc(S(=O)(=O)O)cc2)cc1S(=O)(=O)O] |
| 76 | 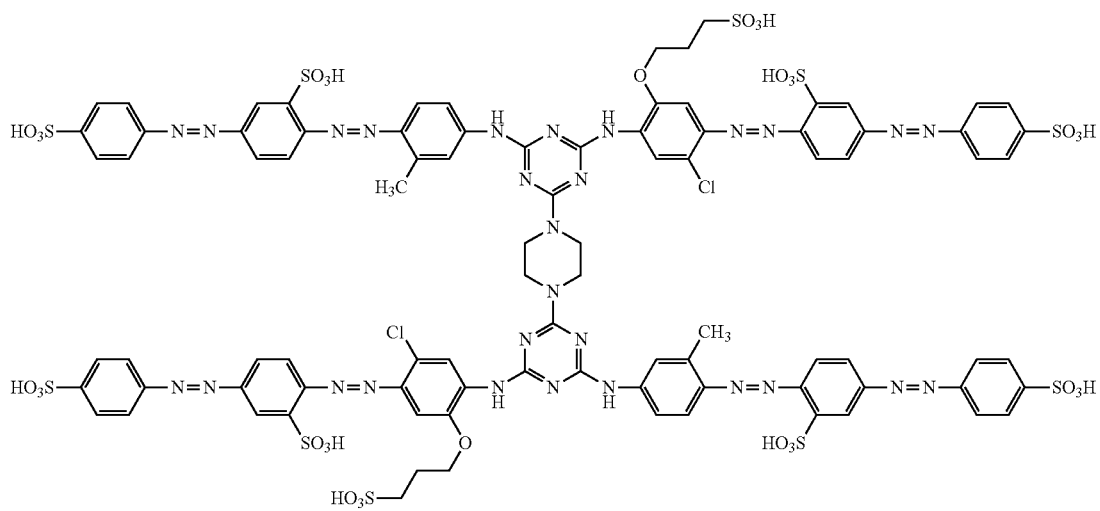 [SMILES: Cc1cc(Nc2nc(Nc3cc(Cl)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(Cl)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
| 77 | 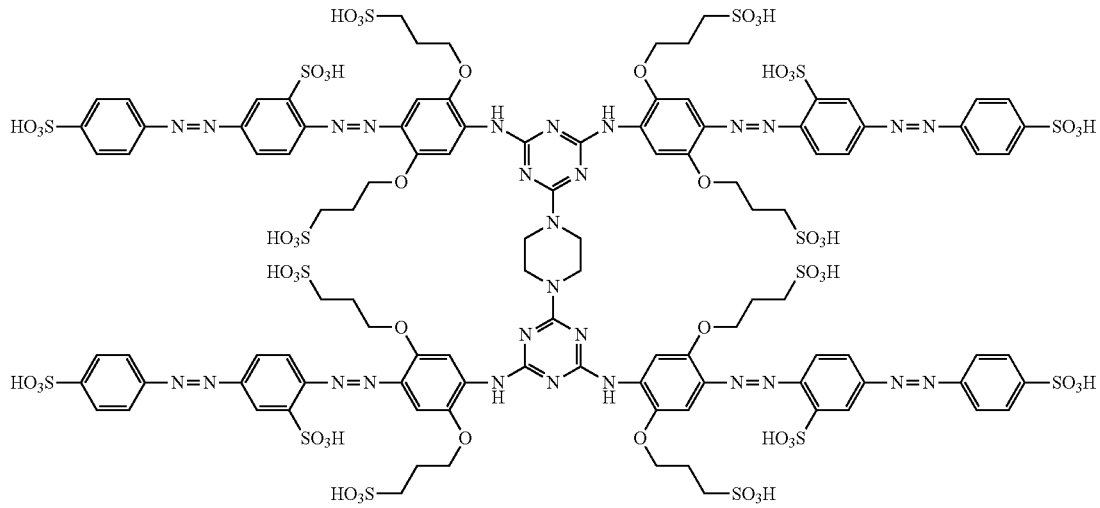 [SMILES: O=S(=O)(O)CCCOc1cc(Nc2nc(Nc3cc(OCCCS(=O)(=O)O)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(OCCCS(=O)(=O)O)c(N=Nc6ccc(N=Nc7ccc(S(=O)(=O)O)cc7)cc6S(=O)(=O)O)cc5OCCCS(=O)(=O)O)nc(Nc5cc(OCCCS(=O)(=O)O)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] | b. Method of Synthesizing the Dyes

The dyes formed of the compounds represented by general formula (1A), general formula (3A) and general formula (4A) may be synthesized by the following methods, for example. Here, the structural formula of the compound in each process is represented in the form of a free acid and $R^1$ to $R^8$ and X used for convenience in the following general formulas (6A) to (22A) each represent the same meanings as those in the above-described formula (1A).

First, the compound represented by the following general formula (6A) is diazotized by a conventional method, the resultant thereof and a compound represented by the following formula (7A) are subjected to a coupling reaction by a conventional method, and the compound represented by the following general formula (8A) is obtained.

Here, other methods of synthesizing the compounds represented by the general formula (8A) include the following methods. Specifically, the compound represented by the general formula (6A) is diazotized by a conventional method, the resultant thereof and a methyl-ω-sulfonic acid derivative of aniline are subjected to a coupling reaction by a conventional method, after which hydrolysis is performed under alkaline conditions and the compound represented by the following general formula (9A) is obtained. By processing the obtained compound represented by the general formula (9A) in fuming sulfuric acid or the like and performing sulfonation, it is possible to obtain the compound represented by the general formula (8A). Further, in the compounds represented by the general formula (8A), there are ones which may be bought as commercially available products (for example, C.I. Acid Yellow 9).

Next, after diazotizing the obtained compound represented by the general formula (8A) by a conventional method, the resultant thereof and a compound represented by the following general formula (10A) are subjected to a coupling reaction by a conventional method, and the compound represented by the following general formula (11A) is obtained.

Meanwhile, after diazotizing the compound represented by the general formula (8A) by a conventional method, the resultant thereof and a compound represented by the following general formula (12A) are subjected to a coupling reaction by a conventional method, and the compound represented by the following general formula (13A) is obtained. In the same manner, after diazotizing the compound represented by the general formula (8A) by a conventional method, the resultant thereof and a compound represented by the following general formula (14A) are subjected to a coupling reaction by a conventional method, and the compound represented by the following general formula (15A) is obtained. In the same manner, after diazotizing the compound represented by the general formula (8A) by a conventional method, the resultant thereof and a compound represented by the following general formula (16A) are subjected to a coupling reaction by a conventional method, and the compound represented by the following general formula (17A) is obtained.

Next, after the condensation-reaction of the obtained compound represented by the general formula (11A) and a cyanuric halide (for example, cyanuric chloride) by a conventional method, the compound represented by the following general formula (18A) is obtained.

Next, after the condensation-reaction of the obtained compound represented by the general formula (18A) and the compound represented by the general formula (13A) by a conventional method, the compound represented by the following general formula (19A) is obtained. In the same manner, after the condensation-reaction of the obtained compound represented by the general formula (15A) and a cyanuric halide (for example, cyanuric chloride) by a conventional method, the compound represented by the following formula (20A) is obtained. Next, after the condensation-reaction of the obtained compound represented by the general formula (20A) and the compound represented by the general formula (17A) by a conventional method, the compound represented by the following general formula (21A) is obtained.

Next, by the condensation-reaction of the obtained compound represented by the general formula (19A), the compound represented by the general formula (21A), and a compound corresponding to the crosslinked group X represented by the following general formula (22A) by a conventional method, the dyes 1A represented by the general formula (1A) may be obtained.

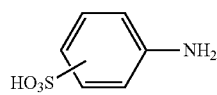

(6A)

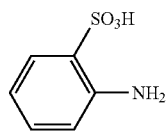

(7A)

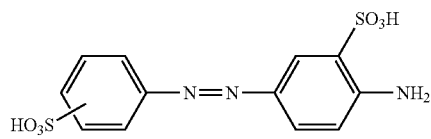

(8A)

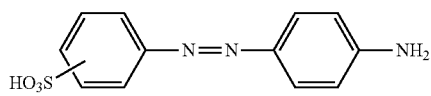

(9A)

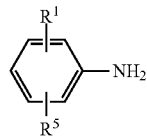

(10A)

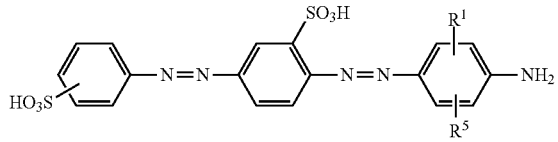

(11A)

-continued
| (12A) | (13A) |
|---|---|
| 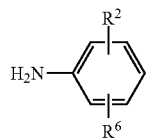 | 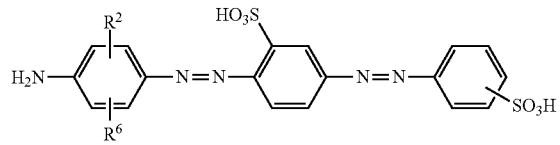 |
| (14A) | (15A) |
| 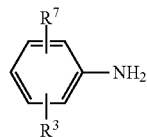 | 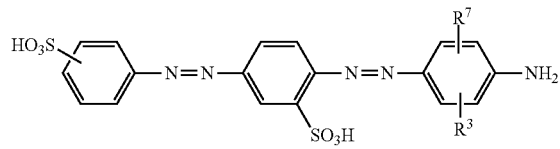 |
| (16A) | (17A) |
| 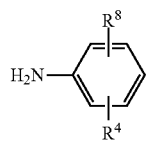 | 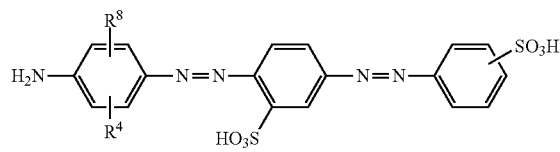 |
(18A)
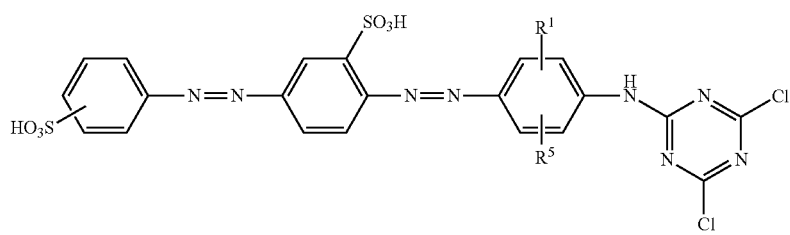
(19A)
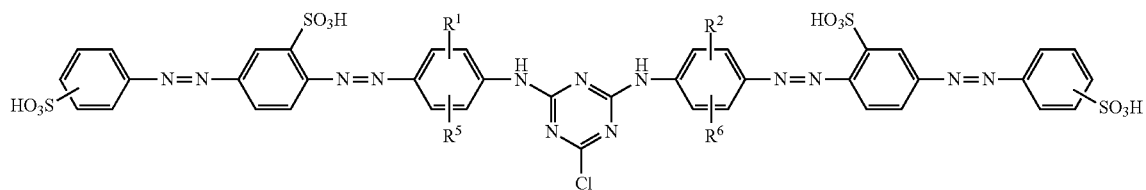
(20A)
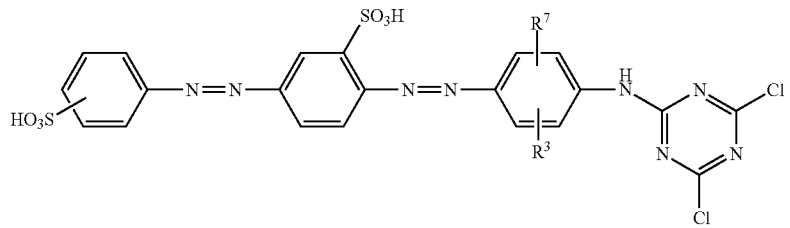
(21A)
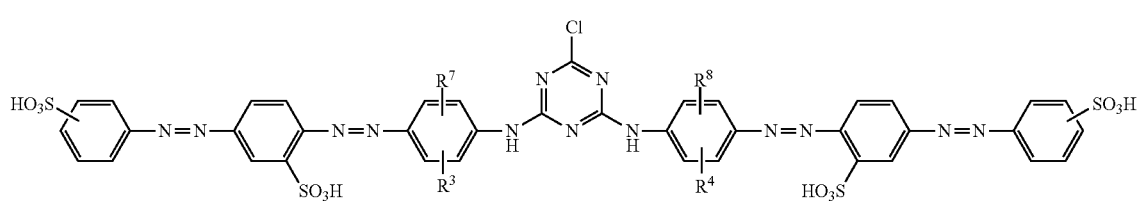
(22A)
H—X—H The diazotizing of the compound represented by the general formula (6A) is performed by a well-known method. Specifically, it is performed in an inorganic acid medium, for example, at a temperature of −5 to 30° C., preferably 0 to 20° C., using a nitrite (for example, alkali metal salts of nitrous acid such as sodium nitrite). Further, the coupling reaction of the diazotized product of the compound represented by the general formula (6A) and the compound represented by the formula (7A) is performed under well-known reaction conditions. For example, it is preferably performed in water or an aqueous organic medium, at a temperature of 0 to 30° C. (preferably 5 to 25° C.), and with a pH value of acidic to slightly acidic (for example, pH 1 to pH 6). Since the diazotized reaction solution is acidic and the reaction system is further acidified by the progress of the coupling reaction, it is preferable to adjust the reaction solution to the above-described pH value by adding a base. As the base, for example, it is possible to use alkali metal hydroxides such as lithium hydroxide, and sodium hydroxide; alkali metal carbonates such as lithium carbonate, sodium carbonate, and potassium carbonate; acetates such as sodium acetate; ammonia or organic amines; or the like. The compound of the general formula (6A) and the compound of formula (7A) are used in almost stoichiometric amounts.

The diazotizing of the compound represented by the general formula (8A) is performed by a well-known method. Specifically, it is performed in an inorganic acid medium, for example, at a temperature of −5 to 30° C., preferably 0 to 25° C., using a nitrite (for example, alkali metal salts of nitrous acid such as sodium nitrite). The coupling reaction of the diazotized product of the compound represented by the general formula (8A) and the compounds represented by the general formula (10A), the general formula (12A), the general formula (14A), or the general formula (16A) is performed under well-known reaction conditions. For example, it is advantageous to perform the reaction in water or an aqueous organic medium, at a temperature of 0 to 30° C., preferably 5 to 25° C., and with a pH value of acidic to slightly acidic (for example, pH 1 to pH 6). Since the diazotized reaction solution is acidic and the reaction system is further acidified by the progress of the coupling reaction, it is preferable to adjust the reaction solution to the above pH value by adding a base. As the base, it is possible to use the same ones as described above. The compound of the general formula (8A) and the compounds of the general formula (10A), the general formula (12A), the general formula (14A), or the general formula (16A) are used in almost stoichiometric amounts.

The condensation reaction of the compound represented by the general formula (11A) or the general formula (15A) and a cyanuric halide (for example, cyanuric chloride) is performed by a well-known method. For example, it is preferable to perform the reaction in water or an aqueous organic medium, at a temperature of 0 to 30° C., preferably 5 to 25° C., and with a pH value of slightly acidic to neutral (for example, pH 3 to pH 8). Since the reaction system is acidified by the progress of the reaction, it is preferable to perform adjustment to the above-described pH value by adding a base. As the base, it is possible to use the same ones as described above. The compound of the general formula (11A) or the compound of formula (15A) and the cyanuric halide are used in almost stoichiometric amounts.

The condensation reaction of the compound represented by the general formula (13A) and the compound represented by the general formula (18A) or the condensation reaction of the compound represented by the general formula (17A) and the compound represented by the general formula (20A) is performed with a well-known method. For example, it is preferable to perform the reaction in water or an aqueous organic medium, at a temperature of 10 to 80° C., preferably 25 to 70° C., and with a pH value of slightly acidic to slightly alkali (for example, pH 5 to pH 9). Adjustment of the pH value is performed by adding a base. As the base, it is possible to use the same ones as described above. The compound represented by the general formula (13A) and the compound represented by the general formula (18A) or the compound represented by the general formula (17A) and the compound represented by the general formula (20A) are used in almost stoichiometric amounts.

The condensation reaction of the compound represented by the general formula (19A), the compound represented by the general formula (21A), and the compound represented by the general formula (22A) is performed with a well-known method. Specifically, it is preferably performed in water or an aqueous organic medium, at a temperature of 50 to 100° C., preferably 60 to 95° C., and with a pH value of neutral to slightly alkali (for example, pH 7 to pH 10). Adjustment of the pH value is performed by adding a base. As the base, it is possible to use the same ones as described above. With respect to one equivalent amount of the compound represented by the general formula (19A) and one equivalent amount of the compound represented by the general formula (21A), the compound represented by the general formula (22A) uses an equivalent amount of 0.4 to 0.6, preferably an equivalent amount of 0.5.

When forming the dye represented by the general formula (1A) into a desired salt, after finishing the final process in the synthesis reaction of the dye represented by the general formula (1A), salting out is performed by adding the desired inorganic salts or salts of organic cations to the reaction solution, or isolating the free acid form is performed by the addition of a mineral acid such as hydrochloric acid, and, by neutralizing the result using a desired inorganic base or an organic base in an aqueous medium after removing inorganic salts by using and washing with water, aqueous acid, an aqueous organic medium, or the like as necessary, it is possible to obtain a solution of the corresponding salts.

As an example, a method of forming the dyes represented by the general formula (1A) as lithium salts will be described below. Next, after condensation-reaction of the compound represented by the general formula (19A), the compound represented by the general formula (21A), and a compound corresponding to the crosslinked group X represented by the general formula (22A) by a conventional method, a sodium salt of dyes represented by the general formula (1A) is obtained by adding sodium chloride, and performing salting-out as well as filtration and fractionation. Next, by adding water and hydrochloric acid to the sodium salt and performing acid removal as well as filtration and fractionation, a free acid of the dyes represented by general formula (1A) is obtained. Further, by adding water and lithium hydroxide to the free acid, it is possible to obtain a lithium salt of the dyes represented by general formula (1A). Further, as a different method of forming the lithium salt, a salt replacing reaction using a sodium salt of the dyes represented by the general formula (1A) and lithium chloride may be exemplified.

Here, for example, the aqueous acid refers to water made to be acidic by dissolving a mineral acid such as sulfuric acid or hydrochloric acid, or an organic acid such as acetic acid therein. Further, the aqueous organic medium refers to organic substances that can be mixed with water and that contain water, so-called organic solvents that can be mixed with water, and the like. Specific examples of the aqueous organic medium include a water-soluble organic solvent or the like; however, even organic substances that are not usually classified as solvents may be used as necessary as long as they may be mixed with water.

As the water-soluble organic solvent, C1-C4 alkanols such as methanol, ethanol, propanol, isopropanol, butanol, isobutanol, sec-butanol, or t-butanol; carboxylic acid amides such as N,N-dimethylformamide, or N,N-dimethylacetamide; lactams such as 2-pyrrolidone, N-methyl-2-pyrrolidone, or N-methyl-pyrrolidin-2-one; cyclic ureas such as 1,3-dimethyl-imidazolidin-2-one, or 1,3-dimethylhexahydropyrimid-2-one; ketones or keto alcohols such as acetone, methyl ethyl ketone, and 2-methyl-2-hydroxy-pentan-4-one; cyclic ethers such as tetrahydrofuran, and dioxane; mono, oligo, or polyalkylene glycols having a C2 to C6 alkylene unit, or thio glycols, such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol, or dithiodiglycol; polyols (triols) such as glycerine, or hexan-1,2,6-triol; C1-C4 alkyl ethers of polyvalent alcohols such as ethylene glycol monomethyl ether, ethylene glycol monoethyl ether, diethylene glycol monomethyl ether, diethylene glycol monoethyl ether, diethylene glycol monobutyl ether (butyl carbitol) triethylene glycol monomethyl ether, or triethylene glycol monoethyl ether; γ-butyrolactone or dimethyl sulfoxide or the like may be exemplified.

In addition, examples of organic substances that are not usually classified as solvents include ureas, sugars, or the like. As the inorganic salts, for example, alkali metal salts such as lithium chloride, sodium chloride, and potassium chloride; ammonium salts such as ammonium chloride, and ammonium bromide; and the like may be exemplified. In addition, as the salt of the organic cations, for example, halogen salts of organic amines or the like may be exemplified. As the inorganic bases, for example, alkali metal hydroxides such as lithium hydroxide, sodium hydroxide, and potassium hydroxide; ammonium hydroxide; alkali metal carbonates such as lithium carbonate, sodium carbonate, and potassium carbonate, and the like may be exemplified. In addition, as the organic bases, quaternary ammonium compounds represented by the general formula (5A) such as organic amines, for example, diethanolamine, triethanolamine, or the like may be exemplified; however, the invention is not limited thereto.

Among the compounds shown in the above-described Table 2 to Table 23, the ink composition of the embodiment may preferably use a compound of the following formula (2A) shown by compound No. 59 or a salt thereof.

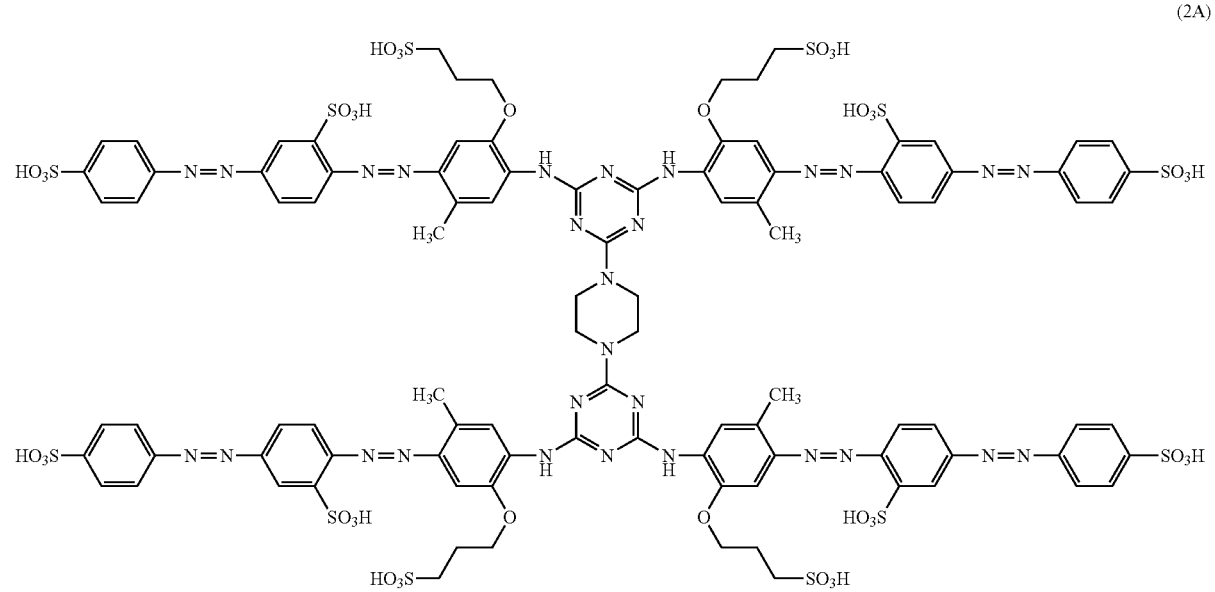 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O]

(2A)

1.2.1.2. Dye 1B a. Dyes

The second ink according to the embodiment includes dyes represented by the following formula (1B) (below, referred to as "dye 1B") and second metal ions as counter-ions of the dyes.

The dye 1B has a property of being not easily decomposed even when light is irradiated thereto, or when exposed to gas (in particular, ozone) in the atmosphere. Therefore, an image formed using the second ink has excellent light resistance and gas resistance (in particular, ozone resistance), and color changes or fading due to the influence of light and the atmosphere are not easily caused. Further, the dye 1B has a property of being not easily decomposed in ink. Therefore, the second ink has excellent stability when stored.

The content of the dye 1B is preferably from 1% by mass or more to 15% by mass or less with respect to the total mass of the second ink, and more preferably 1% by mass or more to 10% by mass or less. When the content of the dye 1B is within the above-described range, it is possible to improve the color development concentration of the recorded image, and to improve the light resistance and the gas resistance.

(1B)

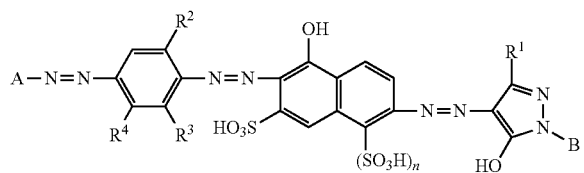

In the above-described general formula (1B), n is 0 or 1, $R^1$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group or a carboxy group.

Further, $R^2$, $R^3$, and $R^4$ each independently represents a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy C1-C4 alkoxy group, a sulfo group or a carboxy group; a mono or di-C1-C4 alkylamino group which may be substituted with a hydroxy group, a sulfo group or a carboxy group; a C1-C4 alkylcarbonylamino group which may be substituted with a hydroxy group or a carboxy group; an N'—C1-C4 alkylureido group which may be substituted with a hydroxy group, a sulfo group or a carboxy group; a phenylamino group in which a benzene ring may be substituted with a chlorine atom, a C1-C4 alkyl group, a nitro group, a sulfo group or a carboxy group; a benzoylamino group in which a benzene ring may be substituted with a chlorine atom, a C1-C4 alkyl group, a nitro group, a sulfo group or a carboxy group; or a phenylsulfonylamino group in which a benzene ring may be substituted with a chlorine atom, a C1-C4 alkyl group, a nitro group, a sulfo group or a carboxy group.

Further, group A is a substituted heterocyclic group represented by the following general formula (2B) and following general formula (3B).

(2B)

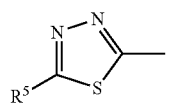

In the above-described general formula (2B), $R^5$ represents a mercapto group; or a C1-C4 alkylthio group which may be substituted with a hydroxy group, a C1-C4 alkoxy group, a hydroxy C1-C4 alkoxy group, a sulfo group or a carboxy group.

(3B)

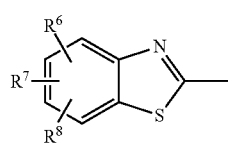

In the above-described general formula (3B), $R^6$, $R^7$, and $R^8$ each independently represents a hydrogen atom; a chlorine atom; a carboxy group; a sulfo group; a nitro group; a hydroxy group; a carbamoyl group; a sulfamoyl group; a C1-C4 alkyl group; a C1-C4 alkoxy group which may be substituted with a hydroxy group, a C1-C4 alkoxy group, a sulfo group or a carboxy group; a C1-C4 alkylsulfonyl group which may be substituted with a hydroxy group, a sulfo group or a carboxy group; or a phenylsulfonyl group in which a benzene ring may be substituted with a chlorine atom, a C1-C4 alkyl group, a nitro group, a sulfo group, or a carboxy group.

Further, group B is a phenyl group or a naphthyl group which may be substituted. Here, when group B is a substituted phenyl group, it has a substituent selected from the group consisting of a hydroxy group; a sulfo group; a carboxy group; a C1-C4 alkyl group; a C1-C4 alkoxy group; an amino group; a mono or di-C1-C4 alkylamino group; an acetylamino group; and a benzoylamino group in which a benzene ring may be substituted with a chlorine atom, a C1-C4 alkyl group, a nitro group, a sulfo group, or a carboxy group. Meanwhile, when group B is a substituted naphthyl group, it has a substituent selected from the group consisting of a hydroxy group; a sulfo group; a C1-C4 alkoxy group; a phenylsulfonyloxy group in which a benzene ring may be substituted with a methyl group, a nitro group, or a chlorine atom.

The dye 1B is a compound having tautomers. As the tautomer, compounds such as the following general formulas (5B) to (7B) may be exemplified, and these tautomers may also be used as the dye 1B according to the embodiment.

(5B)

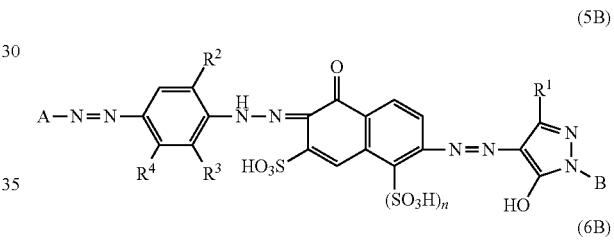

(6B)

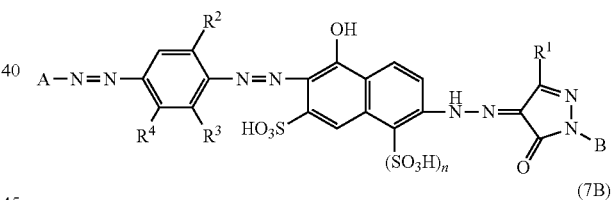

(7B)

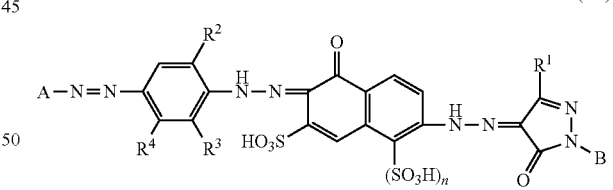

In the above-described general formulas (5B) to (7B), n, $R^1$, $R^2$, $R^3$, $R^4$, group A and group B represent the same meanings as those in the above-described formula (1B).

In the above-described general formula (1B), $R^1$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group or a carboxy group.

When $R^1$ in the general formula (1B) is a C1-C8 alkoxycarbonyl group, the alkoxycarbonyl group may be any of a linear group, a branched group, or a group in which the alkyl member has a cyclic structure; however, the alkoxycarbonyl group is preferably linear or branched. Specific examples include for example, linear methoxycarbonyl, ethoxycarbonyl, n-propoxycarbonyl, n-butoxycarbonyl, n-pentyloxycarbonyl, n-hexyloxycarbonyl, n-heptyloxycarbonyl, n-octyloxycarbonyl, and the like; branched isopropoxycarbonyl, isobutyloxycarbonyl, sec-butoxycarbonyl, tert-butoxycarbonyl, 2,2-dimethylpropoxycarbonyl, isopentyloxycarbonyl, sec-pentyloxycarbonyl, 2-methylbutyloxycarbonyl, and the like; ones in which the alkyl member has a cyclic structure such as cyclopropylmethyloxycarbonyl, cyclobutylmethyloxycarbonyl, cyclopentyloxycarbonyl, and cyclohexyloxycarbonyl; and the like. Among these, a linear C1-C6 alkoxycarbonyl group is more preferable and a linear C1-C4 alkoxycarbonyl group is even more preferable.

When $R^1$ in the general formula (1B) is a C1-C4 alkyl group which may be substituted with a C1-C8 alkoxycarbonyl group or a carboxy group, and the C1-C4 alkyl group is an unsubstituted C1-C4 alkyl group, the alkyl group may be any of a linear group, or a branched group; however, linear is preferable. Specific examples of the C1-C4 alkyl group include, for example, linear groups such as methyl, ethyl, n-propyl, and n-butyl; and branched groups such as isopropyl, isobutyl, sec-butyl, and tert-butyl. Further, even in a case where the C1-C4 alkyl group has a substituent, the alkyl group may be the same as the ones illustrated in the case where the C1-C4 alkyl group is an unsubstituted C1-C4 alkyl group, including the preferences. In a case where the substituent of the C1-C4 alkyl group is a C1-C8 alkoxycarbonyl group, the alkoxycarbonyl group may be the same as the case where $R^1$ is a C1-C8 alkoxycarbonyl group, including the preferences. In a case where $R^1$ is a C1-C4 alkyl group substituted with a C1-C8 alkoxycarbonyl group, preferable specific examples thereof include methoxycarbonylmethyl, ethoxycarbonylethyl, n-butoxycarbonylmethyl, n-octyloxycarboxyethyl, and the like. In a case where $R^1$ is a C1-C4 alkyl group which may be substituted with a carboxy group, preferable specific examples thereof include carboxymethyl, 2-carboxyethyl, 3-carboxypropyl, and the like.

Specific examples of a case where $R^1$ in the general formula (1B) is a phenyl group which may be substituted with a hydroxy group, a sulfo group or a carboxy group, for example, include unsubstituted phenyl; hydroxy substituted phenyls such as 2-hydroxyphenyl, and 4-hydroxyphenyl; sulfo-substituted phenyls such as 2-sulfophenyl, 4-sulfophenyl, 2,4-disulfophenyl, and 3,5-disulfophenyl; carboxy-substituted phenyls such as 2-carboxyphenyl, 4-carboxyphenyl, and 3,5-dicarboxyphenyl; phenyls substituted with a plurality of types of groups such as 2-hydroxy-5-sulfophenyl; and the like.

Even among the above, $R^1$ in the general formula (1B) is more preferably a carboxy group; a C1-C4 alkoxycarbonyl group; an unsubstituted C1-C4 alkyl group; a carboxy group substituted C1-C4 alkyl group; or an unsubstituted phenyl group. Specific examples of a preferable $R^4$ in the general formula (1B) include methyl, ethyl, tert-butyl, carboxymethyl, 3-carboxypropyl, methoxycarbonylmethyl, carboxy, methoxycarboxy, ethoxycarboxy, n-octyloxycarboxy, phenyl, 2-hydroxyphenyl, and 4-sulfophenylmethyl, more preferably include methyl, carboxymethyl, carboxy, and phenyl, and even more preferably include methyl and carboxy.

In the general formula (1B), $R^2$, $R^3$, and $R^4$ each independently represents a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy C1-C4 alkoxy group, a sulfo group or a carboxy group; a mono or di-C1-C4 alkylamino group which may be substituted with a hydroxy group, a sulfo group or a carboxy group; a C1-C4 alkylcarbonylamino group which may be substituted with a hydroxy group or a carboxy group; an N'—C1-C4 alkylureido group which may be substituted with a hydroxy group, a sulfo group or a carboxy group; a phenylamino group in which a benzene ring may be substituted with a chlorine atom, a C1-C4 alkyl group, a nitro group, a sulfo group or a carboxy group; a benzoylamino group in which a benzene ring may be substituted with a chlorine atom, a C1-C4 alkyl group, a nitro group, a sulfo group or a carboxy group; or a phenylsulfonylamino group in which a benzene ring may be substituted with a chlorine atom, a C1-C4 alkyl group, a nitro group, a sulfo group or a carboxy group.

In a case where $R^2$ to $R^4$ in the general formula (1B) are unsubstituted C1-C4 alkoxy groups, the alkoxy groups may be either linear or branched. Specific examples of the unsubstituted C1-C4 alkoxy groups include methoxy, ethoxy, n-propoxy, isopropoxy, n-butoxy, sec-butoxy, tert-butoxy, and the like. When the alkoxy group is substituted with a hydroxy group, a C1-C4 alkoxy group, a hydroxy C1-C4 alkoxy group, a sulfo group, or a carboxy group, specific examples thereof include, for example, a hydroxy C1-C4 alkoxy group such as 2-hydroxyethoxy, 2-hydroxypropoxy, and 3-hydroxypropoxy; a C1-C4 alkoxy C1-C4 alkoxy group such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, and n-propoxybutoxy; a hydroxy C1-C4 alkoxy C1-C4 alkoxy group such as 2-hydroxyethoxyethoxy; a sulfo C1-C4 alkoxy group such as 3-sulfopropoxy, and 4-sulfobutoxy; a carboxy C1-C4 alkoxy group such as carboxymethoxy, 2-carboxyethoxy, and 3-carboxypropoxy; and the like.

In a case where $R^2$ to $R^4$ in the general formula (1B) are unsubstituted mono or di-C1-C4 alkylamino groups, the C1-C4 alkyl member may be either linear or branched. Specific examples of the unsubstituted mono or di-C1-C4 alkylamino groups include linear methylamino, ethylamino, n-propylamino, isopropylamino, n-butylamino, dimethylamino, diethylamino, di-n-propylamino, di-n-butylamino and the like; branched sec-butylamino, tert-butylamino, di-isopropylamino, and the like; and the like. When the mono or di-C1-C4 alkylamino group is substituted with a hydroxy group, a sulfo group, or a carboxy group, specific examples thereof include, for example, a hydroxy substituted mono or di-C1-C4 alkylamino group such as 2-hydroxyethylamino, 2-hydroxypropylamino, and 2,2'-dihydroxydiethylamino; a sulfo-substituted mono or di-C1-C4 alkylamino group such as 2-sulfoethylamino, 3-sulfopropylamino, 4-sulfobutylamino, and 3,3'-disulfodipropylamino; a carboxy-substituted mono or di-C1-C4 alkylamino group such as carboxymethylamino, 2-carboxyethylamino, 3-carboxypropylamino, and 2,2'-dicarboxydiethylamino; and the like.

In a case where $R^2$ to $R^4$ in the general formula (1B) are unsubstituted C1-C4 alkylcarbonylamino groups, the C1-C4 alkyl member may be either linear or branched; however, linear is preferable. Specific examples of the unsubstituted C1-C4 alkylcarbonylamino groups include acetylamino, propanoylamino, butanoylamino, and the like. When the C1-C4 alkylcarbonylamino group is substituted with a hydroxy group or a carboxy group, specific examples of the C1-C4 alkylcarbonyl group include, for example, hydroxy C1-C4 alkylcarbonylamino groups such as hydroxyethanoylamino, 2-hydroxypropanoylamino, 4-hydroxybutanoylamino; carboxy C1-C4 alkylcarbonylamino groups such as 3-carboxypropanoylamino; and the like.

In a case where $R^2$ to $R^4$ in the general formula (1B) are N'—C1-C4 alkylureido groups, ones having substituents are preferable to unsubstituted ones. When the N'—C1-C4 alkylureido groups are substituted with a hydroxy group, a sulfo group, or a carboxy group, specific examples thereof include, for example, N'-hydroxy C1-C4 alkylureido groups such as N'-2-hydroxyethylureido, and N'-3-hydroxyethylureido; N'-sulfo C1-C4 alkylureido groups such as N'-2-sulfoethylureido, and N'-3-sulfopropylureido; N'-carboxy C1-C4 alkylureido groups such as N'-carboxymethylureido, N'-2-carboxyethylureido, N'-3-carboxypropylureido, and N'-4-carboxybutylureido; and the like.

Specific examples of a case where $R^2$ to $R^4$ in the general formula (1B) are phenylamino groups in which a benzene ring may be substituted with a chlorine atom include a C1-C4 alkyl group, a nitro group, a sulfo group, or a carboxy group, for example, unsubstituted phenylamino; chlorine atom substituted phenylamino groups such as 2-chlorophenylamino, 4-chlorophenylamino, and 2,4-dichlorophenylamino; C1-C4 alkyl-substituted phenylamino groups such as 2-methylphenylamino, 4-methylphenylamino, and 4-tert-butylphenylamino; nitro-substituted phenylamino groups such as 2-nitrophenylamino, and 4-nitrophenylamino; sulfo-substituted phenylamino groups such as 3-sulfophenylamino, 4-sulfophenylamino, 2,4-disulfophenylamino, and 3,5-disulfophenylamino; carboxy-substituted phenylamino groups such as 2-carboxyphenylamino, 4-carboxyphenylamino, 2,5-dicarboxyphenylamino, and 3,5-dicarboxyphenylamino; and the like.

When $R^2$ to $R^4$ in the general formula (1B) are a phenylamino group, a benzoylamino group, or a phenylsulfonylamino group having a substituent and the substituent of the benzene ring included in the respective groups is a C1-C4 alkyl group, the alkyl group may be any of linear, branched, or cyclic; however, linear or branched is preferable. Specific examples of the alkyl group include, for example, linear groups such as methyl, ethyl, n-propyl, and n-butyl; and branched groups such as isopropyl, isobutyl, sec-butyl, and tert-butyl.

Specific examples of a case where $R^2$ to $R^4$ in the general formula (1B) are benzoylamino groups in which a benzene ring may be substituted with a chlorine atom include a C1-C4 alkyl group, a nitro group, a sulfo group, or a carboxy group, for example, unsubstituted benzoylamino; chlorine atom substituted benzoylamino groups such as 2-chlorobenzoylamino, 4-chlorobenzoylamino, and 2,4-dichlorobenzoylamino; C1-C4 alkyl-substituted benzoylamino groups such as 2-methyl benzoylamino, 3-methyl benzoylamino, and 4-methyl benzoylamino; nitro-substituted benzoylamino groups such as 2-nitrobenzoylamino, 4-nitrobenzoylamino, and 3,5-dinitrobenzoylamino; sulfo-substituted benzoylamino groups such as 2-sulfobenzoylamino, and 4-sulfobenzoylamino; carboxy-substituted benzoylamino groups such as 2-carboxybenzoylamino, 4-carboxybenzoylamino, and 3,5-dicarboxybenzoylamino; and the like.

Specific examples of a case where $R^2$ to $R^4$ in the general formula (1B) are phenylsulfonylamino groups in which a benzene ring may be substituted with a chlorine atom, a C1-C4 alkyl group, a nitro group, a sulfo group, or a carboxy group, for example, unsubstituted phenylsulfonylamino; chlorine atom substituted phenylsulfonylamino groups such as 2-chlorophenylsulfonylamino, and 4-chlorophenylsulfonylamino; C1-C4 alkyl-substituted phenylsulfonylamino groups such as 2-methylphenylsulfonylamino, 4-methylphenylsulfonylamino and 4-tertbutylphenylsulfonylamino; nitro-substituted phenylsulfonylamino groups such as 2-nitrophenylsulfonylamino, 3-nitrophenylsulfonylamino, and 4-nitrophenylsulfonylamino; sulfo-substituted phenylsulfonylamino groups such as 3-sulfophenylsulfonylamino, and 4-sulfophenylsulfonylamino; carboxy-substituted phenylsulfonylamino groups such as 3-carboxyphenylsulfonylamino, and 4-carboxyphenylsulfonylamino; and the like.

As specific examples of preferable $R^2$ to $R^4$ in general formula (1B), there are a hydrogen atom, carboxy, sulfo, methyl, ethyl, methoxy, ethoxy, 2-hydroxyethoxy, 2-sulfoethoxy, 3-sulfopropoxy, 4-sulfobutoxy, carboxymethoxy, 2-carboxyethoxy, methylamino, ethylamino, 2-hydroxyethylamino, 2-sulfoethylamino, 3-sulfopropylamino, 2-carboxyethylamino, dimethylamino, diethylamino, 2,2'-dihydroxydiethylamino, 2,2'-dicarboxydiethylamino, 3,3'-disulfodipropylamino, acetylamino, 3-carboxypropanoylamino, 4-hydroxybutanoylamino, N'-carboxymethylureido, N'-2-sulfoethylureido, 4-sulfophenylamino, 2,4-disulfophenylamino, 2,5-di-carboxyphenylamino, benzoylamino, 3-sulfobenzoylamino, 2-carboxybenzoylamino, phenylsulfonylamino, 4-methylphenylsulfonylamino, 4-nitrophenylsulfonylamino, 3-sulfophenylsulfonylamino, 4-carboxyphenylsulfonylamino, or the like; more preferably, there are a hydrogen atom, sulfo, methyl, methoxy, 2-hydroxyethoxy, 2-sulfoethoxy, 3-sulfopropoxy, 4-sulfobutoxy, dimethylamino, 3,3'-disulfodipropylamino, acetylamino, 3-carboxypropanoylamino, N'-2-sulfoethylureido, 2,4-disulfophenylamino, benzoylamino, 4-methylphenylsulfonylamino; and, even more preferably, there are a hydrogen atom, sulfo, methyl, methoxy, and 3-sulfopropoxy.

As a preferable combination of $R^2$ to $R^4$ in the general formula (1B), $R^2$ is 3-sulfopropoxy or 4-sulfobutoxy, $R^3$ is a hydrogen atom, and $R^4$ is methyl.

In a case where $R^5$ in the general formula (2B) is a C1-C4 alkylthio group, the C1-C4 alkyl member is preferably either linear or branched; however, linear is more preferable. Specific examples of the C1-C4 alkylthio groups include methylthio, ethylthio, n-propylthio, isopropylthio, n-butylthio, sec-butylthio, tert-butylthio, and the like. Further, in a case where $R^5$ in the general formula (2B) is a C1-C4 alkylthio group having a substituent, the substituent is preferably a hydroxy group, a sulfo group, or a carboxy group and more preferably a sulfo group, or a carboxy group. Specific examples of the C1-C4 alkylthio group having a substituent include, for example, a hydroxy C1-C4 alkylthio group such as 2-hydroxyethylthio, 2-hydroxypropoxythio, and 3-hydroxypropoxythio; a C1-C4 alkoxy C1-C4 alkylthio group such as methoxyethylthio, ethoxyethylthio, n-propoxyethylthio, isopropoxyethylthio, n-butoxyethylthio, methoxypropylthio, ethoxypropylthio, n-propoxypropylthio, isopropoxybutylthio, and n-propoxypropylthio; a hydroxy C1-C4 alkoxy C1-C4 alkylthio group such as 2-hydroxyethoxyethylthio; a sulfo C1-C4 alkylthio group such as 3-sulfopropylthio, and 4-sulfobutylthio; a carboxy C1-C4 alkylthio group such as carboxymethylthio, 2-carboxyethylthio, and 3-carboxypropylthio; and the like.

Specific examples of a preferable $R^5$ in the general formula (2B) include mercapto (—SH), methylthio, ethylthio, 2-hydroxyethylthio, methoxyethylthio, ethoxyethylthio, 2-sulfoethylthio, 3-sulfopropylthio, 4-sulfobutylthio, carboxymethylthio, 2-carboxyethylthio, 3-carboxypropylthio or the like, more preferably include methylthio, 2-sulfopropylthio, carboxymethylthio, and 2-carboxyethylthio, and even more preferably include 2-sulfopropylthio, and 2-carboxyethylthio.

In a case where $R^6$ to $R^8$ in the general formula (3B) are C1-C4 alkyl groups, the alkyl group may be any of linear, branched, or cyclic; however, linear or branched is preferable and linear is even more preferable. Specific examples of the C1-C4 alkyl group include, for example, linear groups such as methyl, ethyl, n-propyl, and n-butyl; and branched groups such as isopropyl, isobutyl, sec-butyl, and tert-butyl.

When $R^6$ to $R^8$ in the general formula (3B) are C1-C4 alkoxy groups which may be substituted with a hydroxy group, a C1-C4 alkoxy group, a sulfo group, or a carboxy group, the substituents may be the same ones as the case where $R^2$ to $R^4$ in the general formula (1B) are C1-C4 alkoxy groups, including the same preferences.

Specific examples of a case where $R^6$ to $R^8$ in the general formula (3B) are C1-C4 alkylsulfonyl groups which may be substituted with a hydroxy group, a sulfo group, or a carboxy group include, for example, linear or branched C1-C4 alkylsulfonyl groups such as methylsulfonyl, ethylsulfonyl, propylsulfonyl, iso-propylsulfonyl, n-butylsulfonyl, sec-butylsulfonyl, and tert-butylsulfonyl; hydroxy C1-C4 alkylsulfonyl groups such as 2-hydroxyethylsulfonyl, and 3-hydroxypropylsulfonyl; sulfo C1-C4 alkylsulfonyl groups such as 2-sulfopropylsulfonyl, 3-sulfopropylsulfonyl, and 4-sulfobutylsulfonyl; carboxy C1-C4 alkylsulfonyl groups such as carboxymethylsulfonyl, 2-carboxyethylsulfonyl, and 3-carboxypropylsulfonyl; and the like.

Specific examples of a case where $R^6$ to $R^8$ in the general formula (3B) are phenylsulfonyl groups in which a benzene ring may be substituted with a chlorine atom, a C1-C4 alkyl group, a nitro group, a sulfo group, or a carboxy group include, for example, unsubstituted phenylsulfonyl; chlorine atom-substituted phenylsulfonyl groups such as 2-chlorophenylsulfonyl, and 4-chlorophenylsulfonyl; C1-C4 alkyl-substituted phenylsulfonyl groups such as 2-methylphenylsulfonyl, 4-methylphenylsulfonyl, 2,4-dimethylphenylsulfonyl, and 4-tert-butylphenylsulfonyl; nitro-substituted phenylsulfonyl groups such as 2-nitrophenylsulfonyl, and 4-nitrophenylsulfonyl; sulfo-substituted phenylsulfonyl groups such as 3-sulfophenylsulfonyl, 4-sulfophenylsulfonyl, and 3,5-disulfophenylsulfonyl; carboxy-substituted phenylsulfonyl groups such as 2-carboxyphenylsulfonyl, 4-carboxyphenylsulfonyl, and 3,5-dicarboxyphenylsulfonyl; and the like.

As specific examples of preferable $R^6$ to $R^8$ in general formula (3B), there are a hydrogen atom, a chlorine atom, carboxy, sulfo, nitro, methyl, ethyl, methoxy, ethoxy, 2-hydroxyethoxy, 2-sulfoethoxy, 3-sulfopropoxy, 4-sulfobutoxy, carboxymethoxy, 2-carboxyethoxy, methylsulfonyl, ethylsulfonyl, tert-butylsulfonyl, 2-hydroxyethylsulfonyl, 3-sulfopropylsulfonyl, 2-carboxyethylsulfonyl, phenylsulfonyl, 4-chlorophenylsulfonyl, 4-methylphenylsulfonyl, 2,4-dimethylphenylsulfonyl, 4-nitrophenylsulfonyl, 4-sulfophenylsulfonyl, 2-carboxyphenylsulfonyl, 4-carboxyphenylsulfonyl, or the like; more preferably, there are a hydrogen atom, a chlorine atom, carboxy, sulfo, nitro, methyl, methoxy, methylsulfonyl, and 2-carboxyphenylsulfonyl; and, even more preferably, there are a hydrogen atom, sulfo, and methoxy. Further, among $R^6$ to $R^8$, at least one is preferably a hydrogen atom, and at least one is preferably a substituent other than a hydrogen atom.

As preferable combinations of $R^6$, $R^7$ and $R^8$ in the general formula (3B), there is one of a hydrogen atom, methoxy and sulfo, or, there is one in which one is sulfo and the other two are hydrogen atoms. When one is sulfo and the other two are hydrogen atoms, the substitution position of the sulfo is more preferably the 6-position of a benzothiazole ring.

In the general formula (1B), group B is a phenyl group or a naphthyl group which may be substituted, and, when group B is a substituted phenyl group, it has a substituent selected from a group of a hydroxy group; a sulfo group; a carboxy group; a C1-C4 alkyl group; a C1-C4 alkoxy group; an amino group; a mono or di-C1-C4 alkylamino group; an acetylamino group; and a benzoylamino group in which a benzene ring may be substituted with a chlorine atom, a C1-C4 alkyl group, a nitro group, a sulfo group, or a carboxy group; and, when group B is a substituted naphthyl group, it has a substituent selected from a group of a hydroxy group; a sulfo group; a C1-C4 alkoxy group; a phenylsulfonyloxy group in which a benzene ring may be substituted with a methyl group, a nitro group, or a chlorine atom.

When group B in the general formula (1B) is a phenyl group or a naphthyl group having a substituent and the substituent is a C1-C4 alkoxy group, the alkoxy group may be the same as the case where $R^2$ to $R^4$ in the general formula (1B) are unsubstituted C1-C4 alkoxy groups, including the same preferences.

When group B in the general formula (1B) is a mono or di-C1-C4 alkylamino group substituted phenyl group, the mono or di-C1-C4 alkylamino group may be the same as the case where $R^2$ to $R^4$ in the general formula (1B) are unsubstituted mono or di-C1-C4 alkylamino groups, including the same preferences.

Specific examples of a case where group B in the general formula (1B) is a substituted naphthyl group, and the substituent is a phenylsulfonyloxy group in which a benzene ring may be substituted with a methyl group, a nitro group, or a chlorine atom include, for example, unsubstituted phenylsulfonyloxy; methyl-substituted phenylsulfonyloxy groups such as 4-methylphenylsulfonyloxy, and 2,4-dimethylphenylsulfonyloxy; nitro-substituted phenylsulfonyloxy groups such as 2-nitrophenylsulfonyloxy, and 4-nitrosulfonyloxy; chlorine atom-substituted phenylsulfonyloxy groups such as 4-chlorophenylsulfonyloxy, 2,4-dichlorophenylsulfonyloxy, and 3,5-dichlorophenylsulfonyloxy; and the like.

n in the general formula (1B) is preferably 1.

Specific examples of a preferable substituent in a case where group B in the general formula (1B) is a substituted phenyl group include a hydrogen atom, hydroxy, sulfo, carboxy, methyl, ethyl, methoxy, ethoxy, dimethylamino, acetylamino, benzoylamino, 4-sulfobenzoylamino, 4-carboxybenzoylamino, or the like, more preferably include a hydrogen atom, hydroxy, sulfo, carboxy, methyl, and acetylamino, and even more preferably include a hydrogen atom, sulfo, and carboxy.

Specific examples of a preferable substituent in a case where group B in the general formula (1B) is a substituted naphthyl group include a hydrogen atom, hydroxy, sulfo, methoxy, ethoxy, phenylsulfonyloxy, 4-methylphenylsulfonyloxy, 2-nitrophenyl, or the like, more preferably include a hydrogen atom, hydroxy, sulfo, methoxy, and even more preferably include a hydrogen atom, and sulfo.

Specific examples of a preferable group B in the general formula (1B) include phenyl, 2-sulfophenyl, 4-sulfophenyl, 2,4-disulfophenyl, 3,5-disulfophenyl, 4-carboxyphenyl, 3,5-carboxyphenyl, 4-methylphenyl, 3-methylphenyl, 3-hydroxy-4-carboxyphenyl, 5-sulfo-3-carboxy-2-hydroxyphenyl, 4-methoxyphenyl, 4-acetylaminophenyl, naphthyl, naphth-2-yl, 6-sulfonaphthyl, 7-sulfonaphthyl, 4,7-disulfonaphthyl, 5,7-disulfonaphth-2-yl, 6,8-disulfonaphth-2-yl, 4,8-disulfonaphth-2-yl, 4,6,8-trisulfonaphth-2-yl, or the like, more preferably include phenyl, 4-sulfophenyl, 2,4-disulfophenyl, 4-carboxyphenyl, 3,5-carboxyphenyl, 5,7-disulfonaphth-2-yl, 4,8-disulfonaphth-2-yl, and even more preferably include phenyl, 4-sulfophenyl, 4-carboxyphenyl, and 3,5-carboxyphenyl.

Regarding the substituent of general formulas (1B) to (3B) and general formulas (5B) to (7B), a compound in which disclosed preferable ones are combined is more preferable, and a compound in which more preferable ones are combined is even more preferable. Here, the same applies to cases such as where even more preferable ones are combined. Here, as above, n, $R^1$ to $R^4$, group A and group B in general formulas (5B) to (7B) represent the same meanings as those in the general formula (1B).

The dyes represented by the general formula (1B) may use a sulfo group or the like in a molecule and form a salt. When forming a salt, the sulfo group or the like in a molecule preferably forms a salt with each of a metal cation, ammonia, an organic base, or the like.

As the metal, an alkali metal or an alkaline earth metal may be exemplified. Examples of the alkali metal include lithium, sodium, potassium and the like. As the alkaline earth metal, for example, calcium, magnesium, and the like may be exemplified.

As the organic base, the quaternary ammonium ions shown in the following general formula (8B) may be exemplified; however, the organic base is not limited thereto.

The second ink according to the embodiment includes dyes represented by general formula (1B) and metal salt of second metal ions and the dyes included in the second ink are preferably substantially formed of metal salts of the second metal ions. In this manner, the solubility of the dyes is improved.

As the second metal ions included in the second ink as the counter-ions of the dye 1B, at least one of sodium ions and lithium ions is preferable. In this manner, it is possible to improve the solubility of the dye 1B in the second ink.

Further, the free acid of the dye 1B according to the embodiment, a tautomer thereof and the various types of salts thereof may be a mixture. For example, it is possible to use a combination of any of a mixture of sodium salt of the dye 1B and ammonium salt of the dye 1B, a mixture of free acid of the dye 1B and sodium salt of the dye 1B, a mixture of lithium salt of the dye 1B, sodium salt of the dye 1B, and ammonium salt

$Z^1$, $Z^2$, $Z^3$, and $Z^4$ in the above-described general formula (8B) each independently represents a group selected from the group consisting of a hydrogen atom, an alkyl group, a hydroxyalkyl group, and a hydroxyalkoxyalkyl group.

Specific examples of the alkyl groups of $Z^1$, $Z^2$, $Z^3$, and $Z^4$ in the general formula (8B) include methyl, ethyl, n-propyl, isopropyl, n-butyl, isobutyl, sec-butyl, tert-butyl and the like. Further, specific examples of the hydroxyalkyl groups include hydroxy C1-C4 alkyl groups such as hydroxymethyl, hydroxyethyl, 3-hydroxypropyl, 2-hydroxypropyl, 4-hydroxybutyl, 3-hydroxybutyl, and 2-hydroxybutyl. Further, examples of the hydroxyalkoxyalkyl groups include hydroxy C1-C4 alkoxy C1-C4 alkyl groups such as hydroxyethoxymethyl, 2-hydroxyethoxyethyl, 3-hydroxyethoxypropyl, 2-hydroxyethoxypropyl, 4-hydroxyethoxy butyl, 3-hydroxyethoxybutyl, and 2-hydroxyethoxybutyl. Among these, it is possible to preferably use a hydrogen atom, methyl, hydroxymethyl, hydroxyethyl, 3-hydroxypropyl, 2-hydroxypropyl, 4-hydroxybutyl, 3-hydroxybutyl, 2-hydroxybutyl, hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, 2-hydroxyethoxybutyl, and the like.

Regarding the quaternary ammonium ions represented in formula (8B), specific examples of preferable combinations of $Z^1$, $Z^2$, $Z^3$, and $Z^4$ are shown in Table 24.

TABLE 24

| Compound No. | $Z^1$ | $Z^2$ | $Z^3$ | $Z^4$ |
|---|---|---|---|---|
| 1-1 | H | CH₃ | CH₃ | CH₃ |
| 1-2 | CH₃ | CH₃ | CH₃ | CH₃ |
| 1-3 | H | —C₂H₄OH | —C₂H₄OH | —C₂H₄OH |
| 1-4 | CH₃ | —C₂H₄OH | —C₂H₄OH | —C₂H₄OH |
| 1-5 | H | —CH₂CH(OH)CH₃ | —CH₂CH(OH)CH₃ | —CH₂CH(OH)CH₃ |
| 1-6 | CH₃ | —CH₂CH(OH)CH₃ | —CH₂CH(OH)CH₃ | —CH₂CH(OH)CH₃ |
| 1-7 | H | —C₂H₄OH | H | —C₂H₄OH |
| 1-8 | CH₃ | —C₂H₄OH | H | —C₂H₄OH |
| 1-9 | H | —CH₂CH(OH)CH₃ | H | —CH₂CH(OH)CH₃ |
| 1-10 | CH₃ | —CH₂CH(OH)CH₃ | H | —CH₂CH(OH)CH₃ |
| 1-11 | CH₃ | —C₂H₄OH | CH₃ | —C₂H₄OH |
| 1-12 | CH₃ | —CH₂CH(OH)CH₃ | CH₃ | —CH₂CH(OH)CH₃ | of the dye 1B, or the like. Since there are cases where the physical property values such as solubility differ according to the type of salt, by selecting an appropriate type of salt as necessary and changing the ratio thereof in cases where a plurality of salts and the like are included, it is possible to obtain a mixture having suitable physical properties.

Preferable specific examples of the dye 1B are not particularly limited; however, compounds or the like represented by the structural formulas shown in Table 25 to Table 30 may be exemplified. The functional groups of the sulfo group, the carboxy group, and the like in each Table are disclosed in the form of free acids for convenience.

TABLE 25

| Compound No. | Structural Formula |
|---|---|
| 1 | (structure) |
| 2 | (structure) |
| 3 | (structure) |
| 4 | (structure) |

TABLE 25-continued

| Compound No. | Structural Formula |
| --- | --- |
| 5 | (chemical structure) |
| 6 | (chemical structure) |

TABLE 26

| Compound No. | Structural Formula |
| --- | --- |
| 7 | (chemical structure) |
| 8 | (chemical structure) |

TABLE 26-continued

| Compound No. | Structural Formula |
|---|---|
| 9 | |
| 10 | |
| 11 | |
| 12 | |

TABLE 27

| Compound No. | Structural Formula |
|---|---|
| 13 | |
| 14 | |
| 15 | |
| 16 | |

TABLE 27-continued

| Compound No. | Structural Formula |
|---|---|
| 17 | (structure) |
| 18 | (structure) |

TABLE 28

| Compound No. | Structural Formula |
|---|---|
| 19 | (structure) |
| 20 | (structure) |

TABLE 28-continued
| Compound No. | Structural Formula |
|---|---|
| 21 | 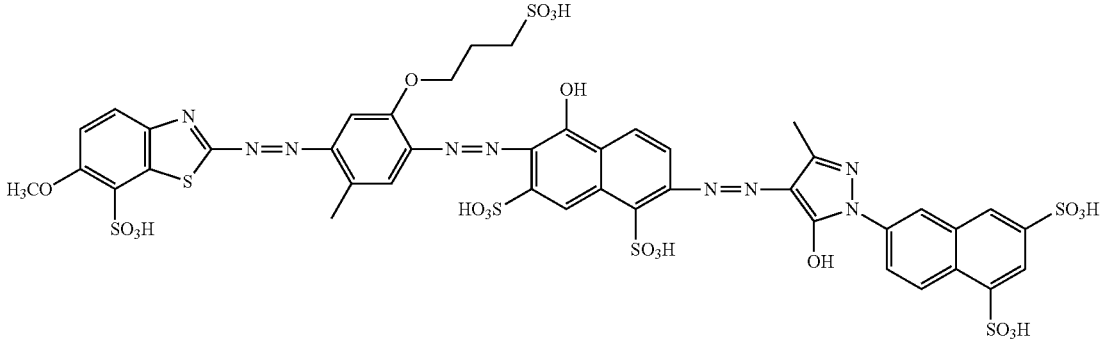 [SMILES: COc1ccc2nc(N=Nc3cc(OCCCS(=O)(=O)O)c(N=Nc4c(S(=O)(=O)O)cc5c(S(=O)(=O)O)c(N=Nc6c(C)nn(-c7ccc8c(S(=O)(=O)O)cc(S(=O)(=O)O)cc8c7)c6O)ccc5c4O)cc3C)sc2c1S(=O)(=O)O] |
| 22 | 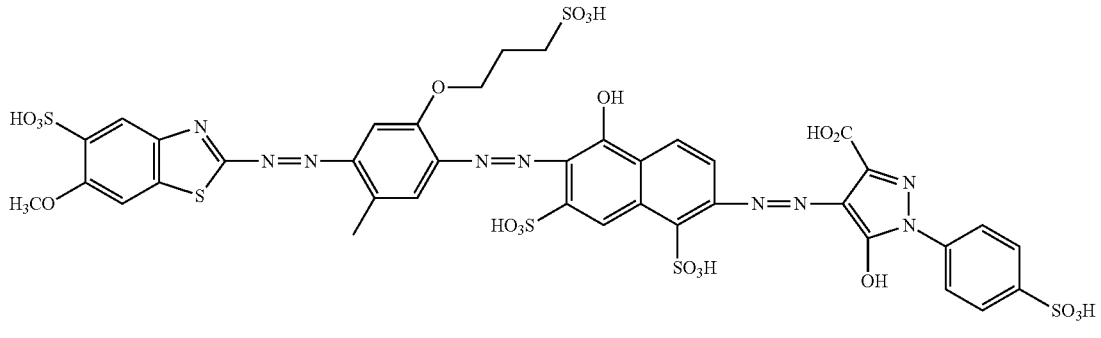 [SMILES: COc1cc2sc(N=Nc3cc(OCCCS(=O)(=O)O)c(N=Nc4c(S(=O)(=O)O)cc5c(S(=O)(=O)O)c(N=Nc6c(C(=O)O)nn(-c7ccc(S(=O)(=O)O)cc7)c6O)ccc5c4O)cc3C)nc2cc1S(=O)(=O)O] |
| 23 | 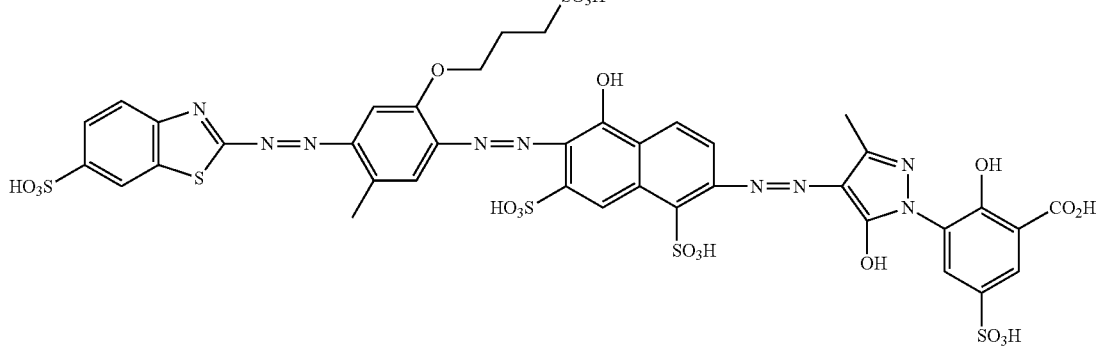 |
| 24 | 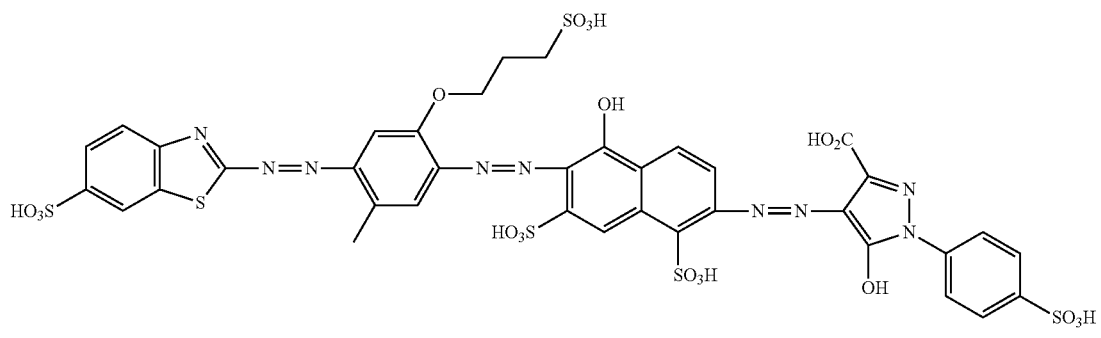 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2ccc(S(=O)(=O)O)cc2s1] |

TABLE 29

| Compound No. | Structural Formula |
|---|---|
| 25 | |
| 26 | |
| 27 | |
| 28 | |

TABLE 29-continued
| Compound No. | Structural Formula |
|---|---|
| 29 | 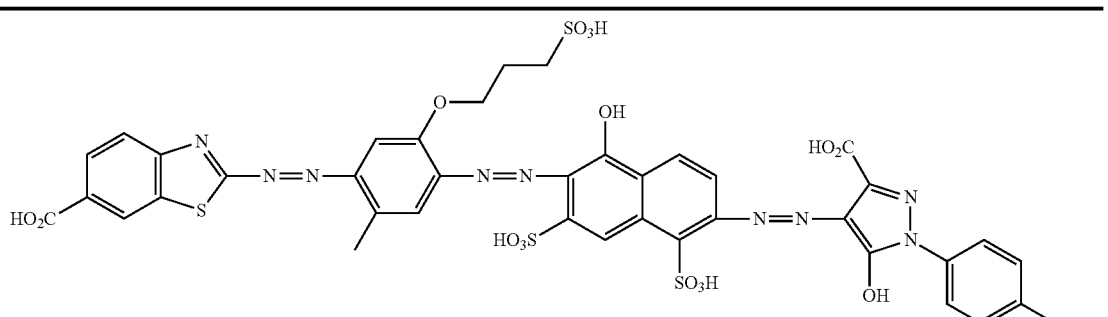 |
| 30 | 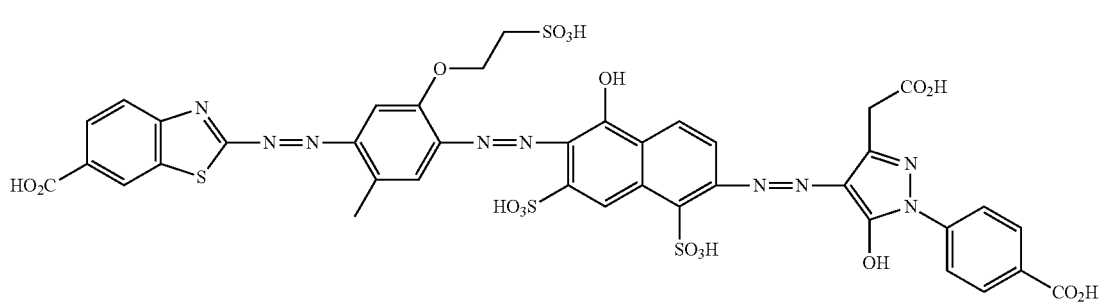 [SMILES: Cc1cc(N=Nc2c(S(=O)(=O)O)cc3c(S(=O)(=O)O)c(N=Nc4c(CC(=O)O)nn(-c5ccc(C(=O)O)cc5)c4O)ccc3c2O)c(OCCS(=O)(=O)O)cc1N=Nc1nc2ccc(C(=O)O)cc2s1] |
TABLE 30
| Compound No. | Structural Formula |
|---|---|
| 31 | 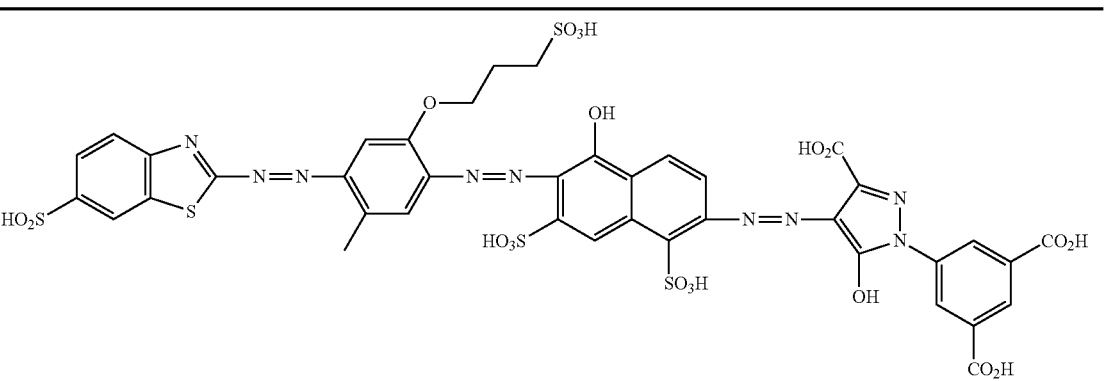 |
| 32 | 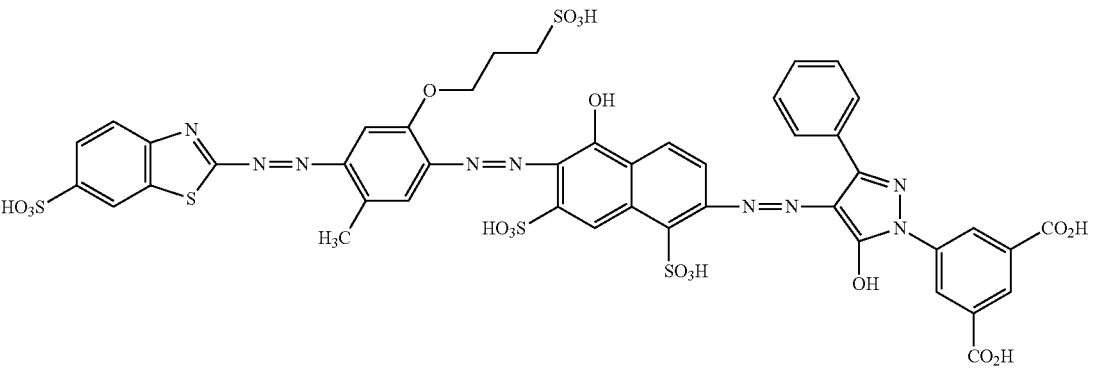 |

TABLE 30-continued

| Compound No. | Structural Formula |
|---|---|
| 33 | 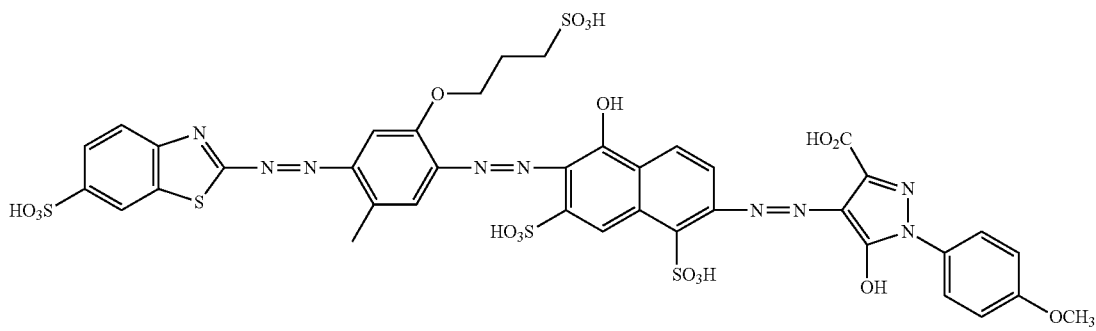 |
| 34 | 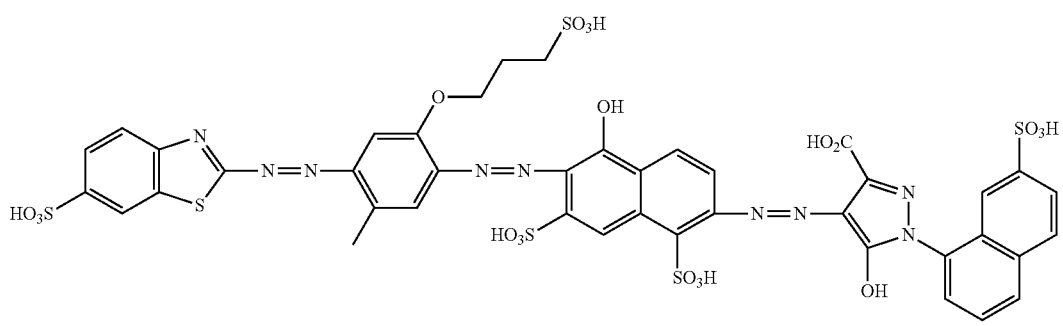 [SMILES: Cc1cc(N=Nc2c(S(=O)(=O)O)cc3c(S(=O)(=O)O)c(N=Nc4c(C(=O)O)nn(-c5cccc6ccc(S(=O)(=O)O)cc56)c4O)ccc3c2O)c(OCCCS(=O)(=O)O)cc1N=Nc1nc2ccc(S(=O)(=O)O)cc2s1] |
| 35 | 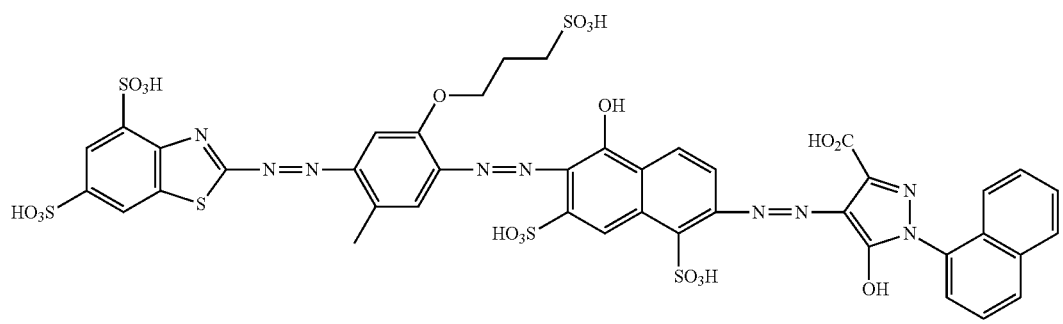 [SMILES: Cc1cc(N=Nc2c(S(=O)(=O)O)cc3c(S(=O)(=O)O)c(N=Nc4c(C(=O)O)nn(-c5cccc6ccccc56)c4O)ccc3c2O)c(OCCCS(=O)(=O)O)cc1N=Nc1nc2c(S(=O)(=O)O)cc(S(=O)(=O)O)cc2s1] |
| 36 | 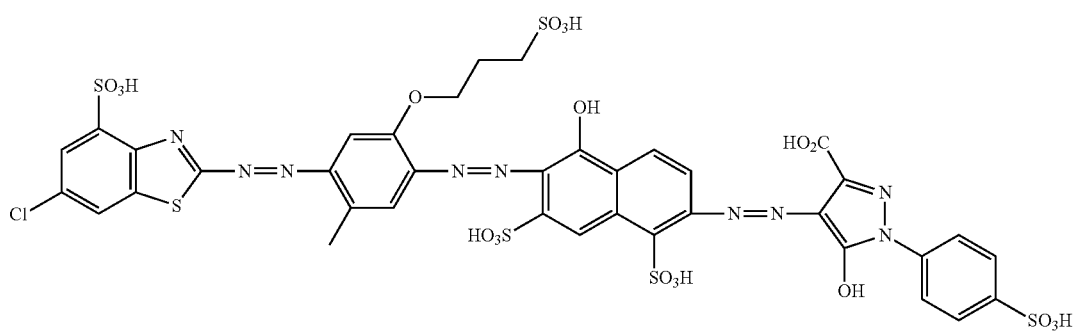 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2c(S(=O)(=O)O)cc(Cl)cc2s1] | b. Method of Synthesizing the Dyes

The dye 1B may be synthesized by the following methods, for example. Here, the structural formulas of the compounds in each process are represented in the form of free acids for convenience.

First, the compound represented by the following general formula (9B) is diazotized by a conventional method, the resultant thereof and a compound represented by the following general formula (10B) are subjected to a coupling reaction by a conventional method, and the compound represented by the following general formula (11B) is obtained. Next, after diazotizing the obtained compound represented by the general formula (11B) by a conventional method, the resultant thereof and a compound represented by the following general formula (12B) are subjected to a coupling reaction by a conventional method, and the compound represented by the following general formula (13B) is obtained. Then, after diazotizing the obtained compound represented by the general formula (13B) by a conventional method, the resultant thereof and a compound represented by the following general formula (14B) are subjected to a coupling reaction by a conventional method, whereby it is possible to obtain the dye 1B according to the present embodiment represented by the general formula (1B). Here, the compound represented by the general formula (14B) may be purchased as a commercially available product, or synthesized by a well-known method.

The diazotizing of the compound of the following general formula (9B) is performed by a well-known method. For example, the diazotizing of the compound of the following general formula (9B) is performed in sulfuric acid, acetic acid, or phosphoric acid, for example, at a temperature of −5 to 20° C., preferably 5 to 10° C., using nitrosyl sulfuric acid. Further, the coupling of the diazotized product of the compound of the general formula (9B) and the compound of the general formula (10B) is performed under well-known conditions. The coupling of the diazotized product of the compound of the general formula (9B) and the compound of the general formula (10B) is performed specifically in water or an aqueous organic medium, for example, at a temperature of −5 to 30° C., preferably 10 to 30° C. The compound of the general formula (9B) and the compound of formula (10B) may be used in almost stoichiometric amounts.

The diazotizing of the compound of the general formula (11B) is performed by a well-known method. Specifically, the diazotizing of the compound of the general formula (12B) is performed in water or an aqueous organic medium (a mixture of water and a water-soluble organic solvent or the like) in the presence of an inorganic acid such as hydrochloric acid or sulfuric acid, for example, at a temperature of −5 to 40° C., preferably 5 to 30° C., using a nitrite, for example, alkali metal salts of nitrous acid such as sodium nitrite or the like. Further, the coupling of the diazotized product of the compound of the general formula (11B) and the compound of the general formula (12B) is performed under well-known conditions. Specifically, the coupling of the diazotized product of the compound of the general formula (11B) and the compound of the general formula (12B) is preferably performed in water or an aqueous organic medium, for example, at a temperature of −5 to 50° C., preferably 10 to 30° C., with a pH value of slightly acidic to alkaline. The coupling of the diazotized product of the compound of the general formula (11B) and the compound of the general formula (12B) is more preferably performed with a pH value of slightly acidic to slightly alkaline, for example, pH 6 to pH 10. Here, since the diazotization reaction solution is acidic and the reaction system is further acidified by the progress of the coupling reaction, it is preferable to adjust the reaction solution to the above-described pH value by adding a base. As the base, for example, it is possible to use alkali metal hydroxides such as lithium hydroxide, and sodium hydroxide; alkali metal carbonates such as lithium carbonate, sodium carbonate, and potassium carbonate; acetates such as sodium acetate; ammonia or organic amines; or the like. The compound of the general formula (11B) and general formula (12B) may be used in almost stoichiometric amounts.

The diazotizing of the compound of the general formula (13B) is performed by a well-known method. Specifically, the diazotizing of the compound of the general formula (13B) is performed in water or an aqueous organic medium (a mixture of water and a water-soluble organic solvent or the like) in the presence of an inorganic acid such as hydrochloric acid or sulfuric acid, for example, at a temperature of −5 to 40° C., preferably 10 to 30° C., using a nitrite, for example, alkali metal salts of nitrous acid such as sodium nitrite or the like.

Further, the coupling of the diazotized product of the compound of the general formula (13B) and the compound of the general formula (14B) is performed under well-known conditions. Specifically, the coupling of the diazotized product of the compound of the general formula (13B) and the compound of the general formula (14B) is preferably performed in water or an aqueous organic medium, for example, at a temperature of −5 to 50° C., preferably 10 to 30° C., with a pH value of slightly acidic to alkaline. The coupling of the diazotized product of the compound of the general formula (13B) and the compound of the general formula (14B) is more preferably performed with a pH value of slightly acidic to slightly alkaline, for example, pH 6 to pH 10, and the adjustment of the pH value is preferably performed by adding a base. As the base, it is possible to use the same as that used for the coupling of the diazotized product of the compound of the general formula (11B) and the compound of the general formula (12B). The compound of the general formula (13B) and general formula (14B) may use almost stoichiometric amounts.

When forming the dye represented by the general formula (1B) into a desired salt, after the coupling reaction, salting out is performed by adding the desired inorganic salts or salts of organic cations to the reaction solution, or isolating the free acid form is performed by the addition of a mineral acid such as hydrochloric acid, and, by neutralizing the result using a desired inorganic base or an organic base in an aqueous medium after removing inorganic salts by using and washing with water, aqueous acid, an aqueous organic medium, or the like as necessary, it is possible to obtain a solution of the corresponding salts.

As an example, a method of forming the dyes represented by the general formula (1B) as a lithium salt will be described below. After the coupling of the compound of the general formula (13B) and the compound of the general formula (14B), a sodium salt of dyes represented by the general formula (1B) is obtained by adding sodium chloride, and performing salting-out as well as filtration and fractionation. Next, by adding water and hydrochloric acid to the sodium salt and performing acid removal as well as filtration and fractionation, a free acid of the dyes represented by general formula (1B) is obtained. Further, by adding water and lithium hydroxide to the free acid, it is possible to obtain a lithium salt of the dyes represented by general formula (1B). Further, as a different method of forming the lithium salt, a salt replacing reaction using a sodium salt of the dyes represented by the general formula (1B) and lithium chloride may be exemplified.

Here, for example, the aqueous acid refers to water made to be acidic by dissolving a mineral acid such as sulfuric acid or hydrochloric acid, or an organic acid such as acetic acid therein. Further, the aqueous organic medium refers to organic substances that can be mixed with water and that contain water, so-called organic solvents that can be mixed with water, and the like. Specific examples of the aqueous organic medium include a water-soluble organic solvent or the like; however, even organic substances that are not usually classified as solvents may be used as necessary as long as they may be mixed with water.

As the water-soluble organic solvent, C1-C4 alkanols such as methanol, ethanol, propanol, isopropanol, butanol, isobutanol, secondary butanol, or tertiary butanol; carboxylic acid amides such as N,N-dimethyl formamide, or N,N-dimethylacetamide; lactams such as 2-pyrrolidone, N-methyl-2-pyrrolidone, or N-methyl-pyrrolidin-2-one; cyclic ureas such as 1,3-dimethyl-imidazolidin-2-one, or 1,3-dimethylhexahydropyrimid-2-one; ketones or keto alcohols such as acetone, methyl ethyl ketone, and 2-methyl-2-hydroxy-pentan-4-one; cyclic ethers such as tetrahydrofuran, and dioxane; mono, oligo, or polyalkylene glycols having a C2-C6 alkylene unit, or thioglycols, such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol, or dithiodiglycol; polyols (triols) such as glycerine, or hexan-1,2,6-triol; C1-C4 alkyl ether of polyvalent alcohols such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, or triethylene glycol monoethyl ether; γ-butyrolactone or dimethyl sulfoxide or the like may be exemplified.

In addition, examples of organic substances that are not usually classified as solvents include ureas, sugars, or the like. As the inorganic salts, for example, alkali metal salts such as lithium chloride, sodium chloride, and potassium chloride; ammonium salts such as ammonium chloride, and ammonium bromide; and the like may be exemplified. In addition, as the salt of the organic cations, for example, halogen salts of organic amines or the like may be exemplified. As the inorganic bases, for example, alkali metal hydroxides such as lithium hydroxide, sodium hydroxide, and potassium hydroxide; ammonium hydroxide or alkali metal carbonates such as lithium carbonate, sodium carbonate, and potassium carbonate, and the like may be exemplified. In addition, as the organic bases, quaternary ammonium compounds represented by the general formula (8B) such as organic amines, for example, diethanolamine, triethanolamine, or the like may be exemplified; however, the invention is not limited thereto.

A-NH$_2$ (9B)

In the general formula (9B), group A represents the same meaning as in formula (2B) and formula (3B).

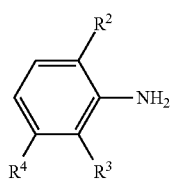
(10B)

In the general formula (10B), $R^2$, $R^3$, and $R^4$ represent the same meanings as those in formula (1B).

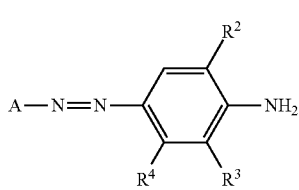
(11B)

In the general formula (11B), group A, $R^2$, $R^3$, and $R^4$ represent the same meanings as those in formula (1B) to formula (3B).

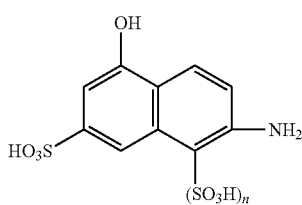
(12B)

In the general formula (12B), n represents the same meaning as that in formula (1B).

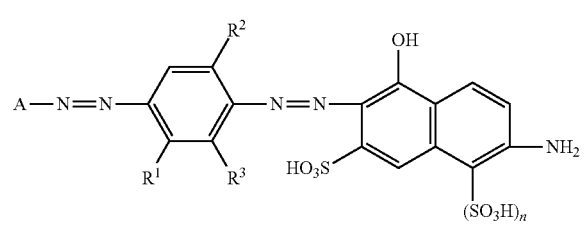
(13B)

In the general formula (13B), $R^2$, $R^3$, and $R^4$ represent the same meanings as those in formula (1B).

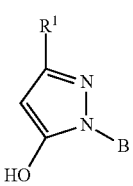
(14B)

In the general formula (14B), $R^1$, and group B represent the same meanings as those in formula (1B).

Among the compounds shown in the above-described Table 25 to Table 30, the dye 1B may preferably use a compound or a salt thereof represented by the following general formula (4B) which is a mixture of a compound or a salt thereof shown by compound No. 14 and a compound or a salt thereof shown by compound No. 22.

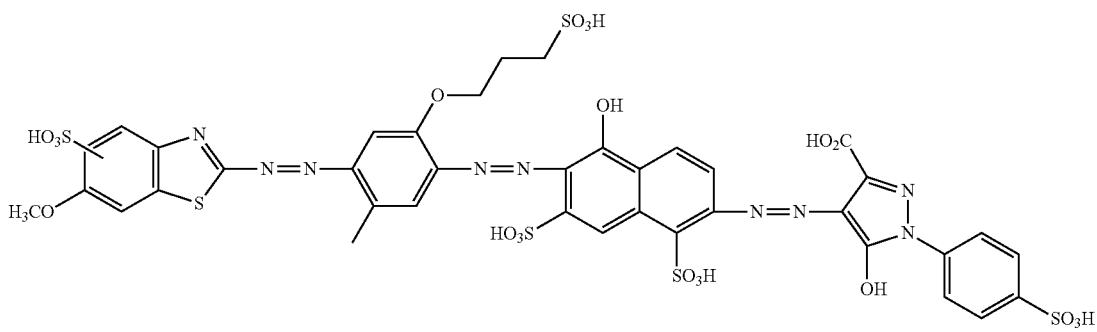

(4B)

1.2.1.3. Dye 1C a. Dyes

The second ink according to the embodiment contains dyes represented by the following general formula (1C) (below, referred to as "Dye 1C") and second metal ions as counterions of the dyes. Dye 1C is a porphyrazine-based compound. That is, one in which zero to three of the four benzo (benzene) rings of tetrabenzo porphyrazine (usually referred to as phthalocyanine) are replaced with nitrogen-containing heterocyclic aromatic rings.

The dye 1C has a property of being not easily decomposed even when light is irradiated thereto, or when exposed to gas (in particular, ozone) in the atmosphere. Therefore, an image formed using the second ink has excellent light resistance and gas resistance (in particular, ozone resistance), and color changes or fading due to the influence of light and the atmosphere are not easily caused. Further, the dye 1C has a property of being not easily decomposed in ink. Therefore, the second ink has excellent stability when stored.

Here, when the ink including metal phthalocyanine dye improving the gas resistance performance and the like is used in high-duty printing, a floating red phenomenon on the recorded image (a so-called bronzing phenomenon) has been known to occur. However, the dye 1C may be preferably used because, although it has excellent gas resistance, it is provided with excellent properties such as being less likely to generate the bronzing phenomenon in a recorded image when used in the ink.

The content of the dye 1C is preferably from 1% by mass or more to 15% by mass or less with respect to the total mass of the second ink, and more preferably 1% by mass or more to 10% by mass or less. When the content of the dye 1C is within the above-described range, it is possible to improve the color development density of the recorded image, and to improve the light resistance and the gas resistance.

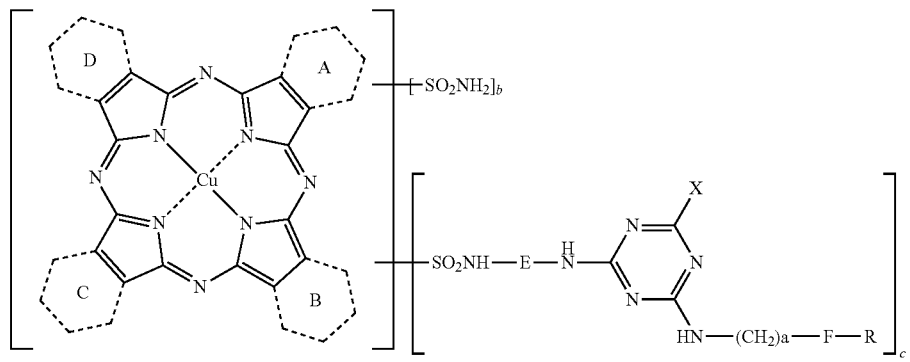

(1C)

In the formula (1C), as the nitrogen-containing heterocyclic aromatic ring in the rings A to D represented by the dashed line (the four rings of ring A, B, C, and D), for example, a nitrogen-containing heterocyclic aromatic ring including one or two nitrogen atoms, such as a pyridine ring, a pyrazine ring, a pyrimidine ring, or a pyridazine ring may be exemplified. Among these, a pyridine ring or a pyrazine ring is preferred, and a pyridine ring is more preferred. While the ozone resistance improves according to the increase in the number of nitrogen-containing heterocyclic aromatic rings, there is a tendency for bronzing to be easily generated; however, it is sufficient to appropriately adjust the number of nitrogen-containing heterocyclic aromatic rings in consideration of the ozone resistance and the bronzing and select a ratio having a good balance. Since the number of nitrogen-containing heterocyclic aromatic rings depends on the type of the heterocyclic ring, it is not possible to define this unconditionally; however, the normal average values are in a range of more than 0.00 to 3.00 or less, preferably 0.20 or more to 2.00 or less, more preferably 0.50 or more to 1.75 or less, even more preferably 0.75 or more to 1.50 or less. The remaining rings A to D are benzene rings and, in the same manner, the benzene rings in rings A to D have normal average values of 1.00 or more to less than 4.00, preferably 2.00 or more to 3.80 or less, more preferably 2.25 or more to 3.50 or less, even more preferably 2.50 or more to 3.25 or less. Here, as is clear from the fact that the number of nitrogen-containing heterocyclic aromatic rings of rings A to D is represented by average values, the porphyrazine-based compound of the invention is mixture of a plurality of compounds.

Further, in the present specification, unless otherwise noted, the number of the nitrogen-containing heterocyclic aromatic rings is given rounded off from three decimal places to two decimal places. However, for example, when the number of nitrogen-containing heterocyclic aromatic rings is 1.375 and the number of benzene rings is 2.625, when rounding off is performed, the former becomes 1.38, and the latter becomes 2.63, whereby the total of the two exceeds 4.00 which is the total of the rings A to D. In such a case, for convenience, the third digit after the decimal point for the nitrogen-containing heterocyclic aromatic ring is removed and only the benzene rings are rounded off, whereby the former is given as 1.37 and the latter is given as 2.63. Further, regarding b and c in formula (1C), as will be described below, the third digits after the decimal point will be given rounded off to the second digits in principle; however, in cases where the digits are similar, they will be given after removing the third digit after the decimal point for b and rounding off only the digit for c.

In the formula (1C), as the alkylene in E, a linear, a branched, or a cyclic alkylene may be exemplified, linear or branched are preferable, and linear is more preferable. The range of the number of carbon atoms is normally C1-C12, preferably C2-C6, more preferably C2-C4, and even more preferably C2-C3. Specific examples of E include linear ones such as ethylene, propylene, butylene, pentylene, hexylene, heptylene, octylene, nonylene, decylene, undecylene, and dodecylene; branched ones such as 2-methylethylene; cyclic ones such as cyclopropylenediyl, 1,2- or 1,3-cyclopentylenediyl, and various cyclohexylenediyls such as 1,2-, 1,3- or 1,4-; and the like. Ethylene, propylene, butylene, pentylene, or hexylene, are preferable, ethylene, propylene, or butylene are more preferable, ethylene or propylene are even more preferable, and ethylene is particularly preferable.

In the formula (1C), X represents a sulfoanilino group, a carboxyanilino group, a phosphonoanilino group, a sulfonaphthylamino group, a carboxynaphthylamino group, or a phosphononaphthylamino group. The numbers of substituents of the sulfo, carboxy and phosphono in these anilino groups and naphthylamino groups are all one. Specific examples of X include sulfoanilino groups such as 2-sulfoanilino, 3-sulfoanilino, and 4-sulfoanilino; carboxyanilino groups such as 2-carboxyanilino, 3-carboxyanilino, and 4-carboxyanilino; phosphonoanilino groups such as 2-phosphonoanilino, 3-phosphonoanilino, and 4-phosphonoanilino; sulfonaphthylamino groups such as 3-sulfo-1-naphthylamino, 6-sulfo-1-naphthylamino, 8-sulfo-1-naphthylamino, 1-sulfo-2-naphthylamino, 3-sulfo-2-naphthylamino, 4-sulfo-2-naphthylamino, 5-sulfo-2-naphthylamino, 6-sulfo-2-naphthylamino, 7-sulfo-2-naphthylamino, and 8-sulfo-2-naphthylamino; and the like. Here, "phosphono" signifies a phosphoric acid group [—P(O)(OH)$_2$]. As the X in the above, a sulfoanilino group, a carboxyanilino group, a phosphonoanilino group, or a sulfonaphthylamino group are preferable and a sulfoanilino group is particularly preferable.

In X, the sulfoanilino group, the carboxyanilino group, the phosphonoanilino group, the sulfonaphthylamino group, the carboxynaphthylamino group, or the phosphononaphthylamino group further have one type or two or more types of group selected from the group consisting of a sulfo group; a carboxy group; a phosphoric acid group; a sulfamoyl group; a carbamoyl group; a hydroxy group; a C1-C6 alkoxy group; an amino group; a mono-C1-C4 alkylamino group; a di-C1-C4 alkylamino group; a mono-arylamino group; a diarylamino group; a C1-C3 alkylcarbonylamino group; a ureido group; a C1-C6 alkyl group; a nitro group; a cyano group; a halogen atom; a C1-C6 alkylsulfonyl group; and a C1-C6 alkylthio group as a substituent. As exemplified here, the group of 20 groups from the sulfo group to the C1-C6 alkylthio group are abbreviated to "group of 20 substituents" below. The number of substituents in X of the group selected from the group of 20 substituents is normally 0 to 4, preferably 0 to 3, more preferably 0 to 2, and even more preferably 0 or 1. The substitution position of the group selected from the group of 20 substituents is not particularly limited; however, in the anilino group and the naphthylamino group, it is preferable to substitute the carbon atom, that is, on the benzene ring for the former and on the naphthalene ring for the latter.

As the C1-C6 alkoxy group in the group of 20 substituents, a linear, a branched, or a cyclic group may be exemplified, linear or branched are preferable, and linear is more preferable. The range of the number of carbon atoms may be exemplified as normally C1-C6, preferably C1-C4, and more preferably C1-C3. Specific examples include linear methoxy, ethoxy, n-propoxy, n-butoxy, n-pentoxy, n-hexyloxy or the like; branched isopropoxy, isobutoxy, sec-butoxy, t-butoxy, isopentyloxy, isohexyloxy or the like; cyclic cyclopropoxy, cyclopentoxy, cyclohexyloxy, or the like; and the like. Among these, methoxy or ethoxy is preferable, and methoxy is particularly preferable.

As the mono-C1-C4 alkylamino group in the group of 20 substituents, a linear, or a branched group may be exemplified, and the number of carbon atoms thereof is normally C1-C4 and preferably C1-C3. Specific examples include linear groups such as methylamino, ethylamino, n-propylamino, and n-butylamino; and branched groups such as isopropylamino, isobutylamino, sec-butylamino, and t-butylamino; and the like. Among these, methylamino is preferable.

As the di-C1-C4 alkylamino group in the group of 20 substituents, a dialkylamino group having two independent alkyl members exemplified by the monoalkylamino group may be exemplified. Specific examples include dimethylamino, diethylamino, methylethylamino, and the like. Among these, dimethylamino is preferable.

As the monoarylamino group in the group of 20 substituents, a mono-C6-C10 aromatic amino group, preferably a phenylamino group or a naphthylamino group, and even more preferably a phenylamino group may be exemplified.

As the diarylamino group in the group of 20 substituents, a diarylamino group having two independent aryls exemplified by the monoarylamino group may be exemplified. Preferably, one having the same aryls, more preferably two phenyls, may be exemplified and, as a specific example, diphenylamino may be exemplified.

As the C1-C3 alkylcarbonylamino group in the group of 20 substituents, a linear or branched group may be exemplified, and a linear group is preferable. Specific examples include linear ones such as methylcarbonylamino (acetylamino), ethylcarbonylamino, and n-propylcarbonylamino; and branched ones such as isopropylcarbonylamino. Among these, acetylamino is preferable.

As the C1-C6 alkyl group in the group of 20 substituents, linear, branched, or cyclic alkyl groups of C1-C6, preferably C1-C4, and more preferably C1-C3 may be exemplified. Among these, linear or branched is preferable, and linear is more preferable. Specific examples include linear methyl, ethyl, n-propyl, n-butyl, n-pentyl, n-hexyl or the like; branched isopropyl, isobutyl, sec-butyl, t-butyl, isopentyl, isohexyl or the like; cyclic cyclopropyl, cyclopentyl, cyclohexyl, or the like; and the like. Among these, methyl is preferable.

As the halogen atom in the group of 20 substituents, a fluorine atom, a chlorine atom, and a bromine atom may be exemplified, a fluorine atom and a chlorine atom are preferable, and a chlorine atom is more preferable.

As the C1-C6 alkylsulfonyl group in the group of 20 substituents, linear or branched alkylsulfonyl groups of C1-C6, preferably C1-C4, and more preferably C1-C3 may be exemplified, and linear ones are preferable. Specific examples include linear methanesulfonyl (methylsulfonyl), ethanesulfonyl (ethylsulfonyl), n-propanesulfonyl (n-propylsulfonyl), n-butylsulfonyl, n-pentylsulfonyl, n-hexylsulfonyl, and the like; branched isopropylsulfonyl, isobutylsulfonyl and the like; and the like. Among these, methylsulfonyl is preferable.

As the C1-C6 alkylthio group in the group of 20 substituents, linear or branched, alkylthio groups of C1-C6, preferably C1-C4, and more preferably C1-C3 may be exemplified, and linear ones are preferable. Specific examples include linear methylthio, ethylthio, n-propylthio, n-butylthio, n-pentylthio, n-hexylthio, and the like; branched isopropylthio, isobutylthio, t-butylthio, isopentylthio, isohexylthio, and the like; and the like. Among these, methylthio is preferable.

When X is a sulfoanilino group, in the group of 20 substituents, a sulfo group, a carboxy group, a hydroxy group, a C1-C6 alkoxy group, an amino group, a mono-C1-C4 alkylamino group, a di-C1-C4 alkylamino group, a C1-C3 alkylcarbonylamino group, a C1-C6 alkyl group, a nitro group, a halogen atom, a C1-C6 alkylsulfonyl group, and a C1-C6 alkylthio group are preferable and the sulfo group is particularly preferable.

When X is a carboxyanilino group, in the group of 20 substituents, a sulfo group, a carboxy group, a hydroxy group, and a sulfamoyl group are preferable.

When X is a phosphonoanilino group, it is preferable not to have a group selected from the group of 20 substituents.

When X is a sulfonaphthylamino group, in the group of 20 substituents, a sulfo group, and a hydroxy group are preferable.

When X is a carboxynaphthylamino group or a phosphononaphthylamino, it is preferable not to have a group selected from the group of 20 substituents.

Specific examples of X in the formula (1C) include ones in which sulfoanilino groups such as 2-sulfoanilino, 3-sulfoanilino, 4-sulfoanilino, 2,4-disulfoanilino, and 2,5-disulfoanilino further have zero or one sulfo groups; ones in which sulfoanilino groups such as 2-carboxy-4-sulfoanilino, and 2-carboxy-5-sulfoanilino, further have one carboxy group (or, one in which a carboxyanilino group further has one sulfo group); ones in which sulfoanilino groups such as 4-methoxy-2-sulfoanilino, 4-ethoxy-2-sulfoanilino, and 4-ethoxy-6-sulfoanilino, further have one C1-C6 alkoxy group; ones in which sulfoanilino groups such as 3-amino-4-sulfoanilino, further have one amino group; ones in which sulfoanilino groups such as 4-methylamino-5-sulfoanilino, further have one mono-C1-C4 alkylamino group; ones in which sulfoanilino groups such as 4-dimethylamino-5-sulfoanilino, further have one di-C1-C4 alkylamino group; ones in which sulfoanilino groups such as 2-methyl-5-sulfoanilino, and 3-methyl-6-sulfoanilino, further have one C1-C6 alkyl group; ones in which sulfoanilino groups such as 4-anilino-3-sulfoanilino, further have one aryl amino group; ones in which sulfoanilino groups such as 4-acetyl-amino-2-sulfoanilino, further have one C1-C3 alkylcarbonylamino group; ones in which sulfoanilino groups such as 2-chloro-5-sulfoanilino, and 3,5-dichloro-4-sulfoanilino, further have one or two halogen atoms; ones in which sulfoanilino groups such as 4-methylsulfonyl-2-sulfoanilino, 4-methylsulfonyl-5-sulfoanilino, and 4-hexylsulfonyl-2-sulfoanilino, further have one C1-C6 alkylsulfonyl group; ones in which sulfoanilino groups such as 4-methylthio-2-sulfoanilino, and 4-hexylthio-2-sulfoanilino, further have one C1-C6 alkylthio group; ones in which sulfoanilino groups such as 3-carboxy-4-hydroxy-5-sulfoanilino, 2-hydroxy-5-nitro-3-sulfoanilino, 2-methoxy-4-nitro-5-sulfoanilino, 3-methyl-6-methoxy-4-sulfoanilino, and 2-hydroxy-3-acetylamino-5-sulfoanilino, further have two of two types of group selected from the group of 20 substituents; ones in which carboxyanilino groups such as 2-carboxyanilino, 3-carboxyanilino, 4-carboxyanilino, and 3,5-dicarboxyanilino, further have zero or one carboxy group; ones in which carboxyanilino groups such as 4-sulfamoyl-2-carboxyanilino, further have one sulfamoyl group; ones in which carboxyanilino groups such as 3-carboxy-4-hydroxyanilino, further have one hydroxy group; ones in which carboxyanilino groups such as 4-hydroxy-3-sulfo-5-carboxyanilino, further have two of two types of group selected from the group of 20 substituents; phosphonoanilino groups such as 2-phosphonoanilino, 3-phosphonoanilino, and 4-phosphonoanilino; ones in which sulfonaphthylamino groups such as 4,8-disulfo-2-naphthylamino, 1,5-disulfo-2-naphthylamino, 3,6-disulfo-1-naphthylamino, 5,7-disulfo-2-naphthylamino, 6,8-disulfo-2-naphthylamino, 3,6,8-trisulfo-1-naphthylamino, and 3,6,8-trisulfo-2-naphthylamino, further have one or two sulfo groups; ones in which sulfonaphthylamino groups such as 5-hydroxy-7-sulfo-2-naphthylamino, further have one hydroxy group; ones in which sulfonaphthylamino groups such as 3,6-disulfo-8-hydroxy-1-naphthylamino, 8-chloro-3,6-disulfo-naphthalen-1-ylamino, and 6-nitro-4,8-disulfo-2-naphthylamino, further have two of two types of group selected from the group of 20 substituents; and the like. Among these, 2-sulfoanilino, 3-sulfoanilino, 4-sulfoanilino, 2,4-disulfoanilino, 2,5-disulfoanilino, 3,6-disulfo-1-naphthylamino, 5,7-disulfo-2-naphthylamino, 6,8-disulfo-2-naphthylamino, and 3,6,8-tri-sulfo-1-naphthylamino are preferable, 4-sulfoanilino, 2,5-disulfoanilino, or 3,6,8-trisulfo-1-naphthylamino are more preferable, and 2,5-disulfoanilino is even more preferable.

In the formula (1C), R represents a hydrogen atom; a sulfo group; a carboxy group; a phosphoric acid group; a sulfamoyl group; a carbamoyl group; a hydroxy group; a C1-C6 alkoxy group; an amino group; a mono-C1-C6 alkylamino group; a di-C1-C6 alkylamino group; a mono-C6-10 arylamino group; a di-C6-10 arylamino group; a C1-C3 alkylcarbonylamino group; a ureido group; a C1-C6 alkyl group; a nitro group; a cyano group; a halogen atom; a C1-C6 alkylsulfonyl group; or an alkylthio group.

As the C1-C6 alkoxy group in the R, C1-C6 linear, branched, or cyclic alkyl groups, preferably C1-C4, and more preferably C1-C3 may be exemplified. Among these, linear or branched is preferable, and linear is more preferable. Specific examples include linear methoxy, ethoxy, n-propoxy, n-butoxy, n-pentoxy, n-hexyloxy or the like; branched isopropoxy, isobutoxy, sec-butoxy, t-butoxy, isopentyloxy, isohexyloxy or the like; cyclic cyclopropoxy, cyclopentoxy, cyclohexyloxy, or the like; and the like. Among these, methoxy or ethoxy is preferable, and methoxy is particularly preferable.

As the mono-C1-C4 alkylamino group in the R, a linear, or a branched group may be exemplified, and the number of carbon atoms thereof is normally C1-C4 and preferably C1-C3. Specific examples include linear groups such as methylamino, ethylamino, n-propylamino, and n-butylamino; and branched groups such as isopropylamino, isobutylamino, sec-butylamino, and t-butylamino; and the like.

As the di-C1-C4 alkylamino group in the R, a dialkylamino group having two independent alkyl members exemplified by the monoalkylamino group may be exemplified. Specific examples include dimethylamino, diethylamino, methylethylamino, and the like.

As the mono-C6-C10 arylamino group in the R, a mono-C6-C10 aromatic amino group, preferably a phenylamino group or a naphthylamino group, and even more preferably a phenylamino group may be exemplified.

As the di-C6-C10 arylamino group in the R, a diarylamino group having two independent aryls exemplified by the monoarylamino group may be exemplified. Preferably, one having the same aryls, more preferably two phenyls, may be exemplified and, as a specific example, diphenylamino may be exemplified.

As the C1-C3 alkylcarbonylamino group in the R, a linear or branched group may be exemplified, and a linear group is preferable. Specific examples include linear ones such as methylcarbonylamino (acetylamino), ethylcarbonylamino, and n-propylcarbonylamino; and branched ones such as isopropylcarbonylamino.

As the C1-C6 alkyl group in the R, C1-C6 linear, branched, or cyclic alkyl groups, preferably C1-C4, and more preferably C1-C3 may be exemplified. Among these, linear or branched is preferable, and linear is more preferable. Specific examples include linear methyl, ethyl, n-propyl, n-butyl, n-pentyl, n-hexyl or the like; branched isopropyl, isobutyl, sec-butyl, t-butyl, isopentyl, isohexyl or the like; cyclic cyclopropyl, cyclopentyl, cyclohexyl, or the like; and the like. Among these, methyl is preferable.

As the halogen atom in the R, a fluorine atom, a chlorine atom, and a bromine atom may be exemplified, the fluorine atom and the chlorine atom are preferable, and the chlorine atom is more preferable.

As the C1-C6 alkylsulfonyl group in the R, linear or branched alkylsulfonyl groups of C1-C6, preferably C1-C4, and more preferably C1-C3 may be exemplified, and linear ones are preferable. Specific examples include linear methanesulfonyl (methylsulfonyl), ethanesulfonyl (ethylsulfonyl), n-propanesulfonyl (n-propylsulfonyl), n-butylsulfonyl, n-pentylsulfonyl, n-hexylsulfonyl, and the like; branched isopropylsulfonyl, isobutylsulfonyl and the like; and the like.

As the C1-C6 alkylthio group in the R, linear or branched alkylthio groups of C1-C6, preferably C1-C4, and more preferably C1-C3 may be exemplified, and linear ones are preferable. Specific examples include linear methylthio, ethylthio, n-propylthio, n-butylthio, n-pentylthio, n-hexylthio, and the like; branched isopropylthio, isobutylthio, t-butylthio, isopentylthio, isohexylthio, and the like; and the like.

In the formula (1C), group F represents a phenyl group, or a 6-membered nitrogen-containing heterocyclic aromatic ring. As the 6-membered nitrogen-containing heterocyclic aromatic ring, a nitrogen-containing heterocyclic aromatic ring including one nitrogen atom may be exemplified. Specific examples include pyridyl. In the 6-membered nitrogen-containing heterocyclic aromatic ring, the bonding position with the alkylene in which the number thereof is represented by "a" is not particularly limited; however, bonding at a carbon atom adjacent to the nitrogen atom is preferable. That is, when group F is pyridyl, the substitution position of the nitrogen atom is set as the 1-position, and 2-pyridyl, 3-pyridyl, and 4-pyridyl may be exemplified, and one in which bonding is performed at the carbon atom adjacent to the nitrogen atom, that is, 2-pyridyl, is preferable.

In the formula (1C), when group F is a phenyl group, in the R, a hydrogen atom, a sulfo group, a carboxy group, a C1-C6 alkoxy group, a C1-C6 alkyl group, and a halogen atom are preferable, a hydrogen atom, a sulfo group, a carboxy group, a methoxy group, a methyl group, a fluorine atom, and a chlorine atom are more preferable, and a hydrogen atom, a sulfo group, and a carboxy group are even more preferable.

In the formula (1C), when group F is a 6-membered nitrogen-containing heterocyclic aromatic ring, in the R, a hydrogen atom or a halogen atom is preferable, and a hydrogen atom is particularly preferable.

In the formula (1C), the substitution position of R in group F is not particularly limited. When group F is a phenyl group, the bonding position with "(CH$_2$)a" is set as the 1-position, and the substitution position of R may be exemplified as the 2-position, the 3-position, or the 4-position, and the 4-position is preferable. Further, when group F is a 6-membered nitrogen-containing heterocyclic aromatic ring, preferably pyridyl, regarding the bonding position of "(CH$_2$)a" and R, a combination in which the nitrogen atom of the pyridine ring is set as the 1-position, the former is the 2-position, and the latter is the 3-position, 4-position, 5-position, or 6-position may be exemplified, and a combination in which the former is the 2-position, and the latter is the 4-position is preferable.

In the formula (1C), a represents the number of repetitions of "(CH$_2$)", that is, the length of the alkylene, and is normally an integer of from 1 to 6, preferably from 1 to 4, more preferably from 1 to 3, still more preferably from 1 to 2, and particularly preferably 1.

In the formula (1C), b and c, as well as the sum of b and c, are all average values. b is 0.00 or more to less than 3.90, c is 0.10 or more to less than 4.00, and the sum of b and c is 1.00 or more to less than 4.00 as an average value. At this time, the number of nitrogen-containing heterocyclic aromatic rings in rings A to D is from greater than 0.00 to 3.00 or less as an average value, and, in the same manner, the number of benzene rings is 1.00 or more to less than 4.00. Preferably, when the number of nitrogen-containing heterocyclic aromatic rings in A to D is 0.20 or more to 2.00 or less and the number of benzene rings is 2.00 or more to 3.80 or less, b is 0.00 or more to 3.40 or less, c is 0.40 or more to 2.00 or less, and the sum of b and c is 2.00 or more to 3.80 or less. More preferably, when the number of nitrogen-containing heterocyclic aromatic rings in rings A to D is 0.50 or more to 1.75 or less and the number of benzene rings is 2.25 or more to 3.50 or less, b is 0.35 or more to 3.05 or less, c is 0.45 or more to 1.90 or less, and the sum of b and c is 2.25 or more to 3.50 or less. Even more preferably, when the number of nitrogen-containing heterocyclic aromatic rings in rings A to D is 0.75 or more to 1.50 or less and the number of benzene rings is 2.50 or more to 3.25 or less, b is 0.70 or more to 2.75 or less, c is 0.50 or more to 1.80 or less, and the sum of b and c is 2.50 or more to 3.25 or less. While there is a tendency for the ozone resistance to improve according to the increase of b, there is a tendency for bronzing to be easily generated; however, it is sufficient to appropriately adjust the number of b and c in consideration of the ozone resistance and the bronzing and select a ratio having a good balance.

Here, the unsubstituted sulfamoyl group and substituted sulfamoyl group in which the respective numbers of substitutions are represented by b and c are both groups substituted on a benzene ring when rings A to D are benzene rings, and are unsubstituted when the rings A to D are 6-membered nitrogen-containing heterocyclic aromatic rings. Further, in the present specification, b, c, and the sum of b and c are all given rounded off from three decimal places to two decimal places.

In the above-described rings A to D, E, X, R, group F, a, b, and c, a compound combining preferable ones is more preferable, and a compound combining more preferable ones is even more preferable. Further, the same applies to combinations of preferable ones, combinations of preferable ones and more preferable ones, and the like.

The dyes represented by the general formula (1C) may use sulfo, carboxy, phosphono, or the like in a molecule and form a salt. When forming a salt, the sulfo group, carboxy group and phosphono group or the like in a molecule preferably forms a salt with each of metal cation, ammonia, an organic base, or the like.

As the metal, an alkali metal or an alkaline earth metal may be exemplified. Examples of the alkali metal include lithium, sodium, potassium and the like. As the alkaline earth metal, for example, calcium, magnesium, and the like may be exemplified.

As the organic base, in particular, organic amines may be exemplified, for example, C1-C3 alkylamines such as methylamine, and ethylamine; and mono-, di-, or tri-C1-C4 alkanolamines such as monoethanolamine, diethanolamine, and triethanolamine may be exemplified.

The second ink according to the embodiment includes dyes represented by general formula (1C) and metal salts of second metal ions and the dyes included in the second ink are preferably substantially formed of metal salts of the second metal ions. In this manner, the solubility of the dyes is improved.

As the second metal ions included in the second ink as the counter-ions of the dye 1C, at least one of sodium ions and lithium ions is preferable. In this manner, it is possible to improve the solubility of the dye 1C in the second ink.

As the dye 1C, particularly preferable compounds are those having combinations of the following (a) to (f). (a) As the nitrogen-containing heterocyclic aromatic rings in rings A to D, pyridine rings each independently condensed at the 2-position and the 3-position or the 3-position and the 4-position; or pyrazine rings condensed at the 2-position and the 3-position are preferable. (b) As E, a linear C2-C4 alkylene is preferable. (c) As X, a sulfoanilino group which may have, as a substituent, zero to two substituents of one kind or two kinds of substituent selected from a group of a sulfo group, a carboxy group, a hydroxy group, a C1-C6 alkoxy group, an amino group, a mono-C1-C4 alkylamino group, a di-C1-C4 alkylamino group, a C1-C3 alkylcarbonylamino group, a nitro group, a halogen atom, a C1-C6 alkylsulfonyl group, and an alkylthio group; a carboxyanilino group which may have, as a substituent, zero to two substituents of one kind or two kinds of substituent selected from a group of a sulfo group, a carboxy group, a hydroxy group, and a sulfamoyl group; a phosphonoanilino group; or a sulfonaphthylamino group which may have, as a substituent, zero to two substituents of one kind or two kinds selected from a sulfo group and a hydroxy group, is preferable. (d) As R, a hydrogen atom; a sulfo group; a carboxy group; a C1-C6 alkoxy group; a C1-C6 alkyl group; or a halogen atom, is preferable. (e) As group F, a phenyl group; or a pyridyl group in which R has a hydrogen atom is preferable. (f) As a, 1 or 2 is preferable.

In the dye 1C, specific examples of the rings A to D, E, X, R, and group F, and the numbers of a, b, and c are shown in the following Table 31 to Table 34. The following examples show representative examples for specifically describing the dye 1C, but the dye 1C is not limited thereto. Further, when the nitrogen-containing heterocyclic aromatic ring of rings A to D is a pyridine ring, as described below, regioisomers or the like due to the nitrogen atom exist, and, during the synthesis of the dye 1C, are obtained as an isomer mixture. It is difficult to isolate these isomers, and it is also difficult to determine the isomers using analysis. For this reason, the normal mixture is used as is. The dye 1C of the invention also includes this kind of mixture. In the specification, when displaying these isomers or the like in a structural formula without distinguishing them, one representative structural formula is described for convenience. Here, the numbers of b and c in the Tables have been given rounded off from two decimal places to one decimal place to avoid complication. Here, in Table 31 to Table 34, "2,3-pyrid" signifies a pyridine ring condensed to a porphyrazine ring at the 2-position and 3-position, "benzo" signifies a benzene ring condensed to the porphyrazine ring, "2-pyridyl" signifies that the nitrogen atom of the pyridine ring is set as the 1-position and the bonding position of "(CH$_2$)a" is the 2-position, respectively. Further, regarding "4-chloro" or the like in R, the substitution position of R is respectively represented in a case where, when group F is a phenyl group, the bonding position with "(CH$_2$)a" is set as the 1-position, and a case where, when group F is a pyridyl, the nitrogen atom of the pyridine ring is set as the 1-position.

TABLE 31

| No. | A | B | C | D | E | F | X | R | a | b | c |
|---|---|---|---|---|---|---|---|---|---|---|---|
| 1 | 2,3-pyrid | benzo | benzo | benzo | ethylene | phenyl | 2,5-disulfoanilino | H | 1 | 1 | 2 |
| 2 | 2,3-pyrid | benzo | benzo | benzo | ethylene | phenyl | 2,4-disulfoanilino | H | 1 | 1 | 2 |
| 3 | 2,3-pyrid | benzo | benzo | benzo | ethylene | phenyl | 2-sulfoanilino | H | 1 | 1 | 2 |
| 4 | 2,3-pyrid | benzo | benzo | benzo | ethylene | phenyl | 3-sulfoanilino | H | 1 | 1 | 2 |
| 5 | 2,3-pyrid | benzo | benzo | benzo | ethylene | phenyl | 4-sulfoanilino | H | 1 | 1 | 2 |
| 6 | 2,3-pyrid | benzo | benzo | benzo | ethylene | phenyl | 2,5-disulfoanilino | H | 2 | 1 | 2 |
| 7 | 2,3-pyrid | benzo | benzo | benzo | ethylene | phenyl | 2,5-disulfoanilino | H | 3 | 1 | 2 |
| 8 | 2,3-pyrid | benzo | benzo | benzo | ethylene | phenyl | 2,5-disulfoanilino | H | 4 | 1 | 2 |
| 9 | benzo | 2,3-pyrid | 2,3-pyrid | 2,3-pyrid | ethylene | phenyl | 2,5-disulfoanilino | H | 1 | 0 | 1 |
| 10 | benzo | 2,3-pyrid | 2,3-pyrid | benzo | ethylene | phenyl | 2,5-disulfoanilino | H | 1 | 1 | 1 |
| 11 | 2,3-pyrid | benzo | benzo | benzo | propylene | phenyl | 2,5-disulfoanilino | H | 1 | 2 | 1 |
| 12 | 2,3-pyrid | benzo | 2,3-pyrid | benzo | propylene | phenyl | 2,5-disulfoanilino | H | 1 | 1 | 1 |
| 13 | 2,3-pyrid | benzo | 2,3-pyrid | 2,3-pyrid | propylene | phenyl | 2,5-disulfoanilino | H | 1 | 0 | 1 |
| 14 | 2,3-pyrid | benzo | benzo | benzo | ethylene | phenyl | 2-sulfoanilino | 4-sulfo | 1 | 1 | 2 |
| 15 | 2,3-pyrid | benzo | benzo | benzo | ethylene | phenyl | 3-sulfoanilino | 4-sulfo | 1 | 1 | 2 |
| 16 | 2,3-pyrid | benzo | benzo | benzo | ethylene | phenyl | 4-sulfoanilino | 4-sulfo | 1 | 1 | 2 |
| 17 | benzo | 2,3-pyrid | 2,3-pyrid | 2,3-pyrid | ethylene | phenyl | 4-sulfoanilino | 4-sulfo | 1 | 0 | 1 |

TABLE 32

| No. | A | B | C | D | E | F | X | R | a | b | c |
|---|---|---|---|---|---|---|---|---|---|---|---|
| 18 | benzo | 2,3-pyrid | 2,3-pyrid | benzo | ethylene | phenyl | 4-sulfoanilino | 4-sulfo | 1 | 1 | 1 |
| 19 | 2,3-pyrid | benzo | benzo | benzo | ethylene | phenyl | 2,5-disulfoanilino | 4-sulfo | 1 | 1 | 2 |
| 20 | benzo | 2,3-pyrid | 2,3-pyrid | 2,3-pyrid | ethylene | phenyl | 2,5-disulfoanilino | 4-sulfo | 1 | 0 | 1 |
| 21 | benzo | 2,3-pyrid | 2,3-pyrid | benzo | ethylene | phenyl | 2,5-disulfoanilino | 4-sulfo | 1 | 1 | 1 |
| 22 | 2,3-pyrid | benzo | benzo | benzo | ethylene | phenyl | 2-sulfoanilino | 4-carboxy | 1 | 1 | 2 |
| 23 | 2,3-pyrid | benzo | benzo | benzo | ethylene | phenyl | 3-sulfoanilino | 4-carboxy | 1 | 1 | 2 |
| 24 | 2,3-pyrid | benzo | benzo | benzo | ethylene | phenyl | 4-sulfoanilino | 4-carboxy | 1 | 1 | 2 |
| 25 | 2,3-pyrid | benzo | benzo | benzo | ethylene | phenyl | 2,5-disulfoanilino | 4-carboxy | 1 | 1 | 2 |
| 26 | benzo | 2,3-pyrid | 2,3-pyrid | 2,3-pyrid | ethylene | phenyl | 2,5-disulfoanilino | 4-carboxy | 1 | 0 | 1 |
| 27 | benzo | 2,3-pyrid | 2,3-pyrid | benzo | ethylene | phenyl | 2,5-disulfoanilino | 4-carboxy | 1 | 1 | 1 |
| 28 | benzo | 2,3-pyrid | 2,3-pyrid | 2,3-pyrid | ethylene | phenyl | 4-sulfoanilino | H | 1 | 0 | 1 |
| 29 | benzo | 2,3-pyrid | 2,3-pyrid | benzo | ethylene | phenyl | 4-sulfoanilino | H | 1 | 1 | 1 |
| 30 | 2,3-pyrid | benzo | benzo | benzo | propylene | phenyl | 4-sulfoanilino | H | 1 | 2 | 1 |
| 31 | 2,3-pyrid | benzo | 2,3-pyrid | benzo | propylene | phenyl | 4-sulfoanilino | H | 1 | 1 | 1 |
| 32 | 2,3-pyrid | benzo | 2,3-pyrid | 2,3-pyrid | propylene | phenyl | 4-sulfoanilino | H | 1 | 0 | 1 |
| 33 | 2,3-pyrid | benzo | benzo | benzo | ethylene | phenyl | 2,5-disulfoanilino | 4-chloro | 1 | 1 | 2 |
| 34 | 2,3-pyrid | benzo | benzo | benzo | ethylene | phenyl | 2,5-disulfoanilino | 4-methyl | 1 | 1 | 2 |

TABLE 33

| No. | A | B | C | D | E | F | X | R | a | b | c |
|---|---|---|---|---|---|---|---|---|---|---|---|
| 35 | 2,3-pyrid | benzo | benzo | benzo | ethylene | phenyl | 2,5-disulfoanilino | 4-methoxy | 1 | 1 | 2 |
| 36 | 2,3-pyrid | benzo | benzo | benzo | ethylene | phenyl | 2,5-disulfoanilino | 4-fluoro | 1 | 1 | 2 |
| 37 | 2,3-pyrid | benzo | benzo | benzo | ethylene | phenyl | 2,5-disulfoanilino | 2-chloro | 1 | 1 | 2 |
| 38 | 2,3-pyrid | benzo | benzo | benzo | ethylene | phenyl | 2,5-disulfoanilino | 2-methyl | 2 | 1 | 2 |
| 39 | 2,3-pyrid | benzo | benzo | benzo | ethylene | phenyl | 2,5-disulfoanilino | 2-methoxy | 2 | 1 | 2 |
| 40 | 2,3-pyrid | benzo | benzo | benzo | ethylene | phenyl | 2,5-disulfoanilino | 2-methoxy | 2 | 1 | 2 |
| 41 | 2,3-pyrid | benzo | benzo | benzo | ethylene | 2-pyridyl | 2,5-disulfoanilino | H | 1 | 1 | 2 |
| 42 | benzo | 2,3-pyrid | 2,3-pyrid | 2,3-pyrid | ethylene | 2-pyridyl | 2,5-disulfoanilino | H | 1 | 0 | 1 |
| 43 | benzo | 2,3-pyrid | 2,3-pyrid | benzo | ethylene | 2-pyridyl | 2,5-disulfoanilino | H | 1 | 1 | 1 |
| 44 | 2,3-pyrid | benzo | benzo | benzo | ethylene | phenyl | 3,6,8-trisulfo-1-naphthylamino | H | 1 | 1 | 2 |
| 45 | benzo | 2,3-pyrid | 2,3-pyrid | 2,3-pyrid | ethylene | phenyl | 3,6,8-trisulfo-1-naphthylamino | H | 1 | 0 | 1 |
| 46 | benzo | 2,3-pyrid | 2,3-pyrid | benzo | ethylene | phenyl | 3,6,8-trisulfo-1-naphthylamino | H | 1 | 1 | 1 |
| 47 | 2,3-pyrid | benzo | benzo | benzo | ethylene | phenyl | 4,8-disulfo-2-naphthylamino | H | 1 | 1 | 2 |
| 48 | 2,3-pyrid | benzo | benzo | benzo | ethylene | 2-pyridyl | 3,6-disulfo-1-naphthylamino | 4-chloro | 1 | 1 | 1 |
| 49 | 2,3-pyrid | benzo | benzo | benzo | ethylene | phenyl | 3,6-disulfo-8-hydroxy-1-naphthylamino | H | 1 | 2 | 1 |
| 50 | 2,3-pyrid | benzo | benzo | benzo | ethylene | phenyl | 4-methoxy-2-sulfoanilino | H | 1 | 2 | 1 |
| 51 | 2,3-pyrid | benzo | benzo | benzo | ethylene | phenyl | 4-nitro-2-sulfoanilino | H | 1 | 2 | 1 |

TABLE 34

| No. | A | B | C | D | E | F | X | R | a | b | c |
|---|---|---|---|---|---|---|---|---|---|---|---|
| 52 | 2,3-pyrid | benzo | benzo | benzo | ethylene | phenyl | 2-chloro-5-sulfoanilino | H | 1 | 2 | 1 |
| 53 | 2,3-pyrid | benzo | benzo | benzo | ethylene | phenyl | 3-methyl-6-sulfoanilino | H | 1 | 2 | 1 |
| 54 | 2,3-pyrid | benzo | benzo | benzo | ethylene | phenyl | 2-carboxy-5-sulfoanilino | H | 1 | 2 | 1 |
| 55 | 2,3-pyrid | benzo | benzo | benzo | ethylene | phenyl | 2,5-dicarboxyanilino | H | 1 | 2 | 1 |
| 56 | 2,3-pyrid | benzo | benzo | benzo | ethylene | phenyl | 3-phospho anilino | H | 1 | 2 | 1 |
| 57 | 2,3-pyrid | benzo | benzo | benzo | ethylene | phenyl | 2-hydroxy-3-acetylamino-5-sulfoanilino | H | 1 | 2 | 1 |
| 58 | 2,3-pyrid | benzo | benzo | benzo | ethylene | 2-pyridyl | 5,7-disulfo-2-naphthylamino | H | 1 | 2 | 1 |
| 59 | 2,3-pyrid | benzo | benzo | benzo | ethylene | phenyl | 6,8-disulfo-2-naphthylamino | H | 1 | 2 | 1 |
| 60 | 2,3-pyrid | benzo | benzo | benzo | ethylene | phenyl | 3-carboxy-4-hydroxy-5-sulfoanilino | 4-methoxy | 1 | 2 | 1 |
| 61 | 2,3-pyrid | benzo | benzo | benzo | ethylene | 2-pyridyl | 3-methyl-6-methoxy-4-sulfoanilino | 4-sulfo | 1 | 2 | 1 |
| 62 | 2,3-pyrid | benzo | benzo | benzo | ethylene | phenyl | 4-methylsulfonyl-2-sulfoanilino | H | 1 | 2 | 1 |
| 63 | 2,3-pyrid | benzo | benzo | benzo | ethylene | phenyl | 4-methylthio-2-sulfoanilino | 2-methoxy | 1 | 2 | 1 |
| 64 | 2,3-pyrid | benzo | benzo | benzo | ethylene | phenyl | 3-amino-4-sulfoanilino | 2-chloro | 1 | 2 | 1 |
| 65 | 2,3-pyrid | benzo | benzo | benzo | ethylene | 2-pyridyl | 4-methylamino-5-sulfoanilino | H | 1 | 2 | 1 |
| 66 | 2,3-pyrid | benzo | benzo | benzo | ethylene | phenyl | 4-dimethylamino-5-sulfoanilino | H | 1 | 2 | 1 |
| 67 | 2,3-pyrid | benzo | benzo | benzo | ethylene | phenyl | 4-sulfamoyl-2-carboxyanilino | H | 1 | 2 | 1 |

Normally, it is possible to use the dye 1C in the second ink without being blended with another colorant; however, depending on the case, the dye may be used after blending with a well-known cyan-based colorant, within a range that does not harm the effect of the invention. When the well-known cyan-based colorant is blended and used, as the colorant to be blended, triphenylmethane-based colorants, phthalocyanine based colorants, or the like having a C. I. number may be used; however, phthalocyanine based coloring materials are preferable.

(b) Method of Synthesizing the Dyes

Below, description will be given of the method of manufacturing the dye 1C. It is possible to obtain the dye 1C by reacting a porphyrazine compound represented by the following formula (2C) and an organic amine represented by the following formula (3C) in the presence of ammonia. The porphyrazine compound represented by the following formula (2C) can be obtained by performing sulfonylchlorination on the resultant of the synthesis of the compound represented by the following formula (4C), based on any well-known method.

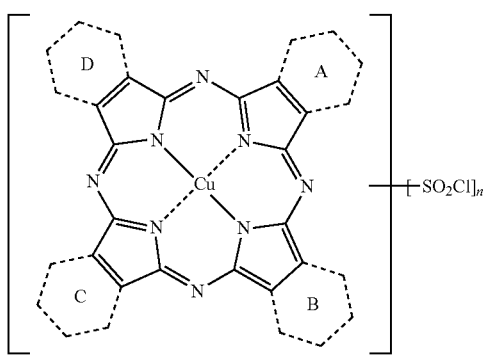
(2C)

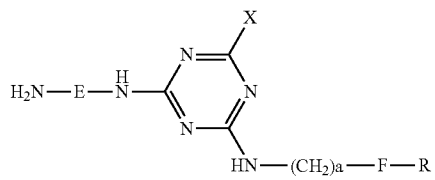
(3C)

That is, the compound represented by the following formula (4C), for example, may be synthesized according to the well-known methods disclosed in Pamphlet of International Publication No. WO 2007/091631 and Pamphlet of International Publication No. WO 2007/116933. These well-known documents do not disclose a manufacturing method relating to a compound in which the number of nitrogen-containing heterocyclic aromatic ring in rings A to D is less than one. However, when performing the synthesis with a known nitrile method or Wyler method, by changing the blending ratio of the nitrogen-containing heterocyclic aromatic ring dicarboxylic acid derivative used as a raw material for reaction and the phthalic acid derivative, it is also possible to synthesize the compound represented by formula (4C) in which the number of nitrogen-containing heterocyclic aromatic rings in ring A to D is less than one. In addition, for the obtained compound represented by the formula (4C), the substitution position of the nitrogen-containing heterocyclic aromatic ring in rings A to D, and the point about becoming a regioisomer mixture relating to the substitution position of the nitrogen atom in the nitrogen-containing heterocyclic aromatic ring are the same as disclosed in the well-known documents.

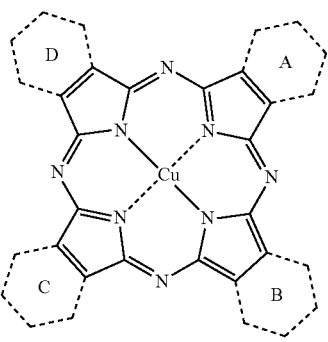
(4C)

In the formula (4C), rings A to D represent the same meanings as those in the formula (1C).

The porphyrazine compound represented by the formula (2C) can be obtained by performing sulfonylchlorination on the compound represented by the formula (4C), according to the well-known method disclosed in the Pamphlet of International Publication in the same manner as the synthesis of the compound represented by the formula (4C). The chlorosulfonyl group in formula (2C) is introduced onto the benzene ring in rings A to D and, in a case where the rings A to D correspond to nitrogen-containing heterocyclic aromatic ring groups, no introduction is made. Since one chlorosulfonyl group is normally introduced onto the benzene ring, the number of n in formula (2C) is the number of benzene rings in the rings A to D or less. Accordingly, the number of chlorosulfonyl groups "n" in the formula (2C) is 1.00 or more to less than 4.00 with respect to the number of benzene rings of the porphyrazine compound represented by the formula (2C). As another synthesis method of the porphyrazine compound represented by the formula (2C), there is a method of synthesizing the porphyrazine compound having a sulfo group by condensing and cyclizing sulfophthalic acid having a sulfo group and a nitrogen-containing heterocyclic aromatic ring dicarboxylic acid derivative such as quinolinic acid in advance and then converting the sulfo group to a chlorosulfonyl group with a suitable chlorinating agent such as thionyl chloride. In this case, by selecting the substitution position of the sulfo group of the sulfophthalic acid which is the synthetic raw material as the 3-position and the 4-position, it is possible to control the substitution position of the sulfo group to be introduced onto the porphyrazine compound represented by the formula (2C). That is, it is possible to selectively introduce sulfo groups respectively at the "α" position in the following formula (5C) when using 3-sulfophthalic acid and at the "β" position in the same manner when using 4-sulfophthalic acid. Here, in the present specification, unless otherwise noted, the terms "α-position of a porphyrazine ring" and "β position of a porphyrazine ring" signify the positions corresponding to those in the following formula (5C).

(5C)

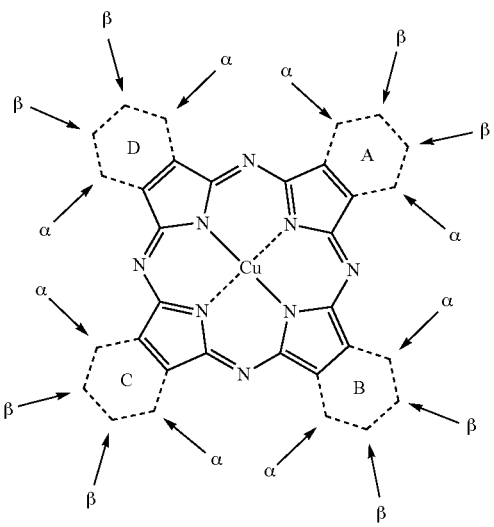

Meanwhile, the organic amine represented by the formula (3C) may also be prepared by a well-known method. For example, a reaction solution of 0.9 to 1.2 mol of a substituted aniline corresponding to X or a substituted naphthylamine and 1 mol 2,4,6-trichloro-5-triazine (cyanuric chloride) is adjusted to a pH of approximately 1 to 5 using a hydroxide of an alkali metal such as sodium hydroxide and reaction is performed under conditions of 0 to 40° C. for 2 to 12 hours, whereby a primary condensate is obtained. Next, 0.9 to 1.5 mol of an amine which is "$H_2N$—$(CH_2)a$-F—R" is added, the reaction solution is adjusted to a pH of approximately 5 to 10 using a hydroxide of an alkali metal such as sodium hydroxide and reaction is performed under conditions of 5 to 80° C. for 0.5 to 12 hours, whereby a secondary condensate is obtained. By reacting 1 mol of the obtained secondary condensate and 1 to 50 mol of alkylenediamines (amines which are "$H_2N$-E-$NH_2$") corresponding to E at approximately pH 9 to 12, and 5 to 90° C. for 0.5 to 8 hours, the organic amine represented by the formula (4C) is obtained. In the pH adjustment of each condensation reaction, normally, alkali metal hydroxides such as sodium hydroxide or potassium hydroxide; alkali metal carbonates such as sodium carbonate or potassium carbonate; or the like may be used. In addition, the order of the condensation may be appropriately decided according to the reactivity of each type of compound to be condensed with the cyanuric chloride and is not limited to this order.

The reaction of the porphyrazine compound represented by the formula (2C) and the organic amine represented by the formula (3C) is performed by reacting in the presence of ammonia in an aqueous solvent at approximately pH 8 to 10 at a temperature of 5 to 70° C. for 1 to 20 hours, whereby the dye 1C represented by the formula (1C), which is the object, is obtained. The "ammonia" used in the reaction refers to normal aqueous ammonia. However, as long as the chemical substance generates ammonia by neutralizing and decomposing, it may be used. As the chemical substance generating ammonia, for example, ones generating ammonia by neutralization such as ammonium salts such as ammonium chloride and ammonium sulfate; ones generating ammonia by thermal decomposition such as urea; ammonia gas, and the like may be exemplified; however, the substance is not limited thereto. As the "ammonia", aqueous ammonia is preferable, and concentrated aqueous ammonia, which may be purchased as a commercial product (normally sold as approximately 28% aqueous ammonia), or concentrated aqueous ammonia diluted with water as necessary may be used.

The use amount of the organic amine represented by formula (3C) is normally 1 mol or more of a theoretical value "mol number of the organic amine represented by formula (3C) of the calculation necessary for obtaining the value of c in the dye 1C which is the object" with respect to 1 mol of the porphyrazine compound represented by the formula (2C); however, there may be differences according to the reactivity of the organic amine to be used or the reaction conditions and the use amount is not limited thereto. Normally, the amount is the theoretical value of 1 to 3 mol and preferably around 1 to 2 mol.

Further, the dye 1C is synthesized from compounds represented by the formula (2C) and the formula (3C) under reaction conditions which do not particularly require anhydrous conditions. For this reason, the chlorosulfonyl group in the formula (2C) partially undergoes hydrolysis due to water mixed into the reaction system and a compound converted into a sulfonic acid is produced as a byproduct, and, as a result, it is theoretically considered that the byproduct is mixed into the dye 1C. However, in mass spectrometry, identifying the unsubstituted sulfamoyl group and the sulfo group is difficult, and the chlorosulfonyl group in the formula (2C) other than the one reacted with the organic amine represented by formula (3C) in the invention is disclosed as one converted to an entirely unsubstituted sulfamoyl group.

Furthermore, in a part of the dye 1C, through a divalent linking group (L), impurities in which a copper porphyrazine ring (Pz) forms a dimer (for example, Pz-L-Pz) or a trimer are produced as a byproduct and may sometimes be mixed into the reaction product. As the divalent linking group represented by the L, there are —$SO_2$—, —$SO_2$—NH—$SO_2$—, and the like, and, in the case of a trimer, byproducts which are combinations of these two L's will sometimes be formed.

From the reaction solution of the final process in the synthesis reaction, it is possible to isolate the dye 1C obtained as described above as a solid by filtration and separation or the like of a solid precipitated by acid removal, salting out or the like. For example, the salting out is preferably performed in an acidic to alkaline range, preferably pH 1 to 11. The temperature during the salting out is not particularly limited; however, salting out is preferably performed by adding sodium chloride or the like after heating at 40 to 80° C. normally and preferably at 50 to 70° C.

The dye 1C synthesized by this method is obtained as a free acid or a salt thereof. As the method of isolating the dye 1C as a free acid, for example, acid removal may be exemplified. Further, as the method of isolation as a salt, it is possible to exemplify salting out, or, when it is not possible to obtain the desired salt by salting out, for example, a salt forming method of adding a desired organic or inorganic base after converting the obtained salt to a free acid, a well-known salt replacement method, or the like.

As an example, a method of setting the dyes represented by the general formula (1C) as a lithium salt will be described below. After reaction of the porphyrazine compound represented by the formula (2C), and the organic amine represented by the formula (3C), a sodium salt of dyes represented by the general formula (1C) is obtained by adding sodium chloride, and performing salting-out as well as filtration and fractionation. Next, by adding water and hydrochloric acid to the sodium salt and performing acid removal as well as filtration and fractionation, a free acid of the dyes represented by general formula (1C) is obtained. Further, by adding water and lithium hydroxide to the free acid, it is possible to obtain a lithium salt of the dyes represented by general formula (1C). Further, as a different method of setting the lithium salt, a salt replacing reaction using a sodium salt of the dyes represented by the general formula (1C) and lithium chloride may be exemplified.

1.2.1.4. Dye 1D a. Dyes

The second ink according to the embodiment contains dyes represented by the following general formula (1D) (below, referred to as "Dye 1D") and second metal ions as counter-ions of the dyes. The dye 1D functions as a coloring material giving a yellow color in the second ink.

The dye 1D has a property of being not easily decomposed even when light is irradiated thereto, or when exposed to gas (in particular, ozone) in the atmosphere. Therefore, an image formed using the second ink has excellent light resistance and gas resistance (in particular, ozone resistance), and color changes or fading due to the influence of light and the atmosphere are not easily caused. Further, the dye 1D has a property of being not easily decomposed in ink. Therefore, the second ink has excellent stability when stored.

Further, the dye 1D has excellent solubility in water. For this reason, the second ink using the dye 1D can provide favorable ejection stability of the ink jet recording apparatus when using the ink jet recording apparatus or the like. Further, the dye 1D has excellent color development. For this reason, the second ink using the dye 1D can record an image with high color development density.

The content of the dye 1D is preferably from 1% by mass or more to 15% by mass or less with respect to the total mass of the second ink, and more preferably 1% by mass or more to 10% by mass or less. When the content of the dye 1D is within the above-described range, the solubility in water is favorable and it is possible to improve the color development density of the recorded image, and to improve the light resistance and the gas resistance.

For the Q, A, x, and y, a compound in which preferable ones are combined is more preferable, and a compound in which more preferable ones are combined is particularly preferable.

As the metal, an alkali metal or an alkaline earth metal may be exemplified. Examples of the alkali metal include lithium, sodium, potassium and the like. As the alkaline earth metal, for example, calcium, magnesium, and the like may be exemplified.

As the organic base, the quaternary ammonium ions shown in the following general formula (3D) may be exemplified; however, the organic base is not limited thereto.

The second ink according to the embodiment includes dyes represented by general formula (1D) and metal salts of second metal ions and the dyes included in the second ink are preferably substantially formed of metal salts of the second metal ions. In this manner, the solubility of the dyes is improved.

As the second metal ions included in the second ink as the counter-ions of the dye 1D, at least one of sodium ions and lithium ions is preferable. In this manner, it is possible to improve the solubility of the dye 1D in the second ink.

Further, the free acid of the dye 1D according to the embodiment and the various types of salts thereof may be a mixture. For example, it is possible to use a combination of any of a mixture of sodium salt of the dye 1D and ammonium salt of the dye 1D, a mixture of free acid of the dye 1D and sodium salt of the dye 1D, a mixture of lithium salt of the dye 1D, sodium salt of the dye 1D, and ammonium salt of the dye 1D, or the like. There are cases where the physical properties such as solubility differ according to the type of salt, and, by selecting an appropriate type of salt as necessary and changing the ratio thereof in cases where a plurality of salts and the like are included, it is possible to obtain a mixture having suitable physical properties.

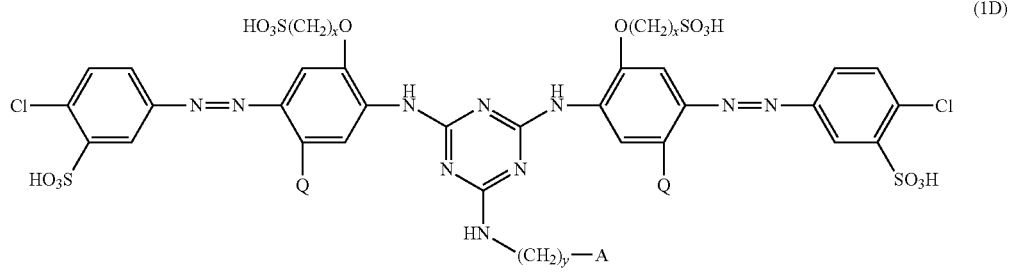

(1D)

In formula (1D), Q represents a halogen atom. Specific examples of the halogen atoms include, a fluorine atom, a chlorine atom, a bromine atom and an iodine atom. Among these, a fluorine atom, or a chlorine atom is preferred, and a chlorine atom is more preferred.

In formula (1D), A represents a sulfo group, a carboxy group or a hydroxy group, and among these, a sulfo group is preferable.

In formula (1D), x represents an integer of 2 to 4, preferably 3.

In formula (1D), y represents an integer of 1 to 3, preferably 2.

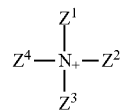

(3D)

$Z^1$, $Z^2$, $Z^3$, and $Z^4$ in the above-described general formula (3D) each independently represents a group selected from the group consisting of a hydrogen atom, an alkyl group, a hydroxyalkyl group, and a hydroxyalkoxyalkyl group.

Specific examples of the alkyl groups of $Z^1$, $Z^2$, $Z^3$, and $Z^4$ in the general formula (3D) include methyl, ethyl, n-propyl, isopropyl, n-butyl, isobutyl, sec-butyl, tert-butyl and the like. Further, specific examples of the hydroxyalkyl groups include hydroxy C1-C4 alkyl groups such as hydroxymethyl, hydroxyethyl, 3-hydroxypropyl, 2-hydroxypropyl, 4-hydroxybutyl, 3-hydroxybutyl, and 2-hydroxybutyl. Further, examples of the hydroxyalkoxyalkyl groups include hydroxy C1-C4 alkoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl. Among these, it is possible to preferably use a hydrogen atom, methyl, hydroxymethyl, hydroxyethyl, 3-hydroxypropyl, 2-hydroxypropyl, 4-hydroxybutyl, 3-hydroxybutyl, 2-hydroxybutyl, hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, 2-hydroxyethoxybutyl, and the like.

Regarding the quaternary ammonium ions represented in formula (3D), specific examples of preferable combinations of $Z^1$, $Z^2$, $Z^3$, and $Z^4$ are shown in Table 35.

TABLE 35

| Compound No. | $Z^1$ | $Z^2$ | $Z^3$ | $Z^4$ |
|---|---|---|---|---|
| 1-1 | H | $CH_3$ | $CH_3$ | $CH_3$ |
| 1-2 | $CH_3$ | $CH_3$ | $CH_3$ | $CH_3$ |
| 1-3 | H | $-C_2H_4OH$ | $-C_2H_4OH$ | $-C_2H_4OH$ |
| 1-4 | $CH_3$ | $-C_2H_4OH$ | $-C_2H_4OH$ | $-C_2H_4OH$ |
| 1-5 | H | $-CH_2CH(OH)CH_3$ | $-CH_2CH(OH)CH_3$ | $-CH_2CH(OH)CH_3$ |
| 1-6 | $CH_3$ | $-CH_2CH(OH)CH_3$ | $-CH_2CH(OH)CH_3$ | $-CH_2CH(OH)CH_3$ |
| 1-7 | H | $-C_2H_4OH$ | H | $-C_2H_4OH$ |
| 1-8 | $CH_3$ | $-C_2H_4OH$ | H | $-C_2H_4OH$ |
| 1-9 | H | $-CH_2CH(OH)CH_3$ | H | $-CH_2CH(OH)CH_3$ |
| 1-10 | $CH_3$ | $-CH_2CH(OH)CH_3$ | H | $-CH_2CH(OH)CH_3$ |
| 1-11 | $CH_3$ | $-C_2H_4OH$ | $CH_3$ | $-C_2H_4OH$ |
| 1-12 | $CH_3$ | $-CH_2CH(OH)CH_3$ | $CH_3$ | $-CH_2CH(OH)CH_3$ |

Specific examples of dye 1D are shown in the following Table 36 and Table 37; however, the invention is not limited to these specific examples. In addition, in Table 2 and Table 3, Q, A, x and y correspond to Q, A, x and y in the general formula (1D).

TABLE 36

| Compound No. | Q | x | y | Structural Formula |
|---|---|---|---|---|
| 1 | Cl | 2 | 2 | (bis-azo triazine dye with $HO_3S(CH_2)_2O$– and –$O(CH_2)_2SO_3H$ substituents; terminal chlorophenyl-azo groups bearing $HO_3S$ and $SO_3H$; central triazine with –HN–$(CH_2)_2$–A) |
| 2 | Cl | 3 | 2 | (bis-azo triazine dye with $HO_3S(CH_2)_3O$– and –$O(CH_2)_3SO_3H$ substituents; terminal chlorophenyl-azo groups bearing $HO_3S$ and $SO_3H$; central triazine with –HN–$(CH_2)_2$–A) |

TABLE 36-continued

| Compound No. | Q | x | y | Structural Formula |
|---|---|---|---|---|
| 3 | Cl | 4 | 2 | *(structure)* |
| 4 | Br | 3 | 2 | *(structure)* |

TABLE 37

| Compound No. | Q | x | y | Structural Formula |
|---|---|---|---|---|
| 5 | F | 3 | 2 | *(structure)* |
| 6 | I | 3 | 2 | *(structure)* |
| 7 | Cl | 3 | 1 | *(structure)* |

TABLE 37-continued

| Compound No. | Q | x | y | Structural Formula |
|---|---|---|---|---|
| 8 | Cl | 3 | 3 | 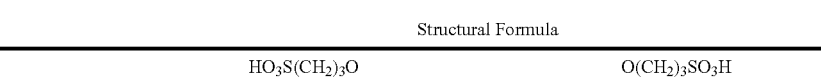 |

Among these compounds, the dye 1D is particularly preferably a compound represented by the following formula (2D) or a salt thereof.

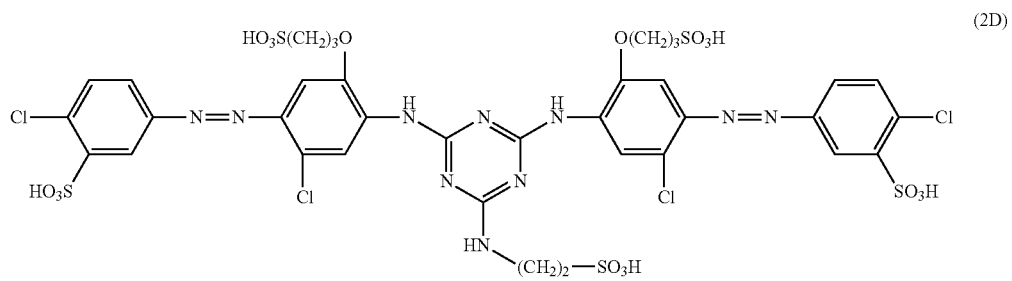

(2D)

b. Method of Synthesizing the Dyes

Below, description will be given of the method of preparing the dye 1D.

The dyes of the invention represented by the formula (1D) may be prepared in the following manner, for example. In addition, in the following formula (4D) to the following formula (9D), Q, A, x and y respectively represent the same meanings as Q, A, x and y in the formula (1D).

First, based on the method disclosed in JPA-2004-75719, the compound of the following formula (4D) obtained with a commercially available 2-amino-4-halogenophenol as a raw material is converted to a methyl-ω-sulfo acid derivative represented by the following formula (5D) using sodium bisulfite and formalin. Next, the 5-amino-2-chlorobenzoic acid represented by the following formula (6D) is diazotized by a conventional method, the resultant thereof and a methyl-ω-sulfonic acid derivative of formula (5D) obtained previously are subjected to a coupling reaction at a reaction temperature of 0 to 15° C. at a pH of 2 to 4, after which hydrolysis is continuously performed at a reaction temperature of 80 to 95° C. at a pH of 10.5 to 11.5, whereby the compound of the following formula (7D) is obtained.

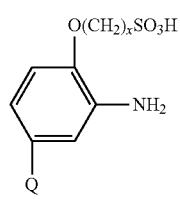

(4D)

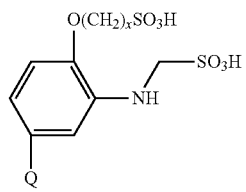

(5D)

-continued (6D)

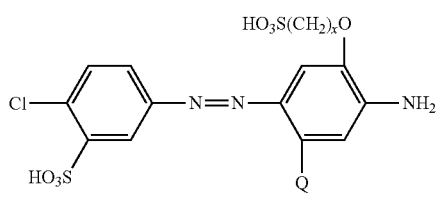

(7D)

Next, by condensing two equivalents of the compound of formula (7D) and one equivalent of a cyanuric halide (for example, cyanuric chloride), at a reaction temperature of 15 to 45° C. and a pH of 5 to 8, the compound of the following formula (8D) is obtained.

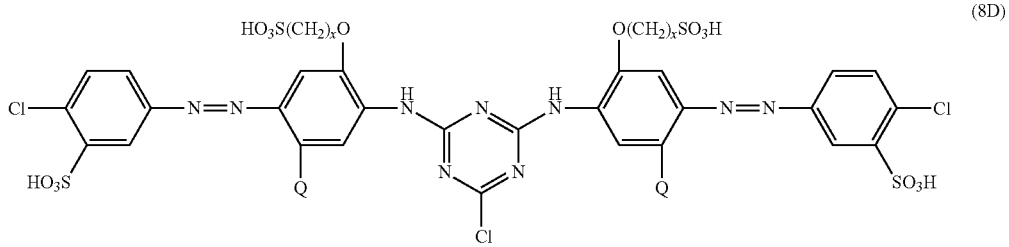

Further, by substituting the chlorine atom on the triazine ring in the obtained compound of formula (8D) with an amine represented by the following formula (9D) under conditions of a reaction temperature of 75 to 90° C. and a pH of 7 to 9, it is possible to obtain a dye represented by the formula (1D).

As the amine represented by formula (9D), for example, aminomethanesulfonic acid, taurine, homotaurine, and the like may be exemplified.

Further, the salts or free acids of the dyes represented by the formula (1D) may be obtained by the following method, for example. For example, by a method of, for instance, adding a water-soluble organic solvent such as acetone, alcohol with 1 to 4 carbon atoms, or the like to the reaction solution after the completion of the final process of the synthesis reaction of the dye represented by the formula (1D), or an aqueous solution containing a salt of a dye represented by the formula (1D), or the like; a method of adding sodium chloride and performing salting out; or the like, the precipitated solid is separated by filtration, and the sodium salt of the dye represented by the formula (1D) can be obtained as a wet cake.

In addition, after dissolving the obtained sodium salt wet cake in water, the pH thereof is appropriately adjusted by the addition of acid such as hydrochloric acid, and the precipitated solid is separated by filtration, whereby it is possible to obtain a free acid of the dyes represented by the formula (1D) or a mixture of free acid and sodium salt in which a part of the dyes represented by formula (1D) is sodium salt.

In addition, after dissolving the obtained sodium salt wet cake or a dry solid thereof in water, the pH thereof is adjusted by the addition of an ammonium salt such as ammonium chloride, and the addition of an acid such as hydrochloric acid, (for example, pH 1 to 3), and the precipitated solid is separated by filtration, whereby it is possible to obtain ammonium salts of the dyes represented by the formula (1D). In addition, by appropriately adjusting one or both of the amount of ammonium chloride to be added and the pH, it is possible to obtain a mixture of ammonium salt of dyes represented by formula (1D) and sodium salt of dyes represented by formula (1D); a mixture of free acid and ammonium salts of dyes represented by formula (1D); or the like.

Further, it is also possible to directly obtain a solid of the free acid by adding mineral acids (for example, hydrochloric acid, sulfuric acid, or the like) to the reaction solution after completion of the synthesis reaction of the dyes represented by the formula (1D). In this case, by adding the wet cake of the free acid of the dyes represented by formula (1D) to water and performing stirring thereof, for example, with the addition of potassium hydroxide; lithium hydroxide; aqueous ammonia; organic quaternary ammonium hydroxides of the above-described formula (3D); or the like and forming a salt, it is possible to obtain potassium salt; lithium salt; ammonium salt; or quaternary ammonium salt; or the like corresponding to the respectively added compound. By limiting the number of moles of hydroxides or the like added with respect to the number of moles of free acid, for example, it is possible to also prepare a mixed salt of lithium salt and sodium salt; as well as a mixed salt of lithium salt, sodium salt and ammonium salt; or the like.

The dyes represented by the formula (1D) may be isolated as free acids of a solid by adding a mineral acid such as hydrochloric acid after completion of the final process in the synthesis reaction thereof, and, by washing the obtained solid of a free acid with water or aqueous acid (for example, aqueous hydrochloric acid, or the like), it is possible to remove the inorganic salts contained as impurities (inorganic impurities such as sodium chloride, sodium sulfate, or the like). As described above, by processing the obtained wet cake or dry solid thereof in water with a desired inorganic or organic base, a solution of the salt of the corresponding compound may be obtained from the free acid of the dyes represented by the formula (1D). As the inorganic base, for example, alkali metal hydroxides such as lithium hydroxide, sodium hydroxide, and potassium hydroxide; alkali metal carbonates such as lithium carbonate, sodium carbonate, and potassium carbonate; ammonium hydroxide (aqueous ammonia); or the like may be exemplified. Examples of the organic base include, for example, organic amines corresponding to the quaternary ammonium represented by the above-described formula (3D); for instance, alkanolamines such as diethanolamine, and triethanolamine, and the like; however, the organic base is not limited thereto.

1.3. Properties of Each Ink

In a case of using the ink set according to the embodiment in the ink jet recording apparatus, the respective viscosities of each ink (first ink and second ink) at 20° C. are preferably 2 mPa·s or more to 10 mPa·s or less, and more preferably 3 mPa·s or more to 6 mPa·s or less. When each ink has a viscosity within the above-described range at 20° C., since it is possible to eject an appropriate amount from the nozzles and further reduce the occurrence of flight bending or scattering, the inks may be favorably used in the ink jet recording apparatus. The viscosity of each ink may be measured by using a vibration type viscometer VM-100AL (manufactured by Yamaichi Electronics Co., Ltd.) and maintaining the temperature of the ink at 20° C.

2. Droplet Ejection Apparatus

The droplet ejection apparatus of an embodiment of the invention includes: an ink set provided with the above-described first ink and second ink, a nozzle surface provided with nozzle holes for ejecting the first ink and second ink, and a wiping member for wiping the nozzle surface.

Below, description will be given of the droplet ejection apparatus according to the embodiment of the invention with reference to FIGS. 1 to 3. Here, in each figure used in the following description, the scale of each member is appropriately changed to make each member visually recognizable size. In the embodiment, an ink jet printer (below, simply referred to as "printer") is exemplified as the droplet ejection apparatus according to the invention.

FIG. 1 is a perspective view showing a configuration of a printer 1 in the embodiment. Here, the printer 1 represents a serial printer.

As shown in FIG. 1, the printer 1 includes: a carriage 4 on which an ink jet head 2 is mounted and an ink cartridge 3 is detachably mounted, a platen 5 on which the recording medium 6 arranged below the ink jet head 2 is transported, a carriage movement mechanism 7 which moves the carriage 4 in the medium width direction of the recording medium 6, and a medium conveying mechanism 8 transporting the recording medium 6 in the medium conveying direction. Additionally, the printer 1 includes a control apparatus CONT controlling the overall operation of the printer 1. Here, the above-described medium width direction is the main scanning direction (head scanning direction). The above-described medium conveying direction is the sub scanning direction (direction perpendicular to the main scanning direction).

The ink cartridge 3 is not limited to being mounted on the carriage 4 of the embodiment and instead, for example, may be a type performing supply to the ink jet head 2 via an ink supply tube mounted on the housing side of the printer 1. In the ink cartridge 3, a first ink, a second ink, a third and a fourth ink are respectively stored. The ink set of the printer 1 is formed of the first ink, the second ink, the third and the fourth ink. The third ink and the fourth ink may be inks with the same composition as at least one of the first ink and the second ink or may be inks with different compositions to the first ink and the second ink.

The carriage 4 is attached in a state of being supported on a guide rod 9 which is a supporting member installed in the main scanning direction. Further, the carriage 4 is moved in the main scanning direction along the guide rod 9 by the carriage movement mechanism 7.

The linear encoder 10 detects the position of the carriage 4 in the main scanning direction using a signal. The detected signal is transmitted to the control apparatus CONT as position information. The control apparatus CONT perceives the scanning position of the ink jet head 2 based on the position information from the linear encoder 10 and performs control of the recording operation (ejection operation) and the like using the ink jet head 2. Further, the control apparatus CONT is configured to be able to variably control the movement speed of the carriage 4.

Figure 2:
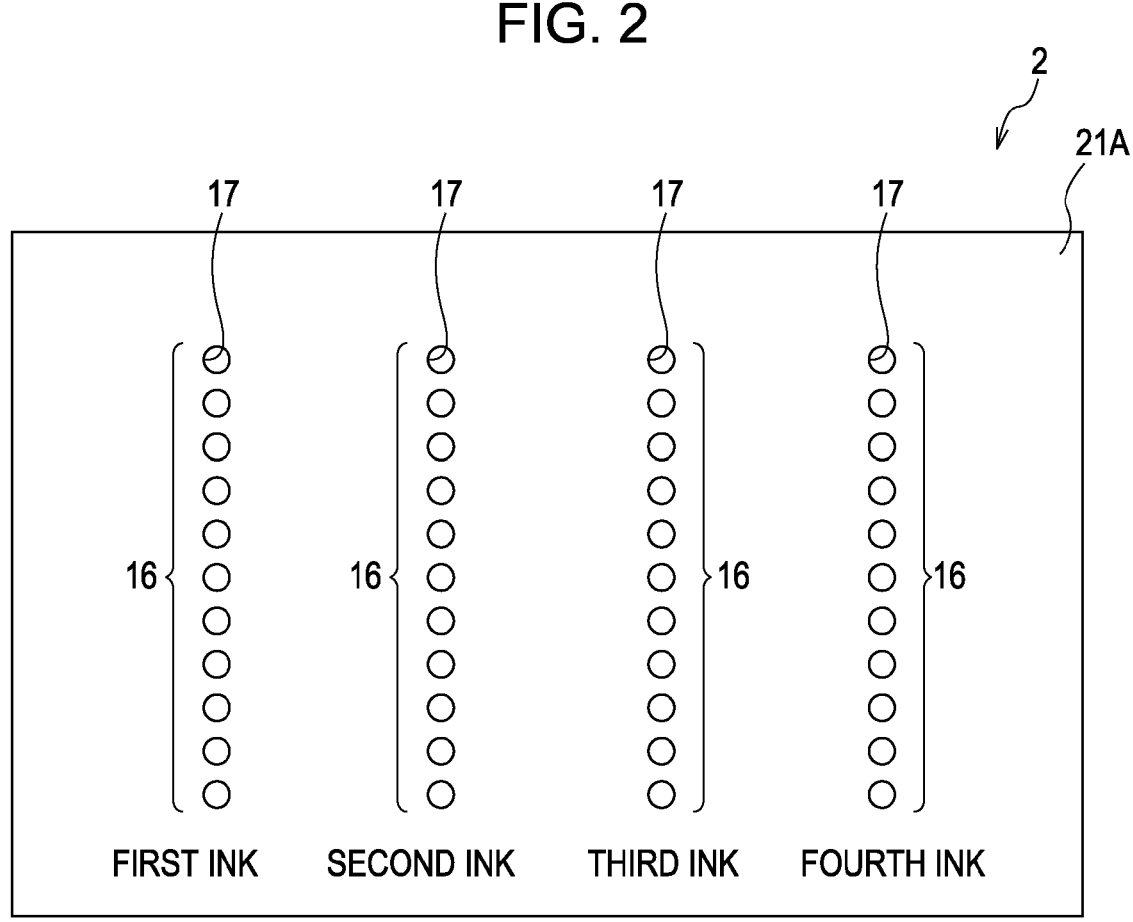
FIG. 2 is a schematic view showing a nozzle arrangement provided in the ink jet head according to an embodiment of the invention.

FIG. 2 is a schematic view showing an arrangement of nozzle holes 17 provided in the ink jet head 2 according to the embodiment.

As shown in FIG. 2, the ink jet head 2 includes a nozzle surface 21A provided with a plurality of nozzle holes 17 ejecting ink. On the nozzle surface 21A which may also be an ink ejection surface, nozzle rows 16 are formed for each of the plurality of nozzle holes 17. In each nozzle row 16, for example, it is possible to eject inks having different compositions. In the embodiment, there are provided four rows corresponding to the compositions of the inks, that is, nozzle row 16 (first ink), nozzle row 16 (second ink), nozzle row 16 (third ink) and nozzle row 16 (fourth ink). Each nozzle row 16 is configured by, for example, 180 nozzle holes 17.

Figure 3:
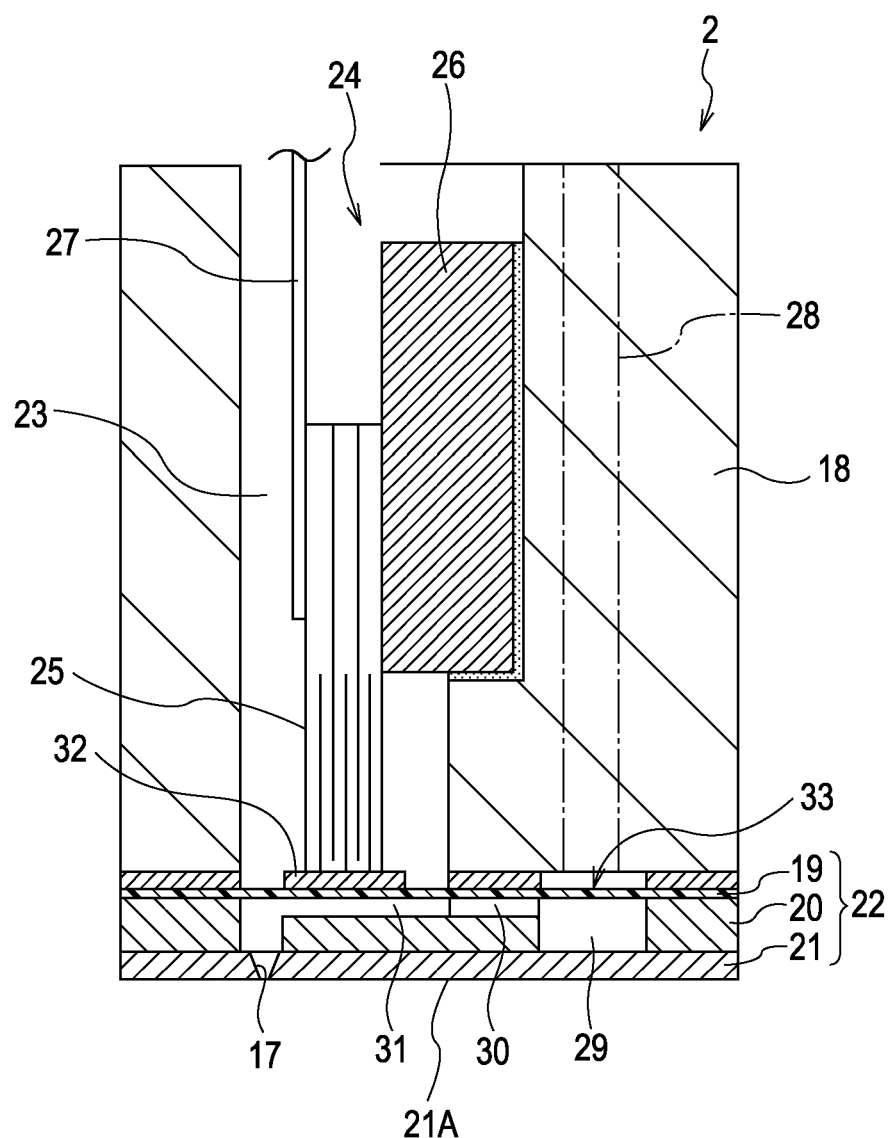
FIG. 3 is a partial cross-sectional view showing an internal configuration of the ink jet head according to an embodiment of the invention.

FIG. 3 is a partial cross-sectional view showing the internal configuration of the ink jet head 2 in the embodiment.

As shown in FIG. 3, the ink jet head 2 is provided with a head main body 18, and a flow channel forming unit 22 connected to the head main body 18. The flow channel forming unit 22 is provided with a vibrating plate 19, a flow channel substrate 20, and a nozzle substrate 21, and forms a common ink chamber 29, an ink supply port 30, and a pressure chamber 31. Further, the flow channel forming unit 22 is provided with an island portion 32 functioning as a diaphragm unit, and a compliance unit 33 absorbing pressure fluctuations inside the common ink chamber 29. In the head main body 18, a storage space 23 storing the fixing member 26 and the driving unit 24 and an internal flow channel 28 guiding the ink to the flow channel forming unit 22 are formed.

According to the above-described configuration, that is, the piezo type ink jet head 2, when a driving signal is input to the driving unit 24 through a cable 27, the piezoelectric element 25 expands and contracts. In this manner, the vibrating plate 19 is deformed (moved) in the direction approaching the pressure chamber 31 and the direction separating therefrom. For this reason, the volume of the pressure chamber 31 is changed and the pressure of the pressure chamber 31 storing the ink is varied. According to the variations of the pressure, ink is ejected from the nozzle holes 17.

Returning to FIG. 1, in the region of the outer side of the platen 5 in the movement range of the ink jet head 2, a home position which becomes the scanning origin of the ink jet head 2 is set. A maintenance unit 11 is provided at the home position. The maintenance unit 11 is configured to perform: a moisture retaining operation of suppressing the evaporation of ink by capping the ink jet head 2 with a cap member 12 when the printing operation is not being performed; a flushing operation of preventing the clogging of the nozzle holes 17 by the thickened ink by ejecting ink in advance from each nozzle hole 17 of the ink-jet head 2 to the cap member 12 or adjusting the meniscus of the nozzle holes 17 and ejecting ink normally from the ink jet head 2; a suction operation (head cleaning) of driving a suction pump (not shown) after capping the ink jet head 2 with the cap member 12, adjusting the meniscus by forcibly suctioning ink with an increased viscosity or attached dust or the like from each nozzle holes 17, and ejecting ink normally from the ink jet head 2; and a wiping operation of removing the ink attached in the vicinity of the nozzle holes 17, the thickened ink or the like by wiping the nozzle surface 21A (refer to FIG. 2) of the ink jet head 2 with a wiping member 13, and performing a purging process of destroying the meniscus of the nozzle holes 17 and readjusting the meniscus.

The first ink and the second ink are formed of the above-described compositions. Therefore, even when the first ink and the second ink are mixed together at the nozzle surface 21A by the wiping, since aggregation of the pigments does not easily occur, it is possible to reduce the clogging and the like of the nozzle holes 17 caused by the pigment aggregations. As a result, the printer 1 has favorable ejection stability.

3. Examples

Hereinafter, specific description will be given of the invention using examples and comparative examples; however, the invention is not limited to these examples.

Embodiment A

3.1.A. Synthesis of Dyes

Preparation Example 1A

Synthesis of the compound represented by the following formula (2A) was performed by the following processes 1A to 3A.

Process 1A 35.7 parts of the mono azo compound represented by the following formula (23A) were added to 200 parts of water and 7.2 parts of sodium nitrite were added thereto while adjusting to pH 6 with sodium hydroxide, to thereby form a solution. After adding this solution dropwise for 30 minutes while maintaining a temperature of 0 to 10° C. into an aqueous solution in which 31.3 parts of 35% hydrochloric acid were diluted in the 200 parts of water, stirring was performed for 1 hour at 20° C. or less and the diazotization reaction was carried out. 0.4 parts of sulfamic acid were added to the obtained reaction solution, stirring was performed for 5 minutes, and the final diazo reaction solution was created.

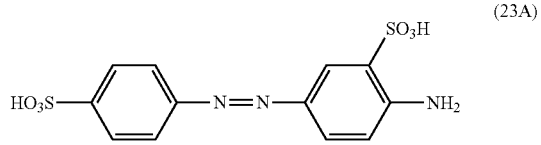
(23A)

On the other hand, 24.0 parts of the compound represented by the following formula (24A) and 25% sodium hydroxide aqueous solution were added to 300 parts of water at 40 to 50° C., adjusted to pH 5 to 6, and an aqueous solution was obtained. While maintaining the aqueous solution at 15 to 25° C., the above-described diazo reaction solution was added dropwise over 30 minutes. During the dropwise addition, the pH was maintained at pH 5 to 6 by the addition of sodium carbonate solution. Subsequently, after stirring for 2 hours at 15 to 25° C. at pH 5 to 6, the pH was adjusted to pH 0 to 1 by adding 35% hydrochloric acid. After stirring the obtained liquid for 2 hours while heating and maintaining the temperature at 65° C., by cooling to 25° C. and filtering and separating the precipitate, 130 parts of wet cake including the compound represented by the following formula (25A) were obtained.

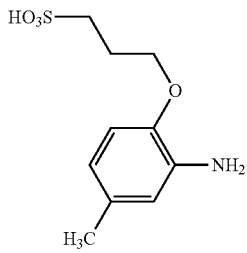
(24A)

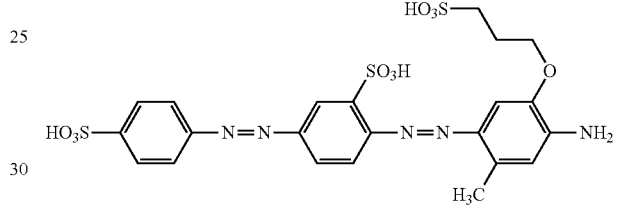
(25A)

Process 2A

By the addition of 25% sodium hydroxide aqueous solution, a solution was formed of 65 parts of the wet cake obtained by the above-described process 1A in 250 parts of water. Here, the pH of the solution was set to 7 to 8. After the addition of 0.1 parts of Leocol TD-90 (manufactured by Lion Corporation, a surfactant) to the solution, 3.8 parts of cyanuric chloride were added at 15 to 25° C. thereto. Next, while the pH was maintained at pH 5 to 6 by the addition of sodium carbonate solution, stirring was performed for 2 hours at 15 to 25° C. Next, the reaction solution was heated to 60 to 65° C., and stirring was performed for 5 hours while the pH was maintained at pH 6 to 7 by the addition of sodium carbonate solution.

Next, 0.89 parts of piperazine were added, the reaction solution was heated to 90 to 95° C., and stirring was performed for 16 hours while the pH was maintained at pH 8 to 9 by the addition of sodium carbonate solution. The obtained reaction solution was cooled to 25° C., sodium chloride was added thereto, the precipitated solid was filtered and separated to obtain a wet cake. The wet cake was added to 400 parts of water and a solution was created. 50 parts of methanol and 800 parts of 2-propanol were added to the solution, precipitated solid was filtered, separated, and dried, whereby a sodium salt of the compound represented by the following formula (2A) was obtained.

(2A)

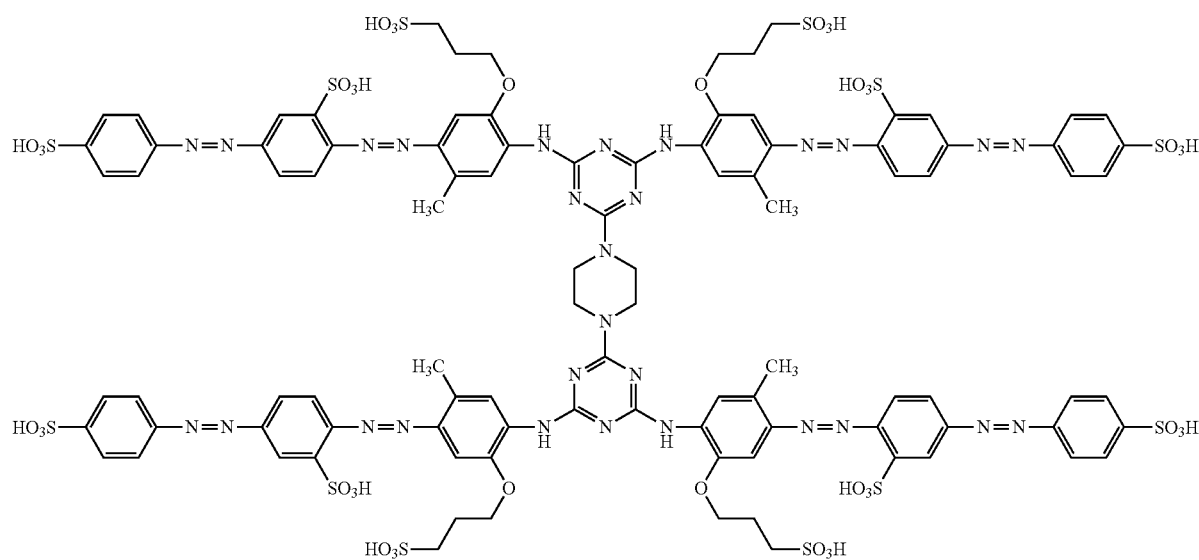

3.2A Preparation of Ink

3.2.1A Preparation of Pigment Ink

1A. Preparation of Pigment Dispersion

After adding 20 parts by mass of black pigment as pigment and 80 parts by mass of ion-exchanged water and mixing and stirring, a 6 hour dispersion process was performed with zirconia beads (diameter 1.5 mm) using a sand mill (manufactured by Yasukawa Seisakusho Co., Ltd.). Thereafter, by separating the zirconia beads with a separator, a pigment dispersion was obtained.

2A. Preparation of Pigment Ink

Next, each component was mixed and stirred in the blending amounts shown in Table 38, pressure filtration was performed with a membrane filter having a pore diameter of 10 µm, and pigment ink A and pigment ink B were obtained. Here, the units described in Table 38 are % by mass.

3.2.2A Preparation of Dye Ink

Each component was mixed and stirred in the blending amounts shown in Table 38, pressure filtration was performed with a membrane filter having a pore diameter of 1.0 µm, and dye ink A, dye ink B, dye ink C, dye ink D, and dye ink E were obtained.

TABLE 38

| | | Pigment Ink A | Pigment Ink B | Dye Ink A | Dye Ink B | Dye Ink C | Dye Ink D | Dye Ink E |
|---|---|---|---|---|---|---|---|---|
| Pigment | Black pigment A (pigment concentration 20%, potassium salt) | 30 | | | | | | |
| | Black pigment B (pigment concentration 20%, sodium salt) | | 30 | | | | | |
| Dyes | Dye Ink A (lithium salt) | | | 5 | | | | |
| | Dye Ink B (sodium salt) | | | | 5 | | | |
| | Dye Ink C (potassium salt) | | | | | 5 | | |
| | Dye Ink D (salt mixture of lithium salt and sodium salt; Li:Na = 8:2) | | | | | | 5 | |
| | Dye Ink E (salt mixture of lithium salt and potassium salt; Li:K = 5:5) | | | | | | | 5 |
| Permeability Enhancing Agent | Triethylene glycol monobutyl ether | 2 | 2 | 5 | 5 | 5 | 5 | 5 |
| Moisturizing Agent | 1,2-Hexanediol | 2 | 2 | 3 | 3 | 3 | 3 | 3 |
| | Glycerin | 9 | 9 | 10 | 10 | 10 | 10 | 10 |
| | Triethylene glycol | | | 8 | 8 | 8 | 8 | 8 |
| | Trimethylolpropane | 4 | 4 | | | | | |
| | 2-Pyrrolidone | 3 | 3 | 3 | 3 | 3 | 3 | 3 |
| Surfactant | Acetylene glycol-based surfactant A | 1 | 1 | 0.5 | 0.5 | 0.5 | 0.5 | 0.5 |
| | Acetylene glycol-based surfactant B | | | 0.5 | 0.5 | 0.5 | 0.5 | 0.5 |
| pH adjuster | Triethanolamine | | | 0.1 | 0.1 | 0.1 | 0.1 | 0.1 |
| | Potassium hydroxide | 0.1 | 0.1 | | | | | |
| Water | Ion-exchanged water | Remainder | Remainder | Remainder | Remainder | Remainder | Remainder | Remainder |
| Total Amount (% by mass) | | 100 | 100 | 100 | 100 | 100 | 100 | 100 |

Each component in Table 38 is as follows. As the black pigment A, one set as a potassium salt by processing PrinteX 30 (trade name) manufactured by Evonik Degussa Corporation using a conventional method was used. Further, as the black pigment B, one set as a sodium salt by processing PrinteX 30 (trade name) manufactured by Evonik Degussa Corporation using a conventional method was used. Here, as the dye A, one set as a lithium salt by processing sodium salt obtained by the above-described preparation example 1A using a conventional method was used. Further, as the dye C, one set as a potassium salt by processing sodium salt obtained by the above-described preparation example 1A using a conventional method was used. Further, as the dye D, one set as mixed salts of a lithium salt and a sodium salt by processing sodium salt obtained by the above-described preparation example 1A using a conventional method was used. Further, as the dye E, one set as mixed salts of a lithium salt and a potassium salt by processing sodium salt obtained by the above-described preparation example 1A using a conventional method was used.

(Pigments)
  Black pigment A (potassium salt)
  Black pigment B (sodium salt)
(Dyes)
  Dye A (lithium salt of compound represented by the above-described formula (2A))
  Dye B (sodium salt of compound represented by the above-described formula (2A))
  Dye C (potassium salt of compound represented by the above-described formula (2A))
  Dye D (salt mixture of lithium salt and sodium salt of compound represented by the above-described formula (2A); Li:Na=8:2)
  Dye E (salt mixture of lithium salt and potassium salt of compound represented by the above-described formula (2A); Li:K=5:5)
(Permeability Enhancing Agent)
  Triethylene glycol monobutyl ether
(Moisturizing Agent)
  1,2-Hexanediol
  Glycerin
  Triethylene glycol
  Trimethylolpropane
  2-Pyrrolidone
(Surfactant)
  Acetylene glycol-based surfactant A (trade name "Olfine E1010", manufactured by Nissin Chemical Industry Co., Ltd.)
  Acetylene glycol-based surfactant B (trade name "Surfynol 104", manufactured by Air Products and Chemicals. Inc.)
(pH Adjuster)
  Triethanolamine
  Potassium hydroxide
(Water)
  Ion-exchanged water

3.3A Evaluation Test

3.3.1A Evaluation of Ejection Stability

The nozzle rows of the ink jet printer PX-B500 (trade name, manufactured by Seiko Epson Corporation) were filled with each pigment ink and each dye ink. Here, among these inks, one type of pigment ink and one type of dye ink were selected and each operation of (a) to (d) was performed for 10 cycles in this order: (a) check printing using the selected pigment ink and dye ink, (b) suction operate the nozzle surface (head cleaning) and wipe the nozzle surface, (c) check printing using the selected pigment ink and dye ink, and (d) leave ink jet printer to stand for 24 hours.

Thereafter, evaluation of the ejection stability was performed by ejecting the selected pigment ink and dye ink from the nozzles, checking the printing, and confirming the presence or absence of missed out nozzles and flight bending of the ink. The evaluation results are shown in Table 39. Further, the classification of the evaluation criteria is as follows.

"○": No missed out nozzles or flight bending of the ink.

"x": Missed out nozzles or flight bending of the ink occurred.

3.4A Evaluation Results

The results of the above evaluation tests are shown in Table 39.

TABLE 39

| | Ink Used (Ink Set) | Maximum Equivalent Conductivity of Metal Ions ($S \cdot cm^2/eq$) | Ejection Stability |
|---|---|---|---|
| Example 1 | Pigment Ink A | 73.5 (potassium ions) | ○ |
| | Dye Ink A | 38.7 (lithium ions) | |
| Example 2 | Pigment Ink A | 73.5 (potassium ions) | ○ |
| | Dye Ink B | 50.1 (sodium ions) | |
| Example 3 | Pigment Ink B | 50.1 (sodium ions) | ○ |
| | Dye Ink A | 38.7 (lithium ions) | |
| Example 4 | Pigment Ink B | 50.1 (sodium ions) | ○ |
| | Dye Ink D | 41.0 (lithium ions:sodium ions = 8:2) | |
| Comparative Example 1 | Pigment Ink A | 73.5 (potassium ions) | X |
| | Dye Ink C | 73.5 (potassium ions) | |
| Comparative Example 2 | Pigment Ink B | 50.1 (sodium ions) | X |
| | Dye Ink B | 50.1 (sodium ions) | |
| Comparative Example 3 | Pigment Ink B | 50.1 (sodium ions) | X |
| | Dye Ink C | 73.5 (potassium ions) | |
| Comparative Example 4 | Pigment Ink B | 50.1 (sodium ions) | X |
| | Dye Ink E | 56.1 (lithium ions:potassium ions = 5:5) | |

For all of the ink sets of Examples 1A to 4A of Table 39, the maximum equivalent conductivity of the metal ions (first metal ions) included in the pigment inks was greater than the maximum equivalent conductivity of the metal ions (second metal ions) included in the dye inks. Therefore, the ejection stability test showed no missing nozzles or flight bending. In this manner, it was shown that, even when the pigment ink and the dye ink are mixed together, aggregation of the pigments does not easily occur.

Meanwhile, for all of the ink sets of Comparative Examples 1A to 4A of Table 39, the maximum equivalent conductivity of the metal ions (first metal ions) included in the pigment inks was less than the maximum equivalent conductivity of the metal ions (second metal ions) included in the dye inks. Therefore, the ejection stability test showed the generation of missing nozzles or flight bending. In this manner, it was shown that aggregation of the pigments occurred due to the pigment ink and the dye ink mixing together. Here, the aggregation of the pigments is generated to a great extent during the wiping of the nozzle surface, as well as being generated by spray of the dye ink during the ejection of the dye ink attaching to the nozzle holes ejecting the pigment ink.

Embodiment B

3.1B Preparation of Ink

3.1.1B Preparation of Pigment Ink

1B. Preparation of Pigment Dispersion

After adding 20 parts by mass of black pigment as pigment and 80 parts by mass of ion-exchanged water and mixing and stirring, a 6 hour dispersion process was performed with zirconia beads (diameter 1.5 mm) using a sand mill (manufactured by Yasukawa Seisakusho Co., Ltd.). Thereafter, by separating the zirconia beads with a separator, a pigment dispersion was obtained.

(2B) Preparation of Pigment Ink

Next, each component was mixed and stirred in the blending amounts shown in Table 40, pressure filtration was performed with a membrane filter having a pore diameter of 10 μm, and pigment ink A and pigment ink B were obtained. Here, the units described in Table 40 are % by mass.

3.1.2B Preparation of Dye Ink

Each component was mixed and stirred in the blending amounts shown in Table 40, pressure filtration was performed with a membrane filter having a pore diameter of 1.0 μm, and dye ink A, dye ink B, dye ink C, dye ink D, and dye ink E were obtained.

(Pigments)
Black pigment A (potassium salt)
Black pigment B (sodium salt)
(Dyes)
Dye A (lithium salt of compound represented by the following formula (4B))
Dye B (sodium salt of compound represented by the following formula (4B))
Dye C (potassium salt of compound represented by the following formula (4B))
Dye D (salt mixture of lithium salt and sodium salt of compound represented by the following formula (4B); Li:Na=8:2)
Dye E (salt mixture of lithium salt and potassium salt of compound represented by the following formula (4B); Li:K=5:5)
(Permeability Enhancing Agent)
Triethylene glycol monobutyl ether
(Moisturizing Agent)
1,2-Hexanediol
Glycerin
Triethylene glycol
Trimethylolpropane
2-Pyrrolidone
(Surfactant)
Acetylene glycol-based surfactant A (brand name "Olfine E1010", manufactured by Nissin Chemical Industry Co., Ltd.)

TABLE 40

|  |  | Pigment Ink A | Pigment Ink B | Dye Ink A | Dye Ink B | Dye Ink C | Dye Ink D | Dye Ink E |
|---|---|---|---|---|---|---|---|---|
| Pigment | Black pigment A (pigment concentration 20%, potassium salt) | 30 | | | | | | |
|  | Black pigment B (pigment concentration 20%, sodium salt) | | 30 | | | | | |
| Dyes | Dye A (lithium salt) | | | 5 | | | | |
|  | Dye B (sodium salt) | | | | 5 | | | |
|  | Dye C (potassium salt) | | | | | 5 | | |
|  | Dye D (salt mixture of lithium salt and sodium salt; Li:Na = 8:2) | | | | | | 5 | |
|  | Dye E (salt mixture of lithium salt and potassium salt; Li:K = 5:5) | | | | | | | 5 |
| Permeability Enhancing Agent | Triethylene glycol monobutyl ether | 2 | 2 | 5 | 5 | 5 | 5 | 5 |
| Moisturizing Agent | 1,2-Hexanediol | 2 | 2 | 3 | 3 | 3 | 3 | 3 |
|  | Glycerin | 9 | 9 | 10 | 10 | 10 | 10 | 10 |
|  | Triethylene glycol | | | 8 | 8 | 8 | 8 | 8 |
|  | Trimethylolpropane | 4 | 4 | | | | | |
|  | 2-Pyrrolidone | 3 | 3 | 3 | 3 | 3 | 3 | 3 |
| Surfactant | Acetylene glycol-based surfactant A | 1 | 1 | 0.5 | 0.5 | 0.5 | 0.5 | 0.5 |
|  | Acetylene glycol-based surfactant B | | | 0.5 | 0.5 | 0.5 | 0.5 | 0.5 |
| pH adjuster | Triethanolamine | | | 0.1 | 0.1 | 0.1 | 0.1 | 0.1 |
|  | Potassium hydroxide | 0.1 | 0.1 | | | | | |
| Water | Ion-exchanged water | Remainder | Remainder | Remainder | Remainder | Remainder | Remainder | Remainder |
| Total Amount (% by mass) |  | 100 | 100 | 100 | 100 | 100 | 100 | 100 |

Here, each component in Table 40 is as follows. As the black pigment A, one set as a potassium salt by processing Printex 30 (trade name) manufactured by Evonik Degussa Corporation using a conventional method was used. Further, as the black pigment B, one set as a sodium salt by processing Printex 30 (trade name) manufactured by Evonik Degussa Corporation using a conventional method was used. Further, as dye A to dye E, ones set as salts by processing the compound represented by the following formula (4B) using a conventional method were used.

Acetylene glycol-based surfactant B (brand name "Surfynol 104", manufactured by Air Products and Chemicals. Inc.)

(pH Adjuster)
Triethanolamine
Potassium hydroxide
(Water)
Ion-exchanged water

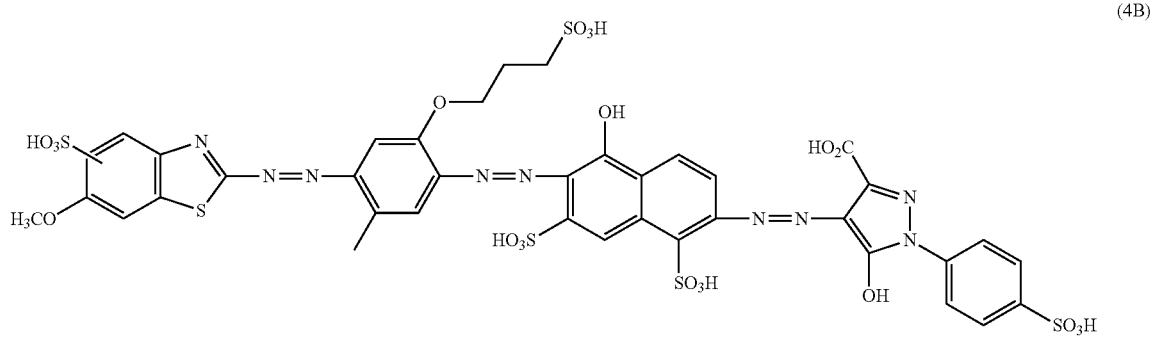

(4B)

3.2B Evaluation Test

3.2.1B Evaluation of Ejection Stability

The nozzle rows of the ink jet printer PX-B500 (trade name, manufactured by Seiko Epson Corporation) were filled with each pigment ink and each dye ink. Here, among these inks, one type of pigment ink and one type of dye ink were selected and each operation of (a) to (d) was performed for 10 cycles in this order: (a) check printing using the selected pigment ink and dye ink, (b) suction operate the nozzle surface (head cleaning) and wipe the nozzle surface, (c) check printing using the selected pigment ink and dye ink, and (d) leave ink jet printer to stand for 24 hours.

Thereafter, evaluation of the ejection stability was performed by ejecting the selected pigment ink and dye ink from the nozzles, checking the printing, and confirming the presence or absence of missed out nozzles and flight bending of the ink. The evaluation results are shown in Table 41. Further, the classification of the evaluation criteria is as follows.
"◯": No missed out nozzles or flight bending of the ink.
"x": Missed out nozzles or flight bending of the ink occurred.

3.3B Evaluation Results

The results of the above evaluation tests are shown in Table 41.

TABLE 41

| | Ink Used (Ink Set) | Maximum Equivalent Conductivity of Metal Ions (S · cm²/eq) | Ejection Stability |
|---|---|---|---|
| Example 1 | Pigment Ink A | 73.5 (potassium ions) | ◯ |
| | Dye Ink A | 38.7 (lithium ions) | |
| Example 2 | Pigment Ink A | 73.5 (potassium ions) | ◯ |
| | Dye Ink B | 50.1 (sodium ions) | |
| Example 3 | Pigment Ink B | 50.1 (sodium ions) | ◯ |
| | Dye Ink A | 38.7 (lithium ions) | |
| Example 4 | Pigment Ink B | 50.1 (sodium ions) | ◯ |
| | Dye Ink D | 41.0 (lithium ions:sodium ions = 8:2) | |
| Comparative Example 1 | Pigment Ink A | 73.5 (potassium ions) | X |
| | Dye Ink C | 73.5 (potassium ions) | |
| Comparative Example 2 | Pigment Ink B | 50.1 (sodium ions) | X |
| | Dye Ink B | 50.1 (sodium ions) | |
| Comparative Example 3 | Pigment Ink B | 50.1 (sodium ions) | X |
| | Dye Ink C | 73.5 (potassium ions) | |
| Comparative Example 4 | Pigment Ink B | 50.1 (sodium ions) | X |
| | Dye Ink E | 56.1 (lithium ions:potassium ions = 5:5) | |

For all of the ink sets of Examples 1B to 4B of Table 41, the maximum equivalent conductivity of the metal ions (first metal ions) included in the pigment inks was greater than the maximum equivalent conductivity of the metal ions (second metal ions) included in the dye inks. Therefore, the ejection stability test showed no missing nozzles or flight bending. In this manner, it was shown that, even when the pigment ink and the dye ink are mixed together, aggregation of the pigments does not easily occur.

Meanwhile, for all of the ink sets of Comparative Examples 1B to 4B of Table 41, the maximum equivalent conductivity of the metal ions (first metal ions) included in the pigment inks was less than the maximum equivalent conductivity of the metal ions (second metal ions) included in the dye inks. Therefore, the ejection stability test showed the generation of missing nozzles or flight bending. In this manner, it was shown that aggregation of the pigments occurred due to the pigment ink and the dye ink mixing together. Here, the aggregation of the pigments is generated to a great extent during the wiping of the nozzle surface, as well as being generated by spray of the dye ink during the ejection of the dye ink attaching to the nozzle holes ejecting the pigment ink.

Embodiment C

3.1C. Synthesis of Dyes

Preparation Example 1C

Synthesis of the dyes A to C was performed by the following processes 1C to 5C. Below, "parts" and "%" are based on mass unless otherwise specified. Further, each operation of the reaction, crystallization, and the like was carried out under stirring unless specified otherwise. Further, the "trade name Leocol (registered trade mark) TD-90 and TD-50" used in the synthesis reaction are both surfactants manufactured by Lion Corporation. Here, when the necessary amount of the desired compound could not be obtained by a single synthesis reaction, the same reaction was repeatedly performed until the necessary amount was obtained.

Here, the dyes synthesized in the preparation example are mixtures including all the above isomers and the like and the yield also includes isomers and the like. Further, unless otherwise specified, the substitution positions of the unsubstituted and substituted sulfamoyl groups in the dyes are a mixture of those substituted at the α-position and β-position of a porphyrazine ring.

Process 1C

Synthesis of a compound in which, in the above-described formula (4C), 1.20 among the rings A to D are pyridine rings condensed at the 2-position and the 3-position, and the remaining 2.80 are represented by benzene rings.

31.11 parts of phthalic anhydride, 15.04 parts of quinolinic acid, 108 parts of urea, 10.1 parts of copper(II) chloride, and 1.5 parts of ammonium molybdate were added to 375 parts of sulfolane, the temperature thereof was raised to 200° C. and the mixture was reacted at the same temperature for 5 hours. After completion of the reaction, the mixture was cooled to 65° C., 50 parts of DMF (N,N-dimethyl formamide) was added thereto, and a precipitated solid was separated by filtration. The obtained solid was washed with 50 parts of DMF and 75.1 parts of wet cake was obtained. The obtained wet cake was added to 450 parts of DMF, the temperature was raised to 110° C., and the mixture was reacted at the same temperature for 1 hour. The precipitated solid was separated by filtration, washed with 200 parts of water and a wet cake was obtained. The obtained wet cake was added to 450 parts of 5% hydrochloric acid, the temperature was raised to 60° C., and the mixture was reacted at the same temperature for 1 hour. The precipitated solid was separated by filtration, washed with 200 parts of water and a wet cake was obtained. The obtained wet cake was added to 450 parts of 5% aqueous ammonia, stirred for 1 hour at 60° C., the precipitated solid was separated by filtration, washed with 200 parts of water, and 78.6 parts of wet cake were obtained. The obtained wet cake was dried at 80° C. and 24.9 parts of the desired compound were obtained as a blue solid.

Process 2C

Synthesis of a compound in which, in the above-described formula (2C), 1.20 among the rings A to D are pyridine rings condensed at the 2-position and the 3-position, the remaining 2.80 are benzene rings, and n is 2.80.

At room temperature, 5.8 parts of the compound of formula (4C) obtained by the above-described "Process 1C" were gradually added to 46.2 parts of chlorosulfonic acid such that the temperature did not exceed 60° C., after which the mixture was reacted for 4 hours at 140° C. The obtained reaction solution was cooled to 70° C., 17.9 parts of thionyl chloride were added dropwise over 30 minutes and the mixture was further reacted for 3 hours at 70° C. By cooling the reaction solution to 30° C. or less, slowly pouring the reaction solution into 800 parts of ice water, separating a precipitated solid by filtration, and washing with 200 parts of cold water, 38.2 parts of wet cake of the desired compound were obtained.

Process 3C

Synthesis of organic amine represented by the following formula (6C).

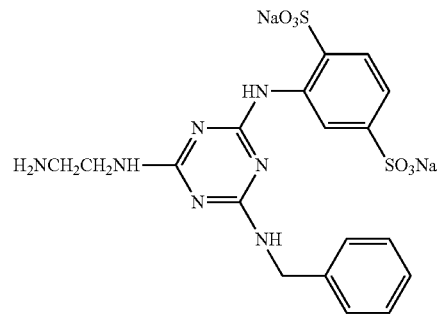

(6C)

18.4 parts of cyanuric chloride and Leocol TD-90 (0.05 parts) were added to 100 parts of ice water and stirring was performed for 30 minutes at a temperature of 10° C. or less. Next, 31.7 parts of 2,5-disulfonylaniline were added (using an 88.4% pure commercially available product) and a reaction was carried out for 2 hours at 0 to 10° C. and 1 hour at 25 to 30° C. while setting the pH to 2.0 to 3.0 in 10% aqueous sodium hydroxide solution. Next, 10.9 parts of benzyl amine were added to the reaction solution, and a reaction was carried out for 1 hour at 25 to 30° C. while setting the pH to 7.0 to 8.0 in 10% aqueous sodium hydroxide solution, then for 1 hour at 30 to 40° C., and a reaction solution including secondary condensates was obtained.

The reaction solution including the secondary condensates obtained in the above manner in the aqueous solution to which 60.1 parts of ethylene diamine were added was gradually added to 120 parts of ice water and stirred for 1 hour at room temperature. 150 parts of ice water and 200 parts of concentrated hydrochloric acid were added to the solution and the pH was adjusted to 1.0. At this time, the amount of solution was 700 parts. 140 parts of sodium chloride were added to the reaction solution, stirring was performed overnight, and a solid was precipitated. The precipitated solid was separated by filtration and 70 parts of wet cake were obtained. The obtained wet cake was added to 280 parts of water and dissolved in 10% aqueous sodium hydroxide solution at pH 9.0. At this time, the amount of solution was 360 parts. The reaction solution was adjusted to pH 1.0 with concentrated hydrochloric acid, 70 parts of sodium chloride were added thereto, stirring was performed overnight, and a solid was precipitated. The precipitated solid was separated by filtration and 60.3 parts of wet cake were obtained. The obtained wet cake was added into a mixed solvent of 255 parts of methanol and 45 parts of water, and stirred for 1 hour at 50° C., after which the precipitated solid was separated by filtration, and 50.3 parts of wet cake were obtained. The obtained wet cake was dried and a white powder of 15.3 parts of the desired organic amine represented by formula (6C) was obtained.

Process 4C

Synthesis of the dyes represented by the following formula (7C) (dyes in which, in the following formula (7C), 1.20 among the rings A to D are pyridine rings condensed at the 2-position and the 3-position, and the remaining 2.80 are benzene rings).

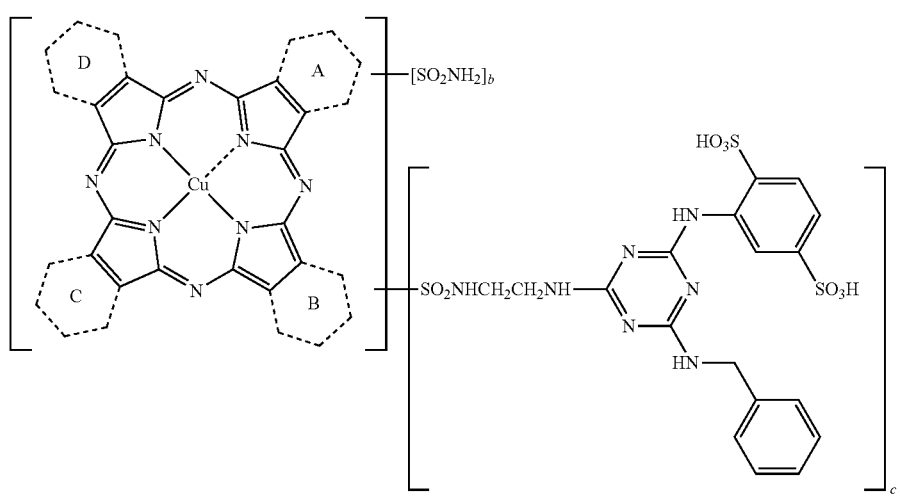

(7C)

38.2 parts of the wet cake obtained by the above-described "Process 2C" were added to 200 parts of ice water and the mixture was stirred and suspended at a temperature of 5° C. or less. After 10 minutes, while maintaining the temperature at 10° C. or less, a solution in which 7.4 parts of organic amine of formula (6C) obtained by "Process 3C" were dissolved in a mixed solution of 1.5 parts of 28% aqueous ammonia and 40 parts of water was added to the suspension and a reaction was carried out while maintaining the pH at 9.0 with 28% aqueous ammonia. While maintaining the same pH, the temperature was raised to 20° C. and a reaction was further carried out overnight at the same temperature. At this time, the amount of solution was 300 parts.

After heating the reaction solution to 50° C., adding 55.0 parts of sodium chloride and stirring for 10 minutes, the pH was adjusted to 1.0 with concentrated hydrochloric acid, a precipitated solid was separated by filtration, washing was performed with 100 parts of 20% sodium chloride aqueous solution, and 27.1 parts of wet cake were obtained. The obtained wet cake was added to 191 parts of water and made to form a solution by adjusting the pH to 9.0 with 25% aqueous sodium hydroxide solution. At this time, the amount of solution was 270 parts. After heating the solution to 50° C., adding 54.0 parts of sodium chloride and stirring for 30 minutes, the pH was adjusted to 4.0 with concentrated hydrochloric acid, a precipitated solid was separated by filtration, washing was performed with 100 parts of 20% sodium chloride aqueous solution, and 21.4 parts of wet cake were obtained. The obtained wet cake was added into a mixed solution of 160 parts of isopropyl alcohol and 40 parts of water, and stirred for 1 hour at 50° C., after which the precipitated solid was separated by filtration, and 15.7 parts of wet cake were obtained. The obtained wet cake was dried and 11.2 parts of dyes (free acid) of the above-described formula (7C) were obtained as a blue powder.

Process 5C

Preparation of salt formed of dyes of formula (7C).

The dyes of the formula (7C) obtained in the above-described manner were processed by a conventional method and dye A (lithium salt of dyes of formula (7C)), dye B (sodium salt of dyes of formula (7C)), dye C (potassium salt of dyes of formula (7C)), dye D (mixed salt of lithium salt and sodium salt of dyes of formula (7C)), and dye E (mixed salt of lithium salt and potassium salt of dyes of formula (7C)) were obtained.

3.2C Preparation of Ink 3.2.1C Preparation of Pigment Ink

1C. Preparation of Pigment Dispersion

After adding 20 parts by mass of black pigment as pigment and 80 parts by mass of ion-exchanged water and mixing and stirring, a 6 hour dispersion process was performed with zirconia beads (diameter 1.5 mm) using a sand mill (manufactured by Yasukawa Seisakusho Co., Ltd.). Thereafter, by separating the zirconia beads with a separator, a pigment dispersion was obtained.

2C. Preparation of Pigment Ink

Next, each component was mixed and stirred in the blending amounts shown in Table 42, pressure filtration was performed with a membrane filter having a pore diameter of 10 μm, and pigment ink A and pigment ink B were obtained. Here, the units described in Table 5 are % by mass.

3.2.2C Preparation of Dye Ink

Each component was mixed and stirred in the blending amounts shown in Table 42, pressure filtration was performed with a membrane filter having a pore diameter of 1.0 μm, and dye ink A, dye ink B, and dye ink C were obtained.

TABLE 42

| | | Pigment Ink A | Pigment Ink B | Dye Ink A | Dye Ink B | Dye Ink C | Dye Ink D | Dye Ink E |
|---|---|---|---|---|---|---|---|---|
| Pigment | Black pigment A (pigment concentration 20%, potassium salt) | 30 | | | | | | |
| | Black pigment B (pigment concentration 20%, sodium salt) | | 30 | | | | | |

TABLE 42-continued

|  |  | Pigment Ink A | Pigment Ink B | Dye Ink A | Dye Ink B | Dye Ink C | Dye Ink D | Dye Ink E |
|---|---|---|---|---|---|---|---|---|
| Dyes | Dye A (lithium salt) |  |  | 5 |  |  |  |  |
|  | Dye B (sodium salt) |  |  |  | 5 |  |  |  |
|  | Dye C (potassium salt) |  |  |  |  | 5 |  |  |
|  | Dye D (salt mixture of lithium salt and sodium salt; Li:Na = 8:2) |  |  |  |  |  | 5 |  |
|  | Dye E (salt mixture of lithium salt and potassium salt; Li:K = 5:5) |  |  |  |  |  |  | 5 |
| Permeability Enhancing Agent | Triethylene glycol monobutyl ether | 2 | 2 | 5 | 5 | 5 | 5 | 5 |
| Moisturizing Agent | 1,2-Hexanediol | 2 | 2 | 3 | 3 | 3 | 3 | 3 |
|  | Glycerin | 9 | 9 | 10 | 10 | 10 | 10 | 10 |
|  | Triethylene glycol |  |  | 8 | 8 | 8 | 8 | 8 |
|  | Trimethylolpropane | 4 | 4 |  |  |  |  |  |
|  | 2-Pyrrolidone | 3 | 3 | 3 | 3 | 3 | 3 | 3 |
| Surfactant | Acetylene glycol-based surfactant A | 1 | 1 | 0.5 | 0.5 | 0.5 | 0.5 | 0.5 |
|  | Acetylene glycol-based surfactant B |  |  | 0.5 | 0.5 | 0.5 | 0.5 | 0.5 |
| pH adjuster | Triethanolamine |  |  | 0.1 | 0.1 | 0.1 | 0.1 | 0.1 |
|  | Potassium hydroxide | 0.1 | 0.1 |  |  |  |  |  |
| Water | Ion-exchanged water | Remainder | Remainder | Remainder | Remainder | Remainder | Remainder | Remainder |
| Total Amount (% by mass) |  | 100 | 100 | 100 | 100 | 100 | 100 | 100 |

Each component in Table 42 is as follows. As the black pigment A, one set as a potassium salt by processing Printex 30 (trade name) manufactured by Evonik Degussa Corporation using a conventional method was used. Further, as the black pigment B, one set as a sodium salt by processing Printex 30 (trade name) manufactured by Evonik Degussa Corporation using a conventional method was used.
(Pigments)
  Black pigment A (potassium salt)
  Black pigment B (sodium salt)
(Dyes)
  Dye A (lithium salt of compound represented by the above-described formula (7C))
  Dye B (sodium salt of compound represented by the above-described formula (7C))
  Dye C (potassium salt of compound represented by the above-described formula (7C))
  Dye D (salt mixture of lithium salt and sodium salt of compound represented by the above-described formula (7C); Li:Na=8:2)
  Dye E (salt mixture of lithium salt and potassium salt of compound represented by the above-described formula (7C); Li:K=5:5)
(Permeability Enhancing Agent)
  Triethylene glycol monobutyl ether
(Moisturizing Agent)
  1,2-Hexanediol
  Glycerin
  Triethylene glycol
  Trimethylolpropane
  2-Pyrrolidone
(Surfactant)
  Acetylene glycol-based surfactant A (brand name "Olfine E1010", manufactured by Nissin Chemical Industry Co., Ltd.)
  Acetylene glycol-based surfactant B (brand name "Surfynol 104", manufactured by Air Products and Chemicals. Inc.)
(pH Adjuster)
  Triethanolamine
  Potassium hydroxide
(Water)
  Ion-exchanged water 3.3C Evaluation Test 3.3.1C Evaluation of Ejection Stability The nozzle rows of the ink jet printer PX-B500 (trade name, manufactured by Seiko Epson Corporation) were filled with each pigment ink and each dye ink. Here, among these inks, one type of pigment ink and one type of dye ink were selected and each operation of (a) to (d) was performed for 10 cycles in this order: (a) check printing using the selected pigment ink and dye ink, (b) suction operate the nozzle surface (head cleaning) and wipe the nozzle surface, (c) check printing using the selected pigment ink and dye ink, and (d) leave ink jet printer to stand for 24 hours.

Thereafter, evaluation of the ejection stability was performed by ejecting the selected pigment ink and dye ink from the nozzles, checking the printing, and confirming the presence or absence of missed out nozzles and flight bending of the ink. The evaluation results are shown in Table 43. Further, the classification of the evaluation criteria is as follows.
"○": No missed out nozzles or flight bending of the ink.
"x": Missed out nozzles or flight bending of the ink occurred.

3.4C Evaluation Results

The results of the above evaluation tests are shown in Table 43.

TABLE 43

| | Ink Used (Ink Set) | Maximum Equivalent Conductivity of Metal Ions ($S \cdot cm^2/eq$) | Ejection Stability |
|---|---|---|---|
| Example 1 | Pigment Ink A | 73.5 (potassium ions) | ○ |
|  | Dye Ink A | 38.7 (lithium ions) |  |
| Example 2 | Pigment Ink A | 73.5 (potassium ions) | ○ |
|  | Dye Ink B | 50.1 (sodium ions) |  |
| Example 3 | Pigment Ink B | 50.1 (sodium ions) | ○ |
|  | Dye Ink A | 38.7 (lithium ions) |  |
| Example 4 | Pigment Ink B | 50.1 (sodium ions) | ○ |
|  | Dye Ink D | 41.0 (lithium ions:sodium ions = 8:2) |  |
| Comparative Example 1 | Pigment Ink A | 73.5 (potassium ions) | X |
|  | Dye Ink C | 73.5 (potassium ions) |  |
| Comparative Example 2 | Pigment Ink B | 50.1 (sodium ions) | X |
|  | Dye Ink B | 50.1 (sodium ions) |  |

TABLE 43-continued

| | Ink Used (Ink Set) | Maximum Equivalent Conductivity of Metal Ions (S · cm²/eq) | Ejection Stability |
|---|---|---|---|
| Comparative Example 3 | Pigment Ink B Dye Ink C | 50.1 (sodium ions) 73.5 (potassium ions) | X |
| Comparative Example 4 | Pigment Ink B Dye Ink E | 50.1 (sodium ions) 56.1 (lithium ions:potassium ions = 5:5) | X |

For all of the ink sets of Examples 1C to 4C of Table 43, the maximum equivalent conductivity of the metal ions (first metal ions) included in the pigment inks was greater than the maximum equivalent conductivity of the metal ions (second metal ions) included in the dye inks. Therefore, the ejection stability test showed no missing nozzles or flight bending. In this manner, it was shown that, even when the pigment ink and the dye ink are mixed together, aggregation of the pigments does not easily occur.

Meanwhile, for all of the ink sets of Comparative Examples 1C to 4C of Table 43, the maximum equivalent conductivity of the metal ions (first metal ions) included in the pigment inks was the maximum equivalent conductivity or less of the metal ions (second metal ions) included in the dye inks. Therefore, the ejection stability test showed the generation of missing nozzles or flight bending. In this manner, it was shown that aggregation of the pigments occurred due to the pigment ink and the dye ink mixing together. Here, the aggregation of the pigments is generated to a great extent during the wiping of the nozzle surface, as well as being generated by spray of the dye ink during the ejection of the dye ink attaching to the nozzle holes ejecting the pigment ink.

Embodiment D 3.1D. Synthesis of Dyes

Preparation Example 1D

Synthesis of the dyes A to E was performed by the following processes 1D to 3D. Below, "part" and "%" are based on mass unless otherwise specified. Further, in each structural formula of the compounds shown in the following processes, the acid functionality of the sulfo group or the like is described in the form of a free acid. Here, the solubilities of dye A to dye C with respect to water at room temperature were all 100 g/liter or more.
Process 1D
Preparation of Azo Compound 20.8 parts of 5-amino-2 chlorobenzene sulfonic acid were dissolved in 200 parts of water while the pH was adjusted to 6 with sodium hydroxide and 7.2 parts of sodium nitrite were subsequently added. After adding the solution dropwise to 20 parts of 5% hydrochloric acid at 0 to 10° C. over 30 minutes, stirring was performed for 1 hour at 10° C. or less and a diazotization reaction was carried out, whereby a diazo reaction solution was prepared.

Meanwhile, 26.6 parts of 2-(sulfo-propoxy)-5-chloroaniline were dissolved in 130 parts of water while adjusting the pH to 7 with sodium hydroxide, and, using 10.4 parts of sodium bisulfite and 8.6 parts of 35% formalin, a methyl-ω-sulfonic acid derivative was formed by a conventional method. The obtained methyl-ω-sulfonic acid derivative was added to the diazo reaction solution prepared earlier and stirred for 24 hours at 0 to 15° C. at a pH of 2 to 4. After setting the reaction solution to pH 11 with sodium hydroxide, stirring was performed for 5 hours at 80 to 95° C. while maintaining the pH, a further 100 parts of sodium chloride were added to perform salting out, and the precipitated solid was separated by filtration, whereby 100 parts of the azo compound represented by the following formula (10D) were obtained as a wet cake.

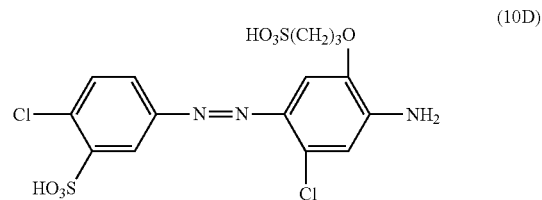

(10D)

(Process 2D) Preparation of Dye B 0.10 parts of Leocol RTMTD90 (trade name, Lion Corporation, surfactant) were added to 250 parts of ice water and vigorously stirred; 3.6 parts of cyanuric chloride were added thereto and stirred at 0 to 5° C. for 30 minutes, whereby a suspension was obtained. Subsequently, 100 parts of the wet cake of the compound represented by the formula (10D) were dissolved in 200 parts of water and the above-described suspension was added dropwise to this solution over 30 minutes. After the completion of the dropwise addition, stirring was performed for 6 hours at 25 to 45° C., and pH 6 to 8. 37.5 parts of taurine were added to the obtained solution, and stirring was performed for 4 hours at 75 to 90° C., and pH 7 to 9. After cooling the obtained reaction solution to 20 to 25° C., 800 parts of acetone were added to the reaction solution and stirring was performed for 1 hour at 20 to 25° C. The precipitated solid was separated by filtration and 50.0 parts of wet cake were obtained. By drying the wet cake with a hot-air dryer at 80° C., 13.5 parts of the sodium salt (dye B) of the compound represented by the following formula (2D) were obtained.

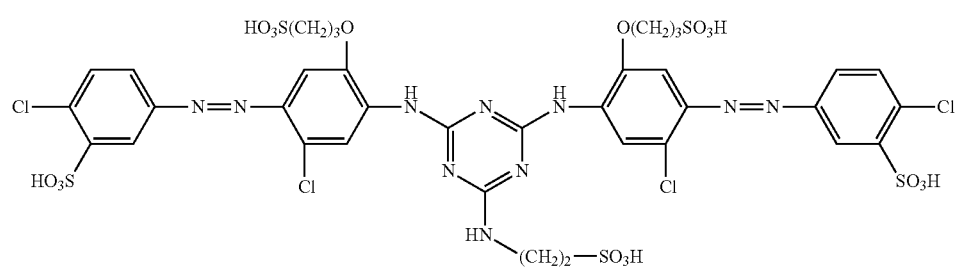

(2D)

Process 3D
Preparation of Dye A, Dye C, Dye D, and Dye E

The sodium salt of the dyes of the formula (2D) obtained in the above-described manner were processed by a conventional method and dye A (lithium salt of dyes of formula (2D)), dye C (potassium salt of dyes of formula (2D)), dye D (mixed salt of lithium salt and sodium salt of dyes of formula (2D)), and dye E (mixed salt of lithium salt and potassium salt of dyes of formula (2D)) were obtained.

3.2D Preparation of Ink

3.2.1D Preparation of Pigment Ink

1D. Preparation of Pigment Dispersion

After adding 20 parts by mass of black pigment as pigment and 80 parts by mass of ion-exchanged water and mixing and stirring, a 6 hour dispersion process was performed with zirconia beads (diameter 1.5 mm) using a sand mill (manufactured by Yasukawa Seisakusho Co., Ltd.). Thereafter, by separating the zirconia beads with a separator, a pigment dispersion was obtained.

2D. Preparation of Pigment Ink

Next, each component was mixed and stirred in the blending amounts shown in Table 44, pressure filtration was performed with a membrane filter having a pore diameter of 10 μm, and pigment ink A and pigment ink B were obtained. Here, the units described in Table 44 are % by mass.

3.2.2D Preparation of Dye Ink

Each component was mixed and stirred in the blending amounts shown in Table 44, pressure filtration was performed with a membrane filter having a pore diameter of 1.0 μm, and dye ink A, dye ink B, dye ink C, dye ink D, and dye ink E were obtained.

Each component in Table 44 is as follows. As the black pigment A, one set as a potassium salt by processing Printex 30 (trade name) manufactured by Evonik Degussa Corporation using a conventional method was used. Further, as the black pigment B, one set as a sodium salt by processing Printex 30 (trade name) manufactured by Evonik Degussa Corporation using a conventional method was used.

(Pigments)
  Black pigment A (potassium salt)
  Black pigment B (sodium salt)
(Dyes)
  Dye A (lithium salt of compound represented by the above-described formula (2D))
  Dye B (sodium salt of compound represented by the above-described formula (2D))
  Dye C (potassium salt of compound represented by the above-described formula (2D))
  Dye D (salt mixture of lithium salt and sodium salt of compound represented by the above-described formula (2D); Li:Na=8:2)
  Dye E (salt mixture of lithium salt and potassium salt of compound represented by the above-described formula (2D); Li:K=5:5)
(Permeability Enhancing Agent)
  Triethylene glycol monobutyl ether
(Moisturizing Agent)
  1,2-Hexanediol
  Glycerin
  Triethylene glycol
  Trimethylolpropane
  2-Pyrrolidone
(Surfactant)
  Acetylene glycol-based surfactant A (brand name "Olfine E1010", manufactured by Nissin Chemical Industry Co., Ltd.)

TABLE 44

| | | Pigment Ink A | Pigment Ink B | Dye Ink A | Dye Ink B | Dye Ink C | Dye Ink D | Dye Ink E |
|---|---|---|---|---|---|---|---|---|
| Pigment | Black pigment A (pigment concentration 20%, potassium salt) | 30 | | | | | | |
| | Black pigment B (pigment concentration 20%, sodium salt) | | 30 | | | | | |
| Dyes | Dye A (lithium salt) | | | 5 | | | | |
| | Dye B (sodium salt) | | | | 5 | | | |
| | Dye C (potassium salt) | | | | | 5 | | |
| | Dye D (salt mixture of lithium salt and sodium salt; Li:Na = 8:2) | | | | | | 5 | |
| | Dye E (salt mixture of lithium salt and potassium salt; Li:K = 5:5) | | | | | | | 5 |
| Permeability Enhancing Agent | Triethylene glycol monobutyl ether | 2 | 2 | 5 | 5 | 5 | 5 | 5 |
| Moisturizing Agent | 1,2-Hexanediol | 2 | 2 | 3 | 3 | 3 | 3 | 3 |
| | Glycerin | 9 | 9 | 10 | 10 | 10 | 10 | 10 |
| | Triethylene glycol | | | 8 | 8 | 8 | 8 | 8 |
| | Trimethylolpropane | 4 | 4 | | | | | |
| | 2-Pyrrolidone | 3 | 3 | 3 | 3 | 3 | 3 | 3 |
| Surfactant | Acetylene glycol-based surfactant A | 1 | 1 | 0.5 | 0.5 | 0.5 | 0.5 | 0.5 |
| | Acetylene glycol-based surfactant B | | | 0.5 | 0.5 | 0.5 | 0.5 | 0.5 |
| pH adjuster | Triethanolamine | | | 0.1 | 0.1 | 0.1 | 0.1 | 0.1 |
| | Potassium hydroxide | 0.1 | 0.1 | | | | | |
| Water | Ion-exchanged water | Remainder | Remainder | Remainder | Remainder | Remainder | Remainder | Remainder |
| Total Amount (% by mass) | | 100 | 100 | 100 | 100 | 100 | 100 | 100 |

Acetylene glycol-based surfactant B (brand name "Surfynol 104", manufactured by Air Products and Chemicals. Inc.)
(pH Adjuster)
 Triethanolamine
 Potassium hydroxide
(Water)
 Ion-exchanged water 3.3D Evaluation Test 3.3.1D Evaluation of Ejection Stability The nozzle rows of the ink jet printer PX-B500 (trade name, manufactured by Seiko Epson Corporation) were filled with each pigment ink and each dye ink. Here, among these inks, one type of pigment ink and one type of dye ink were selected and each operation of (a) to (d) was performed for 10 cycles in this order: (a) check printing using the selected pigment ink and dye ink, (b) suction operate the nozzle surface (head cleaning) and wipe the nozzle surface, (c) check printing using the selected pigment ink and dye ink, and (d) leave ink jet printer to stand for 24 hours.

Thereafter, evaluation of the ejection stability was performed by ejecting the selected pigment ink and dye ink from the nozzles, checking the printing, and confirming the presence or absence of missed out nozzles and flight bending of the ink. The evaluation results are shown in Table 45. Further, the classification of the evaluation criteria is as follows.
"◯" No missed out nozzles or flight bending of the ink.
"x" Missed out nozzles or flight bending of the ink occurred.

3.4D Evaluation Results

The results of the above evaluation tests are shown in Table 45.

TABLE 45

| | Ink Used (Ink Set) | Maximum Equivalent Conductivity of Metal Ions (S · cm$^2$/eq) | Ejection Stability |
|---|---|---|---|
| Example 1 | Pigment Ink A | 73.5 (potassium ions) | ◯ |
| | Dye Ink A | 38.7 (lithium ions) | |
| Example 2 | Pigment Ink A | 73.5 (potassium ions) | ◯ |
| | Dye Ink B | 50.1 (sodium ions) | |
| Example 3 | Pigment Ink B | 50.1 (sodium ions) | ◯ |
| | Dye Ink A | 38.7 (lithium ions) | |
| Example 4 | Pigment Ink B | 50.1 (sodium ions) | ◯ |
| | Dye Ink D | 41.0 (lithium ions:sodium ions = 8:2) | |
| Comparative Example 1 | Pigment Ink A | 73.5 (potassium ions) | X |
| | Dye Ink C | 73.5 (potassium ions) | |
| Comparative Example 2 | Pigment Ink B | 50.1 (sodium ions) | X |
| | Dye Ink B | 50.1 (sodium ions) | |
| Comparative Example 3 | Pigment Ink B | 50.1 (sodium ions) | X |
| | Dye Ink C | 73.5 (potassium ions) | |
| Comparative Example 4 | Pigment Ink B | 50.1 (sodium ions) | X |
| | Dye Ink E | 56.1 (lithium ions:potassium ions = 5:5) | |

For all of the inks sets of Examples 1D to 4D of Table 45, the maximum equivalent conductivity of the metal ions (first metal ions) included in the pigment inks was greater than the maximum equivalent conductivity of the metal ions (second metal ions) included in the dye inks. Therefore, the ejection stability test showed no missing nozzles or flight bending. In this manner, it was shown that, even when the pigment ink and the dye ink are mixed together, aggregation of the pigments does not easily occur.

Meanwhile, for all of the inks sets of Comparative Examples 1D to 4D of Table 45, the maximum equivalent conductivity of the metal ions (first metal ions) included in the pigment inks was the maximum equivalent conductivity or less of the metal ions (second metal ions) included in the dye inks. Therefore, the ejection stability test showed the generation of missing nozzles or flight bending. In this manner, it was shown that aggregation of the pigments occurred due to the pigment ink and the dye ink mixing together. Here, the aggregation of the pigments is generated to a great extent during the wiping of the nozzle surface, as well as being generated by spray of the dye ink during the ejection of the dye ink attaching to the nozzle holes ejecting the pigment ink.

The invention is not limited to the embodiments described above, and various modifications thereof are possible. For example, the invention includes configurations which are the substantially the same as the configurations described in the embodiments (for example, configurations having the same function, method and results, or configurations having the same purpose and effect). In addition, the invention includes configurations in which non-essential parts of the configurations described in the embodiments are replaced. In addition, the invention includes configurations exhibiting the same operation and effect as the configurations described in the embodiments or configurations capable of achieving the same purpose. In addition, the invention includes configurations in which known techniques are added to the configurations described in the embodiments.

What is claimed is:

1. An ink set comprising:
 a first ink containing water, pigments, and first metal ions as counter-ions of the pigments; and
 a second ink containing water, dyes represented by at least one type selected from the group consisting of the following general formula (1A), the following general formula (1B), the following general formula (1C), and the following general formula (1D), and second metal ions as counter-ions of the dyes,
 wherein a maximum equivalent conductivity [S·cm$^2$/eq] of the first metal ions disclosed in the following (condition 1) or (condition 2) is greater than the maximum equivalent conductivity [S·cm$^2$/eq] of the second metal ions disclosed in the following (condition 3) or (condition 4);
 (condition 1) when the first metal ions are formed of one type of metal ions, the maximum equivalent conductivity of the first metal ions is set to the maximum equivalent conductivity of the one type of metal ions
 (condition 2) when the first metal ions are formed of two or more types of metal ions, the maximum equivalent conductivity of the first metal ions is the average of the limits of the equivalent conductivity of the two or more types of metal ions
 (condition 3) when the second metal ions are formed of one type of metal ions, the maximum equivalent conductivity of the second metal ions is set to the maximum equivalent conductivity of the one type of metal ions
 (condition 4) when the second metal ions are formed of two or more types of metal ions, the maximum equivalent conductivity of the second metal ions is the average of the limits of the equivalent conductivity of the two or more types of metal ions

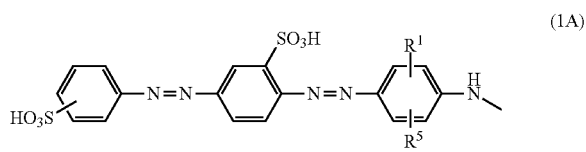

(1A)

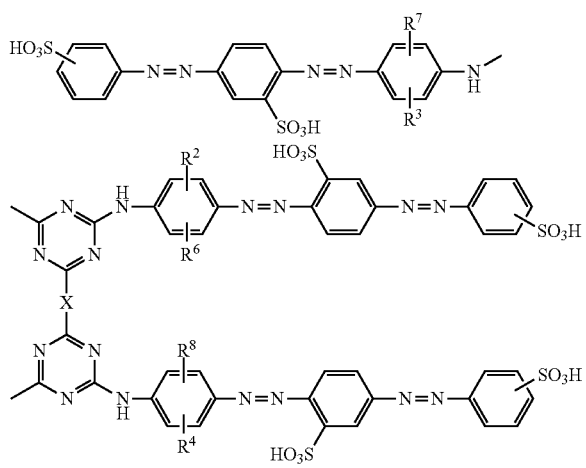

(wherein in the formula (1A), $R^1$, $R^2$, $R^3$, $R^4$, $R^5$, $R^6$, $R^7$, and $R^8$ each independently represents a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one of a hydroxy group, a C1-C4 alkoxy group, a hydroxy C1-C4 alkoxy group, a sulfo group, and a carboxy group as a substituent; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one of a hydroxy group, a sulfo group, and a carboxy group as a substituent; a di-C1-C4 alkylureido group substituted with at least one of a hydroxy group, a sulfo group, and a carboxy group as a substituent; a benzoylamino group; a benzoylamino group in which a benzene ring is substituted with at least one of a halogen atom, a C1-C4 alkyl group, a nitro group, a sulfo group, and a carboxy group; a benzenesulfonylamino group; or a phenylsulfonylamino group in which a benzene ring is substituted with at least one of a halogen atom, a C1-C4 alkyl group, a nitro group, a sulfo group, and a carboxy group; and X represents a divalent crosslinked group;)

(1B)

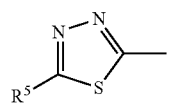

(wherein in formula (1B), n is 0 or 1, $R^1$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group; $R^2$, $R^3$, and $R^4$ each independently represents a hydrogen atom; a chlorine atom; a hydroxy group; a sulfo group; a carboxy group; a sulfamoyl group; a carbamoyl group; a C1-C4 alkyl group; a C1-C4 alkoxy group which may be substituted with a hydroxy group, a C1-C4 alkoxy group, a hydroxy C1-C4 alkoxy group, a sulfo group or a carboxy group; a mono or di-C1-C4 alkylamino group which may be substituted with a hydroxy group, a sulfo group or a carboxy group; a C1-C4 alkylcarbonylamino group which may be substituted with a hydroxy group or a carboxy group; an N'—C1-C4 alkylureido group which may be substituted with a hydroxy group, a sulfo group or a carboxy group; a phenylamino group in which a benzene ring may be substituted with a chlorine atom, a C1-C4 alkyl group, a nitro group, a sulfo group or a carboxy group; a benzoylamino group in which a benzene ring may be substituted with a chlorine atom, a C1-C4 alkyl group, a nitro group, a sulfo group or a carboxy group; or a phenylsulfonylamino group in which a benzene ring may be substituted with a chlorine atom, a C1-C4 alkyl group, a nitro group, a sulfo group or a carboxy group; and group A is a substituted heterocyclic group represented by the following general formula (2B) or the following general formula (3B), (2B)

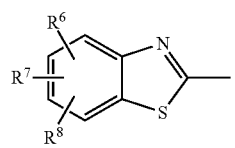

(wherein in the formula (2B), $R^5$ represents a mercapto group; or a C1-C4 alkylthio group which may be substituted with a hydroxy group, a C1-C4 alkoxy group, a hydroxy C1-C4 alkoxy group, a sulfo group or a carboxy group;)

(3B)

(wherein in the formula (3B), $R^6$, $R^7$, and $R^8$ each independently represents a hydrogen atom; a chlorine atom; a carboxy group; a sulfo group; a nitro group; a hydroxy group; a carbamoyl group; a sulfamoyl group; a C1-C4 alkyl group; a C1-C4 alkoxy group which may be substituted with a hydroxy group, a C1-C4 alkoxy group, a sulfo group or a carboxy group; a C1-C4 alkylsulfonyl group which may be substituted with a hydroxy group, a sulfo group or a carboxy group; or a phenylsulfonyl group in which a benzene ring may be substituted with a chlorine atom, a C1-C4 alkyl group, a nitro group, a sulfo group, or a carboxy group;)

Group B is a phenyl group or a naphthyl group which may be substituted, and, when group B is a substituted phenyl group, it has a substituent that is a hydroxy group; a sulfo group; a carboxy group; a C1-C4 alkyl group; a C1-C4 alkoxy group; an amino group; a mono or di-C1-C4 alkylamino group; an acetylamino group; or a benzoylamino group in which a benzene ring may be substituted with a chlorine atom, a C1-C4 alkyl group, a nitro group, a sulfo group, or a carboxy group, and, when group B is a substituted naphthyl group, it has a substituent that is a hydroxy group; a sulfo group; a C1-C4 alkoxy group; or a phenylsulfonyloxy group in which a benzene ring may be substituted with a methyl group, a nitro group, or a chlorine atom;)

a represents an integer of 1 or more to 6 or less, b represents 0.00 or more to less than 3.90 as an average value, c represents 0.10 or more to less than 4.00 as an average value, and the sum of b and c is 1.00 or more to less than 4.00 as an average value;)

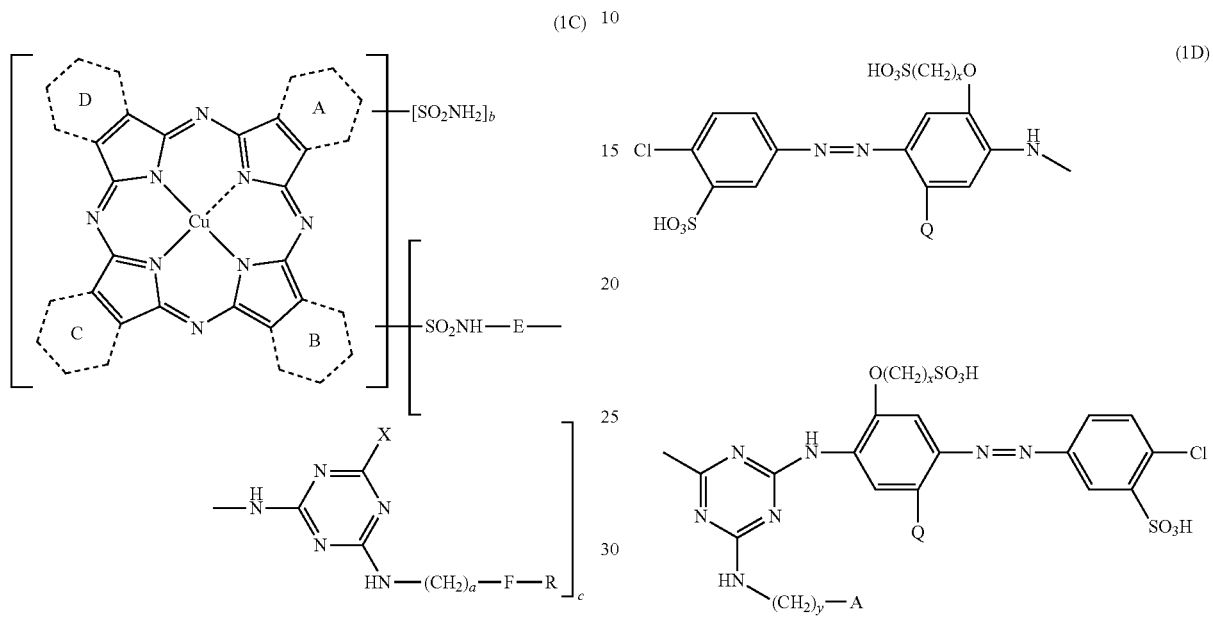

(wherein in the formula (1C), rings A to D represented by a dashed line each independently represents a benzene ring condensed to a porphyrazine ring or a 6-membered nitrogen-containing heterocyclic aromatic ring, the number of nitrogen-containing heterocyclic aromatic rings is greater than 0.00 to 3.00 or less as an average value, and the remainder are benzene rings, E represents a C2-C12 alkylene, X is a sulfoanilino group, a carboxyanilino group, a phosphonoanilino group, a sulfonaphthylamino group, a carboxynaphthylamino group or a phosphononaphthylamino group which may have, as a substituent, at least one of a sulfo group, a carboxy group, a phosphoric acid group, a sulfamoyl group, a carbamoyl group, a hydroxy group, a C1-C6 alkoxy group, an amino group, a mono-C1-C4 alkylamino group, a di-C1-C4 alkylamino group, a mono-C6-C10 arylamino group, di-C6-C10 arylamino group, a C1-C3 alkylcarbonylamino group, a ureido group, a C1-C6 alkyl group, a nitro group, a cyano group, a halogen atom, a C1-C6 alkylsulfonyl group, and a C1-C6 alkylthio group, R represents a hydrogen atom; a sulfo group; a carboxy group; a phosphoric acid group; a sulfamoyl group; a carbamoyl group; a hydroxy group; a C1-C6 alkoxy group; an amino group; a mono-C1-C6 alkylamino group; a di-C1-C6 alkylamino group; a monoarylamino group; a diarylamino group; a C1-C3 alkylcarbonylamino group; a ureido group; a C1-C6 alkyl group; a nitro group; a cyano group; a halogen atom; a C1-C6 alkylsulfonyl group; or an alkylthio group, Group F represents a phenyl group; or a 6-membered nitrogen-containing heterocyclic aromatic ring, (wherein in formula (1D), Q represents a halogen atom, A represents a sulfo group, a carboxy group or a hydroxy group, x represents an integer of 2 or more to 4 or less, and y represents an integer of 1 or more to 3 or less.

2. The ink set according to claim 1, wherein the second metal ions are at least one of sodium ions and lithium ions.

3. The ink set according to claim 1, wherein the first metal ions are at least one of potassium ions and sodium ions.

4. The ink set according to claim 1, wherein a divalent crosslinked group represented by the X in the general formula (1A) is a group that is of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group in which the alkyl member is substituted with a hydroxy group or a carboxy group; an amino C1-C6 alkoxy C1-C6 alkylamino group; an amino C1-C4 alkoxy C1-C4 alkoxy C1-C4 alkylamino group; a xylylenediamino group; a piperazine-1,4-diyl group; a piperazine-1,4-diyl group substituted with a C1-C4 alkyl group or a C1-C4 alkoxy group; or a phenylenediamino group.

5. The ink set according to claim 1, wherein $R^1$, $R^2$, $R^3$, $R^4$, $R^5$, $R^6$, $R^7$ and the $R^8$ in the general formula (1A) may each independently be a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group.

6. The ink set according to claim 1, wherein the dyes are a compound represented by formula (2A) below or a salt thereof (2A)

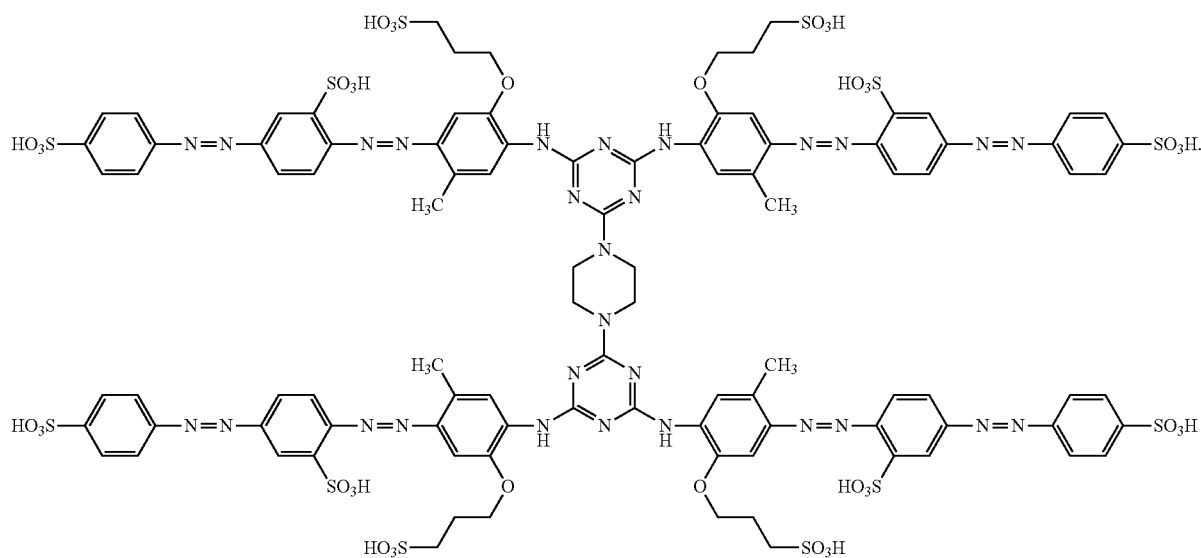

7. The ink set according to claim 1, wherein in the general formula (1B), $R^1$ is a carboxy group or an unsubstituted C1-C4 alkyl group, $R^2$ is a sulfo C1-C4 alkoxy group, and $R^3$ is a hydrogen atom, a methyl group, or an ethyl group.

8. The ink set according to claim 1, wherein
the group A is a substituted heterocyclic group represented by the general formula (3B), and,
in the general formula (3B), $R^6$, $R^7$ and $R^8$ are each independently a hydrogen atom, a chlorine atom, a carboxy group, a sulfo group, a nitro group, a C1-C4 alkyl group, a C1-C4 alkoxy group, and a C1-C4 alkyl sulfonyl group.

9. The ink set according to claim 1, wherein the dyes are a compound represented by formula (4B) below or a salt thereof (4B)

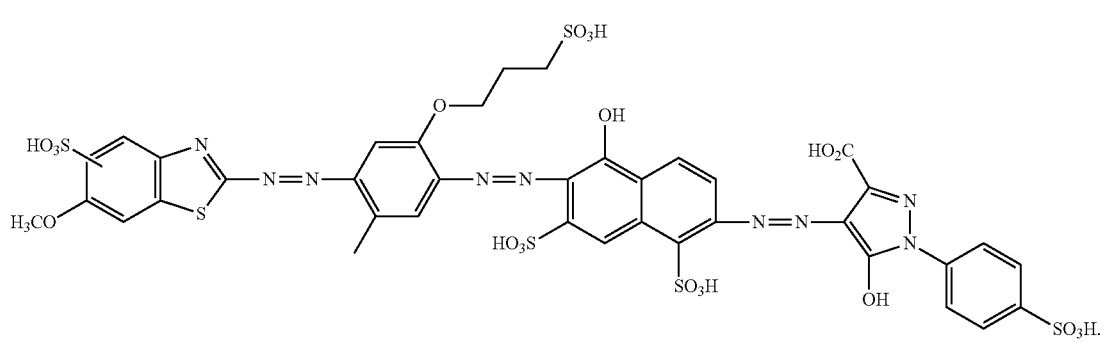

group, a C1-C6 alkoxy group, an amino group, a mono-C1-C4 alkylamino group, a di-C1-C4 alkylamino group, a C1-C3 alkylcarbonylamino group, a nitro group, a halogen atom, a C1-C6 alkylsulfonyl group, and a C1-C6 alkylthio group; a carboxyanilino group which may have, as a substituent, at least one of a sulfo group, a carboxy group, a hydroxy group, and a sulfamoyl group; a phosphonoanilino group; or a sulfonaphthylamino group which may have, as a substituent, at least one of a sulfo group and a hydroxy group,
R is a hydrogen atom; a sulfo group; a carboxy group; a C1-C6 alkoxy group; a C1-C6 alkyl group; or a halogen atom,
group F is a phenyl group; or a pyridyl group in which R is a hydrogen atom, and
a is an integer of 1 or 2.

10. The ink set according to claim 1, wherein
in the general formula (1C),
the nitrogen-containing heterocyclic aromatic rings of rings A to D are each independently pyridine rings condensed at 2-position and 3-position or 3-position and 4-position; or pyrazine rings condensed at 2-position and 3-position,
E is a linear C2-C4 alkylene,
X is a sulfoanilino group which may have, as a substituent, at least one of a sulfo group, a carboxy group, a hydroxy 11. The ink set according to claim 1, wherein
in the general formula (1C),
the nitrogen-containing heterocyclic aromatic rings of rings A to D are each independently pyridine rings condensed at 2-position and 3-position,
E is ethylene,
X is a sulfoanilino group which may have zero or one sulfo group as a substituent; or a sulfonaphthylamino group having two sulfo groups as substituents, R is a hydrogen atom, a sulfo group, or a carboxy group,
group F is a phenyl group, or a pyridyl group in which R is a hydrogen atom,
a is an integer of 1,
b is 0.00 or more to less than 3.90 as an average value,
c is 0.10 or more to less than 4.00 as an average value, and
a sum of b and c is 1.00 or more to less than 4.00 as an average value.

12. The ink set according to claim 1, wherein the dyes are a compound represented by formula (2D) below or a salt thereof

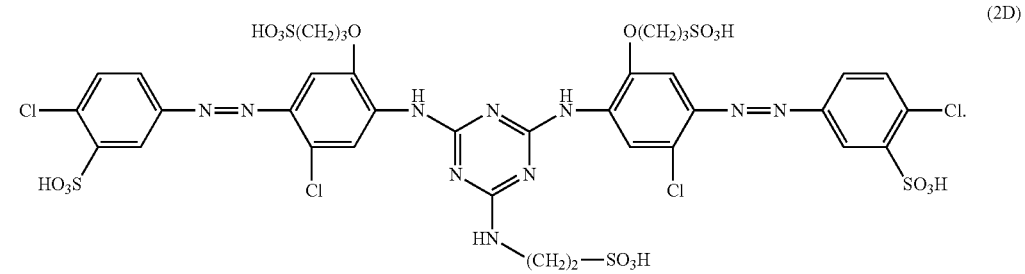

(2D)

13. A droplet ejection apparatus comprising:
the ink set provided with the first ink and second ink according to claim 1;
a nozzle surface provided with nozzle holes for ejecting the first ink and second ink; and
a wiping member for wiping the nozzle surface.

14. A droplet ejection apparatus comprising:
the ink set provided with the first ink and second ink according to claim 2;
a nozzle surface provided with nozzle holes for ejecting the first ink and second ink; and
a wiping member for wiping the nozzle surface.

15. A droplet ejection apparatus comprising:
the ink set provided with the first ink and second ink according to claim 3;
a nozzle surface provided with nozzle holes for ejecting the first ink and second ink; and
a wiping member for wiping the nozzle surface.

16. A droplet ejection apparatus comprising:
the ink set provided with the first ink and second ink according to claim 4;
a nozzle surface provided with nozzle holes for ejecting the first ink and second ink; and
a wiping member for wiping the nozzle surface.

17. A droplet ejection apparatus comprising:
the ink set provided with the first ink and second ink according to claim 5;
a nozzle surface provided with nozzle holes for ejecting the first ink and second ink; and
a wiping member for wiping the nozzle surface.

18. A droplet ejection apparatus comprising:
the ink set provided with the first ink and second ink according to claim 6;
a nozzle surface provided with nozzle holes for ejecting the first ink and second ink; and
a wiping member for wiping the nozzle surface.

19. A droplet ejection apparatus comprising:
the ink set provided with the first ink and second ink according to claim 7;
a nozzle surface provided with nozzle holes for ejecting the first ink and second ink; and
a wiping member for wiping the nozzle surface.

20. A droplet ejection apparatus comprising:
the ink set provided with the first ink and second ink according to claim 8;
a nozzle surface provided with nozzle holes for ejecting the first ink and second ink; and
a wiping member for wiping the nozzle surface.

* * * * *